US011237714B2

(12) United States Patent
Sundermeyer et al.

(10) Patent No.: US 11,237,714 B2

(45) Date of Patent: *Feb. 1, 2022

(54) CONTROL SYSTEM USER INTERFACE

(71) Applicant: iControl Networks, Inc., Philadelphia, PA (US)

(72) Inventors: Ken Sundermeyer, Redwood City, CA (US); Paul Dawes, Redwood City, CA (US); Jim Fulker, Redwood City, CA (US)

(73) Assignee: Control Networks, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,481

(22) Filed: Sep. 27, 2019

(65) Prior Publication Data

US 2020/0159399 A1 May 21, 2020

Related U.S. Application Data

(63) Continuation of application No. 13/929,568, filed on Jun. 27, 2013, now Pat. No. 10,444,964, which is a (Continued)

(51) Int. Cl.
*G06F 3/0484* (2013.01)
*G06F 3/0481* (2013.01)
(Continued)

(52) U.S. Cl.
CPC ...... *G06F 3/04847* (2013.01); *G06F 3/04817* (2013.01); *G06F 3/04842* (2013.01);
(Continued)

(58) Field of Classification Search
CPC ....... H04L 12/2803-2838; H04L 41/06-0627; H04L 41/0803-0809; H04L 41/22;
(Continued)

(56) References Cited

U.S. PATENT DOCUMENTS

| | | | |
|---|---|---|---|
| 686,838 | A | 11/1901 | Appel |
| 1,738,540 | A | 12/1929 | Replogle et al. |

(Continued)

FOREIGN PATENT DOCUMENTS

| | | | |
|---|---|---|---|
| AU | 2005223267 | B2 | 12/2010 |
| AU | 2010297957 | A1 | 5/2012 |

(Continued)

OTHER PUBLICATIONS

"Associate". Merriam-Webster.com Dictionary, Merriam-Webster, https://web.archive.org/web/20061209213742/https://www.merriam-webster.com/dictionary/associate. Dec. 9, 2006.*

(Continued)

*Primary Examiner* — Brendan Y Higa
(74) *Attorney, Agent, or Firm* — BakerHostetler

(57) ABSTRACT

Embodiments include systems and methods comprising a gateway located at a premise forming at least one network on the premise that includes a plurality of premise devices. A sensor user interface (SUI) is coupled to the gateway and presented to a user via a remote device. The SUI includes at least one display element. The at least one display element includes a floor plan display that represents at least one floor of the premise. The floor plan display visually and separately indicates a location and a current state of each premise device of the plurality of premise devices.

35 Claims, 68 Drawing Sheets

Related U.S. Application Data continuation-in-part of application No. 13/718,851, filed on Dec. 18, 2012, now Pat. No. 10,156,831, application No. 16/585,481, filed on Sep. 27, 2019, which is a continuation-in-part of application No. 13/531,757, filed on Jun. 25, 2012, now abandoned, and a continuation-in-part of application No. 13/335,279, filed on Dec. 22, 2011, and a continuation-in-part of application No. 13/311,365, filed on Dec. 5, 2011, now Pat. No. 9,141,276, and a continuation-in-part of application No. 13/104,932, filed on May 10, 2011, and a continuation-in-part of application No. 13/104,936, filed on May 10, 2011, now Pat. No. 10,380,871, and a continuation-in-part of application No. 12/750,470, filed on Mar. 30, 2010, now Pat. No. 9,191,228, and a continuation-in-part of application No. 12/637,671, filed on Dec. 14, 2009, now Pat. No. 8,478,871, and a continuation-in-part of application No. 12/539,537, filed on Aug. 11, 2009, now Pat. No. 10,156,959, and a continuation-in-part of application No. 12/189,757, filed on Aug. 11, 2008, now Pat. No. 8,473,619, and a continuation-in-part of application No. 12/019,568, filed on Jan. 24, 2008, now Pat. No. 10,142,392, and a continuation-in-part of application No. 11/761,745, filed on Jun. 12, 2007, now Pat. No. 8,635,350.

(60) Provisional application No. 61/665,078, filed on Jun. 27, 2012.

(51) Int. Cl.

*G08B 13/196* (2006.01)
*H04L 12/28* (2006.01)
*G08B 13/00* (2006.01)
*H04L 12/26* (2006.01)
*H04L 29/08* (2006.01)
*G08B 25/00* (2006.01)
*G08B 25/14* (2006.01)
*H04L 12/24* (2006.01)

(52) U.S. Cl.

CPC ......... *G08B 13/00* (2013.01); *G08B 13/1968* (2013.01); *G08B 25/003* (2013.01); *G08B 25/008* (2013.01); *G08B 25/14* (2013.01); *H04L 12/283* (2013.01); *H04L 12/2809* (2013.01); *H04L 12/2818* (2013.01); *H04L 12/2823* (2013.01); *H04L 41/22* (2013.01); *H04L 43/04* (2013.01); *H04L 43/045* (2013.01); *H04L 67/025* (2013.01); *H04L 67/36* (2013.01); *H04L 41/0806* (2013.01); *H04L 41/0813* (2013.01); *H04L 41/0883* (2013.01); *H04L 2012/2841* (2013.01); *H04L 2012/2843* (2013.01)

(58) Field of Classification Search

CPC ........... H04L 43/04–045; H04L 67/025; H04L 29/06544; H04L 67/12; H04L 67/36; G08B 13/00–19697; G08B 17/00; G08B 19/00; G08B 23/00; G08B 25/00–009; G08B 29/00; G08B 13/19678–19691; G06F 3/04817; G06F 3/04842

See application file for complete search history.

(56) References Cited

U.S. PATENT DOCUMENTS 3,803,576 A 4/1974 Dobrzanski et al.
3,852,541 A 12/1974 Altenberger
4,006,460 A 2/1977 Hewitt et al.
4,141,006 A 2/1979 Braxton
4,206,449 A 6/1980 Apsell et al.
4,257,038 A 3/1981 Rounds et al.
4,286,331 A 8/1981 Anderson et al.
4,304,970 A 12/1981 Fahey et al.
4,351,023 A 9/1982 Richer
4,363,031 A 12/1982 Reinowitz
4,459,582 A 7/1984 Sheahan et al.
4,520,503 A 5/1985 Kirst et al.
4,559,526 A 12/1985 Tani et al.
4,559,527 A 12/1985 Kirby
4,567,557 A 1/1986 Burns
4,574,305 A 3/1986 Campbell et al.
4,581,606 A 4/1986 Mallory
4,591,834 A 5/1986 Kyle
D284,084 S 6/1986 Ferrara, Jr.
4,641,127 A 2/1987 Hogan et al.
4,652,859 A 3/1987 Van Wienen
4,670,739 A 6/1987 Kelly, Jr.
4,683,460 A 7/1987 Nakatsugawa
4,694,282 A 9/1987 Tamura et al.
4,716,973 A 1/1988 Cobern
4,730,184 A 3/1988 Bach
4,754,261 A 6/1988 Marino
4,755,792 A 7/1988 Pezzolo et al.
4,779,007 A 10/1988 Schlanger et al.
4,801,924 A 1/1989 Burgmann et al.
4,812,820 A 3/1989 Chatwin
4,818,970 A 4/1989 Natale et al.
4,833,339 A 5/1989 Luchaco et al.
4,833,449 A 5/1989 Gaffigan
4,855,713 A 8/1989 Brunius
4,860,185 A 8/1989 Brewer et al.
4,887,064 A 12/1989 Drori et al.
4,897,630 A 1/1990 Nykerk
4,918,623 A 4/1990 Lockitt et al.
4,918,717 A 4/1990 Bissonnette et al.
4,951,029 A 8/1990 Severson
4,959,713 A 9/1990 Morotomi et al.
4,962,473 A 10/1990 Crain
4,980,666 A 12/1990 Hwang
4,993,059 A 2/1991 Smith et al.
4,994,787 A 2/1991 Kratt et al.
4,996,646 A 2/1991 Farrington
5,023,901 A 6/1991 Sloan et al.
5,083,106 A 1/1992 Kostusiak et al.
5,086,385 A 2/1992 Launey et al.
5,091,780 A 2/1992 Pomerleau
5,109,278 A 4/1992 Erickson et al.
5,132,968 A 7/1992 Cephus
5,134,644 A 7/1992 Garton et al.
5,159,315 A 10/1992 Schultz et al.
5,160,879 A 11/1992 Tortola et al.
5,164,703 A 11/1992 Rickman
5,164,979 A 11/1992 Choi
D337,569 S 7/1993 Kando
5,227,776 A 7/1993 Starefoss
5,237,305 A 8/1993 Ishikuro et al.
5,245,694 A 9/1993 Zwern
5,280,527 A 1/1994 Gullman et al.
5,283,816 A 2/1994 Gomez Diaz
5,299,971 A 4/1994 Hart
5,319,394 A 6/1994 Dukek
5,319,698 A 6/1994 Glidewell et al.
5,334,974 A 8/1994 Simms et al.
5,400,011 A 3/1995 Sutton
5,400,246 A 3/1995 Wilson et al.
5,406,260 A 4/1995 Cummings et al.
5,410,343 A 4/1995 Coddington et al.
5,412,708 A 5/1995 Katz
5,414,409 A 5/1995 Voosen et al.
5,414,833 A 5/1995 Hershey et al.
5,428,293 A 6/1995 Sinclair et al.
5,438,607 A 8/1995 Przygoda et al.
5,446,445 A 8/1995 Bloomfield et al.
5,448,290 A 9/1995 Vanzeeland
5,452,344 A 9/1995 Larson
5,465,081 A 11/1995 Todd

(56) References Cited

U.S. PATENT DOCUMENTS

| | | | |
|---|---|---|---|
| 5,471,194 | A | 11/1995 | Guscott |
| 5,481,312 | A | 1/1996 | Cash et al. |
| 5,483,224 | A | 1/1996 | Rankin et al. |
| 5,486,812 | A | 1/1996 | Todd |
| 5,499,014 | A | 3/1996 | Greenwaldt |
| 5,499,196 | A | 3/1996 | Pacheco |
| 5,510,975 | A | 4/1996 | Ziegler, Jr. |
| 5,519,878 | A | 5/1996 | Dolin, Jr. |
| RE35,268 | E | 6/1996 | Frolov et al. |
| 5,525,966 | A | 6/1996 | Parish |
| 5,526,428 | A | 6/1996 | Arnold |
| 5,534,845 | A | 7/1996 | Issa et al. |
| 5,541,585 | A | 7/1996 | Duhame et al. |
| 5,543,778 | A | 8/1996 | Stouffer |
| 5,546,072 | A | 8/1996 | Creuseremee et al. |
| 5,546,074 | A | 8/1996 | Bernal et al. |
| 5,546,447 | A | 8/1996 | Skarbo et al. |
| 5,548,646 | A | 8/1996 | Aziz et al. |
| 5,550,984 | A | 8/1996 | Gelb |
| 5,557,254 | A | 9/1996 | Johnson et al. |
| 5,570,079 | A | 10/1996 | Dockery |
| 5,572,438 | A | 11/1996 | Ehlers et al. |
| 5,578,989 | A | 11/1996 | Pedtke |
| 5,579,197 | A | 11/1996 | Mengelt et al. |
| 5,579,221 | A | 11/1996 | Mun |
| D377,034 | S | 12/1996 | Matsushita |
| 5,586,254 | A | 12/1996 | Kondo et al. |
| 5,587,705 | A | 12/1996 | Morris |
| 5,598,086 | A | 1/1997 | Somerville |
| 5,602,918 | A | 2/1997 | Chen et al. |
| 5,604,493 | A | 2/1997 | Behlke |
| 5,606,615 | A | 2/1997 | Lapointe et al. |
| 5,621,662 | A | 4/1997 | Humphries et al. |
| 5,623,601 | A | 4/1997 | Vu |
| 5,625,338 | A | 4/1997 | Pildner et al. |
| 5,625,410 | A | 4/1997 | Washino et al. |
| 5,629,687 | A | 5/1997 | Sutton et al. |
| 5,630,216 | A | 5/1997 | McEwan |
| 5,631,630 | A | 5/1997 | McSweeney |
| 5,638,046 | A | 6/1997 | Malinowski |
| 5,650,773 | A | 7/1997 | Chiarello |
| 5,651,070 | A | 7/1997 | Blunt |
| 5,652,567 | A | 7/1997 | Traxler |
| 5,654,694 | A | 8/1997 | Newham |
| 5,675,321 | A | 10/1997 | McBride |
| 5,680,131 | A | 10/1997 | Utz |
| 5,682,133 | A | 10/1997 | Johnson et al. |
| 5,686,885 | A | 11/1997 | Bergman |
| 5,686,896 | A | 11/1997 | Bergman |
| 5,689,235 | A | 11/1997 | Sugimoto et al. |
| 5,689,708 | A | 11/1997 | Regnier et al. |
| 5,691,697 | A | 11/1997 | Carvalho et al. |
| 5,694,335 | A | 12/1997 | Hollenberg |
| 5,694,595 | A | 12/1997 | Jacobs et al. |
| 5,696,486 | A | 12/1997 | Poliquin et al. |
| 5,696,898 | A | 12/1997 | Baker et al. |
| D389,501 | S | 1/1998 | Mascarenas et al. |
| 5,706,191 | A | 1/1998 | Bassett et al. |
| 5,712,679 | A | 1/1998 | Coles |
| 5,714,933 | A | 2/1998 | Le Van Suu |
| 5,715,394 | A | 2/1998 | Jabs |
| 5,717,378 | A | 2/1998 | Malvaso et al. |
| 5,717,379 | A | 2/1998 | Peters |
| 5,717,578 | A | 2/1998 | Afzal |
| 5,719,551 | A | 2/1998 | Flick |
| 5,726,912 | A | 3/1998 | Krall et al. |
| 5,731,756 | A | 3/1998 | Roddy |
| 5,736,927 | A | 4/1998 | Stebbins et al. |
| 5,737,391 | A | 4/1998 | Dame et al. |
| 5,748,084 | A | 5/1998 | Isikoff |
| 5,748,089 | A | 5/1998 | Sizemore |
| 5,757,616 | A | 5/1998 | May et al. |
| 5,761,206 | A | 6/1998 | Kackman |
| 5,774,051 | A | 6/1998 | Kostusiak |
| 5,777,551 | A | 7/1998 | Hess |
| 5,777,837 | A | 7/1998 | Eckel et al. |
| 5,784,461 | A | 7/1998 | Shaffer et al. |
| 5,784,463 | A | 7/1998 | Chen et al. |
| 5,793,028 | A | 8/1998 | Wagener et al. |
| 5,793,763 | A | 8/1998 | Mayes et al. |
| 5,794,128 | A | 8/1998 | Brockel et al. |
| 5,796,401 | A | 8/1998 | Winer |
| 5,798,701 | A | 8/1998 | Bernal et al. |
| 5,801,618 | A | 9/1998 | Jenkins |
| 5,805,056 | A | 9/1998 | Mueller et al. |
| 5,805,064 | A | 9/1998 | Yorkey |
| 5,809,013 | A | 9/1998 | Kackman |
| 5,809,265 | A | 9/1998 | Blair et al. |
| 5,812,054 | A | 9/1998 | Cohen |
| 5,819,124 | A | 10/1998 | Somner et al. |
| 5,821,937 | A | 10/1998 | Tonelli |
| 5,844,599 | A | 12/1998 | Hildin |
| 5,845,070 | A | 12/1998 | Ikudome |
| 5,854,588 | A | 12/1998 | Dockery |
| 5,859,966 | A | 1/1999 | Hayman et al. |
| 5,861,804 | A | 1/1999 | Fansa et al. |
| 5,867,484 | A | 2/1999 | Shaunfield |
| 5,867,495 | A | 2/1999 | Elliott et al. |
| 5,874,952 | A | 2/1999 | Morgan |
| 5,875,395 | A | 2/1999 | Holmes |
| 5,877,696 | A | 3/1999 | Powell |
| 5,880,775 | A | 3/1999 | Ross |
| 5,881,226 | A | 3/1999 | Veneklase |
| 5,886,894 | A | 3/1999 | Rakoff |
| 5,892,442 | A | 4/1999 | Ozery |
| 5,898,831 | A | 4/1999 | Hall et al. |
| 5,905,438 | A | 5/1999 | Weiss et al. |
| 5,907,279 | A | 5/1999 | Bruins et al. |
| 5,909,183 | A | 6/1999 | Borgstahl et al. |
| 5,914,655 | A | 6/1999 | Clifton et al. |
| 5,924,069 | A | 7/1999 | Kowalkowski et al. |
| 5,926,209 | A | 7/1999 | Glatt |
| 5,933,098 | A | 8/1999 | Haxton |
| 5,940,387 | A | 8/1999 | Humpleman |
| 5,943,394 | A | 8/1999 | Ader et al. |
| 5,952,815 | A | 9/1999 | Rouillard et al. |
| 5,955,946 | A | 9/1999 | Beheshti et al. |
| 5,958,053 | A | 9/1999 | Denker |
| 5,959,528 | A | 9/1999 | Right et al. |
| 5,959,529 | A | 9/1999 | Kail, IV |
| 5,963,916 | A | 10/1999 | Kaplan |
| 5,967,975 | A | 10/1999 | Ridgeway |
| 5,974,547 | A | 10/1999 | Klimenko |
| D416,910 | S | 11/1999 | Vasquez |
| 5,982,418 | A | 11/1999 | Ely |
| 5,991,795 | A | 11/1999 | Howard et al. |
| 5,995,838 | A | 11/1999 | Oda et al. |
| 6,002,430 | A | 12/1999 | McCall et al. |
| 6,009,320 | A | 12/1999 | Dudley |
| 6,011,321 | A | 1/2000 | Stancu et al. |
| 6,011,921 | A | 1/2000 | Takahashi et al. |
| 6,032,036 | A | 2/2000 | Maystre et al. |
| 6,037,991 | A | 3/2000 | Thro et al. |
| 6,038,289 | A | 3/2000 | Sands |
| 6,040,770 | A | 3/2000 | Britton |
| 6,049,272 | A | 4/2000 | Lee et al. |
| 6,049,273 | A | 4/2000 | Hess |
| 6,049,598 | A | 4/2000 | Peters et al. |
| 6,052,052 | A | 4/2000 | Delmonaco |
| 6,058,115 | A | 5/2000 | Sawyer et al. |
| 6,060,994 | A | 5/2000 | Chen |
| 6,067,346 | A | 5/2000 | Akhteruzzaman |
| 6,067,440 | A | 5/2000 | Diefes |
| 6,069,655 | A | 5/2000 | Seeley et al. |
| 6,078,253 | A | 6/2000 | Fowler |
| 6,078,257 | A | 6/2000 | Ferraro |
| 6,078,649 | A | 6/2000 | Small et al. |
| 6,085,030 | A | 7/2000 | Whitehead et al. |
| 6,091,771 | A | 7/2000 | Seeley et al. |
| 6,094,134 | A | 7/2000 | Cohen |
| 6,097,429 | A | 8/2000 | Seeley et al. |
| 6,104,785 | A | 8/2000 | Chen |
| 6,107,918 | A | 8/2000 | Klein et al. |
| 6,107,930 | A | 8/2000 | Behlke et al. |

(56) References Cited

U.S. PATENT DOCUMENTS 6,108,034 A 8/2000 Kim
6,112,015 A 8/2000 Lanas et al.
6,112,237 A 8/2000 Donaldson et al.
6,117,182 A 9/2000 Alpert et al.
6,124,882 A 9/2000 Voois et al.
6,128,653 A 10/2000 Del et al.
6,134,303 A 10/2000 Chen
6,134,591 A 10/2000 Nickles
6,138,249 A 10/2000 Nolet
6,139,177 A 10/2000 Venkatraman et al.
6,140,987 A 10/2000 Stein et al.
6,144,993 A 11/2000 Fukunaga et al.
6,154,133 A 11/2000 Ross et al.
6,157,943 A 12/2000 Meyer
6,161,182 A 12/2000 Nadooshan
6,167,186 A 12/2000 Kawasaki et al.
6,181,341 B1 1/2001 Shinagawa
6,192,282 B1 2/2001 Smith et al.
6,192,418 B1 2/2001 Hale et al.
6,198,475 B1 3/2001 Kunimatsu et al.
6,198,479 B1 3/2001 Humpleman et al.
6,208,247 B1 3/2001 Agre et al.
6,208,952 B1 3/2001 Goertzel et al.
6,209,011 B1 3/2001 Vong et al.
6,211,783 B1 4/2001 Wang
6,215,404 B1 4/2001 Morales
6,218,938 B1 4/2001 Lin
6,219,677 B1 4/2001 Howard
6,226,031 B1 5/2001 Barraclough et al.
6,229,429 B1 5/2001 Horon
6,230,271 B1 5/2001 Wadlow et al.
6,239,892 B1 5/2001 Davidson
6,243,683 B1 6/2001 Peters
6,246,320 B1 6/2001 Monroe
6,271,752 B1 8/2001 Vaios
6,275,227 B1 8/2001 Destefano
6,281,790 B1 8/2001 Kimmel et al.
6,282,569 B1 8/2001 Wallis et al.
6,286,038 B1 9/2001 Reichmeyer et al.
6,288,716 B1 9/2001 Humpleman et al.
6,289,382 B1 9/2001 Bowman-Amuah
6,292,766 B1 9/2001 Mattos et al.
6,292,827 B1 9/2001 Raz
6,295,346 B1 9/2001 Markowitz et al.
6,314,425 B1 11/2001 Serbinis et al.
6,320,506 B1 11/2001 Ferraro
6,323,897 B1 11/2001 Kogane et al.
D451,529 S 12/2001 Vasquez
6,327,044 B1 12/2001 Shima
6,331,122 B1 12/2001 Wu
6,332,193 B1 12/2001 Glass et al.
6,347,393 B1 2/2002 Alpert et al.
6,351,213 B1 2/2002 Hirsch et al.
6,351,271 B1 2/2002 Mainwaring et al.
6,351,595 B1 2/2002 Kim
6,351,829 B1 2/2002 Dupont et al.
6,353,853 B1 3/2002 Gravlin
6,353,891 B1 3/2002 Borella et al.
6,359,560 B1 3/2002 Budge et al.
6,363,417 B1 3/2002 Howard et al.
6,363,422 B1 3/2002 Hunter et al.
6,366,211 B1 4/2002 Parker
6,369,695 B1 4/2002 Horon
6,369,705 B1 4/2002 Kennedy
6,370,436 B1 4/2002 Howard et al.
6,374,079 B1 4/2002 Hsu
6,377,861 B1 4/2002 York
6,378,109 B1 4/2002 Young et al.
6,385,772 B1 5/2002 Courtney
6,392,538 B1 5/2002 Shere
6,400,265 B1 6/2002 Saylor et al.
6,405,348 B1 6/2002 Fallah-Tehrani et al.
6,411,802 B1 6/2002 Cardina et al.
D460,472 S 7/2002 Wang
6,418,037 B1 7/2002 Zhang
6,421,080 B1 7/2002 Lambert
6,430,629 B1 8/2002 Smyers
6,433,683 B1 8/2002 Robinson
6,434,604 B1 8/2002 Harada et al.
6,434,700 B1 8/2002 Alonso et al.
6,437,692 B1 8/2002 Petite et al.
6,441,723 B1 8/2002 Mansfield et al.
6,442,241 B1 8/2002 Tsumpes
6,445,291 B2 9/2002 Addy et al.
6,446,192 B1 9/2002 Narasimhan et al.
6,452,490 B1 9/2002 Garland et al.
6,452,923 B1 9/2002 Gerszberg et al.
6,453,687 B2 9/2002 Sharood et al.
D464,328 S 10/2002 Vasquez et al.
D464,948 S 10/2002 Vasquez et al.
6,462,507 B2 10/2002 Fisher, Jr.
6,462,663 B1 10/2002 Wilson et al.
6,467,084 B1 10/2002 Howard et al.
6,476,858 B1 11/2002 Ramirez et al.
6,480,901 B1 11/2002 Weber et al.
6,493,020 B1 12/2002 Stevenson et al.
6,496,927 B1 12/2002 McGrane et al.
6,499,131 B1 12/2002 Savithri et al.
6,504,479 B1 1/2003 Lemons et al.
6,507,589 B1 1/2003 Ramasubramani et al.
6,508,709 B1 1/2003 Karmarkar
6,526,581 B1 2/2003 Edson
6,529,230 B1 3/2003 Chong
6,529,723 B1 3/2003 Bentley
6,535,110 B1 * 3/2003 Arora .................... H04L 12/282 340/12.32
6,542,075 B2 4/2003 Barker et al.
6,542,992 B1 4/2003 Peirce et al.
6,552,647 B1 4/2003 Thiessen et al.
6,553,336 B1 4/2003 Johnson et al.
6,559,769 B2 5/2003 Anthony et al.
6,563,800 B1 5/2003 Salo et al.
6,563,910 B2 5/2003 Menard et al.
6,567,122 B1 5/2003 Anderson et al.
6,567,502 B2 5/2003 Zellner et al.
6,574,234 B1 6/2003 Myer et al.
6,580,424 B1 * 6/2003 Krumm .................. G06T 17/00 345/419
6,580,950 B1 6/2003 Johnson et al.
6,587,046 B2 7/2003 Joao
6,587,455 B1 7/2003 Ray et al.
6,587,736 B2 7/2003 Howard et al.
6,587,739 B1 7/2003 Abrams et al.
6,591,094 B1 7/2003 Bentley
6,597,703 B1 7/2003 Li et al.
6,601,086 B1 7/2003 Howard et al.
6,603,488 B2 8/2003 Humpleman et al.
6,609,127 B1 8/2003 Lee et al.
6,611,206 B2 8/2003 Eshelman et al.
6,615,088 B1 9/2003 Myer et al.
6,621,827 B1 9/2003 Rezvani et al.
6,624,750 B1 9/2003 Marman et al.
6,631,416 B2 10/2003 Bendinelli et al.
6,636,893 B1 10/2003 Fong
6,643,355 B1 11/2003 Tsumpes
6,643,652 B2 11/2003 Helgeson et al.
6,643,669 B1 11/2003 Novak et al.
6,643,795 B1 11/2003 Sicola et al.
6,648,682 B1 11/2003 Wu
6,658,091 B1 12/2003 Naidoo et al.
6,661,340 B1 12/2003 Saylor et al.
6,662,340 B2 12/2003 Rawat et al.
6,665,004 B1 12/2003 Paff
6,667,688 B1 12/2003 Menard et al.
6,674,767 B1 1/2004 Kadyk et al.
6,675,365 B2 1/2004 Elzinga
6,680,730 B1 1/2004 Shields et al.
6,686,838 B1 2/2004 Rezvani et al.
6,690,411 B2 2/2004 Naidoo et al.
6,690,719 B1 2/2004 Raphaeli et al.
6,693,530 B1 2/2004 Dowens et al.
6,693,545 B2 2/2004 Brown et al.
6,697,103 B1 2/2004 Fernandez et al.
6,704,786 B1 3/2004 Gupta et al.

(56) References Cited

U.S. PATENT DOCUMENTS 6,720,990 B1 4/2004 Walker et al.
6,721,689 B2 4/2004 Markle et al.
6,721,740 B1 4/2004 Skinner et al.
6,721,747 B2 4/2004 Lipkin
6,721,802 B1 4/2004 Wright et al.
6,727,811 B1 4/2004 Fendis
6,728,233 B1 4/2004 Park et al.
6,728,688 B1 4/2004 Hirsch et al.
6,738,824 B1 5/2004 Blair
6,741,171 B2 5/2004 Palka et al.
6,741,977 B1 5/2004 Nagaya et al.
6,754,717 B1 6/2004 Day et al.
6,756,896 B2 6/2004 Ford
6,756,998 B1 6/2004 Bilger
6,759,956 B2 7/2004 Menard et al.
6,762,686 B1 7/2004 Tabe
6,771,181 B1 8/2004 Hughen, Jr.
6,778,085 B2 8/2004 Faulkner et al.
6,779,019 B1 8/2004 Mousseau et al.
6,781,509 B1 8/2004 Oppedahl et al.
6,785,542 B1 8/2004 Blight et al.
6,789,147 B1 9/2004 Kessler et al.
6,795,322 B2 9/2004 Aihara et al.
6,795,863 B1 9/2004 Doty, Jr.
6,798,344 B2 9/2004 Faulkner et al.
6,804,638 B2 10/2004 Fiedler
6,810,409 B1 10/2004 Fry et al.
6,826,173 B1 11/2004 Kung et al.
6,826,233 B1 11/2004 Oosawa
6,829,478 B1 12/2004 Layton et al.
6,834,208 B2 12/2004 Gonzales et al.
6,836,214 B2 12/2004 Choi
6,850,252 B1 2/2005 Hoffberg
6,856,236 B2 2/2005 Christensen et al.
6,857,026 B1 2/2005 Cain
6,865,690 B2 3/2005 Kocin
6,871,193 B1 3/2005 Campbell et al.
6,873,256 B2 3/2005 Lemelson et al.
6,885,362 B2 4/2005 Suomela
D504,889 S 5/2005 Andre et al.
6,891,838 B1 5/2005 Petite et al.
6,912,429 B1 6/2005 Bilger
6,914,533 B2 7/2005 Petite
6,918,112 B2 7/2005 Bourke-Dunphy et al.
6,920,502 B2 7/2005 Araujo et al.
6,920,615 B1 7/2005 Campbell et al.
6,922,701 B1 * 7/2005 Ananian ................ G06F 30/13
6,928,148 B2 8/2005 Simon et al.
6,930,598 B2 8/2005 Weiss
6,930,599 B2 8/2005 Naidoo et al.
6,930,730 B2 8/2005 Maxson et al.
6,931,445 B2 8/2005 Davis
6,941,258 B2 9/2005 Van et al.
6,943,681 B2 9/2005 Rezvani et al.
6,956,477 B2 10/2005 Chun
6,957,186 B1 10/2005 Guheen et al.
6,957,275 B1 10/2005 Sekiguchi
6,959,341 B1 10/2005 Leung
6,959,393 B2 10/2005 Hollis et al.
6,963,908 B1 11/2005 Lynch et al.
6,963,981 B1 11/2005 Bailey et al.
6,965,294 B1 11/2005 Elliott et al.
6,965,313 B1 11/2005 Saylor et al.
6,970,183 B1 11/2005 Monroe
6,971,063 B1 11/2005 Rappaport et al.
6,971,076 B2 11/2005 Chen
6,972,676 B1 12/2005 Kimmel et al.
6,975,220 B1 12/2005 Foodman et al.
6,977,485 B1 12/2005 Wei
6,983,432 B2 1/2006 Hayes
6,990,591 B1 1/2006 Pearson
6,993,658 B1 1/2006 Engberg et al.
6,999,562 B2 2/2006 Winick
6,999,992 B1 2/2006 Deen et al.
7,015,806 B2 3/2006 Naidoo et al.
7,016,970 B2 3/2006 Harumoto et al.
7,019,639 B2 3/2006 Stilp
7,020,697 B1 3/2006 Goodman et al.
7,020,701 B1 3/2006 Gelvin et al.
7,023,913 B1 4/2006 Monroe
7,023,914 B2 4/2006 Furukawa et al.
7,023,975 B2 4/2006 Mansfield et al.
7,024,676 B1 4/2006 Klopfenstein
7,028,328 B2 4/2006 Kogane et al.
7,030,752 B2 4/2006 Tyroler
7,032,002 B1 4/2006 Rezvani et al.
7,034,681 B2 4/2006 Yamamoto et al.
7,035,907 B1 4/2006 Decasper et al.
7,039,391 B2 5/2006 Rezvani et al.
7,043,537 B1 5/2006 Pratt
7,047,088 B2 5/2006 Nakamura et al.
7,047,092 B2 5/2006 Wimsatt
7,047,180 B1 * 5/2006 Mathews .............. G06F 16/972
703/27
7,050,388 B2 5/2006 Kim et al.
7,053,764 B2 5/2006 Stilp
7,053,765 B1 5/2006 Clark
7,068,164 B1 6/2006 Duncan et al.
7,072,934 B2 7/2006 Helgeson et al.
7,073,140 B1 7/2006 Li et al.
7,075,429 B2 7/2006 Marshall
7,079,020 B2 7/2006 Stilp
7,080,046 B1 7/2006 Rezvani et al.
7,081,813 B2 7/2006 Winick et al.
7,082,460 B2 7/2006 Hansen et al.
7,084,756 B2 8/2006 Stilp
7,085,814 B1 8/2006 Gandhi et al.
7,085,937 B1 8/2006 Rezvani et al.
7,086,018 B2 8/2006 Ito
7,099,944 B1 8/2006 Anschutz et al.
7,099,994 B2 8/2006 Thayer et al.
7,103,152 B2 9/2006 Naidoo et al.
7,106,176 B2 9/2006 La et al.
7,107,322 B1 9/2006 Freeny, Jr.
7,110,774 B1 9/2006 Davis et al.
7,113,090 B1 9/2006 Saylor et al.
7,113,099 B2 9/2006 Tyroler et al.
7,114,554 B2 10/2006 Bergman et al.
7,119,609 B2 10/2006 Naidoo et al.
7,119,674 B2 10/2006 Sefton
7,120,139 B1 10/2006 Kung et al.
7,120,232 B2 10/2006 Naidoo et al.
7,120,233 B2 10/2006 Naidoo et al.
7,126,473 B1 10/2006 Powell
7,130,383 B2 10/2006 Naidoo et al.
7,130,585 B1 10/2006 Ollis et al.
7,134,138 B2 11/2006 Scherr
7,136,711 B1 11/2006 Duncan et al.
7,142,503 B1 11/2006 Grant et al.
7,145,898 B1 12/2006 Elliott
7,147,147 B1 12/2006 Enright et al.
7,148,810 B2 12/2006 Bhat
7,149,798 B2 12/2006 Rezvani et al.
7,149,814 B2 12/2006 Neufeld et al.
7,158,026 B2 1/2007 Feldkamp et al.
7,158,776 B1 1/2007 Estes et al.
7,158,920 B2 1/2007 Ishikawa
7,164,883 B2 * 1/2007 Rappaport ............ G06Q 10/10
455/3.01
7,164,907 B2 1/2007 Cochran et al.
7,166,987 B2 1/2007 Lee et al.
7,171,466 B2 1/2007 Van Der Meulen
7,171,686 B1 1/2007 Jansen et al.
7,174,018 B1 2/2007 Patil et al.
7,174,564 B1 2/2007 Weatherspoon et al.
7,180,889 B1 2/2007 Kung et al.
7,181,207 B1 2/2007 Chow et al.
7,181,716 B1 2/2007 Dahroug
7,183,907 B2 2/2007 Simon et al.
7,184,848 B2 2/2007 Krzyzanowski et al.
7,187,279 B2 3/2007 Chung
7,187,986 B2 3/2007 Johnson et al.
7,194,003 B2 3/2007 Danner et al.
7,194,446 B1 3/2007 Bromley et al.

(56) References Cited

U.S. PATENT DOCUMENTS 7,203,486 B2 4/2007 Patel
7,209,945 B2 4/2007 Hicks et al.
7,212,570 B2 5/2007 Akiyama et al.
7,213,061 B1 5/2007 Hite et al.
7,218,217 B2 5/2007 Adonailo et al.
7,222,359 B2 5/2007 Freund et al.
7,229,012 B1 6/2007 Enright et al.
7,237,267 B2 6/2007 Rayes et al.
7,240,327 B2 7/2007 Singh et al.
7,246,044 B2 7/2007 Imamura et al.
7,248,150 B2 7/2007 MacKjust et al.
7,248,161 B2 7/2007 Spoltore et al.
7,249,177 B1 7/2007 Miller
7,249,317 B1 7/2007 Nakagawa et al.
7,250,854 B2 7/2007 Rezvani et al.
7,250,859 B2 7/2007 Martin et al.
7,254,779 B1 8/2007 Rezvani et al.
7,262,690 B2 8/2007 Heaton et al.
7,277,010 B2 10/2007 Joao
7,292,142 B2 11/2007 Simon et al.
7,293,083 B1 11/2007 Ranous et al.
7,298,253 B2 11/2007 Petricoin et al.
7,305,461 B2 12/2007 Ullman
7,310,115 B2 12/2007 Tanimoto
7,313,102 B2 12/2007 Stephenson et al.
7,313,231 B2 12/2007 Reid
D558,460 S 1/2008 Yu et al.
D558,756 S 1/2008 Andre et al.
7,337,217 B2 2/2008 Wang
7,337,473 B2 2/2008 Chang et al.
7,340,314 B1 3/2008 Duncan et al.
7,343,619 B2 3/2008 Ofek et al.
7,345,580 B2 3/2008 Akamatsu et al.
7,346,338 B1 3/2008 Calhoun et al.
7,349,682 B1 3/2008 Bennett et al.
7,349,761 B1 3/2008 Cruse
7,349,967 B2 3/2008 Wang
7,356,372 B1 4/2008 Duncan et al.
7,359,843 B1 4/2008 Keller et al.
7,362,221 B2 4/2008 Katz
7,367,045 B2 4/2008 Ofek et al.
7,370,115 B2 5/2008 Bae et al.
7,383,339 B1 6/2008 Meenan et al.
7,383,522 B2 6/2008 Murgai et al.
7,391,298 B1 6/2008 Campbell et al.
7,403,838 B2 7/2008 Deen et al.
7,409,045 B2 8/2008 Naidoo et al.
7,409,451 B1 8/2008 Meenan et al.
7,412,447 B2 8/2008 Hilbert et al.
7,425,101 B2 9/2008 Cheng
7,428,585 B1 9/2008 Owens et al.
7,430,614 B2 9/2008 Shen et al.
7,437,753 B2 10/2008 Nahum
7,440,434 B2 10/2008 Chaskar et al.
7,440,767 B2 10/2008 Ballay et al.
7,447,775 B1 11/2008 Zhu et al.
7,454,731 B2 11/2008 Oh et al.
7,457,869 B2 11/2008 Kernan
7,466,223 B2 12/2008 Sefton
7,469,139 B2 12/2008 Van De Groenendaal
7,469,294 B1 12/2008 Luo et al.
7,469,381 B2 12/2008 Ording
7,469,391 B2 12/2008 Carrere et al.
D584,738 S 1/2009 Kim et al.
D585,399 S 1/2009 Hwang
7,477,629 B2 1/2009 Tsirtsis et al.
7,479,949 B2 1/2009 Jobs et al.
7,480,713 B2 1/2009 Ullman
7,480,724 B2 1/2009 Zimler et al.
7,483,958 B1 1/2009 Elabbady et al.
7,493,651 B2 2/2009 Vaenskae et al.
7,498,695 B2 3/2009 Gaudreau et al.
7,502,672 B1 3/2009 Kolls
7,506,052 B2 3/2009 Qian et al.
7,509,687 B2 3/2009 Ofek et al.
7,511,614 B2 3/2009 Stilp et al.
7,512,965 B1 3/2009 Amdur et al.
7,526,539 B1 4/2009 Hsu
7,526,762 B1 4/2009 Astala et al.
7,528,723 B2 5/2009 Fast et al.
7,542,721 B1 6/2009 Bonner et al.
7,549,134 B1 6/2009 Li et al.
7,551,071 B2 6/2009 Bennett et al.
7,554,934 B2 6/2009 Abraham et al.
7,558,379 B2 7/2009 Winick
7,558,862 B1 7/2009 Tyukasz et al.
7,558,903 B2 7/2009 Kinstler
7,562,323 B1 7/2009 Bai et al.
7,564,855 B1 7/2009 Georgiou
7,568,018 B1 7/2009 Hove et al.
7,571,459 B2 8/2009 Ganesh et al.
7,577,420 B2 8/2009 Srinivasan et al.
7,583,191 B2 9/2009 Zinser
7,587,464 B2 9/2009 Moorer et al.
7,590,953 B2 9/2009 Chang
7,595,816 B1 9/2009 Enright et al.
7,596,622 B2 9/2009 Owen et al.
D602,014 S 10/2009 Andre et al.
D602,015 S 10/2009 Andre et al.
D602,017 S 10/2009 Andre et al.
D602,486 S 10/2009 Andre et al.
D602,487 S 10/2009 Maskatia
7,606,767 B1 10/2009 Couper et al.
7,610,555 B2 10/2009 Klein et al.
7,619,512 B2 11/2009 Trundle et al.
7,620,427 B2 11/2009 Shanahan
7,627,665 B2 12/2009 Barker et al.
7,633,385 B2 12/2009 Cohn et al.
7,634,519 B2 12/2009 Creamer et al.
7,639,157 B1 12/2009 Whitley et al.
7,651,530 B2 1/2010 Winick
7,653,911 B2 1/2010 Doshi et al.
7,671,729 B2 3/2010 Hershkovitz et al.
7,679,503 B2 3/2010 Mason et al.
7,681,201 B2 3/2010 Dale et al.
7,684,418 B2 3/2010 Scott et al.
7,696,873 B2 4/2010 Sharma et al.
7,697,028 B1 4/2010 Johnson
7,701,970 B2 4/2010 Krits et al.
7,702,782 B1 4/2010 Pai
D615,083 S 5/2010 Andre et al.
7,711,796 B2 5/2010 Gutt et al.
7,720,654 B2 5/2010 Hollis
7,733,371 B1 6/2010 Monroe
7,734,020 B2 6/2010 Elliot et al.
7,734,286 B2 6/2010 Almeda et al.
7,734,906 B2 6/2010 Orlando et al.
7,739,596 B2 6/2010 Clarke-Martin et al.
7,747,975 B2 6/2010 Dinter et al.
7,751,409 B1 7/2010 Carolan
7,755,472 B2 7/2010 Grossman
7,755,506 B1 7/2010 Clegg et al.
7,761,275 B2 7/2010 Chopra et al.
7,787,863 B2 8/2010 Van De Groenendaal
7,804,760 B2 9/2010 Schmukler et al.
D624,896 S 10/2010 Park et al.
D626,437 S 11/2010 Lee et al.
7,825,793 B1 11/2010 Spillman et al.
7,827,252 B2 11/2010 Hopmann et al.
7,847,675 B1 12/2010 Thyen et al.
7,855,635 B2 12/2010 Cohn et al.
7,859,404 B2 12/2010 Chul et al.
7,882,466 B2 2/2011 Ishikawa
7,882,537 B2 2/2011 Okajo et al.
7,884,855 B2 2/2011 Ortiz
7,890,612 B2 2/2011 Todd et al.
7,890,915 B2 2/2011 Celik et al.
7,899,732 B2 3/2011 Van et al.
7,904,074 B2 3/2011 Karaoguz et al.
7,904,187 B2 3/2011 Hoffberg et al.
7,911,341 B2 3/2011 Raji et al.
D636,769 S 4/2011 Wood et al.
7,921,686 B2 4/2011 Bagepalli et al.
7,928,840 B2 4/2011 Kim et al.

(56) References Cited

U.S. PATENT DOCUMENTS

| | | | |
|---|---|---|---|
| D637,596 | S | 5/2011 | Akana et al. |
| 7,949,960 | B2 | 5/2011 | Roessler et al. |
| D639,805 | S | 6/2011 | Song et al. |
| D640,663 | S | 6/2011 | Arnholt et al. |
| 7,956,736 | B2 | 6/2011 | Cohn et al. |
| 7,970,863 | B1 | 6/2011 | Fontaine |
| D641,018 | S | 7/2011 | Lee et al. |
| 7,974,235 | B2 | 7/2011 | Ghozati et al. |
| D642,563 | S | 8/2011 | Akana et al. |
| 8,001,219 | B2 | 8/2011 | Moorer et al. |
| D645,015 | S | 9/2011 | Lee et al. |
| D645,435 | S | 9/2011 | Kim et al. |
| D645,833 | S | 9/2011 | Seflic et al. |
| 8,022,833 | B2 | 9/2011 | Cho |
| 8,028,041 | B2 | 9/2011 | Olliphant et al. |
| 8,032,881 | B2 | 10/2011 | Holmberg et al. |
| 8,042,049 | B2 | 10/2011 | Killian et al. |
| 8,046,411 | B2 | 10/2011 | Hayashi et al. |
| 8,069,194 | B1 | 11/2011 | Manber et al. |
| D650,381 | S | 12/2011 | Park et al. |
| 8,073,931 | B2 | 12/2011 | Dawes et al. |
| 8,086,702 | B2 | 12/2011 | Baum et al. |
| 8,086,703 | B2 | 12/2011 | Baum et al. |
| D654,460 | S | 2/2012 | Kim et al. |
| D654,497 | S | 2/2012 | Lee |
| 8,122,131 | B2 | 2/2012 | Baum et al. |
| 8,125,184 | B2 | 2/2012 | Raji et al. |
| D656,137 | S | 3/2012 | Chung et al. |
| 8,140,658 | B1 | 3/2012 | Gelvin et al. |
| 8,144,836 | B2 | 3/2012 | Naidoo et al. |
| 8,149,849 | B2 | 4/2012 | Osborn et al. |
| 8,159,519 | B2 | 4/2012 | Kurtz et al. |
| 8,159,945 | B2 | 4/2012 | Muro et al. |
| 8,160,425 | B2 | 4/2012 | Kisliakov |
| 8,196,064 | B2 | 6/2012 | Krzyzanowski et al. |
| 8,200,827 | B1 | 6/2012 | Hunyady et al. |
| 8,205,181 | B1 | 6/2012 | Singla et al. |
| 8,209,400 | B2 | 6/2012 | Baum et al. |
| D663,298 | S | 7/2012 | Song et al. |
| D664,540 | S | 7/2012 | Kim et al. |
| 8,214,494 | B1 | 7/2012 | Slavin |
| 8,214,496 | B2 | 7/2012 | Gutt et al. |
| 8,229,812 | B2 | 7/2012 | Raleigh |
| D664,954 | S | 8/2012 | Kim et al. |
| D666,198 | S | 8/2012 | Van et al. |
| 8,239,477 | B2 | 8/2012 | Sharma et al. |
| D667,395 | S | 9/2012 | Lee |
| D667,396 | S | 9/2012 | Koh |
| D667,397 | S | 9/2012 | Koh |
| D667,398 | S | 9/2012 | Koh |
| D667,399 | S | 9/2012 | Koh |
| 8,269,376 | B1 | 9/2012 | Elberbaum |
| 8,269,623 | B2 | 9/2012 | Addy |
| 8,271,629 | B1 | 9/2012 | Winters et al. |
| 8,271,881 | B2 | 9/2012 | Moorer et al. |
| 8,272,053 | B2 | 9/2012 | Markham et al. |
| 8,275,830 | B2 | 9/2012 | Raleigh |
| D668,650 | S | 10/2012 | Han |
| D668,651 | S | 10/2012 | Kim et al. |
| D668,652 | S | 10/2012 | Kim et al. |
| D669,469 | S | 10/2012 | Kang |
| D670,692 | S | 11/2012 | Akana et al. |
| D671,514 | S | 11/2012 | Kim et al. |
| 8,311,526 | B2 | 11/2012 | Forstall et al. |
| D671,938 | S | 12/2012 | Hsu et al. |
| D672,344 | S | 12/2012 | Li |
| D672,345 | S | 12/2012 | Li |
| D672,739 | S | 12/2012 | Sin |
| D672,768 | S | 12/2012 | Huang et al. |
| 8,335,842 | B2 | 12/2012 | Raji et al. |
| 8,335,854 | B2 | 12/2012 | Eldering |
| 8,336,010 | B1 | 12/2012 | Chang et al. |
| D673,561 | S | 1/2013 | Hyun et al. |
| D673,948 | S | 1/2013 | Andre et al. |
| D673,950 | S | 1/2013 | Li et al. |
| D674,369 | S | 1/2013 | Jaewoong |
| D675,203 | S | 1/2013 | Yang |
| 8,350,694 | B1 | 1/2013 | Trundle et al. |
| D675,588 | S | 2/2013 | Park |
| D675,612 | S | 2/2013 | Andre et al. |
| D676,443 | S | 2/2013 | Canizares et al. |
| D676,819 | S | 2/2013 | Choi |
| 8,373,313 | B2 | 2/2013 | Garcia et al. |
| D677,255 | S | 3/2013 | McManigal et al. |
| D677,640 | S | 3/2013 | Kim et al. |
| D677,659 | S | 3/2013 | Akana et al. |
| D677,660 | S | 3/2013 | Groene et al. |
| D678,271 | S | 3/2013 | Chiu |
| D678,272 | S | 3/2013 | Groene et al. |
| D678,877 | S | 3/2013 | Groene et al. |
| 8,396,766 | B1 | 3/2013 | Enright et al. |
| 8,400,767 | B2 | 3/2013 | Yeom et al. |
| D679,706 | S | 4/2013 | Tang et al. |
| D680,151 | S | 4/2013 | Katori |
| D680,524 | S | 4/2013 | Feng et al. |
| D681,032 | S | 4/2013 | Akana et al. |
| 8,413,204 | B2 | 4/2013 | White et al. |
| D681,583 | S | 5/2013 | Park |
| D681,591 | S | 5/2013 | Sung |
| D681,632 | S | 5/2013 | Akana et al. |
| D682,239 | S | 5/2013 | Yeh et al. |
| 8,451,986 | B2 | 5/2013 | Cohn et al. |
| D684,553 | S | 6/2013 | Kim et al. |
| D684,968 | S | 6/2013 | Smith et al. |
| 8,456,293 | B1 | 6/2013 | Trundle et al. |
| 8,473,619 | B2 | 6/2013 | Baum et al. |
| D685,778 | S | 7/2013 | Fahrendorff et al. |
| D685,783 | S | 7/2013 | Bryan et al. |
| 8,478,450 | B2 | 7/2013 | Lu et al. |
| 8,478,844 | B2 | 7/2013 | Baum et al. |
| 8,478,871 | B2 | 7/2013 | Gutt et al. |
| 8,483,853 | B1 | 7/2013 | Lambourne |
| 8,493,202 | B1 | 7/2013 | Trundle et al. |
| 8,499,038 | B1 | 7/2013 | Vucurevich |
| 8,520,068 | B2 | 8/2013 | Naidoo et al. |
| 8,520,072 | B1 | 8/2013 | Slavin et al. |
| 8,525,664 | B2 | 9/2013 | Hadizad et al. |
| 8,543,665 | B2 | 9/2013 | Ansari et al. |
| D692,042 | S | 10/2013 | Dawes et al. |
| 8,554,478 | B2 | 10/2013 | Hartman |
| 8,560,041 | B2 | 10/2013 | Flaherty et al. |
| 8,570,993 | B2 | 10/2013 | Austin et al. |
| 8,584,199 | B1 | 11/2013 | Chen et al. |
| 8,595,377 | B1 | 11/2013 | Apgar et al. |
| D695,735 | S | 12/2013 | Kitchen et al. |
| 8,599,018 | B2 | 12/2013 | Kellen et al. |
| 8,612,591 | B2 | 12/2013 | Dawes et al. |
| 8,634,533 | B2 | 1/2014 | Strasters |
| 8,635,350 | B2 | 1/2014 | Gutt et al. |
| 8,635,499 | B2 | 1/2014 | Cohn et al. |
| 8,638,211 | B2 | 1/2014 | Cohn et al. |
| 8,649,386 | B2 | 2/2014 | Ansari et al. |
| 8,666,560 | B2 | 3/2014 | Lu et al. |
| 8,675,071 | B1 | 3/2014 | Slavin et al. |
| 8,700,769 | B2 | 4/2014 | Alexander et al. |
| 8,704,821 | B2 * | 4/2014 | Kulkarni ................ H04L 41/22 345/419 |
| 8,713,132 | B2 | 4/2014 | Baum et al. |
| 8,723,671 | B2 | 5/2014 | Foisy et al. |
| 8,730,834 | B2 | 5/2014 | Marusca et al. |
| 8,738,765 | B2 | 5/2014 | Wyatt et al. |
| 8,812,654 | B2 | 8/2014 | Gelvin et al. |
| 8,817,809 | B2 | 8/2014 | Gage |
| 8,819,178 | B2 | 8/2014 | Baum et al. |
| 8,825,871 | B2 | 9/2014 | Baum et al. |
| 8,836,467 | B1 | 9/2014 | Cohn et al. |
| 8,885,552 | B2 | 11/2014 | Bedingfield et al. |
| 8,902,740 | B2 | 12/2014 | Hicks, III |
| 8,914,526 | B1 | 12/2014 | Lindquist et al. |
| 8,914,837 | B2 | 12/2014 | Ahmed et al. |
| 8,935,236 | B2 | 1/2015 | Morita et al. |
| 8,937,539 | B2 | 1/2015 | Sharma et al. |
| 8,937,658 | B2 | 1/2015 | Hicks et al. |
| 8,953,479 | B2 | 2/2015 | Hall et al. |

(56) References Cited

U.S. PATENT DOCUMENTS

| | | | |
|---|---|---|---|
| 8,953,749 | B2 | 2/2015 | Naidoo et al. |
| 8,963,713 | B2 | 2/2015 | Dawes et al. |
| 8,976,763 | B2 | 3/2015 | Shrestha et al. |
| 8,988,217 | B2 | 3/2015 | Piccolo, III |
| 8,988,221 | B2 | 3/2015 | Raji et al. |
| 8,989,922 | B2 | 3/2015 | Jones et al. |
| 8,996,665 | B2 | 3/2015 | Baum et al. |
| 9,047,753 | B2 | 6/2015 | Dawes et al. |
| 9,059,863 | B2 | 6/2015 | Baum et al. |
| 9,064,394 | B1 | 6/2015 | Trundle |
| 9,094,407 | B1 | 7/2015 | Matthieu et al. |
| 9,100,446 | B2 | 8/2015 | Cohn et al. |
| 9,141,276 | B2 | 9/2015 | Dawes et al. |
| 9,144,143 | B2 | 9/2015 | Raji et al. |
| 9,146,548 | B2 | 9/2015 | Chambers et al. |
| 9,147,337 | B2 | 9/2015 | Cohn et al. |
| 9,160,784 | B2 | 10/2015 | Jeong et al. |
| 9,170,707 | B1 | 10/2015 | Laska et al. |
| 9,172,532 | B1 | 10/2015 | Fuller et al. |
| 9,172,553 | B2 | 10/2015 | Dawes et al. |
| 9,172,605 | B2 | 10/2015 | Hardy et al. |
| 9,189,934 | B2 | 11/2015 | Jentoft et al. |
| 9,191,228 | B2 | 11/2015 | Fulker et al. |
| 9,202,362 | B2 | 12/2015 | Hyland et al. |
| 9,246,921 | B1 | 1/2016 | Vlaminck et al. |
| 9,286,772 | B2 | 3/2016 | Shapiro et al. |
| 9,287,727 | B1 | 3/2016 | Egan et al. |
| 9,300,921 | B2 | 3/2016 | Naidoo et al. |
| 9,306,809 | B2 | 4/2016 | Dawes et al. |
| 9,310,864 | B1 | 4/2016 | Klein et al. |
| 9,412,248 | B1 | 8/2016 | Cohn et al. |
| 9,426,720 | B2 | 8/2016 | Cohn et al. |
| 9,450,776 | B2 | 9/2016 | Baum et al. |
| 9,462,041 | B1 | 10/2016 | Hagins et al. |
| 9,510,065 | B2 | 11/2016 | Cohn et al. |
| 9,529,344 | B1 | 12/2016 | Hagins et al. |
| 9,531,593 | B2 | 12/2016 | Baum et al. |
| 9,553,738 | B2 | 1/2017 | Meenan et al. |
| 9,600,945 | B2 | 3/2017 | Naidoo et al. |
| 9,609,003 | B1 | 3/2017 | Chmielewski et al. |
| 9,613,524 | B1 | 4/2017 | Lamb et al. |
| 9,621,408 | B2 | 4/2017 | Gutt et al. |
| 9,721,461 | B2 | 8/2017 | Zeng et al. |
| 9,729,342 | B2 | 8/2017 | Cohn et al. |
| 9,779,595 | B2 | 10/2017 | Thibault |
| 9,805,587 | B2 | 10/2017 | Lamb |
| 9,824,234 | B2 | 11/2017 | Cho et al. |
| 9,843,458 | B2 | 12/2017 | Cronin |
| 9,876,651 | B2 | 1/2018 | Cho et al. |
| 9,882,985 | B1 | 1/2018 | Esam et al. |
| 9,978,238 | B2 | 5/2018 | Fadell et al. |
| 9,979,625 | B2 | 5/2018 | McLaughlin et al. |
| 10,002,507 | B2 | 6/2018 | Wilson et al. |
| 10,025,473 | B2 | 7/2018 | Sarao et al. |
| 10,051,078 | B2 | 8/2018 | Burd et al. |
| 10,062,245 | B2 | 8/2018 | Fulker et al. |
| 10,062,273 | B2 | 8/2018 | Raji et al. |
| 10,078,958 | B2 | 9/2018 | Cohn et al. |
| 10,079,839 | B1 | 9/2018 | Bryan et al. |
| 10,120,354 | B1 | 11/2018 | Rolston et al. |
| 10,127,801 | B2 | 11/2018 | Raji et al. |
| 10,140,840 | B2 | 11/2018 | Cohn et al. |
| 10,142,392 | B2 | 11/2018 | Raji et al. |
| 10,142,394 | B2 | 11/2018 | Chmielewski et al. |
| 10,156,831 | B2 | 12/2018 | Raji et al. |
| 10,156,959 | B2 | 12/2018 | Fulker et al. |
| 10,223,903 | B2 | 3/2019 | Raji et al. |
| 10,225,314 | B2 | 3/2019 | Raji et al. |
| 10,237,237 | B2 | 3/2019 | Dawes et al. |
| 10,237,757 | B2 | 3/2019 | Raleigh et al. |
| 10,264,138 | B2 | 4/2019 | Raleigh et al. |
| 10,313,303 | B2 | 6/2019 | Baum et al. |
| 10,339,791 | B2 | 7/2019 | Baum et al. |
| 10,348,575 | B2 | 7/2019 | Sundermeyer et al. |
| 10,354,517 | B1 | 7/2019 | King |
| 10,380,873 | B1 | 8/2019 | Halverson |
| 10,430,887 | B1 | 10/2019 | Parker et al. |
| 10,616,244 | B2 | 4/2020 | Bryan et al. |
| 10,672,254 | B2 | 6/2020 | Cohn et al. |
| 10,687,270 | B2 | 6/2020 | Ishii |
| 10,691,295 | B2 | 6/2020 | Fulker et al. |
| 2001/0016501 | A1 | 8/2001 | King |
| 2001/0022836 | A1 | 9/2001 | Bremer et al. |
| 2001/0025349 | A1 | 9/2001 | Sharood et al. |
| 2001/0029585 | A1 | 10/2001 | Simon et al. |
| 2001/0030597 | A1 | 10/2001 | Inoue et al. |
| 2001/0034209 | A1 | 10/2001 | Tong et al. |
| 2001/0034754 | A1 | 10/2001 | Elwahab et al. |
| 2001/0034759 | A1 | 10/2001 | Chiles et al. |
| 2001/0036192 | A1 | 11/2001 | Chiles et al. |
| 2001/0042137 | A1 | 11/2001 | Ota et al. |
| 2001/0044835 | A1 | 11/2001 | Schober et al. |
| 2001/0046366 | A1 | 11/2001 | Susskind |
| 2001/0047474 | A1 | 11/2001 | Takagi et al. |
| 2001/0053207 | A1 | 12/2001 | Jeon et al. |
| 2001/0054115 | A1 | 12/2001 | Ferguson et al. |
| 2002/0000913 | A1 | 1/2002 | Hamamoto et al. |
| 2002/0003575 | A1 | 1/2002 | Marchese |
| 2002/0004828 | A1 | 1/2002 | Davis et al. |
| 2002/0005894 | A1 | 1/2002 | Foodman et al. |
| 2002/0016639 | A1 | 2/2002 | Smith et al. |
| 2002/0018057 | A1 | 2/2002 | Sano |
| 2002/0019751 | A1 | 2/2002 | Rothschild et al. |
| 2002/0026476 | A1 | 2/2002 | Miyazaki et al. |
| 2002/0026531 | A1 | 2/2002 | Keane et al. |
| 2002/0027504 | A1 | 3/2002 | Davis et al. |
| 2002/0028696 | A1 | 3/2002 | Hirayama et al. |
| 2002/0029276 | A1 | 3/2002 | Bendinelli et al. |
| 2002/0031120 | A1 | 3/2002 | Rakib |
| 2002/0032853 | A1 | 3/2002 | Preston et al. |
| 2002/0037004 | A1 | 3/2002 | Bossemeyer et al. |
| 2002/0038380 | A1 | 3/2002 | Brawn et al. |
| 2002/0046280 | A1 | 4/2002 | Fujita |
| 2002/0052719 | A1 | 5/2002 | Alexander et al. |
| 2002/0052913 | A1 | 5/2002 | Yamada et al. |
| 2002/0055977 | A1 | 5/2002 | Nishi |
| 2002/0059078 | A1 | 5/2002 | Valdes et al. |
| 2002/0059148 | A1 | 5/2002 | Rosenhaft et al. |
| 2002/0059637 | A1 | 5/2002 | Rakib |
| 2002/0068558 | A1 | 6/2002 | Janik |
| 2002/0068984 | A1 | 6/2002 | Alexander et al. |
| 2002/0072868 | A1 | 6/2002 | Bartone et al. |
| 2002/0075153 | A1 | 6/2002 | Dahl |
| 2002/0077077 | A1 | 6/2002 | Rezvani et al. |
| 2002/0083342 | A1 | 6/2002 | Webb et al. |
| 2002/0085488 | A1 | 7/2002 | Kobayashi |
| 2002/0091815 | A1 | 7/2002 | Anderson et al. |
| 2002/0095490 | A1 | 7/2002 | Barker et al. |
| 2002/0099809 | A1 | 7/2002 | Lee |
| 2002/0099829 | A1 | 7/2002 | Richards et al. |
| 2002/0099854 | A1 | 7/2002 | Jorgensen |
| 2002/0103898 | A1 | 8/2002 | Moyer et al. |
| 2002/0103927 | A1 | 8/2002 | Parent |
| 2002/0107910 | A1 | 8/2002 | Zhao |
| 2002/0109580 | A1 | 8/2002 | Shreve et al. |
| 2002/0111698 | A1 | 8/2002 | Graziano et al. |
| 2002/0112051 | A1 | 8/2002 | Ullman |
| 2002/0112182 | A1 | 8/2002 | Chang et al. |
| 2002/0114439 | A1 | 8/2002 | Dunlap |
| 2002/0116117 | A1 | 8/2002 | Martens et al. |
| 2002/0118107 | A1 | 8/2002 | Yamamoto et al. |
| 2002/0118796 | A1 | 8/2002 | Menard et al. |
| 2002/0120696 | A1 | 8/2002 | Mousseau et al. |
| 2002/0120698 | A1 | 8/2002 | Tamargo |
| 2002/0120790 | A1 | 8/2002 | Schwalb |
| 2002/0126009 | A1 | 9/2002 | Oyagi et al. |
| 2002/0128728 | A1 | 9/2002 | Murakami et al. |
| 2002/0131404 | A1 | 9/2002 | Mehta et al. |
| 2002/0133539 | A1 | 9/2002 | Monday |
| 2002/0133578 | A1 | 9/2002 | Wu |
| 2002/0143805 | A1 | 10/2002 | Hayes et al. |
| 2002/0143923 | A1 | 10/2002 | Alexander |
| 2002/0147982 | A1 | 10/2002 | Naidoo et al. |
| 2002/0150086 | A1 | 10/2002 | Bailey et al. |

(56) References Cited

U.S. PATENT DOCUMENTS

| | | | | |
|---|---|---|---|---|
| 2002/0152298 | A1 | 10/2002 | Kikta et al. | |
| 2002/0152432 | A1 | 10/2002 | Fleming | |
| 2002/0156564 | A1 | 10/2002 | Preston et al. | |
| 2002/0156899 | A1 | 10/2002 | Sekiguchi | |
| 2002/0161885 | A1* | 10/2002 | Childers | H04L 12/2825 709/224 |
| 2002/0163534 | A1 | 11/2002 | Choi et al. | |
| 2002/0163997 | A1 | 11/2002 | Bergman et al. | |
| 2002/0164997 | A1 | 11/2002 | Parry | |
| 2002/0165006 | A1 | 11/2002 | Haller et al. | |
| 2002/0166125 | A1 | 11/2002 | Fulmer | |
| 2002/0174367 | A1 | 11/2002 | Kimmel et al. | |
| 2002/0174434 | A1 | 11/2002 | Lee et al. | |
| 2002/0177428 | A1 | 11/2002 | Menard et al. | |
| 2002/0177482 | A1 | 11/2002 | Cheong et al. | |
| 2002/0178100 | A1 | 11/2002 | Koveos | |
| 2002/0178211 | A1 | 11/2002 | Singhal et al. | |
| 2002/0180579 | A1 | 12/2002 | Nagaoka et al. | |
| 2002/0184301 | A1 | 12/2002 | Parent | |
| 2002/0184527 | A1 | 12/2002 | Chun et al. | |
| 2002/0186683 | A1 | 12/2002 | Buck et al. | |
| 2002/0191636 | A1 | 12/2002 | Hallenbeck | |
| 2003/0001883 | A1 | 1/2003 | Wang | |
| 2003/0005030 | A1 | 1/2003 | Sutton et al. | |
| 2003/0006879 | A1 | 1/2003 | Kang et al. | |
| 2003/0009552 | A1 | 1/2003 | Benfield et al. | |
| 2003/0009553 | A1 | 1/2003 | Benfield et al. | |
| 2003/0010243 | A1 | 1/2003 | Roller | |
| 2003/0023839 | A1 | 1/2003 | Burkhardt et al. | |
| 2003/0025599 | A1 | 2/2003 | Monroe | |
| 2003/0028294 | A1 | 2/2003 | Yanagi | |
| 2003/0028398 | A1 | 2/2003 | Yamashita et al. | |
| 2003/0030548 | A1 | 2/2003 | Kovacs et al. | |
| 2003/0031165 | A1 | 2/2003 | O'Brien | |
| 2003/0038730 | A1 | 2/2003 | Imafuku et al. | |
| 2003/0038849 | A1 | 2/2003 | Craven et al. | |
| 2003/0039242 | A1 | 2/2003 | Moore | |
| 2003/0041137 | A1 | 2/2003 | Horie et al. | |
| 2003/0041167 | A1 | 2/2003 | French et al. | |
| 2003/0050731 | A1 | 3/2003 | Rosenblum | |
| 2003/0051009 | A1 | 3/2003 | Shah et al. | |
| 2003/0051026 | A1 | 3/2003 | Carter et al. | |
| 2003/0052905 | A1 | 3/2003 | Gordon et al. | |
| 2003/0052923 | A1 | 3/2003 | Porter | |
| 2003/0056012 | A1 | 3/2003 | Modeste et al. | |
| 2003/0056014 | A1 | 3/2003 | Verberkt et al. | |
| 2003/0060900 | A1 | 3/2003 | Lo et al. | |
| 2003/0061344 | A1 | 3/2003 | Monroe | |
| 2003/0061615 | A1 | 3/2003 | Van Der Meulen | |
| 2003/0061621 | A1 | 3/2003 | Petty et al. | |
| 2003/0062997 | A1 | 4/2003 | Naidoo et al. | |
| 2003/0065407 | A1 | 4/2003 | Johnson et al. | |
| 2003/0065757 | A1 | 4/2003 | Mentze et al. | |
| 2003/0065784 | A1 | 4/2003 | Herrod | |
| 2003/0065791 | A1 | 4/2003 | Garg et al. | |
| 2003/0067923 | A1 | 4/2003 | Ju et al. | |
| 2003/0071724 | A1 | 4/2003 | D Amico | |
| 2003/0071840 | A1 | 4/2003 | Huang et al. | |
| 2003/0073406 | A1 | 4/2003 | Benjamin et al. | |
| 2003/0081768 | A1 | 5/2003 | Caminschi | |
| 2003/0090473 | A1 | 5/2003 | Joshi | |
| 2003/0096590 | A1 | 5/2003 | Satoh | |
| 2003/0101243 | A1 | 5/2003 | Donahue et al. | |
| 2003/0101459 | A1 | 5/2003 | Edson | |
| 2003/0103088 | A1 | 6/2003 | Dresti et al. | |
| 2003/0110262 | A1 | 6/2003 | Hasan et al. | |
| 2003/0110302 | A1 | 6/2003 | Hodges et al. | |
| 2003/0112866 | A1 | 6/2003 | Yu et al. | |
| 2003/0113100 | A1 | 6/2003 | Hecht et al. | |
| 2003/0115345 | A1 | 6/2003 | Chien et al. | |
| 2003/0123419 | A1 | 7/2003 | Rangnekar et al. | |
| 2003/0123634 | A1 | 7/2003 | Chee | |
| 2003/0128114 | A1 | 7/2003 | Quigley | |
| 2003/0128115 | A1 | 7/2003 | Giacopelli et al. | |
| 2003/0132018 | A1 | 7/2003 | Okita et al. | |
| 2003/0134590 | A1 | 7/2003 | Suda et al. | |
| 2003/0137426 | A1 | 7/2003 | Anthony et al. | |
| 2003/0137991 | A1 | 7/2003 | Doshi et al. | |
| 2003/0147534 | A1 | 8/2003 | Ablay et al. | |
| 2003/0149671 | A1 | 8/2003 | Yamamoto et al. | |
| 2003/0153325 | A1 | 8/2003 | Veerepalli et al. | |
| 2003/0155757 | A1 | 8/2003 | Larsen et al. | |
| 2003/0158609 | A1 | 8/2003 | Chiu | |
| 2003/0158635 | A1 | 8/2003 | Pillar et al. | |
| 2003/0159135 | A1 | 8/2003 | Hiller et al. | |
| 2003/0169728 | A1 | 9/2003 | Choi | |
| 2003/0174154 | A1 | 9/2003 | Yukie et al. | |
| 2003/0174648 | A1 | 9/2003 | Wang et al. | |
| 2003/0174717 | A1 | 9/2003 | Zabarski et al. | |
| 2003/0177236 | A1 | 9/2003 | Goto et al. | |
| 2003/0182396 | A1 | 9/2003 | Reich et al. | |
| 2003/0182640 | A1 | 9/2003 | Alani et al. | |
| 2003/0184436 | A1 | 10/2003 | Seales et al. | |
| 2003/0187920 | A1 | 10/2003 | Redkar | |
| 2003/0187938 | A1 | 10/2003 | Mousseau et al. | |
| 2003/0189509 | A1 | 10/2003 | Hayes et al. | |
| 2003/0197847 | A1 | 10/2003 | Shinoda | |
| 2003/0200285 | A1 | 10/2003 | Hansen et al. | |
| 2003/0200325 | A1 | 10/2003 | Krishnaswamy et al. | |
| 2003/0201889 | A1 | 10/2003 | Zulkowski | |
| 2003/0208610 | A1 | 11/2003 | Rochetti et al. | |
| 2003/0210126 | A1 | 11/2003 | Kanazawa | |
| 2003/0214775 | A1 | 11/2003 | Fukuta et al. | |
| 2003/0216143 | A1 | 11/2003 | Roese et al. | |
| 2003/0217110 | A1 | 11/2003 | Weiss | |
| 2003/0217136 | A1 | 11/2003 | Cho et al. | |
| 2003/0225883 | A1 | 12/2003 | Greaves et al. | |
| 2003/0227382 | A1 | 12/2003 | Breed | |
| 2003/0229779 | A1 | 12/2003 | Morais et al. | |
| 2003/0230934 | A1 | 12/2003 | Cordelli et al. | |
| 2003/0233155 | A1 | 12/2003 | Slemmer et al. | |
| 2003/0233332 | A1 | 12/2003 | Keeler et al. | |
| 2003/0233594 | A1 | 12/2003 | Earl | |
| 2003/0234725 | A1 | 12/2003 | Lemelson et al. | |
| 2003/0236841 | A1 | 12/2003 | Epshteyn | |
| 2004/0003051 | A1 | 1/2004 | Krzyzanowski et al. | |
| 2004/0003241 | A1 | 1/2004 | Sengodan et al. | |
| 2004/0008724 | A1 | 1/2004 | Devine et al. | |
| 2004/0015572 | A1 | 1/2004 | Kang | |
| 2004/0024851 | A1 | 2/2004 | Naidoo et al. | |
| 2004/0034697 | A1 | 2/2004 | Fairhurst et al. | |
| 2004/0034798 | A1 | 2/2004 | Yamada et al. | |
| 2004/0036615 | A1 | 2/2004 | Candela | |
| 2004/0037295 | A1 | 2/2004 | Tanaka et al. | |
| 2004/0039459 | A1 | 2/2004 | Daugherty et al. | |
| 2004/0041910 | A1 | 3/2004 | Naidoo et al. | |
| 2004/0054789 | A1 | 3/2004 | Breh et al. | |
| 2004/0056665 | A1 | 3/2004 | Iwanaga et al. | |
| 2004/0064351 | A1 | 4/2004 | Mikurak | |
| 2004/0068657 | A1 | 4/2004 | Alexander et al. | |
| 2004/0083015 | A1 | 4/2004 | Patwari | |
| 2004/0086088 | A1 | 5/2004 | Naidoo et al. | |
| 2004/0086090 | A1 | 5/2004 | Naidoo et al. | |
| 2004/0086093 | A1 | 5/2004 | Schranz | |
| 2004/0093492 | A1 | 5/2004 | Daude et al. | |
| 2004/0095943 | A1 | 5/2004 | Korotin | |
| 2004/0103308 | A1 | 5/2004 | Paller | |
| 2004/0107027 | A1 | 6/2004 | Boudrieau | |
| 2004/0107299 | A1 | 6/2004 | Lee et al. | |
| 2004/0113770 | A1 | 6/2004 | Falk et al. | |
| 2004/0113778 | A1 | 6/2004 | Script et al. | |
| 2004/0113937 | A1 | 6/2004 | Sawdey et al. | |
| 2004/0117068 | A1 | 6/2004 | Lee | |
| 2004/0117330 | A1 | 6/2004 | Ehlers et al. | |
| 2004/0117462 | A1 | 6/2004 | Bodin et al. | |
| 2004/0117465 | A1 | 6/2004 | Bodin et al. | |
| 2004/0123149 | A1 | 6/2004 | Tyroler | |
| 2004/0125146 | A1 | 7/2004 | Gerlach et al. | |
| 2004/0125782 | A1 | 7/2004 | Chang | |
| 2004/0133689 | A1 | 7/2004 | Vasisht | |
| 2004/0137915 | A1 | 7/2004 | Diener et al. | |
| 2004/0139227 | A1 | 7/2004 | Takeda | |
| 2004/0143749 | A1 | 7/2004 | Tajalli et al. | |
| 2004/0153171 | A1 | 8/2004 | Brandt et al. | |

(56) References Cited

U.S. PATENT DOCUMENTS

2004/0155757 A1 8/2004 Litwin et al.
2004/0160309 A1 8/2004 Stilp
2004/0162902 A1 8/2004 Davis
2004/0163073 A1 8/2004 Krzyzanowski et al.
2004/0163118 A1 8/2004 Mottur
2004/0163705 A1 8/2004 Uhler
2004/0169288 A1 9/2004 Hsieh et al.
2004/0170120 A1 9/2004 Reunamaki et al.
2004/0170155 A1 9/2004 Omar et al.
2004/0172396 A1 9/2004 Vanska et al.
2004/0177163 A1 9/2004 Casey et al.
2004/0181693 A1 9/2004 Milliot et al.
2004/0183756 A1 9/2004 Freitas et al.
2004/0189460 A1 9/2004 Heaton et al.
2004/0189471 A1 9/2004 Ciarcia et al.
2004/0189871 A1 9/2004 Kurosawa et al.
2004/0196844 A1 10/2004 Hagino
2004/0198386 A1 10/2004 Dupray
2004/0199645 A1 10/2004 Rouhi
2004/0201472 A1 10/2004 McGunn et al.
2004/0202351 A1 10/2004 Park et al.
2004/0212494 A1 10/2004 Stilp
2004/0212497 A1 10/2004 Stilp
2004/0212500 A1 10/2004 Stilp
2004/0212503 A1 10/2004 Stilp
2004/0212687 A1 10/2004 Patwari
2004/0213150 A1 10/2004 Krause et al.
2004/0215694 A1 10/2004 Podolsky
2004/0215700 A1 10/2004 Shenfield et al.
2004/0215750 A1 10/2004 Stilp
2004/0215955 A1 10/2004 Tamai et al.
2004/0218591 A1 11/2004 Ogawa et al.
2004/0220830 A1 11/2004 Moreton et al.
2004/0223605 A1 11/2004 Donnelly
2004/0225516 A1 11/2004 Bruskotter et al.
2004/0225719 A1 11/2004 Kisley et al.
2004/0229569 A1 11/2004 Franz
2004/0243714 A1 12/2004 Wynn et al.
2004/0243835 A1 12/2004 Terzis et al.
2004/0243996 A1 12/2004 Sheehy et al.
2004/0246339 A1 12/2004 Ooshima et al.
2004/0249613 A1 12/2004 Sprogis et al.
2004/0249922 A1 12/2004 Hackman et al.
2004/0257433 A1 12/2004 Lia et al.
2004/0260407 A1 12/2004 Wimsatt
2004/0260427 A1 12/2004 Wimsatt
2004/0260527 A1 12/2004 Stanculescu
2004/0263314 A1 12/2004 Dorai et al.
2004/0266493 A1 12/2004 Bahl et al.
2004/0267385 A1 12/2004 Lingemann
2004/0267937 A1 12/2004 Klemets
2005/0002335 A1 1/2005 Adamczyk et al.
2005/0002417 A1 1/2005 Kelly et al.
2005/0007967 A1 1/2005 Keskar et al.
2005/0010866 A1 1/2005 Humpleman et al.
2005/0015805 A1 1/2005 Iwamura
2005/0021309 A1 1/2005 Alexander et al.
2005/0021626 A1 1/2005 Prajapat et al.
2005/0022210 A1 1/2005 Zintel et al.
2005/0023858 A1 2/2005 Bingle et al.
2005/0024203 A1 2/2005 Wolfe
2005/0030928 A1 2/2005 Virtanen et al.
2005/0033513 A1 2/2005 Gasbarro
2005/0038325 A1 2/2005 Moll
2005/0038326 A1 2/2005 Mathur
2005/0044061 A1 2/2005 Klemow
2005/0048957 A1 3/2005 Casey et al.
2005/0049746 A1 3/2005 Rosenblum
2005/0052831 A1 3/2005 Chen
2005/0055575 A1 3/2005 Evans et al.
2005/0055716 A1 3/2005 Louie et al.
2005/0057361 A1 3/2005 Giraldo et al.
2005/0060163 A1 3/2005 Barsness et al.
2005/0060411 A1 3/2005 Coulombe et al.
2005/0066045 A1 3/2005 Johnson et al.
2005/0066912 A1 3/2005 Korbitz et al.
2005/0069098 A1 3/2005 Kalervo et al.
2005/0071483 A1 3/2005 Motoyama
2005/0075764 A1 4/2005 Horst et al.
2005/0079855 A1 4/2005 Jethi et al.
2005/0081161 A1 4/2005 MacInnes et al.
2005/0086093 A1 4/2005 Hammad et al.
2005/0086126 A1 4/2005 Patterson
2005/0086211 A1 4/2005 Mayer
2005/0086366 A1 4/2005 Luebke et al.
2005/0088983 A1 4/2005 Wesslen et al.
2005/0089023 A1 4/2005 Barkley et al.
2005/0090915 A1 4/2005 Geiwitz
2005/0091435 A1 4/2005 Han et al.
2005/0091696 A1 4/2005 Wolfe et al.
2005/0096753 A1 5/2005 Arling et al.
2005/0097478 A1 5/2005 Killian et al.
2005/0101314 A1 5/2005 Levi
2005/0102152 A1 5/2005 Hodges
2005/0102497 A1 5/2005 Buer
2005/0105530 A1 5/2005 Kono
2005/0108091 A1 5/2005 Sotak et al.
2005/0108369 A1 5/2005 Sather et al.
2005/0114432 A1 5/2005 Hodges et al.
2005/0114528 A1 5/2005 Suito
2005/0114900 A1 5/2005 Ladd et al.
2005/0119913 A1 6/2005 Hornreich et al.
2005/0120082 A1 6/2005 Hesselink et al.
2005/0125083 A1 6/2005 Kiko
2005/0128068 A1 6/2005 Winick et al.
2005/0128083 A1 6/2005 Puzio et al.
2005/0128093 A1 6/2005 Genova et al.
2005/0128314 A1 6/2005 Ishino
2005/0144312 A1 6/2005 Kadyk et al.
2005/0148356 A1 7/2005 Ferguson et al.
2005/0149639 A1 7/2005 Vrielink et al.
2005/0149746 A1 7/2005 Lu et al.
2005/0154494 A1 7/2005 Ahmed
2005/0154774 A1 7/2005 Giaffreda et al.
2005/0155757 A1 7/2005 Paton
2005/0156568 A1 7/2005 Yueh
2005/0156737 A1 7/2005 Al-Khateeb
2005/0159823 A1 7/2005 Hayes et al.
2005/0159911 A1 7/2005 Funk et al.
2005/0169288 A1 8/2005 Kamiwada et al.
2005/0174229 A1 8/2005 Feldkamp et al.
2005/0179531 A1 8/2005 Tabe
2005/0182681 A1 8/2005 Bruskotter et al.
2005/0184865 A1 8/2005 Han
2005/0188315 A1 8/2005 Campbell et al.
2005/0197847 A1 9/2005 Smith
2005/0200474 A1 9/2005 Behnke
2005/0204076 A1 9/2005 Cumpson et al.
2005/0207429 A1 9/2005 Akita et al.
2005/0210532 A1 9/2005 Winick
2005/0216302 A1 9/2005 Raji et al.
2005/0216580 A1 9/2005 Raji et al.
2005/0220123 A1 10/2005 Wybenga et al.
2005/0222820 A1 10/2005 Chung
2005/0222933 A1 10/2005 Wesby
2005/0229016 A1 10/2005 Addy
2005/0231349 A1 10/2005 Bhat
2005/0232242 A1 10/2005 Karaoguz et al.
2005/0232284 A1 10/2005 Karaoguz et al.
2005/0234568 A1 10/2005 Chung et al.
2005/0237182 A1 10/2005 Wang
2005/0246119 A1 11/2005 Koodali
2005/0249199 A1 11/2005 Albert et al.
2005/0253706 A1 11/2005 Spoltore et al.
2005/0253709 A1 11/2005 Baker
2005/0256608 A1 11/2005 King et al.
2005/0257013 A1 11/2005 Ma
2005/0257260 A1 11/2005 Lenoir et al.
2005/0259673 A1 11/2005 Lu et al.
2005/0260973 A1 11/2005 Van De Groenendaal
2005/0262241 A1 11/2005 Gubbi et al.
2005/0267605 A1 12/2005 Lee et al.
2005/0270151 A1 12/2005 Winick
2005/0273831 A1 12/2005 Slomovich et al.

(56) References Cited

U.S. PATENT DOCUMENTS

2005/0276389 A1 12/2005 Hinkson et al.
2005/0280964 A1 12/2005 Richmond et al.
2005/0281196 A1 12/2005 Tornetta et al.
2005/0282557 A1 12/2005 Mikko et al.
2005/0283823 A1 12/2005 Okajo et al.
2005/0285934 A1 12/2005 Carter
2005/0285941 A1 12/2005 Haigh et al.
2006/0009863 A1 1/2006 Lingemann
2006/0010078 A1 1/2006 Rezvani et al.
2006/0015943 A1 1/2006 Mahieu
2006/0018328 A1 1/2006 Mody et al.
2006/0018479 A1 1/2006 Chen
2006/0022816 A1 2/2006 Yukawa
2006/0023847 A1 2/2006 Tyroler et al.
2006/0025132 A1 2/2006 Karaoguz et al.
2006/0026301 A1 2/2006 Maeda et al.
2006/0031852 A1 2/2006 Chu et al.
2006/0036750 A1 2/2006 Ladd et al.
2006/0041655 A1 2/2006 Holloway et al.
2006/0045074 A1 3/2006 Lee
2006/0050692 A1 3/2006 Petrescu et al.
2006/0050862 A1 3/2006 Shen et al.
2006/0051122 A1 3/2006 Kawazu et al.
2006/0052884 A1 3/2006 Staples et al.
2006/0053447 A1 3/2006 Krzyzanowski et al.
2006/0053459 A1 3/2006 Simerly et al.
2006/0053491 A1 3/2006 Khuti et al.
2006/0058923 A1 3/2006 Kruk et al.
2006/0063534 A1 3/2006 Kokkonen et al.
2006/0064305 A1 3/2006 Alonso
2006/0064478 A1 3/2006 Sirkin
2006/0067344 A1 3/2006 Sakurai
2006/0067356 A1 3/2006 Kim et al.
2006/0067484 A1 3/2006 Elliot et al.
2006/0075235 A1 4/2006 Renkis
2006/0077254 A1 4/2006 Shu et al.
2006/0078344 A1 4/2006 Kawazu et al.
2006/0080465 A1 4/2006 Conzola et al.
2006/0088092 A1 4/2006 Chen et al.
2006/0092010 A1 5/2006 Simon et al.
2006/0092011 A1 5/2006 Simon et al.
2006/0093365 A1 5/2006 Dybsetter et al.
2006/0094400 A1 5/2006 Beachem et al.
2006/0101062 A1 5/2006 Godman et al.
2006/0103510 A1 5/2006 Chen et al.
2006/0103520 A1 5/2006 Clark
2006/0104312 A1 5/2006 Friar
2006/0105713 A1 5/2006 Zheng et al.
2006/0106933 A1 5/2006 Huang et al.
2006/0109113 A1 5/2006 Reyes et al.
2006/0109860 A1 5/2006 Matsunaga et al.
2006/0111095 A1 5/2006 Weigand
2006/0121924 A1 6/2006 Rengaraju et al.
2006/0123212 A1 6/2006 Yagawa
2006/0129837 A1 6/2006 Im et al.
2006/0132302 A1 6/2006 Stilp
2006/0136558 A1 6/2006 Sheehan et al.
2006/0142880 A1 6/2006 Deen et al.
2006/0142968 A1 6/2006 Han et al.
2006/0142978 A1* 6/2006 Suenbuel .............. H04W 8/245
703/1
2006/0143268 A1 6/2006 Chatani
2006/0145842 A1 7/2006 Stilp
2006/0154642 A1 7/2006 Scannell, Jr.
2006/0155851 A1 7/2006 Ma et al.
2006/0159032 A1 7/2006 Ukrainetz et al.
2006/0161270 A1 7/2006 Luskin et al.
2006/0161662 A1 7/2006 Ng et al.
2006/0161960 A1 7/2006 Benoit
2006/0167784 A1 7/2006 Hoffberg
2006/0167919 A1 7/2006 Hsieh
2006/0168013 A1 7/2006 Wilson et al.
2006/0168178 A1 7/2006 Hwang et al.
2006/0168190 A1 7/2006 Johan et al.
2006/0176146 A1 8/2006 Krishan et al.
2006/0176167 A1 8/2006 Dohrmann
2006/0181406 A1 8/2006 Petite et al.
2006/0182100 A1 8/2006 Li et al.
2006/0183460 A1 8/2006 Srinivasan et al.
2006/0187900 A1 8/2006 Akbar
2006/0189311 A1 8/2006 Cromer et al.
2006/0190458 A1 8/2006 Mishina et al.
2006/0190529 A1 8/2006 Morozumi et al.
2006/0197660 A1 9/2006 Luebke et al.
2006/0200845 A1 9/2006 Foster et al.
2006/0206220 A1 9/2006 Amundson
2006/0208872 A1 9/2006 Yu et al.
2006/0208880 A1 9/2006 Funk et al.
2006/0209857 A1 9/2006 Hicks, III
2006/0215650 A1 9/2006 Wollmershauser et al.
2006/0218244 A1 9/2006 Rasmussen et al.
2006/0218593 A1 9/2006 Afshary et al.
2006/0220830 A1 10/2006 Bennett et al.
2006/0221184 A1 10/2006 Vallone et al.
2006/0222153 A1 10/2006 Tarkoff et al.
2006/0226972 A1 10/2006 Smith
2006/0229746 A1 10/2006 Ollis et al.
2006/0230270 A1 10/2006 Goffin
2006/0233372 A1 10/2006 Shaheen et al.
2006/0235963 A1 10/2006 Wetherly et al.
2006/0238372 A1 10/2006 Jung et al.
2006/0238617 A1 10/2006 Tamir
2006/0242395 A1 10/2006 Fausak
2006/0244589 A1 11/2006 Schranz
2006/0245369 A1 11/2006 Schimmelpfeng et al.
2006/0246886 A1 11/2006 Benco et al.
2006/0246919 A1 11/2006 Park et al.
2006/0250235 A1 11/2006 Astrin
2006/0251255 A1 11/2006 Batta
2006/0258342 A1 11/2006 Fok et al.
2006/0265489 A1 11/2006 Moore
2006/0271695 A1 11/2006 Lavian
2006/0274764 A1 12/2006 Mah et al.
2006/0281435 A1 12/2006 Shearer et al.
2006/0282886 A1 12/2006 Gaug
2006/0288288 A1 12/2006 Girgensohn et al.
2006/0291507 A1 12/2006 Sarosi et al.
2006/0294565 A1 12/2006 Walter
2007/0001818 A1 1/2007 Small et al.
2007/0002833 A1 1/2007 Bajic
2007/0005736 A1 1/2007 Hansen et al.
2007/0005957 A1 1/2007 Sahita et al.
2007/0006177 A1 1/2007 Aiber et al.
2007/0008099 A1 1/2007 Kimmel et al.
2007/0014248 A1 1/2007 Fowlow
2007/0043478 A1 2/2007 Ehlers et al.
2007/0043954 A1 2/2007 Fox
2007/0046462 A1 3/2007 Fancella
2007/0047585 A1 3/2007 Gillespie et al.
2007/0052675 A1 3/2007 Chang
2007/0055770 A1 3/2007 Karmakar et al.
2007/0058627 A1 3/2007 Smith et al.
2007/0061018 A1 3/2007 Callaghan et al.
2007/0061020 A1 3/2007 Bovee et al.
2007/0061266 A1 3/2007 Moore et al.
2007/0061430 A1 3/2007 Kim
2007/0061878 A1 3/2007 Hagiu et al.
2007/0063836 A1 3/2007 Hayden et al.
2007/0063866 A1 3/2007 Webb
2007/0064714 A1 3/2007 Bi et al.
2007/0079151 A1 4/2007 Connor et al.
2007/0079385 A1 4/2007 Williams et al.
2007/0083668 A1 4/2007 Kelsey et al.
2007/0090944 A1 4/2007 Du Breuil
2007/0094716 A1 4/2007 Farino et al.
2007/0096981 A1 5/2007 Abraham
2007/0101345 A1 5/2007 Takagi
2007/0103433 A1 5/2007 Katz
2007/0105072 A1 5/2007 Koljonen
2007/0106124 A1 5/2007 Kuriyama et al.
2007/0106536 A1 5/2007 Moore
2007/0106547 A1 5/2007 Agrawal
2007/0109975 A1 5/2007 Reckamp et al.
2007/0116020 A1 5/2007 Cheever et al.

(56) References Cited

U.S. PATENT DOCUMENTS

2007/0117464 A1 5/2007 Freeman
2007/0118609 A1 5/2007 Mullan et al.
2007/0127510 A1 6/2007 Bossemeyer et al.
2007/0130286 A1 6/2007 Hopmann et al.
2007/0132576 A1 6/2007 Kolavennu et al.
2007/0140267 A1 6/2007 Yang
2007/0142022 A1 6/2007 Madonna et al.
2007/0142044 A1 6/2007 Fitzgerald et al.
2007/0143440 A1 6/2007 Reckamp et al.
2007/0146127 A1 6/2007 Stilp et al.
2007/0146484 A1 6/2007 Horton et al.
2007/0147419 A1 6/2007 Tsujimoto et al.
2007/0150616 A1 6/2007 Baek et al.
2007/0154010 A1 7/2007 Wong
2007/0155325 A1 7/2007 Bambic et al.
2007/0155423 A1 7/2007 Carmody et al.
2007/0160017 A1 7/2007 Meier et al.
2007/0161372 A1 7/2007 Rogalski et al.
2007/0162228 A1 7/2007 Mitchell
2007/0162680 A1 7/2007 Mitchell
2007/0164779 A1 7/2007 Weston et al.
2007/0168860 A1 7/2007 Takayama et al.
2007/0176766 A1 8/2007 Cheng
2007/0182543 A1 8/2007 Luo
2007/0182819 A1 8/2007 Monroe
2007/0183345 A1 8/2007 Fahim et al.
2007/0185989 A1 8/2007 Corbett et al.
2007/0192486 A1 8/2007 Wilson et al.
2007/0198698 A1 8/2007 Boyd et al.
2007/0200658 A1 8/2007 Yang
2007/0208521 A1 9/2007 Petite et al.
2007/0214262 A1 9/2007 Buchbinder et al.
2007/0214264 A1 9/2007 Koister
2007/0216764 A1 9/2007 Kwak
2007/0216783 A1 9/2007 Ortiz et al.
2007/0218895 A1 9/2007 Saito et al.
2007/0223465 A1 9/2007 Wang et al.
2007/0223500 A1 9/2007 Lee et al.
2007/0226182 A1 9/2007 Sobotka et al.
2007/0230415 A1 10/2007 Malik
2007/0230744 A1 10/2007 Dronge
2007/0245223 A1 10/2007 Siedzik et al.
2007/0253361 A1 11/2007 Pristas et al.
2007/0255856 A1 11/2007 Reckamp et al.
2007/0256105 A1 11/2007 Tabe
2007/0257986 A1 11/2007 Ivanov et al.
2007/0260713 A1 11/2007 Moorer et al.
2007/0262857 A1 11/2007 Jackson
2007/0263782 A1 11/2007 Stock et al.
2007/0265866 A1 11/2007 Fehling et al.
2007/0271398 A1 11/2007 Manchester et al.
2007/0275703 A1 11/2007 Lim et al.
2007/0277111 A1 11/2007 Bennett et al.
2007/0282665 A1 12/2007 Buehler et al.
2007/0283001 A1 12/2007 Spiess et al.
2007/0283004 A1* 12/2007 Buehler ................ G06Q 30/02 709/224
2007/0286210 A1 12/2007 Gutt et al.
2007/0286369 A1 12/2007 Gutt et al.
2007/0287405 A1 12/2007 Radtke
2007/0288849 A1 12/2007 Moorer et al.
2007/0288858 A1 12/2007 Pereira
2007/0290830 A1 12/2007 Gurley
2007/0291118 A1 12/2007 Shu et al.
2007/0296814 A1 12/2007 Cooper et al.
2007/0298772 A1 12/2007 Owens et al.
2008/0001734 A1 1/2008 Stilp et al.
2008/0013531 A1 1/2008 Elliott et al.
2008/0013957 A1 1/2008 Akers et al.
2008/0025487 A1 1/2008 Johan et al.
2008/0027587 A1 1/2008 Nickerson et al.
2008/0042826 A1 2/2008 Hevia et al.
2008/0043107 A1 2/2008 Coogan et al.
2008/0046593 A1 2/2008 Ando et al.
2008/0048861 A1 2/2008 Naidoo et al.
2008/0048975 A1 2/2008 Leibow
2008/0052348 A1 2/2008 Adler et al.
2008/0056261 A1 3/2008 Osborn et al.
2008/0059533 A1 3/2008 Krikorian
2008/0059622 A1 3/2008 Hite et al.
2008/0065681 A1 3/2008 Fontijn et al.
2008/0065685 A1 3/2008 Frank
2008/0072244 A1 3/2008 Eker et al.
2008/0074258 A1 3/2008 Bennett et al.
2008/0074993 A1 3/2008 Vainola
2008/0082186 A1 4/2008 Hood et al.
2008/0084294 A1 4/2008 Zhiying et al.
2008/0084296 A1 4/2008 Kutzik et al.
2008/0086564 A1 4/2008 Putman et al.
2008/0091793 A1 4/2008 Diroo et al.
2008/0095339 A1 4/2008 Elliott et al.
2008/0102845 A1 5/2008 Zhao
2008/0103608 A1 5/2008 Gough et al.
2008/0104215 A1 5/2008 Excoffier et al.
2008/0104516 A1 5/2008 Lee
2008/0109302 A1 5/2008 Salokannel et al.
2008/0109650 A1 5/2008 Shim et al.
2008/0112340 A1 5/2008 Luebke
2008/0112405 A1 5/2008 Cholas et al.
2008/0117029 A1 5/2008 Dohrmann et al.
2008/0117201 A1 5/2008 Martinez et al.
2008/0117922 A1 5/2008 Cockrell et al.
2008/0120405 A1 5/2008 Son et al.
2008/0122575 A1 5/2008 Lavian et al.
2008/0126535 A1 5/2008 Zhu et al.
2008/0128444 A1 6/2008 Schininger et al.
2008/0129484 A1* 6/2008 Dahl ..................... G08B 25/14 340/501
2008/0129821 A1 6/2008 Howarter et al.
2008/0130949 A1 6/2008 Ivanov et al.
2008/0133725 A1 6/2008 Shaouy
2008/0134343 A1 6/2008 Pennington et al.
2008/0137572 A1 6/2008 Park et al.
2008/0140868 A1 6/2008 Kalayjian et al.
2008/0141303 A1 6/2008 Walker et al.
2008/0141341 A1 6/2008 Vinogradov et al.
2008/0144884 A1 6/2008 Habibi
2008/0147834 A1 6/2008 Quinn et al.
2008/0155080 A1 6/2008 Marlow et al.
2008/0155470 A1 6/2008 Khedouri et al.
2008/0162637 A1 7/2008 Adamczyk et al.
2008/0163355 A1 7/2008 Chu
2008/0168404 A1 7/2008 Ording
2008/0170511 A1 7/2008 Shorty et al.
2008/0180240 A1 7/2008 Raji et al.
2008/0181239 A1 7/2008 Wood et al.
2008/0183483 A1* 7/2008 Hart ........................ G06F 30/13 705/1.1
2008/0183842 A1 7/2008 Raji et al.
2008/0189609 A1 8/2008 Larson et al.
2008/0201468 A1 8/2008 Titus
2008/0204190 A1 8/2008 Cohn et al.
2008/0204219 A1 8/2008 Cohn et al.
2008/0208399 A1 8/2008 Pham
2008/0209505 A1 8/2008 Ghai et al.
2008/0209506 A1 8/2008 Ghai et al.
2008/0215450 A1 9/2008 Gates et al.
2008/0215613 A1 9/2008 Grasso
2008/0219239 A1 9/2008 Bell et al.
2008/0221715 A1 9/2008 Krzyzanowski et al.
2008/0227460 A1 9/2008 David et al.
2008/0235326 A1 9/2008 Parsi et al.
2008/0235600 A1 9/2008 Harper et al.
2008/0239075 A1 10/2008 Mehrotra et al.
2008/0240372 A1 10/2008 Frenette
2008/0240696 A1 10/2008 Kucharyson
2008/0253391 A1 10/2008 Krits et al.
2008/0259818 A1 10/2008 Balassanian
2008/0261540 A1 10/2008 Rohani et al.
2008/0263150 A1* 10/2008 Childers ................ H04L 67/42 709/203
2008/0266080 A1 10/2008 Leung et al.
2008/0266257 A1 10/2008 Chiang
2008/0271150 A1 10/2008 Boerger et al.

(56) References Cited

U.S. PATENT DOCUMENTS

2008/0284580 A1 11/2008 Babich et al.
2008/0284587 A1 11/2008 Saigh et al.
2008/0284592 A1 11/2008 Collins et al.
2008/0288639 A1 11/2008 Ruppert et al.
2008/0294588 A1 11/2008 Morris et al.
2008/0297599 A1 12/2008 Donovan et al.
2008/0303903 A1 12/2008 Bentley et al.
2008/0313316 A1 12/2008 Hite et al.
2008/0316024 A1 12/2008 Chantelou et al.
2009/0003252 A1 1/2009 Salomone et al.
2009/0003820 A1 1/2009 Law et al.
2009/0007596 A1 1/2009 Goldstein et al.
2009/0013210 A1 1/2009 McIntosh et al.
2009/0019141 A1 1/2009 Bush et al.
2009/0036142 A1 2/2009 Yan
2009/0041467 A1 2/2009 Carleton et al.
2009/0042649 A1 2/2009 Hsieh et al.
2009/0046664 A1 2/2009 Aso
2009/0049094 A1 2/2009 Howell et al.
2009/0049488 A1 2/2009 Stransky
2009/0051769 A1 2/2009 Kuo et al.
2009/0055760 A1 2/2009 Whatcott et al.
2009/0057427 A1* 3/2009 Geadelmann ....... G06F 16/9535 236/51
2009/0063582 A1 3/2009 Anna et al.
2009/0066534 A1 3/2009 Sivakkolundhu
2009/0066788 A1 3/2009 Baum et al.
2009/0066789 A1 3/2009 Baum et al.
2009/0067395 A1 3/2009 Curtis et al.
2009/0067441 A1 3/2009 Ansari et al.
2009/0070436 A1 3/2009 Dawes et al.
2009/0070473 A1 3/2009 Baum et al.
2009/0070477 A1 3/2009 Baum et al.
2009/0070681 A1 3/2009 Dawes et al.
2009/0070682 A1 3/2009 Dawes et al.
2009/0070692 A1 3/2009 Dawes et al.
2009/0072988 A1 3/2009 Haywood
2009/0074184 A1 3/2009 Baum et al.
2009/0076211 A1 3/2009 Yang et al.
2009/0076879 A1 3/2009 Sparks et al.
2009/0077167 A1 3/2009 Baum et al.
2009/0077622 A1 3/2009 Baum et al.
2009/0077623 A1 3/2009 Baum et al.
2009/0077624 A1 3/2009 Baum et al.
2009/0079547 A1 3/2009 Oksanen et al.
2009/0086660 A1 4/2009 Sood et al.
2009/0092283 A1 4/2009 Whillock et al.
2009/0100329 A1 4/2009 Espinoza
2009/0100492 A1 4/2009 Hicks et al.
2009/0113344 A1 4/2009 Nesse et al.
2009/0119397 A1 5/2009 Neerdaels
2009/0125708 A1 5/2009 Woodring et al.
2009/0128365 A1 5/2009 Laskin
2009/0134998 A1 5/2009 Baum et al.
2009/0138600 A1 5/2009 Baum et al.
2009/0138958 A1 5/2009 Baum et al.
2009/0146846 A1 6/2009 Grossman
2009/0158189 A1 6/2009 Itani
2009/0158292 A1 6/2009 Rattner et al.
2009/0161609 A1 6/2009 Bergstrom
2009/0165114 A1 6/2009 Baum et al.
2009/0172443 A1 7/2009 Rothman et al.
2009/0177298 A1 7/2009 McFarland et al.
2009/0177906 A1 7/2009 Paniagua et al.
2009/0187297 A1 7/2009 Kish et al.
2009/0193373 A1 7/2009 Abbaspour et al.
2009/0197539 A1 8/2009 Shiba
2009/0202250 A1 8/2009 Dizechi et al.
2009/0204693 A1 8/2009 Andreev et al.
2009/0221368 A1 9/2009 Yen et al.
2009/0224875 A1 9/2009 Rabinowitz et al.
2009/0228445 A1 9/2009 Gangal
2009/0240353 A1 9/2009 Songkakul et al.
2009/0240730 A1 9/2009 Wood
2009/0240787 A1 9/2009 Denny
2009/0240814 A1 9/2009 Brubacher et al.
2009/0240946 A1 9/2009 Yeap et al.
2009/0256708 A1 10/2009 Hsiao et al.
2009/0259515 A1 10/2009 Belimpasakis et al.
2009/0260052 A1 10/2009 Bathula et al.
2009/0260430 A1 10/2009 Zamfes
2009/0265042 A1 10/2009 Mollenkopf et al.
2009/0265193 A1 10/2009 Collins et al.
2009/0270090 A1 10/2009 Kawamura
2009/0271042 A1 10/2009 Voysey
2009/0289787 A1 11/2009 Dawson et al.
2009/0289788 A1 11/2009 Leblond
2009/0303100 A1 12/2009 Zemany
2009/0307255 A1 12/2009 Park
2009/0307307 A1 12/2009 Igarashi
2009/0313693 A1 12/2009 Rogers
2009/0316671 A1 12/2009 Rolf et al.
2009/0322510 A1 12/2009 Berger et al.
2009/0324010 A1 12/2009 Hou
2009/0327483 A1 12/2009 Thompson et al.
2009/0327510 A1 12/2009 Edelman et al.
2010/0000791 A1 1/2010 Alberty
2010/0001812 A1 1/2010 Kausch
2010/0004949 A1 1/2010 O'Brien
2010/0008274 A1 1/2010 Kneckt et al.
2010/0013917 A1 1/2010 Hanna et al.
2010/0023865 A1 1/2010 Fulker et al.
2010/0026481 A1 2/2010 Oh et al.
2010/0026487 A1 2/2010 Hershkovitz
2010/0030578 A1 2/2010 Siddique et al.
2010/0030810 A1 2/2010 Marr
2010/0039958 A1 2/2010 Ge et al.
2010/0041380 A1 2/2010 Hewes et al.
2010/0052612 A1 3/2010 Raji et al.
2010/0066530 A1 3/2010 Cohn et al.
2010/0067371 A1 3/2010 Gogic et al.
2010/0074112 A1 3/2010 Derr et al.
2010/0077111 A1 3/2010 Holmes et al.
2010/0077347 A1 3/2010 Kirtane et al.
2010/0082744 A1 4/2010 Raji et al.
2010/0095111 A1 4/2010 Gutt et al.
2010/0095369 A1 4/2010 Gutt et al.
2010/0100269 A1 4/2010 Ekhaguere et al.
2010/0102951 A1 4/2010 Rutledge
2010/0121521 A1 5/2010 Kiribayashi
2010/0122091 A1 5/2010 Huang et al.
2010/0138758 A1 6/2010 Mizumori et al.
2010/0138764 A1 6/2010 Hatambeiki et al.
2010/0141762 A1 6/2010 Siann et al.
2010/0145485 A1 6/2010 Duchene et al.
2010/0150170 A1 6/2010 Lee et al.
2010/0153853 A1 6/2010 Dawes et al.
2010/0159898 A1 6/2010 Krzyzanowski et al.
2010/0159967 A1 6/2010 Pounds et al.
2010/0164736 A1 7/2010 Byers et al.
2010/0165897 A1 7/2010 Sood
2010/0174643 A1 7/2010 Schaefer et al.
2010/0177749 A1 7/2010 Essinger et al.
2010/0177750 A1 7/2010 Essinger et al.
2010/0185857 A1 7/2010 Neitzel et al.
2010/0197219 A1 8/2010 Issa et al.
2010/0204839 A1 8/2010 Berm et al.
2010/0210240 A1 8/2010 Mahaffey et al.
2010/0212012 A1 8/2010 Touboul et al.
2010/0218104 A1 8/2010 Lewis
2010/0222069 A1 9/2010 Abraham et al.
2010/0238286 A1 9/2010 Boghossian et al.
2010/0241711 A1 9/2010 Ansari et al.
2010/0241748 A1 9/2010 Ansari et al.
2010/0245107 A1 9/2010 Fulker et al.
2010/0248681 A1 9/2010 Phills
2010/0267390 A1 10/2010 Lin et al.
2010/0274366 A1 10/2010 Fata et al.
2010/0277300 A1 11/2010 Cohn et al.
2010/0277302 A1 11/2010 Cohn et al.
2010/0277315 A1 11/2010 Cohn et al.
2010/0280635 A1 11/2010 Cohn et al.
2010/0280637 A1 11/2010 Cohn et al.
2010/0281135 A1 11/2010 Cohn et al.

(56) References Cited

U.S. PATENT DOCUMENTS

2010/0281161 A1 11/2010 Cohn et al.
2010/0281312 A1 11/2010 Cohn et al.
2010/0298024 A1 11/2010 Choi
2010/0308990 A1 12/2010 Simon et al.
2010/0321151 A1 12/2010 Matsuura et al.
2010/0325107 A1 12/2010 Kenton et al.
2010/0332164 A1 12/2010 Aisa et al.
2011/0000521 A1 1/2011 Tachibana
2011/0029875 A1 2/2011 Milch
2011/0030056 A1 2/2011 Tokunaga
2011/0037593 A1 2/2011 Foisy et al.
2011/0040415 A1 2/2011 Nickerson et al.
2011/0040877 A1 2/2011 Foisy
2011/0046792 A1 2/2011 Imes et al.
2011/0051638 A1 3/2011 Jeon et al.
2011/0068921 A1 3/2011 Shafer
2011/0080267 A1 4/2011 Clare et al.
2011/0087988 A1 4/2011 Ray et al.
2011/0093799 A1 4/2011 Hatambeiki et al.
2011/0096678 A1 4/2011 Ketonen
2011/0102588 A1 5/2011 Trundle et al.
2011/0107436 A1 5/2011 Cholas et al.
2011/0125333 A1 5/2011 Gray
2011/0125846 A1 5/2011 Ham et al.
2011/0128378 A1 6/2011 Raji
2011/0156914 A1 6/2011 Sheharri et al.
2011/0169637 A1 7/2011 Siegler et al.
2011/0197327 A1 8/2011 McElroy et al.
2011/0200052 A1 8/2011 Mungo et al.
2011/0208359 A1 8/2011 Duchene et al.
2011/0212706 A1 9/2011 Uusilehto
2011/0218777 A1 9/2011 Chen et al.
2011/0230160 A1 9/2011 Felgate
2011/0234392 A1 9/2011 Cohn et al.
2011/0257953 A1 10/2011 Li et al.
2011/0261195 A1 10/2011 Martin et al.
2011/0276699 A1 11/2011 Pedersen
2011/0283006 A1 11/2011 Ramamurthy
2011/0286437 A1 11/2011 Austin et al.
2011/0289517 A1 11/2011 Sather et al.
2011/0302497 A1 12/2011 Garrett et al.
2011/0309929 A1 12/2011 Myers
2011/0314515 A1 12/2011 Hernoud et al.
2012/0001436 A1 1/2012 Sami et al.
2012/0014363 A1 1/2012 Hassan et al.
2012/0016607 A1 1/2012 Cottrell et al.
2012/0017268 A9 1/2012 Dispensa
2012/0020060 A1 1/2012 Myer et al.
2012/0023151 A1 1/2012 Bennett et al.
2012/0030130 A1 2/2012 Smith et al.
2012/0062026 A1 3/2012 Raji et al.
2012/0062370 A1 3/2012 Feldstein et al.
2012/0066608 A1 3/2012 Sundermeyer et al.
2012/0066632 A1 3/2012 Sundermeyer et al.
2012/0081842 A1 4/2012 Ewing et al.
2012/0084184 A1 4/2012 Raleigh et al.
2012/0143383 A1 6/2012 Cooperrider et al.
2012/0154126 A1 6/2012 Cohn et al.
2012/0154138 A1 6/2012 Cohn et al.
2012/0172027 A1 7/2012 Partheesh et al.
2012/0182245 A1 7/2012 Hutton
2012/0209951 A1 8/2012 Enns et al.
2012/0214502 A1 8/2012 Qiang
2012/0232788 A1 9/2012 Diao
2012/0242788 A1 9/2012 Chuang et al.
2012/0257061 A1 10/2012 Edwards et al.
2012/0259722 A1 10/2012 Mikurak
2012/0260184 A1 10/2012 Dawes et al.
2012/0265892 A1 10/2012 Ma et al.
2012/0269199 A1 10/2012 Chan et al.
2012/0278877 A1 11/2012 Baum et al.
2012/0280790 A1 11/2012 Gerhardt et al.
2012/0296486 A1 11/2012 Marriam et al.
2012/0307646 A1 12/2012 Xia et al.
2012/0309354 A1 12/2012 Du
2012/0314901 A1 12/2012 Hanson et al.
2012/0315848 A1 12/2012 Smith et al.
2012/0324566 A1 12/2012 Baum et al.
2012/0327242 A1 12/2012 Barley et al.
2012/0331109 A1 12/2012 Baum et al.
2013/0007871 A1 1/2013 Meenan et al.
2013/0038730 A1 2/2013 Peterson et al.
2013/0038800 A1 2/2013 Yoo
2013/0062951 A1 3/2013 Raji et al.
2013/0073746 A1 3/2013 Singh et al.
2013/0082835 A1 4/2013 Shapiro et al.
2013/0082836 A1 4/2013 Watts
2013/0085615 A1 4/2013 Barker
2013/0085620 A1 4/2013 Lu et al.
2013/0103207 A1 4/2013 Ruff et al.
2013/0115972 A1 5/2013 Ziskind et al.
2013/0120134 A1 5/2013 Hicks, III
2013/0125157 A1 5/2013 Sharif-Ahmadi et al.
2013/0136102 A1 5/2013 MacWan et al.
2013/0147799 A1* 6/2013 Hoguet .................. G06T 17/00 345/420
2013/0154822 A1 6/2013 Kumar et al.
2013/0155229 A1 6/2013 Thornton et al.
2013/0163491 A1 6/2013 Singh et al.
2013/0174239 A1 7/2013 Kim et al.
2013/0183924 A1 7/2013 Saigh et al.
2013/0184874 A1 7/2013 Frader-Thompson et al.
2013/0191755 A1 7/2013 Balog et al.
2013/0218959 A1 8/2013 Sa et al.
2013/0222133 A1 8/2013 Schultz et al.
2013/0223279 A1 8/2013 Tinnakornsrisuphap et al.
2013/0245837 A1 9/2013 Grohman
2013/0257611 A1 10/2013 Lamb et al.
2013/0261821 A1 10/2013 Lu et al.
2013/0266193 A1 10/2013 Tiwari et al.
2013/0311146 A1 11/2013 Miller et al.
2013/0314542 A1 11/2013 Jackson
2013/0318231 A1 11/2013 Raji et al.
2013/0318443 A1 11/2013 Bachman et al.
2013/0331109 A1 12/2013 Dhillon et al.
2013/0344875 A1 12/2013 Chowdhury
2014/0032034 A1 1/2014 Raptopoulos et al.
2014/0035726 A1 2/2014 Schoner et al.
2014/0053246 A1 2/2014 Huang et al.
2014/0068486 A1 3/2014 Sellers et al.
2014/0075464 A1 3/2014 McCrea
2014/0098247 A1 4/2014 Rao et al.
2014/0112405 A1 4/2014 Jafarian et al.
2014/0126425 A1 5/2014 Burd et al.
2014/0136242 A1 5/2014 Weekes et al.
2014/0136847 A1 5/2014 Huang
2014/0136936 A1 5/2014 Patel et al.
2014/0140575 A1 5/2014 Wolf
2014/0143695 A1 5/2014 Sundermeyer et al.
2014/0143851 A1 5/2014 Baum et al.
2014/0143854 A1 5/2014 Lopez et al.
2014/0146171 A1 5/2014 Brady et al.
2014/0153695 A1 6/2014 Yanagisawa et al.
2014/0167928 A1 6/2014 Burd et al.
2014/0172957 A1 6/2014 Baum et al.
2014/0176797 A1 6/2014 Silva et al.
2014/0180968 A1 6/2014 Song et al.
2014/0188290 A1 7/2014 Steinberg et al.
2014/0201291 A1 7/2014 Russell
2014/0218517 A1 8/2014 Kim et al.
2014/0232861 A1 8/2014 Naidoo et al.
2014/0233951 A1 8/2014 Cook
2014/0236325 A1 8/2014 Sasaki et al.
2014/0245160 A1 8/2014 Bauer et al.
2014/0266678 A1 9/2014 Shapiro et al.
2014/0266736 A1 9/2014 Cretu-Petra
2014/0278281 A1 9/2014 Vaynriber et al.
2014/0282048 A1 9/2014 Shapiro et al.
2014/0282934 A1 9/2014 Miasnik et al.
2014/0289384 A1 9/2014 Kao et al.
2014/0289388 A1 9/2014 Ghosh et al.
2014/0293046 A1 10/2014 Ni
2014/0316616 A1 10/2014 Kugelmass
2014/0317660 A1 10/2014 Cheung et al.

(56) References Cited

U.S. PATENT DOCUMENTS

| | | | |
|---|---|---|---|
| 2014/0319232 | A1 | 10/2014 | Gourlay et al. |
| 2014/0328161 | A1 | 11/2014 | Haddad et al. |
| 2014/0340216 | A1 | 11/2014 | Puskarich |
| 2014/0355588 | A1 | 12/2014 | Cho et al. |
| 2014/0359101 | A1 | 12/2014 | Dawes et al. |
| 2014/0359524 | A1 | 12/2014 | Sasaki et al. |
| 2014/0368331 | A1 | 12/2014 | Cohn et al. |
| 2014/0369584 | A1 | 12/2014 | Fan et al. |
| 2014/0372599 | A1 | 12/2014 | Gutt et al. |
| 2014/0372811 | A1 | 12/2014 | Cohn et al. |
| 2015/0009325 | A1 | 1/2015 | Kardashov |
| 2015/0019714 | A1 | 1/2015 | Shaashua et al. |
| 2015/0054947 | A1 | 2/2015 | Dawes |
| 2015/0074206 | A1 | 3/2015 | Baldwin |
| 2015/0074259 | A1 | 3/2015 | Ansari et al. |
| 2015/0077553 | A1 | 3/2015 | Dawes |
| 2015/0082414 | A1 | 3/2015 | Dawes |
| 2015/0088982 | A1 | 3/2015 | Johnson et al. |
| 2015/0097680 | A1 | 4/2015 | Fadell et al. |
| 2015/0097949 | A1 | 4/2015 | Lire et al. |
| 2015/0097961 | A1 | 4/2015 | Ure et al. |
| 2015/0106721 | A1 | 4/2015 | Cha et al. |
| 2015/0116108 | A1 | 4/2015 | Fadell et al. |
| 2015/0142991 | A1 | 5/2015 | Zaloom |
| 2015/0161875 | A1 | 6/2015 | Cohn et al. |
| 2015/0205465 | A1 | 7/2015 | Robison et al. |
| 2015/0222517 | A1 | 8/2015 | McLaughlin et al. |
| 2015/0256355 | A1 | 9/2015 | Pera et al. |
| 2015/0261427 | A1 | 9/2015 | Sasaki |
| 2015/0266577 | A1 | 9/2015 | Jones et al. |
| 2015/0287310 | A1 | 10/2015 | Deiiuliis et al. |
| 2015/0319006 | A1 | 11/2015 | Plummer et al. |
| 2015/0319046 | A1 | 11/2015 | Plummer et al. |
| 2015/0325106 | A1 | 11/2015 | Dawes et al. |
| 2015/0331662 | A1 | 11/2015 | Lambourne |
| 2015/0334087 | A1 | 11/2015 | Dawes |
| 2015/0348554 | A1 | 12/2015 | Orr et al. |
| 2015/0350031 | A1 | 12/2015 | Burks et al. |
| 2015/0358359 | A1 | 12/2015 | Ghai et al. |
| 2015/0365217 | A1 | 12/2015 | Scholten et al. |
| 2015/0373149 | A1 | 12/2015 | Lyons |
| 2016/0012715 | A1 | 1/2016 | Raji et al. |
| 2016/0019763 | A1 | 1/2016 | Raji et al. |
| 2016/0019778 | A1 | 1/2016 | Raji et al. |
| 2016/0023475 | A1 | 1/2016 | Bevier et al. |
| 2016/0027295 | A1 | 1/2016 | Raji et al. |
| 2016/0036944 | A1 | 2/2016 | Kitchen et al. |
| 2016/0042637 | A1 | 2/2016 | Cahill |
| 2016/0055573 | A1 | 2/2016 | Chen et al. |
| 2016/0062624 | A1 | 3/2016 | Sundermeyer et al. |
| 2016/0065413 | A1 | 3/2016 | Sundermeyer et al. |
| 2016/0065414 | A1 | 3/2016 | Sundermeyer et al. |
| 2016/0077935 | A1 | 3/2016 | Zheng et al. |
| 2016/0087933 | A1 | 3/2016 | Johnson et al. |
| 2016/0100348 | A1 | 4/2016 | Cohn et al. |
| 2016/0107749 | A1 | 4/2016 | Mucci |
| 2016/0116914 | A1 | 4/2016 | Mucci |
| 2016/0127641 | A1 | 5/2016 | Gove |
| 2016/0147919 | A1 | 5/2016 | Yabe et al. |
| 2016/0161277 | A1 | 6/2016 | Park et al. |
| 2016/0163185 | A1 | 6/2016 | Ramasubbu et al. |
| 2016/0164923 | A1 | 6/2016 | Dawes |
| 2016/0171853 | A1 | 6/2016 | Naidoo et al. |
| 2016/0180719 | A1 | 6/2016 | Wouhaybi et al. |
| 2016/0183073 | A1 | 6/2016 | Saito et al. |
| 2016/0189509 | A1 | 6/2016 | Malhotra et al. |
| 2016/0189524 | A1 | 6/2016 | Poder et al. |
| 2016/0189527 | A1 | 6/2016 | Peterson et al. |
| 2016/0189549 | A1 | 6/2016 | Marcus |
| 2016/0191265 | A1 | 6/2016 | Cohn et al. |
| 2016/0191621 | A1 | 6/2016 | Oh et al. |
| 2016/0192461 | A1 | 6/2016 | Minsky |
| 2016/0202695 | A1 | 7/2016 | Deroos et al. |
| 2016/0209072 | A1 | 7/2016 | Golden et al. |
| 2016/0225240 | A1 | 8/2016 | Voddhi et al. |
| 2016/0226732 | A1 | 8/2016 | Kim et al. |
| 2016/0231916 | A1 | 8/2016 | Dawes |
| 2016/0232780 | A1 | 8/2016 | Cohn et al. |
| 2016/0234075 | A1 | 8/2016 | Sirpal et al. |
| 2016/0241633 | A1 | 8/2016 | Overby et al. |
| 2016/0260135 | A1 | 9/2016 | Zomet et al. |
| 2016/0261932 | A1 | 9/2016 | Fadell et al. |
| 2016/0266579 | A1 | 9/2016 | Chen et al. |
| 2016/0267751 | A1 | 9/2016 | Fulker et al. |
| 2016/0269191 | A1 | 9/2016 | Cronin |
| 2016/0274759 | A1 | 9/2016 | Dawes |
| 2016/0363337 | A1 | 12/2016 | Steinberg et al. |
| 2016/0364089 | A1 | 12/2016 | Blackman et al. |
| 2016/0371961 | A1 | 12/2016 | Narang et al. |
| 2016/0373453 | A1 | 12/2016 | Ruffner et al. |
| 2016/0378109 | A1 | 12/2016 | Raffa et al. |
| 2017/0004714 | A1 | 1/2017 | Rhee |
| 2017/0005818 | A1 | 1/2017 | Gould |
| 2017/0006107 | A1 | 1/2017 | Dawes et al. |
| 2017/0019644 | A1 | 1/2017 | K et al. |
| 2017/0026440 | A1 | 1/2017 | Cockrell et al. |
| 2017/0039413 | A1 | 2/2017 | Nadler |
| 2017/0052513 | A1 | 2/2017 | Raji et al. |
| 2017/0054571 | A1 | 2/2017 | Kitchen et al. |
| 2017/0054594 | A1 | 2/2017 | Decenzo et al. |
| 2017/0063967 | A1 | 3/2017 | Kitchen et al. |
| 2017/0063968 | A1 | 3/2017 | Kitchen et al. |
| 2017/0068419 | A1 | 3/2017 | Sundermeyer et al. |
| 2017/0070361 | A1 | 3/2017 | Sundermeyer et al. |
| 2017/0070563 | A1 | 3/2017 | Sundermeyer et al. |
| 2017/0078298 | A1 | 3/2017 | Vlaminck et al. |
| 2017/0103646 | A1 | 4/2017 | Naidoo et al. |
| 2017/0109999 | A1 | 4/2017 | Cohn et al. |
| 2017/0118037 | A1 | 4/2017 | Kitchen et al. |
| 2017/0127124 | A9 | 5/2017 | Wilson et al. |
| 2017/0154507 | A1 | 6/2017 | Dawes et al. |
| 2017/0155545 | A1 | 6/2017 | Baum et al. |
| 2017/0180198 | A1 | 6/2017 | Baum et al. |
| 2017/0180306 | A1 | 6/2017 | Gutt et al. |
| 2017/0185277 | A1 | 6/2017 | Sundermeyer et al. |
| 2017/0185278 | A1 | 6/2017 | Sundermeyer et al. |
| 2017/0192402 | A1 | 7/2017 | Karp et al. |
| 2017/0227965 | A1 | 8/2017 | Decenzo et al. |
| 2017/0244573 | A1 | 8/2017 | Baum et al. |
| 2017/0255452 | A1 | 9/2017 | Barnes et al. |
| 2017/0257257 | A1 | 9/2017 | Dawes |
| 2017/0278407 | A1 | 9/2017 | Lemmey et al. |
| 2017/0279629 | A1 | 9/2017 | Raji |
| 2017/0289360 | A1 | 10/2017 | Baum et al. |
| 2017/0301216 | A1 | 10/2017 | Cohn et al. |
| 2017/0302469 | A1 | 10/2017 | Cohn et al. |
| 2017/0303257 | A1 | 10/2017 | Yamada et al. |
| 2017/0310500 | A1 | 10/2017 | Dawes |
| 2017/0331781 | A1 | 11/2017 | Gutt et al. |
| 2017/0337806 | A1 | 11/2017 | Cohn et al. |
| 2017/0353324 | A1 | 12/2017 | Baum et al. |
| 2018/0004377 | A1 | 1/2018 | Kitchen et al. |
| 2018/0019890 | A1 | 1/2018 | Dawes |
| 2018/0054774 | A1 | 2/2018 | Cohn et al. |
| 2018/0063248 | A1 | 3/2018 | Dawes et al. |
| 2018/0063259 | A1 | 3/2018 | Connelly et al. |
| 2018/0083831 | A1 | 3/2018 | Baum et al. |
| 2018/0092046 | A1 | 3/2018 | Egan et al. |
| 2018/0096568 | A1 | 4/2018 | Cohn et al. |
| 2018/0191720 | A1 | 7/2018 | Dawes |
| 2018/0191740 | A1 | 7/2018 | Decenzo et al. |
| 2018/0191741 | A1 | 7/2018 | Dawes et al. |
| 2018/0191742 | A1 | 7/2018 | Dawes |
| 2018/0191807 | A1 | 7/2018 | Dawes |
| 2018/0197387 | A1 | 7/2018 | Dawes |
| 2018/0198688 | A1 | 7/2018 | Dawes |
| 2018/0198755 | A1 | 7/2018 | Domangue et al. |
| 2018/0198756 | A1 | 7/2018 | Dawes |
| 2018/0198788 | A1 | 7/2018 | Helen et al. |
| 2018/0198802 | A1 | 7/2018 | Dawes |
| 2018/0198841 | A1 | 7/2018 | Chmielewski et al. |
| 2018/0278701 | A1 | 9/2018 | Diem |
| 2018/0307223 | A1 | 10/2018 | Peeters et al. |
| 2019/0014413 | A1 | 1/2019 | Kallai et al. |

(56) References Cited

U.S. PATENT DOCUMENTS

| | | | |
|---|---|---|---|
| 2019/0041547 | A1 | 2/2019 | Rolf et al. |
| 2019/0058720 | A1 | 2/2019 | Lindquist et al. |
| 2019/0073534 | A1 | 3/2019 | Dvir et al. |
| 2019/0239008 | A1 | 8/2019 | Lambourne |
| 2019/0347924 | A1 | 11/2019 | Trundle et al. |
| 2019/0386892 | A1 | 12/2019 | Sundermeyer et al. |
| 2019/0391545 | A1 | 12/2019 | Trundle et al. |
| 2020/0029339 | A1 | 1/2020 | Suzuki |
| 2020/0094963 | A1 | 3/2020 | Myslinski |
| 2020/0127891 | A9 | 4/2020 | Johnson et al. |
| 2020/0257721 | A1 | 8/2020 | McKinnon et al. |
| 2020/0279626 | A1 | 9/2020 | Ansari et al. |
| 2021/0099753 | A1 | 4/2021 | Connelly et al. |

FOREIGN PATENT DOCUMENTS

| | | | |
|---|---|---|---|
| AU | 2011250886 | A1 | 1/2013 |
| AU | 2013284428 | A1 | 2/2015 |
| AU | 2011305163 | B2 | 12/2016 |
| AU | 2017201365 | A1 | 3/2017 |
| AU | 2017201585 | A1 | 3/2017 |
| BE | 1008939 | A6 | 10/1996 |
| CA | 2203813 | A1 | 6/1996 |
| CA | 2174482 | A1 | 10/1997 |
| CA | 2346638 | A1 | 4/2000 |
| CA | 2389958 | A1 | 3/2003 |
| CA | 2878117 | A1 | 1/2014 |
| CA | 2559842 | C | 5/2014 |
| CA | 2992429 | A1 | 12/2016 |
| CA | 2976682 | A1 | 2/2018 |
| CA | 2976802 | A1 | 2/2018 |
| CN | 102834818 | A | 12/2012 |
| CN | 102985915 | A | 3/2013 |
| EP | 0295146 | A2 | 12/1988 |
| EP | 0308046 | A2 | 3/1989 |
| EP | 0591585 | A1 | 4/1994 |
| EP | 1117214 | A2 | 7/2001 |
| EP | 1119837 | A1 | 8/2001 |
| EP | 0978111 | | 11/2001 |
| EP | 1738540 | A2 | 1/2007 |
| EP | 1881716 | A1 | 1/2008 |
| EP | 2112784 | A1 | 10/2009 |
| EP | 2188794 | A1 | 5/2010 |
| EP | 2191351 | A1 | 6/2010 |
| EP | 2327063 | A1 | 6/2011 |
| EP | 2483788 | A1 | 8/2012 |
| EP | 2569712 | A1 | 3/2013 |
| EP | 2619686 | A1 | 7/2013 |
| EP | 2868039 | A2 | 5/2015 |
| EP | 3031206 | A2 | 6/2016 |
| EP | 3285238 | A2 | 2/2018 |
| EP | 3308222 | A1 | 4/2018 |
| FR | 2584217 | A1 | 1/1987 |
| FR | 2661023 | A1 | 10/1991 |
| FR | 2793334 | A1 | 11/2000 |
| GB | 2222288 | A | 2/1990 |
| GB | 2273593 | A | 6/1994 |
| GB | 2286423 | A | 8/1995 |
| GB | 2291554 | A | 1/1996 |
| GB | 2319373 | A | 5/1998 |
| GB | 2320644 | A | 6/1998 |
| GB | 2324630 | A | 10/1998 |
| GB | 2325548 | A | 11/1998 |
| GB | 2335523 | A | 9/1999 |
| GB | 2349293 | A | 10/2000 |
| GB | 2370400 | A | 6/2002 |
| GB | 2442628 | A | 4/2008 |
| GB | 2442633 | A | 4/2008 |
| GB | 2442640 | A | 4/2008 |
| GB | 2428821 | B | 6/2008 |
| IN | 45/2015 | | 11/2015 |
| IN | 04/2016 | | 1/2016 |
| JP | 63-033088 | A | 2/1988 |
| JP | 05-167712 | A | 7/1993 |
| JP | 06-339183 | A | 12/1993 |
| JP | 08-227491 | | 9/1996 |
| JP | 10-004451 | A | 1/1998 |
| JP | 2000-006343 | A | 1/2000 |
| JP | 2000-023146 | A | 1/2000 |
| JP | 2000-278671 | A | 10/2000 |
| JP | 2001-006088 | A | 1/2001 |
| JP | 2001-006343 | A | 1/2001 |
| JP | 2001-069209 | A | 3/2001 |
| JP | 2002-055895 | | 2/2002 |
| JP | 2002-185629 | | 6/2002 |
| JP | 2003-085258 | A | 3/2003 |
| JP | 2003-141659 | A | 5/2003 |
| JP | 2003-281647 | A | 10/2003 |
| JP | 2004-192659 | A | 7/2004 |
| JP | 2006-094394 | A | 4/2006 |
| JP | 2007-529826 | A | 10/2007 |
| JP | 2010-140091 | A | 6/2010 |
| KR | 10-2006-0021605 | A | 3/2006 |
| KR | 10-0771941 | B1 | 10/2007 |
| TW | 340934 | B | 9/1998 |
| TW | I239176 | B | 9/2005 |
| TW | I480839 | B | 4/2015 |
| TW | I480840 | B | 4/2015 |
| TW | I509579 | B | 11/2015 |
| TW | I517106 | B | 1/2016 |
| WO | 89/07855 | A1 | 8/1989 |
| WO | 89/11187 | A1 | 11/1989 |
| WO | 94/03881 | A1 | 2/1994 |
| WO | 95/13944 | A1 | 5/1995 |
| WO | 96/36301 | A1 | 11/1996 |
| WO | 97/13230 | A2 | 4/1997 |
| WO | 98/25243 | A1 | 6/1998 |
| WO | 98/49663 | A1 | 11/1998 |
| WO | 98/52343 | A1 | 11/1998 |
| WO | 98/59256 | A2 | 12/1998 |
| WO | 99/34339 | A2 | 7/1999 |
| WO | 00/21053 | A1 | 4/2000 |
| WO | 00/36812 | A1 | 6/2000 |
| WO | 00/72598 | A1 | 11/2000 |
| WO | 01/11586 | A1 | 2/2001 |
| WO | 01/52478 | A2 | 7/2001 |
| WO | 01/71489 | A1 | 9/2001 |
| WO | 01/99078 | A2 | 12/2001 |
| WO | 02/11444 | A1 | 2/2002 |
| WO | 02/21300 | A1 | 3/2002 |
| WO | 02/97584 | A2 | 12/2002 |
| WO | 2002/100083 | | 12/2002 |
| WO | 2003/026305 | A1 | 3/2003 |
| WO | 03/40839 | A1 | 5/2003 |
| WO | 2004/004222 | A1 | 1/2004 |
| WO | 2004/098127 | A1 | 11/2004 |
| WO | 2004/107710 | A1 | 12/2004 |
| WO | 2005/091218 | A2 | 9/2005 |
| WO | 2007/038872 | A1 | 4/2007 |
| WO | 2007/124453 | A2 | 11/2007 |
| WO | 2008/056320 | A1 | 5/2008 |
| WO | 2009/006670 | A1 | 1/2009 |
| WO | 2009/023647 | A1 | 2/2009 |
| WO | 2009/029590 | A1 | 3/2009 |
| WO | 2009/029597 | A1 | 3/2009 |
| WO | 2009/064795 | A1 | 5/2009 |
| WO | 2009/145747 | A1 | 12/2009 |
| WO | 2010/019624 | A1 | 2/2010 |
| WO | 2010/025468 | A1 | 3/2010 |
| WO | 2010/127009 | A1 | 11/2010 |
| WO | 2010/127194 | A2 | 11/2010 |
| WO | 2010/127200 | A1 | 11/2010 |
| WO | 2010/127203 | A1 | 11/2010 |
| WO | 2011/038409 | A1 | 3/2011 |
| WO | 2011/063354 | A1 | 5/2011 |
| WO | 2011/143273 | A1 | 11/2011 |
| WO | 2012/040653 | A1 | 3/2012 |
| WO | 2014/004911 | A2 | 1/2014 |
| WO | 2015/021469 | A2 | 2/2015 |
| WO | 2015/134520 | A1 | 9/2015 |

(56) References Cited

FOREIGN PATENT DOCUMENTS

WO 2016/201033 A1 12/2016
ZA 201302668 6/2014

OTHER PUBLICATIONS

"Indicate". Merriam-Webster.com Dictionary, Merriam-Webster, https://web.archive.org/web/20061209080613/https://www.merriam-webster.com/dictionary/indicate. Dec. 9, 2006.*
US Patent Application filed Aug. 23, 2019, entitled "Premises System Management Using Status Signal", U.S. Appl. No. 16/549,837.
US Patent Application filed Sep. 6, 2018, entitled "Takeover of Security Network", U.S. Appl. No. 16/123,695.
US Patent Application filed Sep. 17, 2018, entitled "Integrated Security System With Parallel Processing Architecture", U.S. Appl. No. 16/133,135.
US Patent Application filed Sep. 28, 2018, entitled "Control System User Interface", U.S. Appl. No. 16/146,715.
US Patent Application filed Sep. 28, 2018, entitled "Forming a Security Network Including Integrated Security System Components and Network Devices", U.S. Appl. No. 16/147,044.
US Patent Application filed Sep. 11, 2018, entitled "Premises Management Networking", U.S. Appl. No. 16/128,089.
US Patent Application filed Oct. 1, 2018, entitled "Integrated Security System With Parallel Processing Architecture", U.S. Appl. No. 16/148,387.
US Patent Application filed Oct. 1, 2018, entitled "Integrated Security System with Parallel Processing Architecture", U.S. Appl. No. 16/148,411.
US Patent Application filed Oct. 1, 2018, entitled "User Interface in a Premises Network", U.S. Appl. No. 16/148,572.
US Patent Application filed Oct. 3, 2018, entitled "Activation of a Home Automation Controller", U.S. Appl. No. 16/150,973.
US Patent Application filed Oct. 10, 2018, entitled "Method and System for Providing Alternate Network Access", U.S. Appl. No. 16/156,448.
US Patent Application filed Oct. 13, 2017, entitled "Notification of Event Subsequent to Communication Failure With Security System", U.S. Appl. No. 15/783,858.
US Patent Application filed Oct. 18, 2018, entitled "Generating Risk Profile Using Data of Home Monitoring and Security System", U.S. Appl. No. 16/164,114.
US Patent Application filed Oct. 27, 2017, entitled "Security System With Networked Touchscreen", U.S. Appl. No. 15/796,421.
US Patent Application filed Nov. 28, 2017, entitled "Forming a Security Network Including Integrated Security System Components", U.S. Appl. No. 15/824,503.
US Patent Application filed Nov. 29, 2018, entitled "Premise Management Systems and Methods", U.S. Appl. No. 16/204,442.
US Patent Application filed Nov. 30, 2017, entitled "Controller and Interface for Home Security, Monitoring and Automation Having Customizable Audio Alerts for SMA Events", U.S. Appl. No. 15/828,030.
US Patent Application filed Dec. 14, 2018, entitled "Communication Protocols Over Internet Protocol (IP) Networks", U.S. Appl. No. 16/221,299.
US Patent Application filed Dec. 27, 2018, entitled "Communication Protocols in Integrated Systems", U.S. Appl. No. 16/233,913.
US Patent Application filed Aug. 9, 2018, entitled "Method and Systems for Processing Security Event Data", U.S. Appl. No. 16/059,833.
Valtchev, D., and I. Frankov. "Service gateway architecture for a smart home." Communications Magazine, IEEE 40.4 (2002): 126-132.
Visitalk, Communication with Vision, http://www.visitalk.jimbo.com; website accessed Jan. 10, 2018.
Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from Internet on Jan. 11, 2018.
Windows, Newton's Telecom Dictionary, 21st Edition, Mar. 2005, 937-938.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.
Yanni Zhai et al., Design of Smart Home Remote Monitoring System Based on Embedded System, 2011 IEEE 2nd International Conference on Computing, Control and Industrial Engineering, vol. 2, pp. 41-44.
Security for the Future, Introducing 5804B0—Advanced two-way wireless remote technology, Advertisement, ADEMCO Group, Syosset, NY, circa 1997.
Shang, Wei-Lai, "Study on Application Embedded Intelligent Area System", Journal of Anyang Institute of Technology, Dec. 2010, vol. 9, No. 6, pp. 56-57 and 65.
Shang, Wei-lai, Study on Application of Embedded Intelligent Area System, Journal of Anyang Institute of Technology, vol. 9, No. 6, pp. 56-57 and 65.
South African Patent App. No. 2013/02668, corresponds to WO2012/040653.
Supplemental European Search Report for Application No. EP05725743.8 dated Sep. 14, 2010, 2 pages.
Supplementary European Search Report for Application No. EP10819658, dated Mar. 10, 2015, 2 pages.
Supplementary European Search Report for Application No. EP11827671, dated Mar. 10, 2015, 2 pages.
Supplementary Partial European Search Report for Application No. EP09807196, dated Nov. 17, 2014, 5 pages.
Supplementary European Search Report for Application No. EP2191351, dated Jun. 23, 2014, 2 pages.
Supplementary Non-Final Office Action dated Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
US Patent Application filed Jan. 3, 2019, entitled "Methods and Systems for Data Communication", U.S. Appl. No. 16/239,114.
US Patent Application filed Jan. 22, 2019, entitled "Data Model for Home Automation", U.S. Appl. No. 16/254,535.
US Patent Application filed Jan. 22, 2019, entitled "Premises System Automation", U.S. Appl. No. 16/254,480.
US Patent Application filed Jan. 25, 2019, entitled Communication Protocols in Integrated Systems, U.S. Appl. No. 16/257,706.
US Patent Application filed Jan. 28, 2019, entitled "Automation System User Interface With Three-Dimensional Display", U.S. Appl. No. 16/258,858.
US Patent Application filed Mar. 2, 2017, entitled "Generating Risk Profile Using Data of Home Monitoring and Security System", U.S. Appl. No. 15/447,982.
US Patent Application filed Mar. 7, 2014, entitled "Activation of Gateway Device", U.S. Appl. No. 14/201,162.
US Patent Application filed Mar. 7, 2014, entitled "Communication Protocols in Integrated Systems", U.S. Appl. No. 14/200,921.
US Patent Application filed Mar. 7, 2014, entitled "Device Integration Framework", U.S. Appl. No. 14/201,227.
US Patent Application filed Mar. 7, 2014, entitled "Integrated Security and Control System With Geofencing", U.S. Appl. No. 14/201,189.
US Patent Application filed Mar. 7, 2014, entitled "Security System Integrated With Social Media Platform", U.S. Appl. No. 14/201,133.
US Patent Application filed Mar. 10, 2014, entitled "Communication Protocols in Integrated Systems", U.S. Appl. No. 14/202,573.
US Patent Application filed Mar. 10, 2014, entitled "Communication Protocols in Integrated Systems", U.S. Appl. No. 14/202,592.

(56) References Cited

OTHER PUBLICATIONS

US Patent Application filed Mar. 10, 2014, entitled "Communication Protocols in Integrated Systems", U.S. Appl. No. 14/202,627.
US Patent Application filed Mar. 10, 2014, entitled "Communication Protocols in Integrated Systems", U.S. Appl. No. 14/202,685.
US Patent Application filed Mar. 10, 2014, entitled "Communication Protocols in Integrated Systems", U.S. Appl. No. 14/203,077.
US Patent Application filed Mar. 10, 2014, entitled "Communication Protocols in Integrated Systems", U.S. Appl. No. 14/203,084.
US Patent Application filed Mar. 10, 2014, entitled "Communication Protocols in Integrated Systems", U.S. Appl. No. 14/203,128.
US Patent Application filed Mar. 10, 2014, entitled "Communication Protocols in Integrated Systems", U.S. Appl. No. 14/203,141.
US Patent Application filed Mar. 10, 2014, entitled "Communication Protocols in Integrated Systems", U.S. Appl. No. 14/203,219.
US Patent Application filed Mar. 10, 2014, entitled "Communication Protocols Over Internet Protocol (IP) Networks", U.S. Appl. No. 14/202,505.
US Patent Application filed Mar. 10, 2014, entitled "Communication Protocols Over Internet Protocol (IP) Networks", U.S. Appl. No. 14/202,579.
US Patent Application filed Mar. 18, 2019, entitled "Server-Based Notification of Alarm Event Subsequent to Communication Failure With Armed Security System", U.S. Appl. No. 16/356,742.
US Patent Application filed Apr. 23, 2019, entitled "Control System User Interface", U.S. Appl. No. 16/391,625.
US Patent Application filed Apr. 26, 2019, entitled "Custom Content for Premises Management", U.S. Appl. No. 16/396,368.
US patent application filed May 2, 2018, entitled "Automation System With Mobile Interface", U.S. Appl. No. 15/969,514.
US Patent Application filed May 23, 2018, entitled "Networked Touchscreen With Integrated Interfaces", U.S. Appl. No. 15/987,638.
US Patent Application filed Jun. 1, 2012, entitled "Gateway Registry Methods and Systems", U.S. Appl. No. 13/486,276.
US Patent Application filed Jun. 27, 2018, entitled "Activation of Gateway Device", U.S. Appl. No. 16/020,499.
US Patent Application filed Jul. 2, 2019, entitled "Communication Protocols in Integrated Systems", U.S. Appl. No. 16/460,712.
US Patent Application filed Jul. 3, 2018, entitled "WIFI-to-Serial Encapsulation in Systems", U.S. Appl. No. 16/026,703.
US Patent Application filed Jul. 12, 2018, entitled "Integrated Security System with Parallel Processing Architecture", U.S. Appl. No. 16/034,132.
US Patent Application filed Jul. 20, 2018, entitled "Cross-Client Sensor User Interface in an Integrated Security Network", U.S. Appl. No. 16/041,291.
US Patent Application filed Jul. 26, 2019, entitled "Device Integration Framework", U.S. Appl. No. 16/522,949.
US Patent Application filed Jul. 28, 2016, entitled "Method and System for Automatically Providing Alternate Network Access for Telecommunications", U.S. Appl. No. 15/222,416.
US Patent Application filed Aug. 8, 2016, entitled "Security, Monitoring and Automation Controller Access and Use of Legacy Security Control Panel Information", U.S. Appl. No. 15/231,273.
US Patent Application filed Aug. 9, 2016, entitled "Controller and Interface for Home Security, Monitoring and Automation Having Customizable Audio Alerts for SMA Events", U.S. Appl. No. 15/232,135.
US Patent Application filed Aug. 9, 2018, entitled "Method and System for Processing Security Event Data", U.S. Appl. No. 16/059,833.
US Patent Application filed Aug. 21, 2018, entitled "Premises System Management Using Status Signal", U.S. Appl. No. 16/107,568.
"Dragging" The Authoritative Dictionary of IEEE Standard Terms. 7th ed. 2000, p. 337.
"Application" The Authoritative Dictionary of IEEE Standard Terms. 7th ed. 2000.
"Modular programming", The Authoritative Dictionary of IEEE Standard Terms. 7th ed. 2000.
6270 Touch Screen Keypad Notes, Honeywell, Sep. 2006.
Alarm.com—Interactive Security Systems, Elders [retrieved on Nov. 4, 2003], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
AU application filed on Feb. 28, 2017, entitled "Control System User Interface", 2017201365.
AU application filed on Mar. 8, 2017, entitled "Integrated Security Network with Security Alarm Signaling System", 2017201585.
CA application filed on Aug. 15, 2017, entitled "Automation System User Interface", 2976682.
CA application filed on Aug. 16, 2017, entitled "Automation System User Interface", 2976802.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.
CorAccess Systems, Companion 6 User Guide, Jun. 17, 2002.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
Elwahab et al. ; Device, System and . . . Customer Premises Gateways, Sep. 27, 2001; WO 01/71489.
EP application filed on Jun. 9, 2016, entitled, "Data Model for Home Automation", 16808247.7.
EP application filed on Aug. 16, 2017, entitled, "Automation System User Interface", 17186497.8.
EP examination report issued in EP08797646.0, dated May 17, 2017, 11 pages.
Examination Report under Section 18(3) re for UK Patent Application No. GB0620362.4, dated Aug. 13, 2007.
Examination Report under Section 18(3) re for UK Patent Application No. GB0724248.0, dated Jun. 4, 2008.
Examination Report under Section 18(3) re for UK Patent Application No. GB0724248.0, dated Jan. 30, 2008.
Examination Report under Section 18(3) re for UK Patent Application No. GB0724760.4, dated Jan. 30, 2008.
Examination Report under Section 18(3) re for UK Patent Application No. GB0800040.8, dated Jan. 30, 2008.
Faultline, "AT&T Targets video home security as next broadband market"; Nov. 2, 2006; The Register; 2 Pages.
Final Office Action dated Aug. 1, 2011 for U.S. Appl. No. 12/630,092, filed Dec. 3, 2009.
Final Office Action dated Jun. 1, 2009 for U.S. Appl. No. 11/084,232, filed Mar. 16, 2005.
Final Office Action dated Jun. 5, 2012 for U.S. Appl. No. 12/771,071, filed Apr. 30, 2010.
Final Office Action dated May 9, 2013 for U.S. Appl. No. 12/189,780, filed Aug. 11, 2008.
Final Office Action dated May 9, 2013 for U.S. Appl. No. 12/952,080, filed Nov. 22, 2010.
Final Office Action dated Jan. 10, 2011 for U.S. Appl. No. 12/189,785, filed Aug. 11, 2008.
Final Office Action dated Jun. 10, 2011 for U.S. Appl. No. 11/084,232, filed Mar. 16, 2005.
Final Office Action dated Jan. 13, 2011 for U.S. Appl. No. 12/189,780, filed Aug. 11, 2008.
Final Office Action dated Oct. 17, 2012 for U.S. Appl. No. 12/637,671, filed Dec. 14, 2009.
Final Office Action dated Sep. 17, 2012 for U.S. Appl. No. 12/197,958, filed Aug. 25, 2008.
Final Office Action dated Mar. 21, 2013 for U.S. Appl. No. 12/691,992, filed Jan. 22, 2010.
Final Office Action dated Jul. 23, 2013 for U.S. Appl. No. 13/531,757, filed Jun. 25, 2012.

(56) References Cited

OTHER PUBLICATIONS

Final Office Action dated Feb. 26, 2013 for U.S. Appl. No. 12/771,471, filed Apr. 30, 2010.
Final Office Action dated Jun. 29, 2012 for U.S. Appl. No. 12/539,537, filed Aug. 11, 2009.
Final Office Action dated Dec. 31, 2012 for U.S. Appl. No. 12/770,365, filed Apr. 29, 2010.
Final Office Action dated Oct. 31, 2012 for U.S. Appl. No. 12/771,624, filed Apr. 30, 2010.
Final Office Action dated Feb. 16, 2011 for U.S. Appl. No. 12/019,568, filed Jan. 24, 2008.
Final Office Action dated Jul. 12, 2010 for U.S. Appl. No. 12/019,554, filed Jan. 24, 2008.
Final Office Action dated Sep. 14, 2011 for U.S. Appl. No. 12/197,931, filed Aug. 25, 2008.
Foreign communication from a related counterpart application—International Preliminary Examination Report, App No. PCT/US02/14450, dated Mar. 2, 2004, 4 pgs.
Foreign communication from a related counterpart application—International Search Report, App No. PCT/US02/14450, dated Dec. 17, 2002, 6 pgs.
Form PCT/ISA/210, "PCT International Search Report for the Application No. PCT/US05/08766 (ICON.P020)," dated May 23, 2006, 2 pages.
Form PCT/ISA/210, "PCT International Search Report for the Application No. PCT/US08/72831 (ICON.P001WO)," dated Nov. 4, 2008, 2 pages.
Form PCT/ISA/210, "PCT International Search Report for the Application No. PCT/US08/74246 (ICON.P003WO)," dated Nov. 14, 2008, 2 pages.
Form PCT/ISA/210, "PCT International Search Report for the Application No. PCT/US08/74260 (ICON.P002WO)," dated Nov. 13, 2008, 2 pages.
Form PCT/ISA/210, "PCT International Search Report for the Application No. PCT/US08/83254," dated Jan. 14, 2009, 2 pages.
Form PCT/ISA/210, "PCT International Search Report for the Application No. PCT/US09/53485 (ICON.P011WO)," dated Oct. 22, 2009, 2 pages.
Form PCT/ISA/210, "PCT International Search Report for the Application No. PCT/US09/55559 (ICON.P012WO)," dated Nov. 12, 2009, 2 pages.
Form PCT/ISA/210, "PCT International Search Report for the Application No. PCT/US10/50585 (ICON.P014WO)," dated Dec. 30, 2010, 2 pages.
Form PCT/ISA/210, "PCT International Search Report for the Application No. PCT/US10/57674 (ICON.P015WO)," dated Mar. 2, 2011, 2 pages.
Form PCT/ISA/210, "PCT International Search Report for the Application No. PCT/US11/34858 (ICON.P017WO)," dated Oct. 3, 2011, 2 pages.
Form PCT/ISA/210, "PCT International Search Report for the Application No. PCT/US11/35994 (ICON.P016WO)," dated Sep. 28, 2011, 2 pages.
Form PCT/ISA/210, "PCT International Search Report for the Application No. PCT/US11/53136 (ICON.P019WO)," dated Jan. 5, 2012, 2 pages.
Form PCT/ISA/220, "PCT Notification of Transmittal of the International Search Report and the Written Opinion fo the International Searching Authority, or the Declaration for the Application No. PCT/US08/74260," dated Nov. 13, 2008, 1 page.
Form PCT/ISA/220, "PCT Notification of Transmittal of the International Search Report and the Written Opinion of the International Searching Authority, or the Declaration for the Application No. PCT/US08/72831 (ICON.P001WO)," dated Nov. 4, 2008, 1 page.
Form PCT/ISA/220, "PCT Notification of Transmittal of the International Search Report and the Written Opinion of the International Searching Authority, or the Declaration for the Application No. PCT/US08/74246 (ICON.P003WO)" dated Nov. 14, 2008, 1 page.
Form PCT/ISA/220, "PCT Notification of Transmittal of the International Search Report and the Written Opinion of the International Searching Authority, or the Declaration for the Application No. PCT/US08/83254," dated Jan. 14, 2009, 1 page.
Form PCT/ISA/220, "PCT Notification of Transmittal of the International Search Report and the Written Opinion of the International Searching Authority, or the Declaration for the Application No. PCT/US09/53485 (ICON.P011 WO)," dated Oct. 22, 2009, 1 page.
Form PCT/ISA/220, "PCT Notification of Transmittal of the International Search Report and the Written Opinion of the International Searching Authority, or the Declaration for the Application No. PCT/US09/55559 (ICON.P012WO)," dated Nov. 12, 2009, 1 page.
Form PCT/ISA/220, "PCT Notification of Transmittal of the International Search Report and the Written Opinion of the International Searching Authority, or the Declaration for the Application No. PCT/US10/50585 (ICON.P014WO)," dated Dec. 30, 2010, 1 page.
Form PCT/ISA/220, "PCT Notification of Transmittal of the International Search Report and the Written Opinion of the International Searching Authority, or the Declaration for the Application No. PCT/US10/57674 (ICON.P015WO)," dated Mar. 2, 2011, 1 page.
Form PCT/ISA/220, "PCT Notification of Transmittal of the International Search Report and the Written Opinion of the International Searching Authority, or the Declaration for the Application No. PCT/US11/35994 (ICON.P016WO)," dated Sep. 28, 2011, 1 page.
Form PCT/ISA/220, PCT Notification of Transmittal of the International Search Report and the Written Opinion of the International Searching Authority, or the Declaration for the Application No. PCT/US05/08766, dated May 23, 2006, 1 page.
Form PCT/ISA/237, "PCT Written Opinion ofthe International Searching Authority for the Application No. PCT/US05/08766 (ICON.P020)," dated May 23, 2006, 5 pages.
Form PCT/ISA/237, "PCT Written Opinion of the International Searching Authority for the Application No. PCT/US08/72831 (ICON.P001WO)," dated Nov. 4, 2008, 6 pages.
Form PCT/ISA/237, "PCT Written Opinion of the International Searching Authority for the Application No. PCT/US08/74246 (ICON.P003WO)," dated Nov. 14, 2008, 6 pages.
Form PCT/ISA/237, "PCT Written Opinion of the International Searching Authority for the Application No. PCT/US08/74260 (ICON.P002WO)," dated Nov. 13, 2008, 6 pages.
Form PCT/ISA/237, "PCT Written Opinion of the International Searching Authority for the Application No. PCT/US09/53485 (ICON.P011 WO)," dated Oct. 22, 2009, 8 pages.
Form PCT/ISA/237, "PCT Written Opinion of the International Searching Authority for the Application No. PCT/US09/55559 (ICON.P012WO)," dated Nov. 12, 2009, 6 pages.
Form PCT/ISA/237, "PCT Written Opinion of the International Searching Authority for the Application No. PCT/US10/50585 (ICON.P014WO)," dated Dec. 30, 2010, 7 pages.
Form PCT/ISA/237, "PCT Written Opinion of the International Searching Authority for the Application No. PCT/US10/57674 (ICON.P015WO)," dated Mar. 2, 2011, 6 pages.
Form PCT/ISA/237, "PCT Written Opinion of the International Searching Authority for the Application No. PCT/US11/34858 (ICON.P017WO)," dated Oct. 3, 2011, 8 pages.
Form PCT/ISA/237, "PCT Written Opinion of the International Searching Authority for the Application No. PCT/US11/35994 (ICON.P016WO)," dated Sep. 28, 2011, 11 pages.
Form PCT/ISA/237, "PCT Written Opinion of the International Searching Authority for the Application No. PCT/US11/53136 (ICON.P019WO)," dated Jan. 5, 2012.
Form PCT/ISA/237, "PCT Written Opinion ofthe International Searching Authority of the Application No. PCT/US08/83254 (ICON.P005WO)," dated Jan. 14, 2009, 7 pages.
Gateway Registry Methods and Systems, U.S. Appl. No. 13/486,276.
Genex OmniEye http://www.qenextech.com/prod01.htm, 1999 5 pages.
Genex Technologies, Genex OmniEye, www.av-iq.com/avcat/images/documents/pdfs/omnieye%20nightwatchbrochure.pdf; webpage accessed Jan. 10, 2018.
Gong, Li, A Software architecture for open service gateways, Internet Computing, IEEE 5.1, Jan.-Feb. 2001, 64-70.
GrayElectronics, "Digitizing TV cameras on TCP/IP Computer Networks," http://www.grayelectronics.com/default.htm, printed on Oct. 12, 1999 (2 pages).

(56) References Cited

OTHER PUBLICATIONS

GrayElectronics, http://www.grayelectronics.com; webpage accessed on Jan. 10, 2018.
GTI Genex Technologies, Inc. OmniEye.(Trademark). Product Brochure, Sep. 14, 1999 (5 pages).
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012, corresponds to W02011/143273 filed Nov. 17, 2011.
Indian Patent App. No. 3687/DELNP/2012, corresponds to WO2011/038409 filed on Sep. 28, 2010.
International Search Report for Application No. PCT/US13/48324, dated Jan. 14, 2014, 2 pages.
International Search Report for Application No. PCT/US2014/050548, dated Mar. 18, 2015, 4 pages.
J. David Eisenberg, SVG Essentials: Producing Scalable Vector Graphics with XML. O'Reilly & Associates, Inc., Sebastopol, CA 2002.
Lagotek Wireless Home Automation System, May 2006 [retrieved on Aug. 22, 2012].
Network Working Group, Request for Comments H.Schulzrinne Apr. 1998.
US Patent Application filed Jan. 23, 2020, entitled "Forming a Security Network Including Integrated Security System Components and Network Dev", U.S. Appl. No. 16/750,976.
US Patent Application filed Feb. 6, 2020, entitled "Activation of Gateway Device", U.S. Appl. No. 16/784,159.
US Patent Application filed Mar. 2, 2020, entitled "Communication Protocols in Integrated Systems", U.S. Appl. No. 16/807,100.
US Patent Application filed Mar. 2, 2020, entitled "Coordinated Control of Connected Devices in a Premise", U.S. Appl. No. 16/807,028.
US Patent Application filed Mar. 11, 2020, entitled "Management of a Security System at a Premises", U.S. Appl. No. 16/816,134.
US Patent Application filed Mar. 20, 2020, entitled "Security, Monitoring and Automation Controller Access and Use of Legacy Security Control Panel Information", U.S. Appl. No. 16/825,099.
US Patent Application filed Oct. 18, 2019, entitled "WIFI-to-Serial Encapsulation in Systems", U.S. Appl. No. 16/656,874.
US Patent Application filed Nov. 19, 2019, entitled "Integrated Cloud System With Lightweight Gateway for Premises Automation", U.S. Appl. No. 16/688,717.
US Patent Application filed Nov. 26, 2019, entitled "Communication Protocols Over Internet Protocol (IP) Networks", U.S. Appl. No. 16/696,657.
US Patent Application filed Dec. 27, 2019, entitled "Premises Management Systems", U.S. Appl. No. 16/728,608.
Non-Final Office Action dated Apr. 4, 2013 for U.S. Appl. No. 12/197,931, filed Aug. 25, 2008.
Non-Final Office Action dated Mar. 4, 2013 for U.S. Appl. No. 13/400,477, filed Feb. 20, 2012.
Non-Final Office Action dated May 5, 2010 for U.S. Appl. No. 12/189,780, filed Aug. 11, 2008.
Non-Final Office Action dated May 5, 2010 for U.S. Appl. No. 12/189,785, filed Aug. 11, 2008.
Non-Final Office Action dated Feb. 7, 2012 for U.S. Appl. No. 12/637,671, filed Dec. 14, 2009.
Non-Final Office Action dated Feb. 7, 2013 for U.S. Appl. No. 12/970,313, filed Dec. 16, 2010.
Non-Final Office Action dated Feb. 8, 2012 for U.S. Appl. No. 12/630,092, filed Dec. 3, 2009.
Non-Final Office Action dated Apr. 9, 2012 for U.S. Appl. No. 12/771,624, filed Apr. 30, 2010.
Non-Final Office Action dated Dec. 9, 2008 for U.S. Appl. No. 11/084,232, filed Mar. 16, 2005.
Non-Final Office Action dated Aug. 10, 2012 for U.S. Appl. No. 12/771,471, filed Apr. 30, 2010.
Non-Final Office Action dated Oct. 11, 2012 for U.S. Appl. No. 12/019,568, filed Jan. 24, 2008.
Non-Final Office Action dated Apr. 12, 2012 for U.S. Appl. No. 12/770,365, filed Apr. 29, 2010.
Non-Final Office Action dated Jul. 12, 2012 for U.S. Appl. No. 12/691,992, filed Jan. 22, 2010.
Non-Final Office Action dated Oct. 12, 2012 for U.S. Appl. No. 12/630,092, filed Dec. 3, 2009.
Non-Final Office Action dated Sep. 12, 2012 for U.S. Appl. No. 12/952,080, filed Nov. 22, 2010.
Non-Final Office Action dated Jul. 13, 2010 for U.S. Appl. No. 12/019,568, filed Jan. 24, 2008.
Non-Final Office Action dated Nov. 14, 2012 for U.S. Appl. No. 13/531,757, filed Jun. 25, 2012.
Non-Final Office Action dated Sep. 14, 2010 for U.S. Appl. No. 11/084,232, filed Mar. 16, 2005.
Non-Final Office Action dated Sep. 16, 2011 for U.S. Appl. No. 12/539,537, filed Aug. 11, 2009.
Non-Final Office Action dated Sep. 17, 2012 for U.S. Appl. No. 12/189,780, filed Aug. 11, 2008.
Non-Final Office Action dated Aug. 18, 2011 for U.S. Appl. No. 12/197,958, filed Aug. 25, 2008.
Non-Final Office Action dated Feb. 18, 2011 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Jul. 21, 2010 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 22, 2013 for U.S. Appl. No. 12/630,092, filed Dec. 3, 2009.
Non-Final Office Action dated Jan. 26, 2012 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jun. 27, 2013 for U.S. Appl. No. 12/019,568, filed Jan. 24, 2008.
Non-Final Office Action dated Dec. 30, 2009 for U.S. Appl. No. 11/084,232, filed Mar. 16, 2005.
Non-Final Office Action dated May 30, 2008 for U.S. Appl. No. 11/084,232, filed Mar. 16, 2005.
Non-Final Office Action dated Apr. 13, 2010 for U.S. Appl. No. 11/761,745, filed Jun. 12, 2007.
Non-Final Office Action dated Feb. 21, 2013 for U.S. Appl. No. 12/771,372, filed Apr. 30, 2010.
Non-Final Office Action dated Jan. 5, 2010 for U.S. Appl. No. 12/019,554, filed Jan. 24, 2008.
Non-Final Office Action dated May 23, 2013 for U.S. Appl. No. 13/104,932, filed May 10, 2011.
Non-Final Office Action dated May 23, 2013 for U.S. Appl. No. 13/104,936, filed May 10, 2011.
Notice of Allowance dated May 14, 2013 for U.S. Appl. No. 12/637,671, filed Dec. 14, 2009.
Notice of Allowance dated Oct. 25, 2012 for U.S. Appl. No. 11/084,232, filed Mar. 16, 2005.
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
PCT Application filed on Jun. 30, 2016, entitled "Integrated Cloud System with Lightweight Gateway for Premises Automation", PCT/US2016/040451.
PCT Application filed on Jul. 7, 2016, entitled "Automation System User Interface with Three-Dimensional Display", PCT/US2016/041353.
PCT Application filed on Aug. 16, 2016, entitled "Automation System User Interface", PCT/US2016/047172.
PCT Application filed on Aug. 17, 2016, entitled "Automation System User Interface", PCT/US2016/047262.
PCT Application filed on Oct. 13, 2016, entitled "Coordinated Control of Connected Devices in a Premise", PCT/US2016/056842.

(56) References Cited

OTHER PUBLICATIONS

PCT Application filed on Nov. 17, 2016, entitled "Mobile Premises Automation Platform", PCT/US2016/062519.
Requirement for Restriction/Election dated Jan. 22, 2013 for U.S. Appl. No. 13/104,932, filed May 10, 2011.
Requirement for Restriction/Election dated Jan. 22, 2013 for U.S. Appl. No. 13/104,936, filed May 10, 2011.
Requirement for Restriction/Election dated Oct. 24, 2012 for U.S. Appl. No. 12/750,470, filed Mar. 30, 2010.
"File", The Authoritative Dictionary of IEEE Standard Terms. 7th ed. 2000, pp. 453.
"Icon", Newton's Telecom Dictionary, 21st ed., Mar. 2005.
US Patent Application filed Apr. 17, 2020, entitled "Method and System for Providing Alternate Network Access", U.S. Appl. No. 16/852,072.
US Patent Application filed Apr. 17, 2020, entitled "Networked Touchscreen With Integrated Interfaces", U.S. Appl. No. 16/852,058.
US Patent Application filed May 11, 2020, entitled "Control System User Interface", U.S. Appl. No. 16/871,151.
US Patent Application filed May 12, 2020, entitled "IP Device Discovery Systems and Methods", U.S. Appl. No. 15/930,029.
US Patent Application filed May 19, 2020, entitled "User Interface in a Premises Network", U.S. Appl. No. 16/878,099.
US Patent Application filed May 26, 2020, entitled "Premises Management Configuration and Control", U.S. Appl. No. 16/882,876.
US Patent Application filed Jun. 10, 2020, entitled "Method and System for Communicating With and Controlling an Alarm System From a Remote Server", U.S. Appl. No. 16/898,146.
US Patent Application filed Jun. 24, 2020, entitled "Method and System for Processing Security Event Data", U.S. Appl. No. 16/910,967.
US Patent Application filed Jul. 9, 2020, entitled "Automation System With Mobile Interface", U.S. Appl. No. 16/925,026.
US Patent Application filed Aug. 26, 2020, entitled "Automation System User Interface With Three-Dimensional Display", U.S. Appl. No. 17/003,550.
US Patent Application filed Sep. 10, 2020, entitled "Security System With Networked Touchscreen", U.S. Appl. No. 17/017,519.
US Patent Application filed Sep. 11, 2020, entitled "Management of Applications for a Device Located at a Premises", U.S. Appl. No. 17/018,901.
US Patent Application filed Oct. 8, 2020, entitled "Communication Protocols in Integrated Systems", U.S. Appl. No. 17/065,841.
US Patent Application filed Oct. 12, 2020, entitled "Integrated Security System With Parallel Processing Architecture", U.S. Appl. No. 17/068,584.
US Patent Application filed Nov. 10, 2020, entitled "Integrated Cloud System for Premises Automation", U.S. Appl. No. 17/094,120.
Wang et al, "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
Oxford Dictionary, Definition of "application", 2021, 2 pages (Year: 2021).
US Patent Application filed Mar. 15, 2021, entitled "Automation System User Interface", U.S. Appl. No. 17/202,279.
US Patent Application filed Mar. 17, 2021, entitled "Communication Protocols Over Internet Protocol (IP) Networks", U.S. Appl. No. 17/204,068.
US Patent Application filed Mar. 22, 2021, entitled "Premises Management Configuration and Control", U.S. Appl. No. 17/208,866.
US Patent Application filed Feb. 9, 2021, entitled "Premises Management Networking", U.S. Appl. No. 17/171,398.
US Patent Application filed Jan. 11, 2021, entitled "Premise Management Systems and Methods", U.S. Appl. No. 17/145,773.
US Patent Application filed Nov. 25, 2020, entitled "Premises Management Networking", U.S. Appl. No. 17/105,235.
US Patent Application filed Dec. 9, 2020, entitled "Integrated Security System With Parallel Processing Architecture", U.S. Appl. No. 17/115,936.
US Patent Application filed Apr. 8, 2021, entitled "System for Data Routing in Networks", U.S. Appl. No. 17/301,605.
U.S. Patent Application filed on Jun. 18, 2021, entitled "Controlling Data Routing Among Networks", U.S. Appl. No. 17/304,342.
U.S. Patent Application filed on Jul. 26, 2021, entitled "Notification of Event Subsequent To Communication Failure With Security System", U.S. Appl. No. 17/443,427.
U.S. Patent Application filed on Jul. 30, 2021, entitled "Gateway Integrated With Premises Security System", U.S. Appl. No. 17/390,222.

* cited by examiner

| Security State 4030 | | Sensor Status 4032 |
|---|---|---|
| Armed Doors & Windows. | | Uncleared Alarm. |
| Armed All. | | Sensor Tripped. |
| Armed Stay. | | Sensor Problem. |
| Armed Away. | | Sensor(s) Bypassed. |
| Disarmed. | | Motion. |
| Armed Maximum. | | All Quiet. |
| Armed Night Stay. | | |
| Armed Stay Instant. | | [# of sensors open] Sensor(s) Open. |
| Armed Away Instant. | | "1 Sensor Open." |
| Armed Motion. | | OR |
| Subdisarmed. | | "[# of sensors open] Sensors Open." |

FIG. 6

| System State | Icon | Warning Text |
| --- | --- | --- |
| *Primary connection is broadband.* *Broadband is down. Cellular being used.* |  | Using cellular connection |
| *Primary connection is broadband.* *Broadband and cellular are down.* |  | No cellular connection |
| *Primary connection is broadband.* *Broadband is down. No cellular backup installed.* |  | Broadband connection unknown |
| *Primary connection is cellular. Cellular is down.* |  | No cellular connection |
| *Security panel not connected to AC power* |  | Security panel AC power loss |
| *Security panel low battery* |  | Security panel low battery |
| *Security panel tampered* |  | Security panel tampered |
| *Sensor(s) bypassed* | No Icon | Sensor(s) bypassed |

FIG. 7

| Sensor State / Sort Order | Icon | Sensor name | Status Text |
|---|---|---|---|
| *1. Breached & any sensor state* | | [Sensor name] (Zone #) | ALARM, [Sensor state] |
| *2. Tripped (Smoke, Water, Gas, Freeze, etc.)* | | [Sensor name] (Zone #) | Tripped |
| *3. Tampered* | | [Sensor name] (Zone #) | Tampered, [Sensor state] |
| *4. Low Battery* | | [Sensor name] (Zone #) | Low Battery, [Sensor state] |
| *5. Offline / AWOL* | | [Sensor name] (Zone #) | Offline |
| *6. Unknown** | | [Sensor name] (Zone #) | Unknown |
| *7. Installing* | | [Sensor name] (Zone #) | Installing |
| *8. Open* | | [Sensor name] | [Sensor state] |
| *9. Motion* | | [Sensor name] | [Sensor state] |
| *10. Bypassed* | | [Sensor name] | Bypassed, [Sensor state] |
| **Quiet Sensors:** | | | |
| *Okay, Closed, No Motion* | | [Sensor name] | [Sensor state] |

FIG. 8

 (red diamond bang) = tamper, offline, bypassed, installing, battery
 (yellow triangle) = open or triggered
 (wavy lines) = motion
FIG. 9
| | Icon Description | Sensor State |
|---|---|---|
|  | Green circle | Closed, No Motion, Okay |
FIG. 10

| Sensor State | Icon |
|---|---|
| *Alarmed, tripped, or tampered sensors* | |
| *Low Battery* | |
| *Offline / AWOL* | |
| *Unknown* | |
| *Installing* | |
| *Open door / window sensor* | |
| *Motion sensor active* | |
| Quiet Sensors: | |
| *Okay, Closed, No Motion* | |

| System State | Home View | System Icon |
|---|---|---|
| Disarmed or Subdisarmed 4202 | 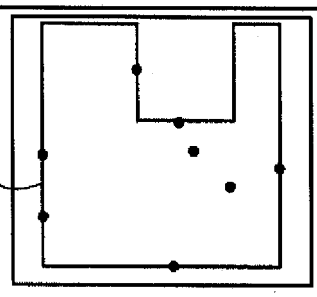 | 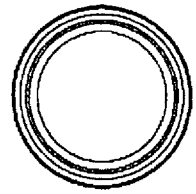 |
| Armed (any type) 4204 | 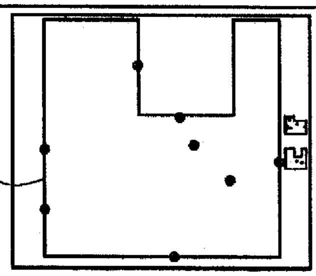 | 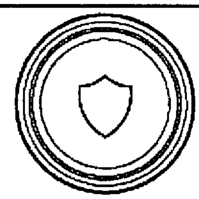 |
| Alarm 4206 | 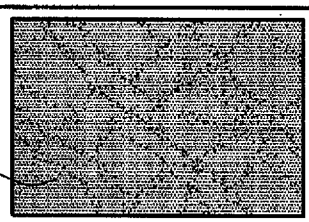 TBD: Red with black diagonal stripes | 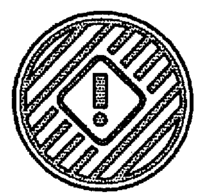 |
| Offline (iHub or panel) 4208 | 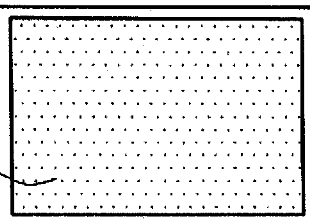 TBD: gray bgnd, all sensors are unknown icon | 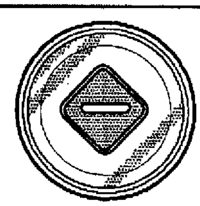 |
FIG. 27

| | | | | | | | | | | | | | | | | | | |
|---|---|---|---|---|---|---|---|---|---|---|---|---|---|---|---|---|---|---|
| t | h | h | h | h | h | h | r | E | E | E | E | E | E | t | h | h | h | r |
| v | e | e | e | e | e | e | V | E | E | E | E | E | E | v | e | e | e | V |
| v | e | e | e | e | e | e | V | E | E | E | E | E | E | v | e | e | e | V |
| v | e | e | e | e | e | e | V | E | E | E | E | E | E | v | e | e | e | V |
| v | e | e | e | e | e | e | V | E | E | E | E | E | E | v | e | e | e | V |
| v | e | e | e | e | e | e | V | E | E | E | E | E | E | v | e | e | e | V |
| v | e | e | e | e | e | e | V | E | E | E | E | E | E | v | e | e | e | V |
| v | e | e | e | e | e | e | V | E | E | E | E | E | E | v | e | e | e | V |
| v | e | e | e | e | e | e | L | h | h | h | h | h | h | B | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| v | e | e | e | e | e | e | e | e | e | e | e | e | e | e | e | e | e | V |
| l | H | H | H | H | H | H | H | H | H | H | H | H | H | H | H | H | H | b |

FIG. 41

| tile number (from 0) | device type | device identifier |
|---|---|---|
| 0 | zone | 3 |
| 238 | zone | 1 |
| 341 | camera | Courtyard Cam |
| 552 | thermo | Upstairs Thermostat |

```
homeViewLayouts="
thhhhhhrEEEEEEthhhr
veeeeeeVEEEEEEveeeV
veeeeeeVEEEEEEveeeV
veeeeeeVEEEEEEveeeV
veeeeeeVEEEEEEveeeV
veeeeeeVEEEEEEveeeV
veeeeeeVEEEEEEveeeV
veeeeeeVEEEEEEveeeV
veeeeeeLhhhhhhBeeeV
veeeeeeeeeeeeeeeeeV
veeeeeeeeeeeeeeeeeV
veeeeeeeeeeeeeeeeeV
veeeeeeeeeeeeeeeeeV
veeeeeeeeeeeeeeeeeV
veeeeeeeeeeeeeeeeeV
veeeeeeeeeeeeeeeeeV
veeeeeeeeeeeeeeeeeV
veeeeeeeeeeeeeeeeeV
1HHHHHHHHHHHHHHHHHb"
```

| Tile Shape | Simple / filled |
|---|---|
| empty | e |
| horizontal wall | h |
| vertical wall | v |
| top left corner | t |
| top right corner | r |
| bottom left corner | l |
| bottom right corner | b |
| T-shape down | p |
| T-shape right | f |
| T-shape up | n |
| T-shape left | j |
| 4 corner shape | x |

FIG. 44

| Tile Shape | Simple / filled | Fill bottom / right | Fill top / left | Empty exterior |
|---|---|---|---|---|
| empty | e | | | E |
| horizontal wall | h | i | I | H |
| vertical wall | v | w | W | V |
| top left corner | t | u | U | T |
| top right corner | r | s | S | R |
| bottom left corner | l | m | M | L |
| bottom right corner | b | c | C | B |

| Tile Shape | Fill all | Fill 1 | Fill 2 | Fill 3 | Fill 4 | Fill 5 | Fill 6 | Ext |
|---|---|---|---|---|---|---|---|---|
| T-shape down | p | P | q | Q | = | 0 | 1 | a |
| T-shape right | f | F | g | G | 2 | 3 | 4 | A |
| T-shape up | n | N | o | O | 5 | 6 | 7 | d |
| T-shape left | j | J | k | K | 8 | 9 | $ | D |

| Tile Shape | Fill all | Fill 1 | Fill 2 | Fill 3 | Fill 4 | Exterior |
|---|---|---|---|---|---|---|
| 4 corner shape | x<br>+<br>[ | X<br>^<br>] | y<br>_ (underscore)<br>{ | Y<br>- (dash)<br>} | z<br>, (comma) | Z<br>' (single quote) |

FIG. 45

Let's take a simple room for example:
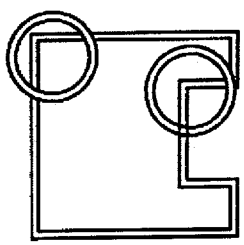
In this example, there are two perimeter versions of the top-right corner tile "t". One filled on the bottom right (tile "u"): 
and one filled on the top left (tile "U"): 
FIG. 46

CONTROL SYSTEM USER INTERFACE

CROSS REFERENCE TO RELATED APPLICATIONS

This application is a continuation of U.S. patent application Ser. No. 13/929,568, filed on Jun. 27, 2018, which is hereby incorporated by reference in its entirety.

This application claims the benefit of U.S. Patent Application No. 61/665,078, filed Jun. 27, 2012.

This application is a continuation in part application of U.S. patent application Ser. No. 13/104,932, filed May 10, 2011.

This application is a continuation in part application of U.S. patent application Ser. No. 13/104,936, filed May 10, 2011, now U.S. Pat. No. 10,380,871.

This application is a continuation in part application of U.S. patent application Ser. No. 13/718,851, filed Dec. 18, 2012, now U.S. Pat. No. 10,156,831.

This application is a continuation of U.S. patent application Ser. No. 12/189,757, filed Aug. 11, 2008, now U.S. Pat. No. 8,473,619.

This application is a continuation in part application of U.S. patent application Ser. No. 12/637,671, filed Dec. 14, 2009, now U.S. Pat. No. 8,478,871.

This application is a continuation in part application of U.S. patent application Ser. No. 11/761,745, filed Jun. 12, 2007, now U.S. Pat. No. 8,635,350.

This application is a continuation in part application of U.S. patent application Ser. No. 12/019,568, filed Jan. 24, 2008, now U.S. Pat. No. 10,142,392.

This application is a continuation in part application of U.S. patent application Ser. Ser. No. 13/531,757, filed Jun. 25, 2012, now abandoned.

This application is a continuation in part application of U.S. patent application Ser. No. 13/311,365, filed Dec. 5, 2011, now U.S. Pat. No. 9,141,276.

This application is a continuation in part application of U.S. patent application Ser. No. 13/335,279, filed Dec. 22, 2011.

This application is a continuation in part application of U.S. patent application Ser. No. 12/539,537, filed Aug. 11, 2009, now U.S. Pat. No. 10,156,959.

This application is a continuation in part application of U.S. patent application Ser. No. 12/750,470, filed Mar. 30, 2010, now U.S. Pat. No. 9,191,228.

TECHNICAL FIELD

The embodiments described herein relate generally to a method and apparatus for improving the capabilities of security systems in premise applications.

BACKGROUND

The field of home and small business security is dominated by technology suppliers who build comprehensive 'closed' security systems, where the individual components (sensors, security panels, keypads) operate solely within the confines of a single vendor solution. For example, a wireless motion sensor from vendor A cannot be used with a security panel from vendor B. Each vendor typically has developed sophisticated proprietary wireless technologies to enable the installation and management of wireless sensors, with little or no ability for the wireless devices to operate separate from the vendor's homogeneous system. Furthermore, these traditional systems are extremely limited in their ability to interface either to a local or wide area standards-based network (such as an IP network); most installed systems support only a low-bandwidth, intermittent connection utilizing phone lines or cellular (RF) backup systems. Wireless security technology from providers such as GE Security, Honeywell, and DSC/Tyco are well known in the art, and are examples of this proprietary approach to security systems for home and business.

Furthermore, with the proliferation of the internet, ethernet and WiFi local area networks (LANs) and advanced wide area networks (WANs) that offer high bandwidth, low latency connections (broadband), as well as more advanced wireless WAN data networks (e.g. GPRS or CDMA 1×RTT) there increasingly exists the networking capability to extend these traditional security systems to offer enhanced functionality. In addition, the proliferation of broadband access has driven a corresponding increase in home and small business networking technologies and devices. It is desirable to extend traditional security systems to encompass enhanced functionality such as the ability to control and manage security systems from the world wide web, cellular telephones, or advanced function internet-based devices. Other desired functionality includes an open systems approach to interface home security systems to home and small business networks.

Due to the proprietary approach described above, the traditional vendors are the only ones capable of taking advantage of these new network functions. To date, even though the vast majority of home and business customers have broadband network access in their premises, most security systems do not offer the advanced capabilities associated with high speed, low-latency LANs and WANs. This is primarily because the proprietary vendors have not been able to deliver such technology efficiently or effectively. Solution providers attempting to address this need are becoming known in the art, including three categories of vendors: traditional proprietary hardware providers such as Honeywell and GE Security; third party hard-wired module providers such as Alarm.com, NextAlarm, and uControl; and new proprietary systems providers such as InGrid.

A disadvantage of the prior art technologies of the traditional proprietary hardware providers arises due to the continued proprietary approach of these vendors. As they develop technology in this area it once again operates only with the hardware from that specific vendor, ignoring the need for a heterogeneous, cross-vendor solution. Yet another disadvantage of the prior art technologies of the traditional proprietary hardware providers arises due to the lack of experience and capability of these companies in creating open internet and web based solutions, and consumer friendly interfaces.

A disadvantage of the prior art technologies of the third party hard-wired module providers arises due to the installation and operational complexities and functional limitations associated with hardwiring a new component into existing security systems. Moreover, a disadvantage of the prior art technologies of the new proprietary systems providers arises due to the need to discard all prior technologies, and implement an entirely new form of security system to access the new functionalities associated with broadband and wireless data networks. There remains, therefore, a need for systems, devices, and methods that easily interface to and control the existing proprietary security technologies utilizing a variety of wireless technologies.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 6 is a table of security state and the corresponding sensor status displayed on the SUI, under an embodiment.

FIG. 7 is a table of system state and the corresponding warning text displayed as system warnings on the SUI, under an embodiment.

FIG. 8 is a table of sensor state/sort order and the corresponding sensor name and status text of the SUI, under an embodiment.

FIG. 9 shows icons of the interesting sensors, under an embodiment.

FIG. 10 shows the quiet sensor icon, under an embodiment.

FIG. 27 shows the system states along with the corresponding Home View display and system or orb icon, under an embodiment.

FIG. 41 is an example of the floor grid data, under an embodiment.

FIG. 42 is an example sensor hash table for a single-floor site, under an embodiment.

FIG. 43 shows an example hash table mapping, under an embodiment.

FIG. 44 shows the twelve shapes of a tile set, under an embodiment.

FIG. 45 shows the tile shapes and corresponding fill options for rendered tiles, under an embodiment.

FIG. 46 is an example tile rendering for a room of a premise, under an embodiment.

Home View is configured via site settings as described in detail herein. Each application retains or remembers the user's preferred mode across sessions.

Figure 50:
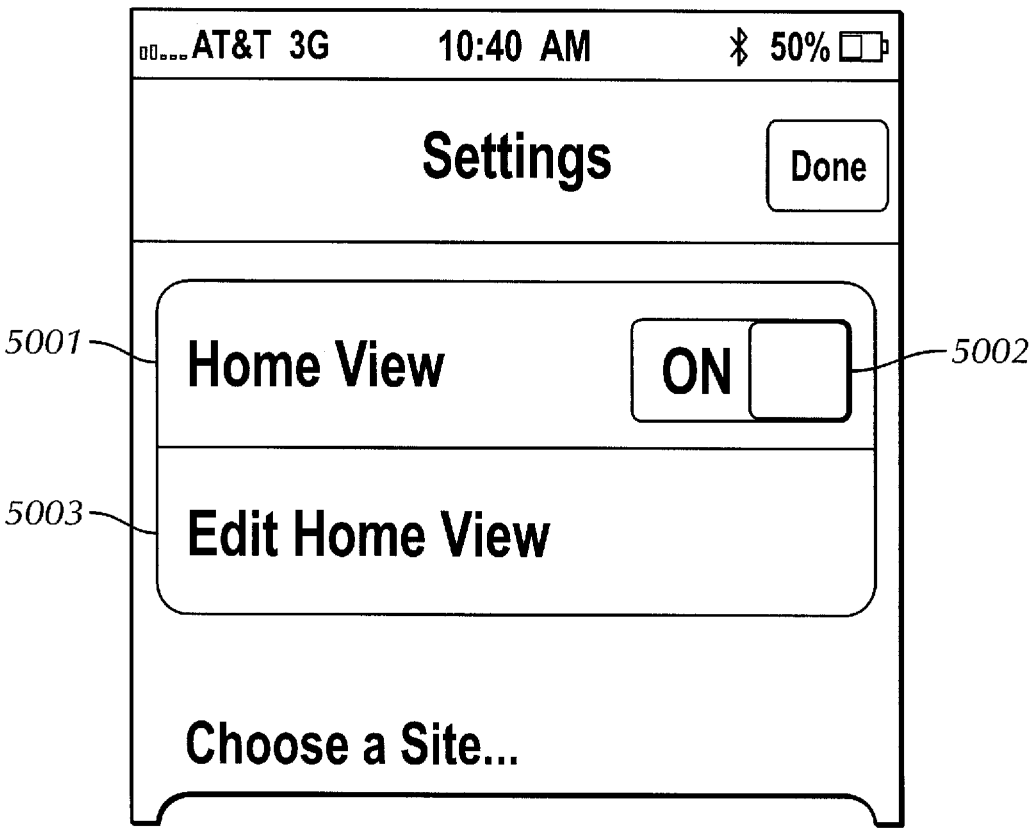

FIG. 50 shows an example of a Settings page of Home View, under an embodiment.

Figure 51:
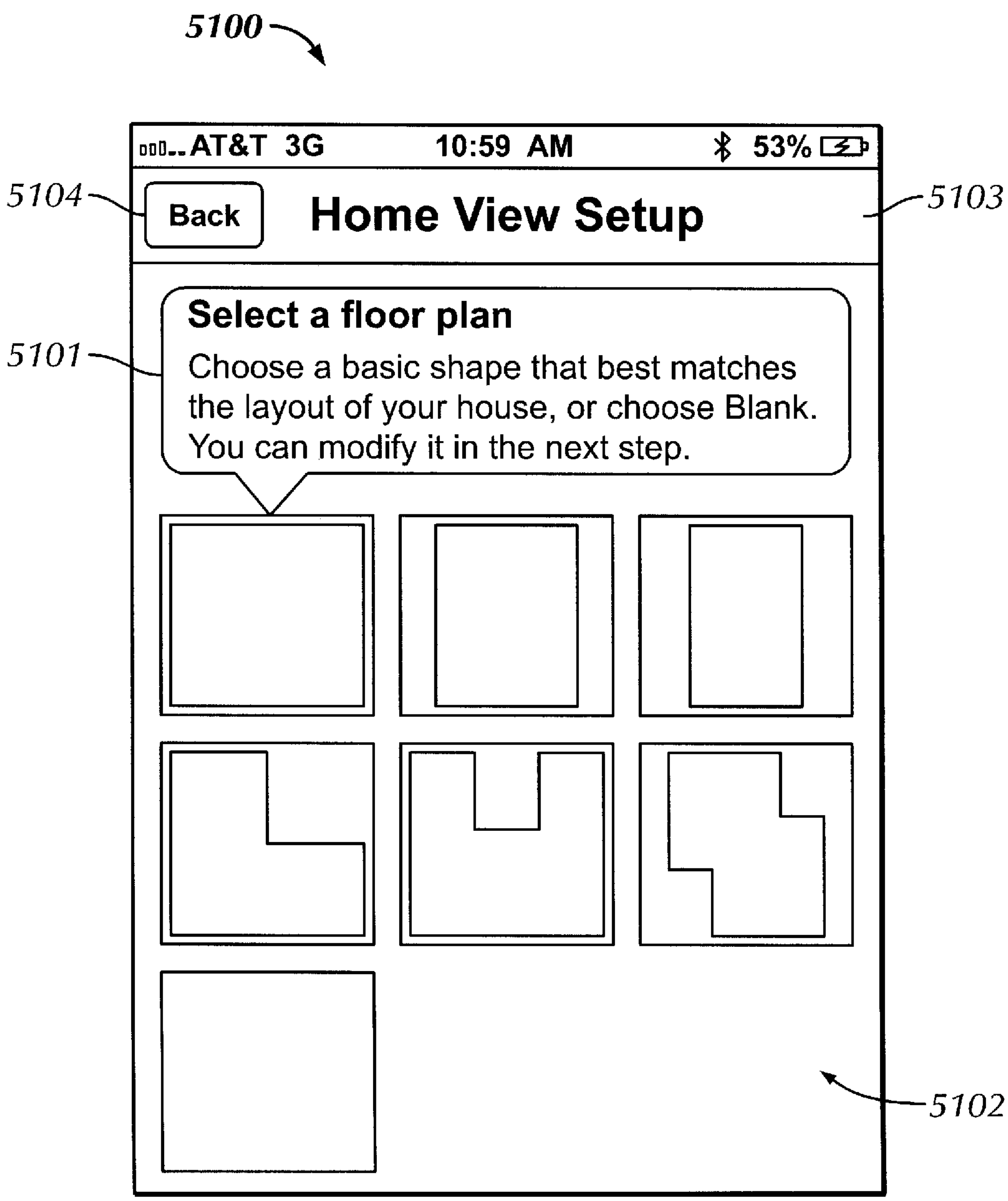

FIG. 51 shows an example "Home View Setup" editor page 5100 for use in selecting a floor plan, under an embodiment.

Figure 52:
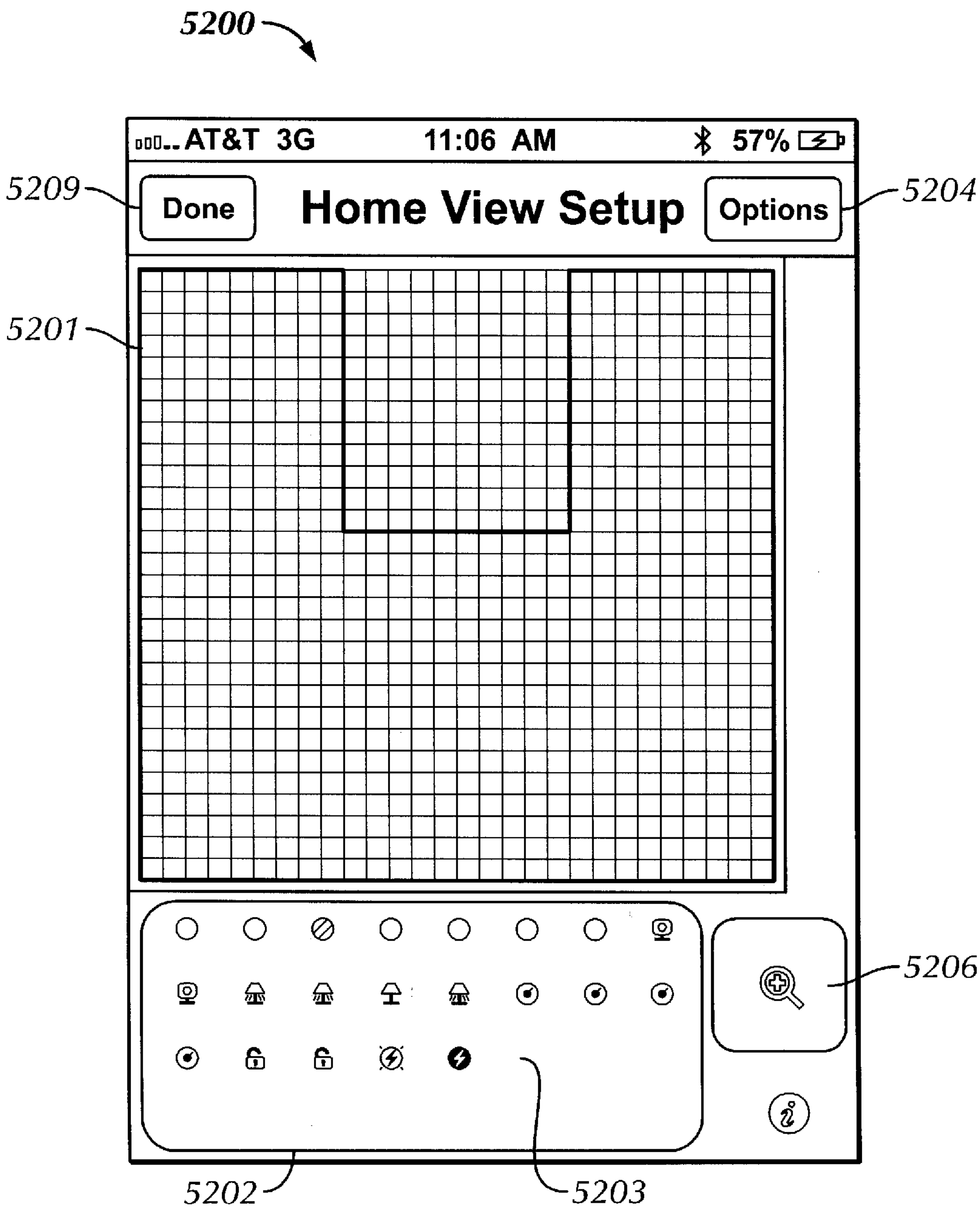

FIG. 52 shows a "Home View Setup" editor screen 5200 with a selected floor plan 5201, under an embodiment.

Figure 53:
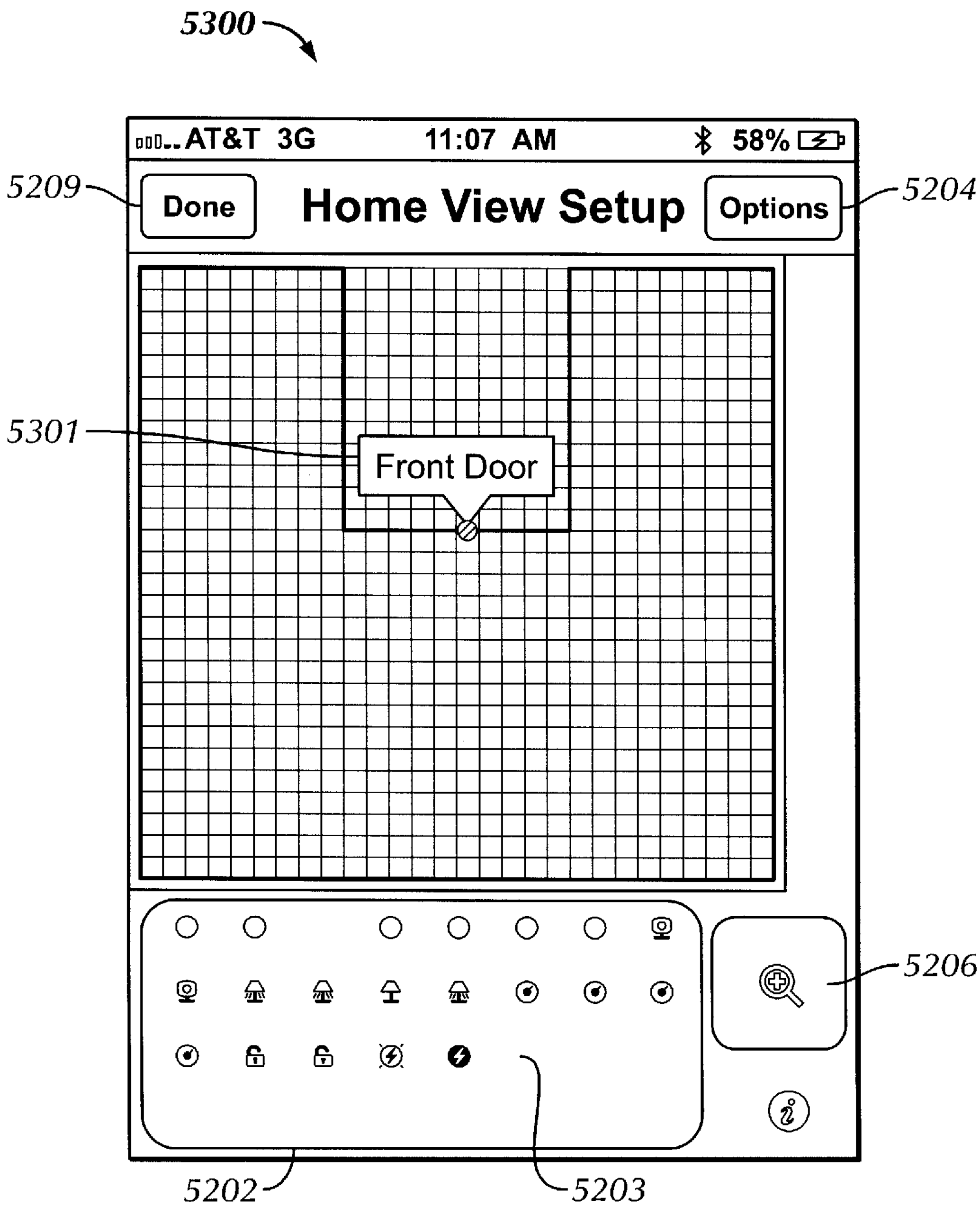

FIG. 53 shows an example editor screen 5300 for which a label 5301 with a name of the device ("Front Door") is displayed, under an embodiment.

Figure 54:
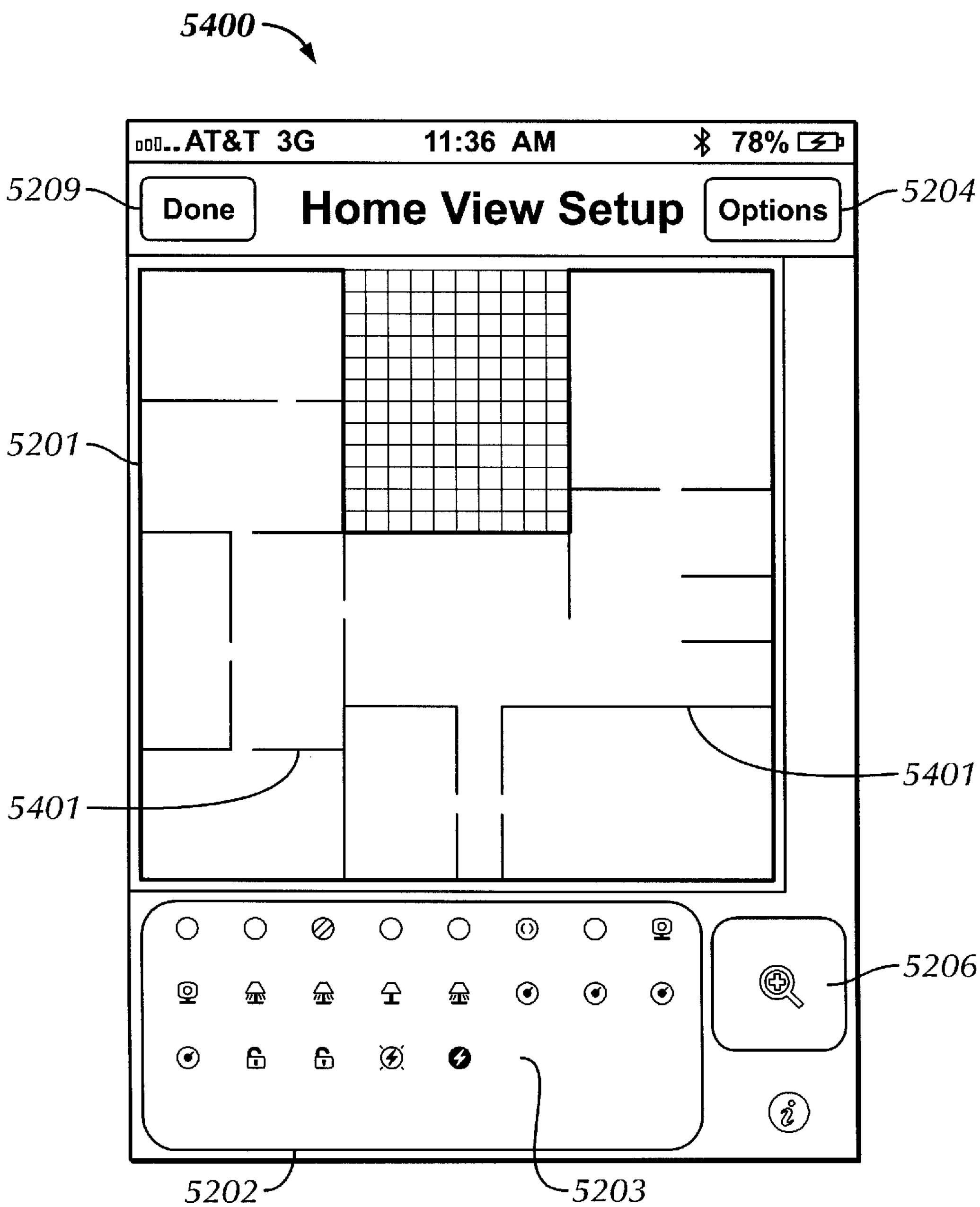

FIG. 54 shows a Home View Setup page 5400 with a selected floor plan 5201 that has been edited to add numerous interior walls 5401, under an embodiment.

Figure 55:
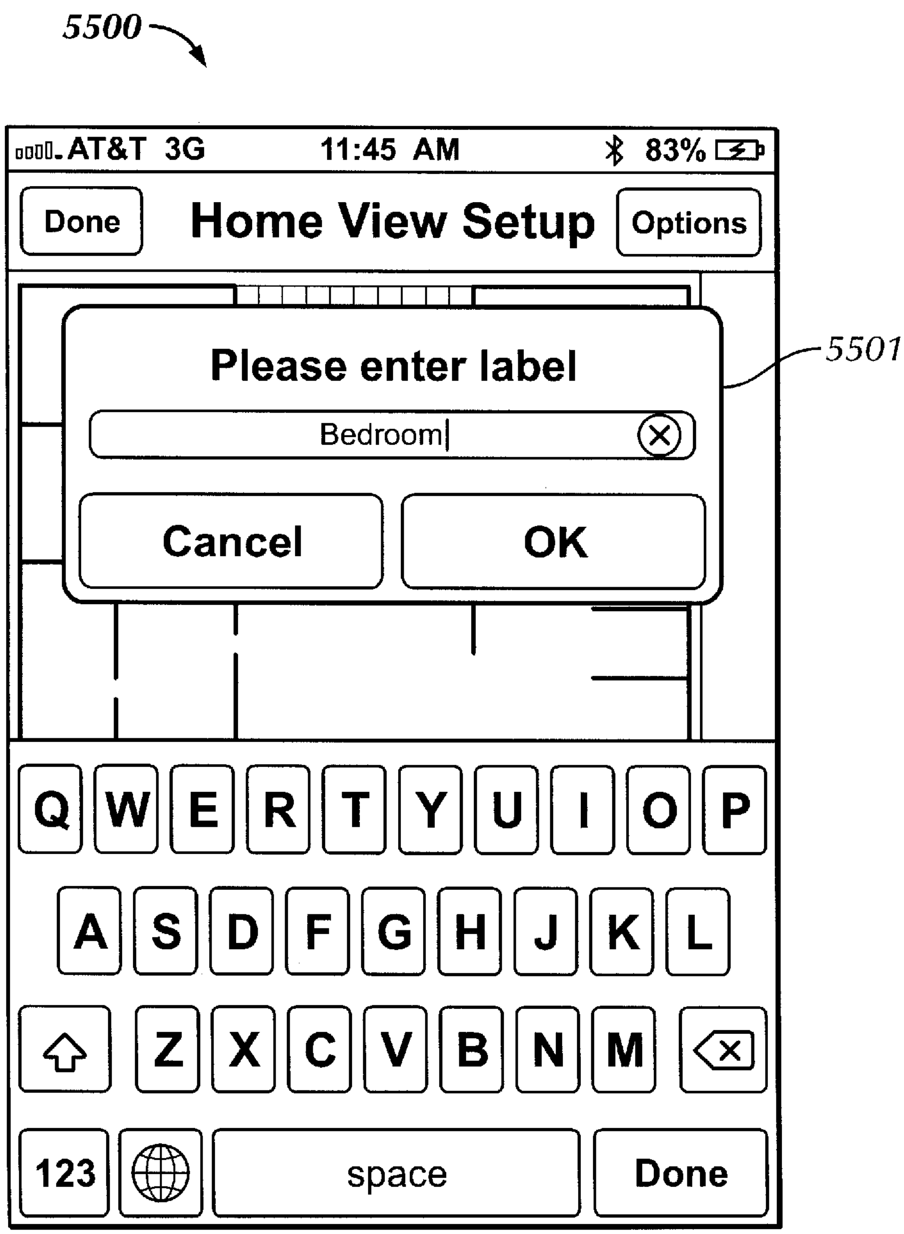

FIG. 55 shows a Home View Setup page with a label editing prompt 5501, under an embodiment.

Figure 56:
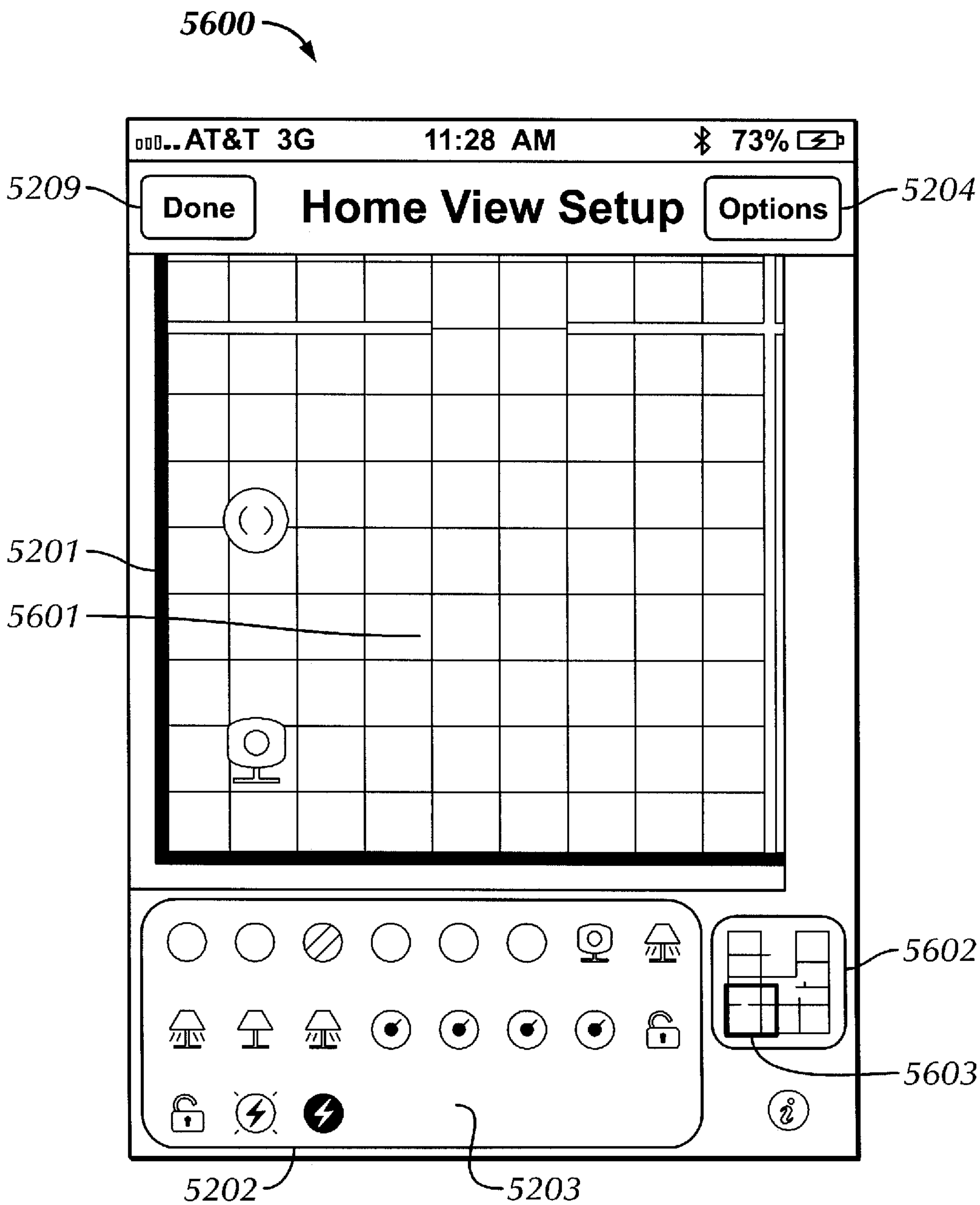

FIG. 56 shows a Home View Setup page 5600 in a zoomed editing mode to zoom on one room 5601 in a building, under an embodiment.

Figure 57:
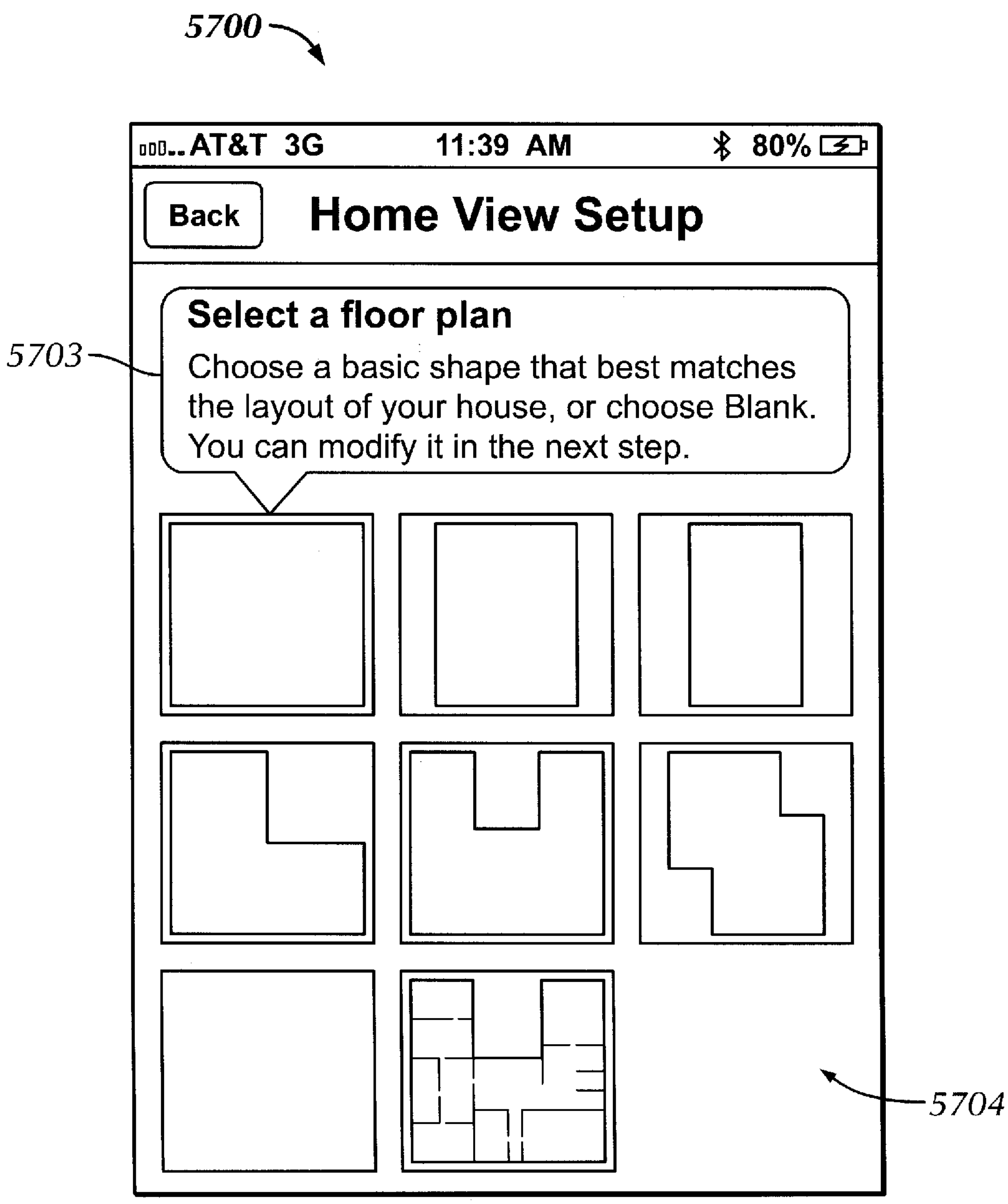

FIG. 57 shows a Home View Setup page for adding at least one floor to a floor plan, under an embodiment.

Figure 58:
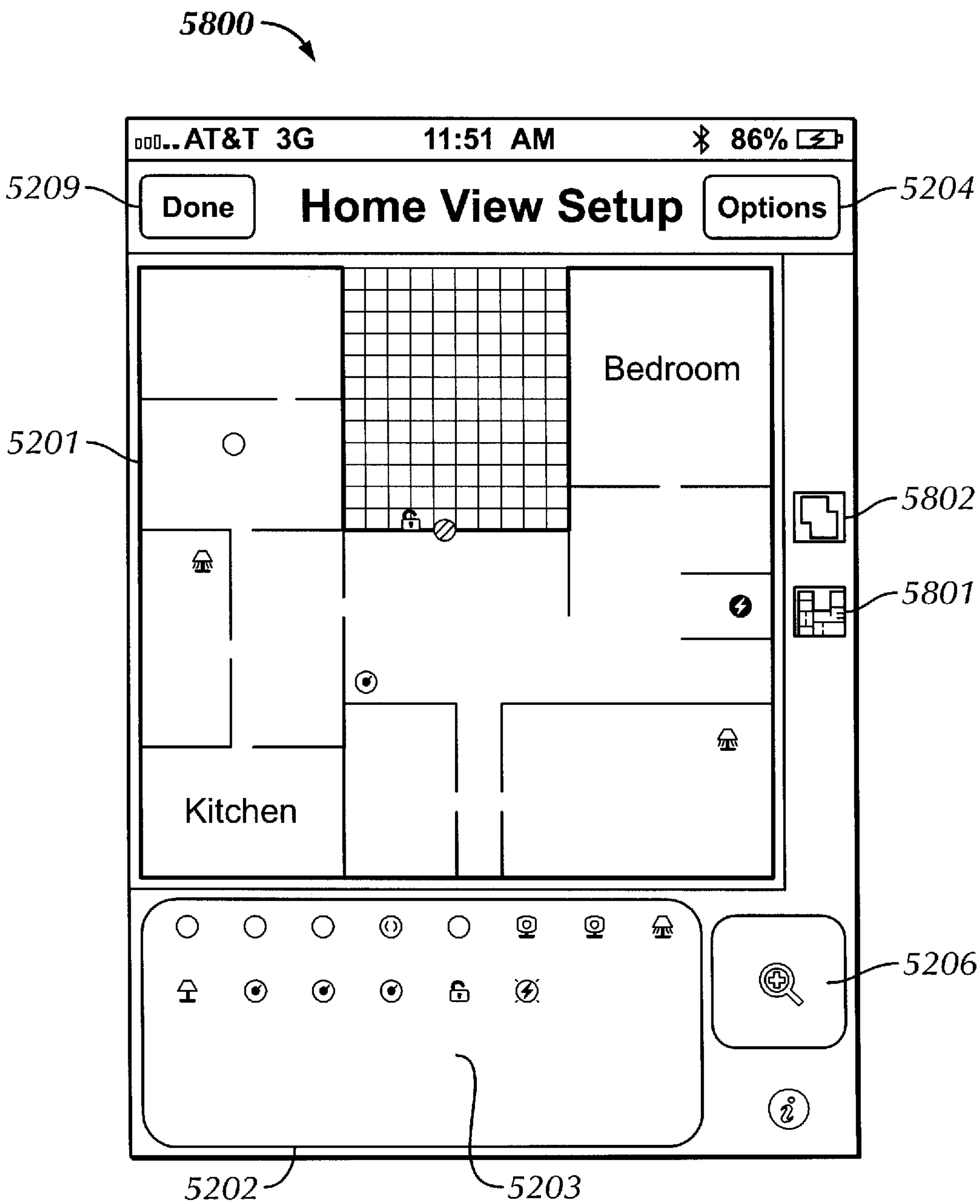

FIG. 58 shows a Home View Setup page 5800 with editing for multiple floors, under an embodiment.

Figure 59:
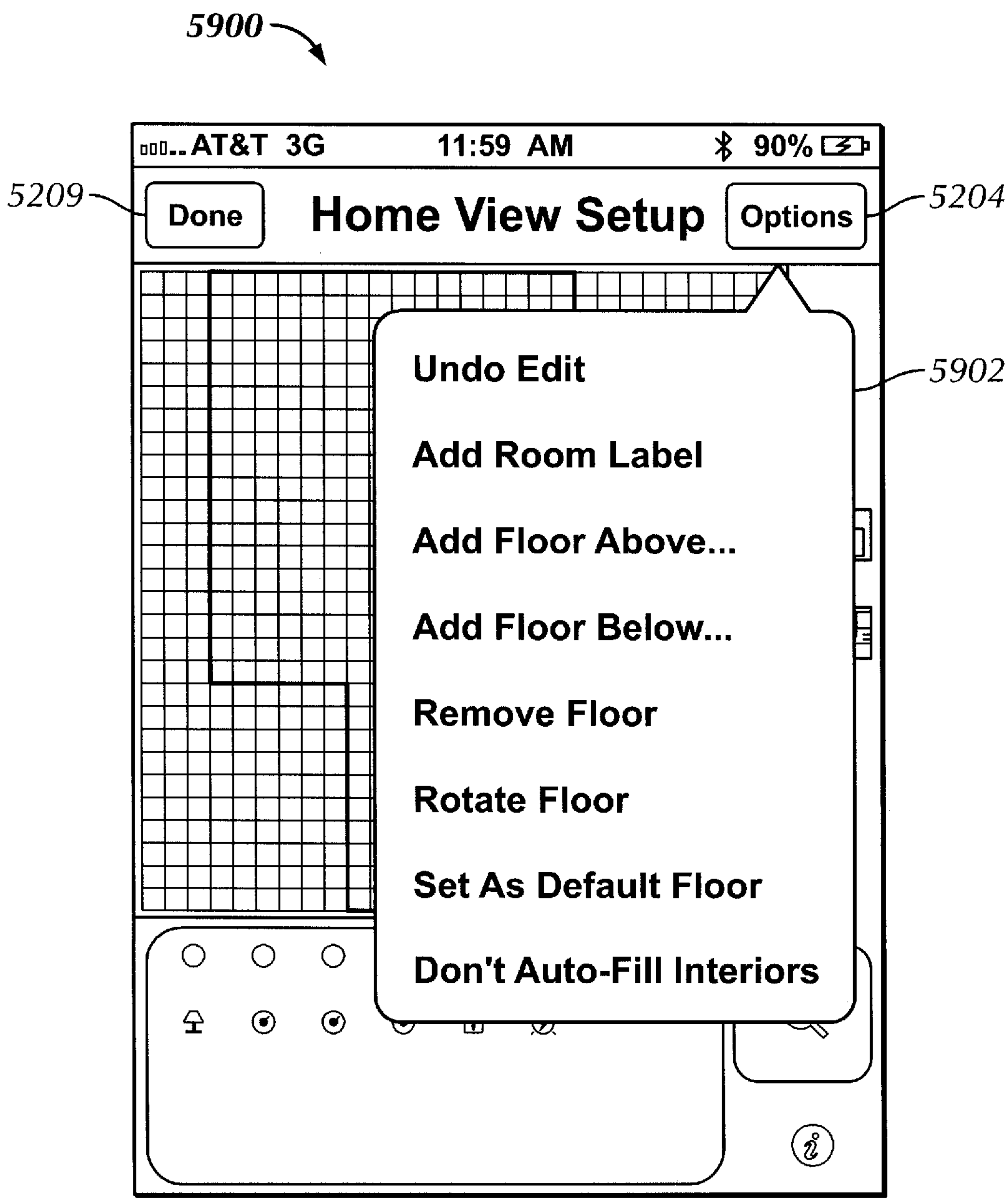

FIG. 59 shows a Home View Setup page 5900 with options displayed, under an embodiment.

Figure 60:
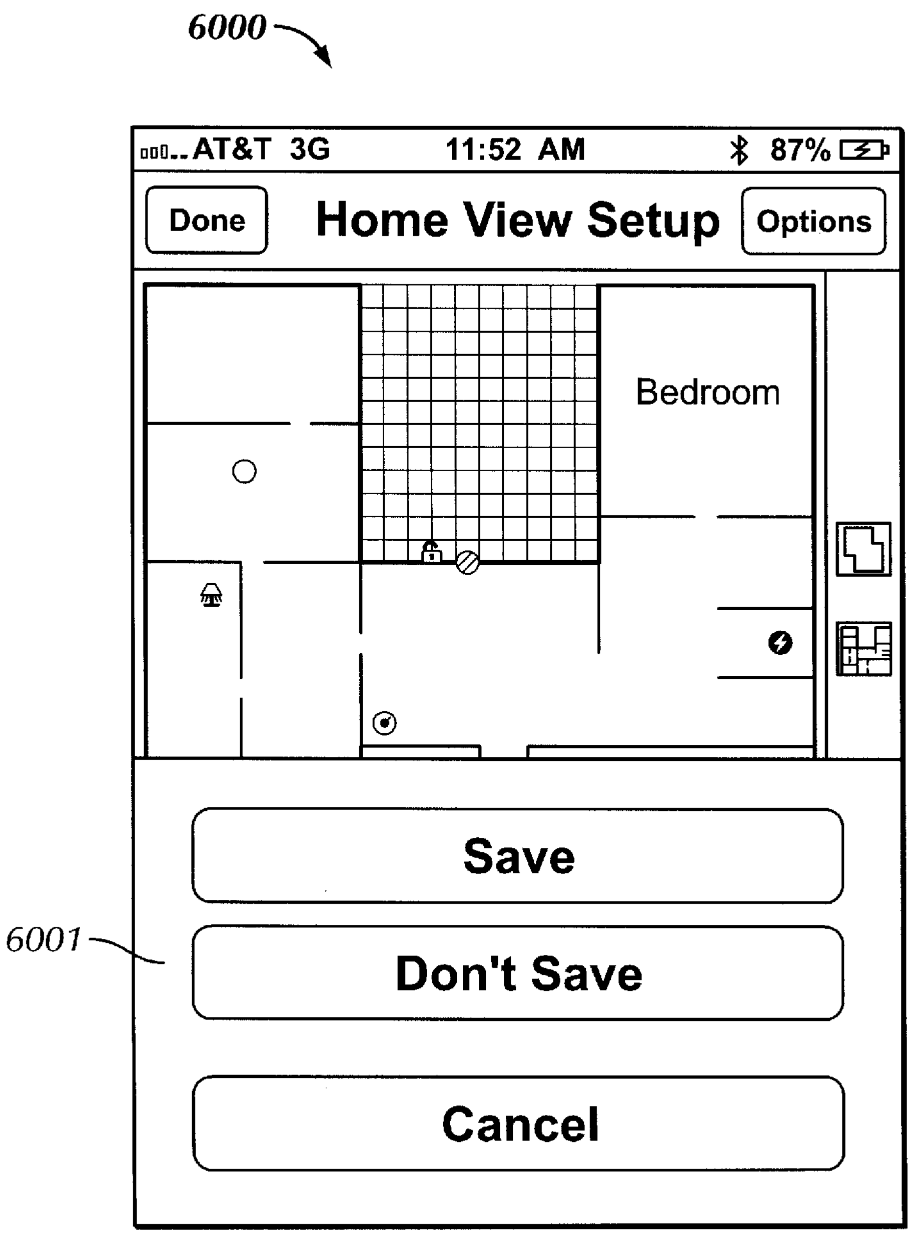

FIG. 60 shows a Home View Setup page 6000 with editor exit option prompts 6001 displayed, under an embodiment.

Figure 61:
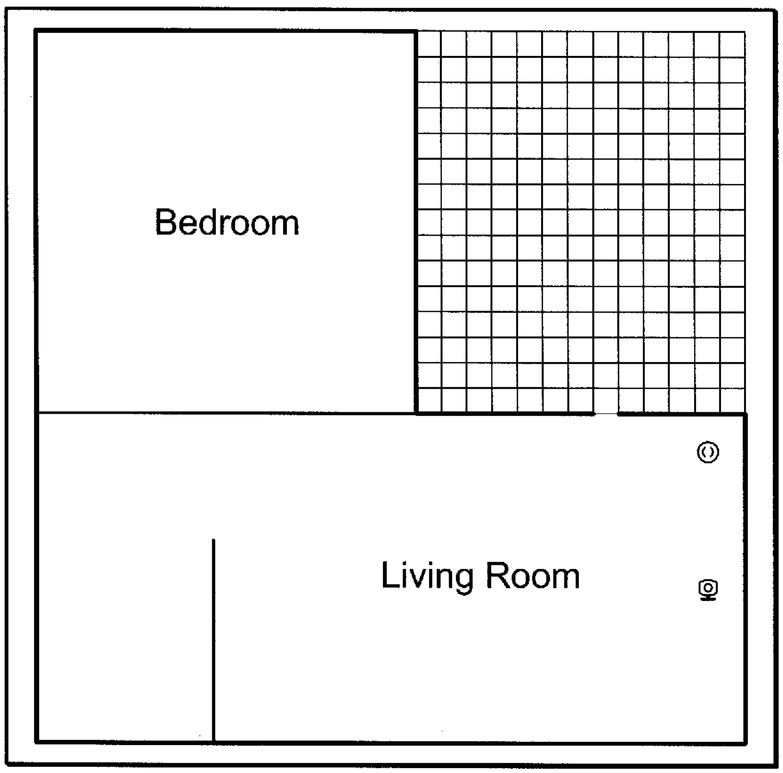

FIG. 61 is an example floor plan, under an embodiment.

Figure 62:
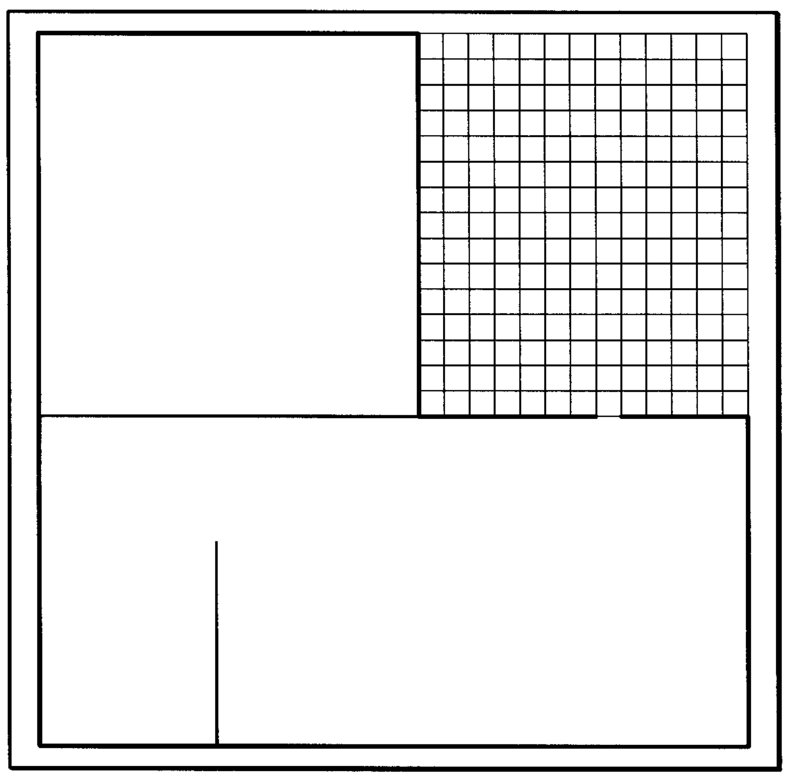

FIG. 62 is an example Home View one-story floor plan, under an embodiment.

Figure 63:
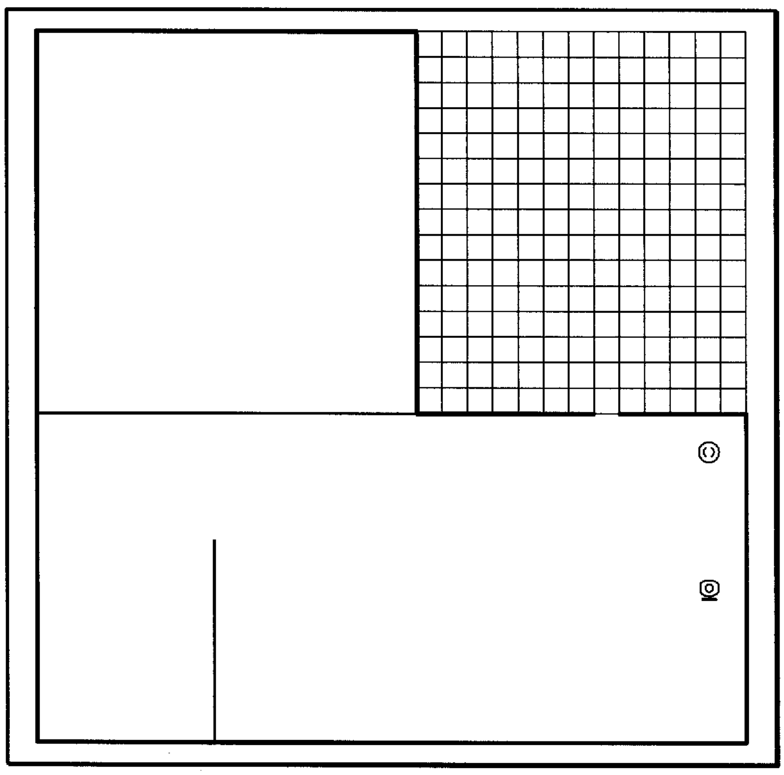

FIG. 63 is an example Home View floor plan that includes two devices, under an embodiment.

Figure 64:
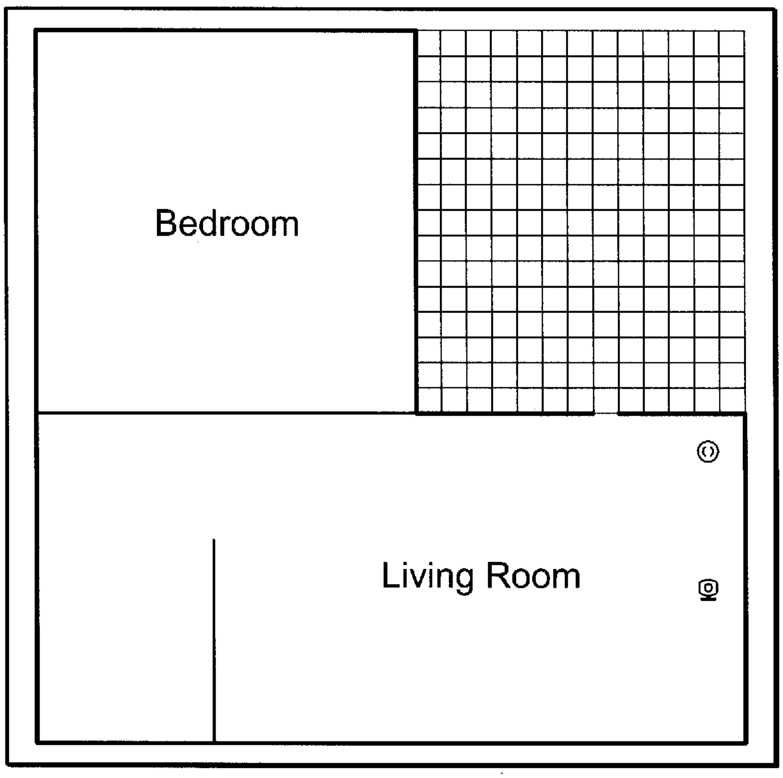

FIG. 64 is an example Home View floor plan that includes two labels, under an embodiment.

Figure 65:
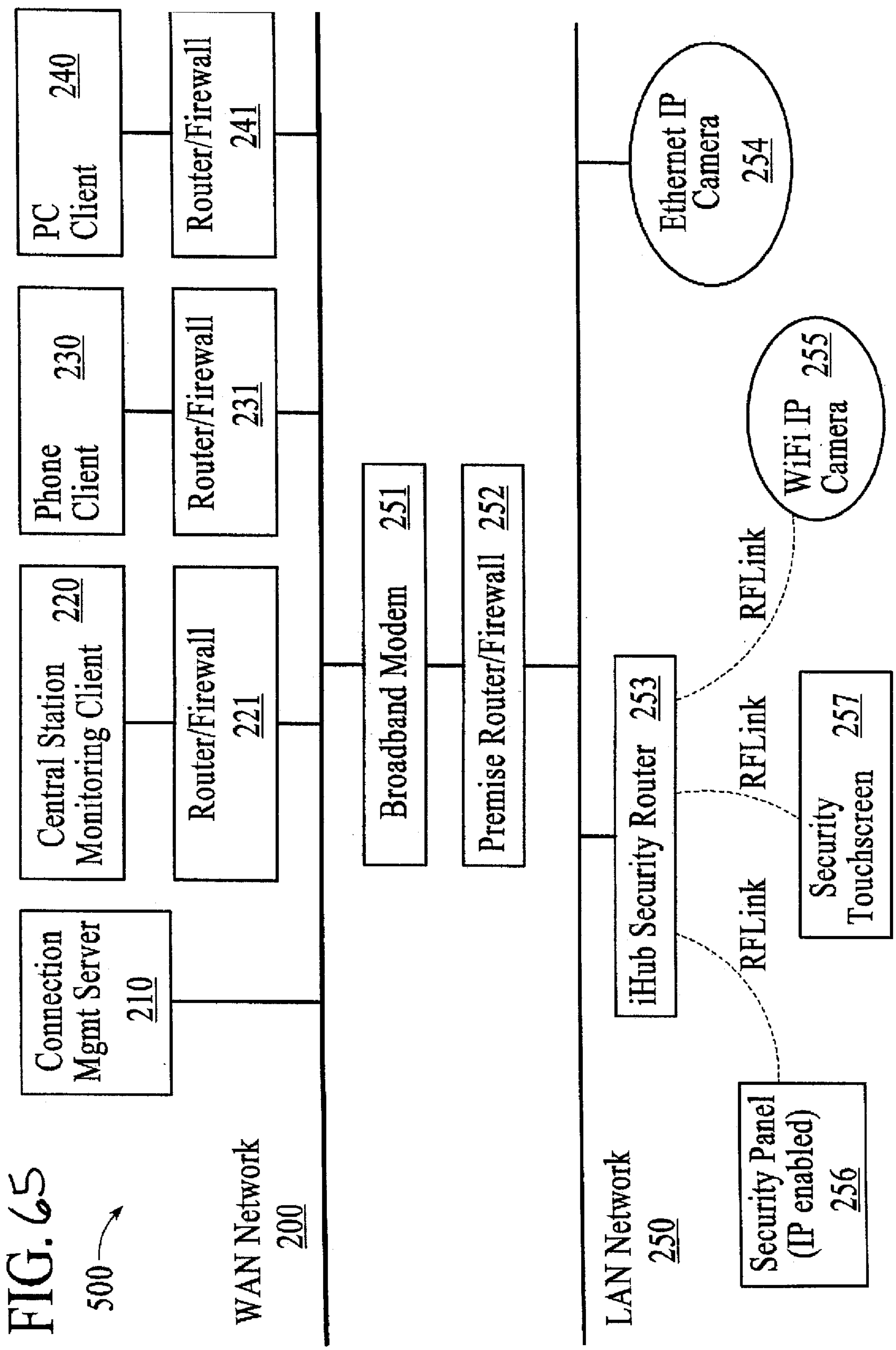

FIG. 65 is a block diagram of IP device integration with a premise network, under an embodiment.

Figure 66:
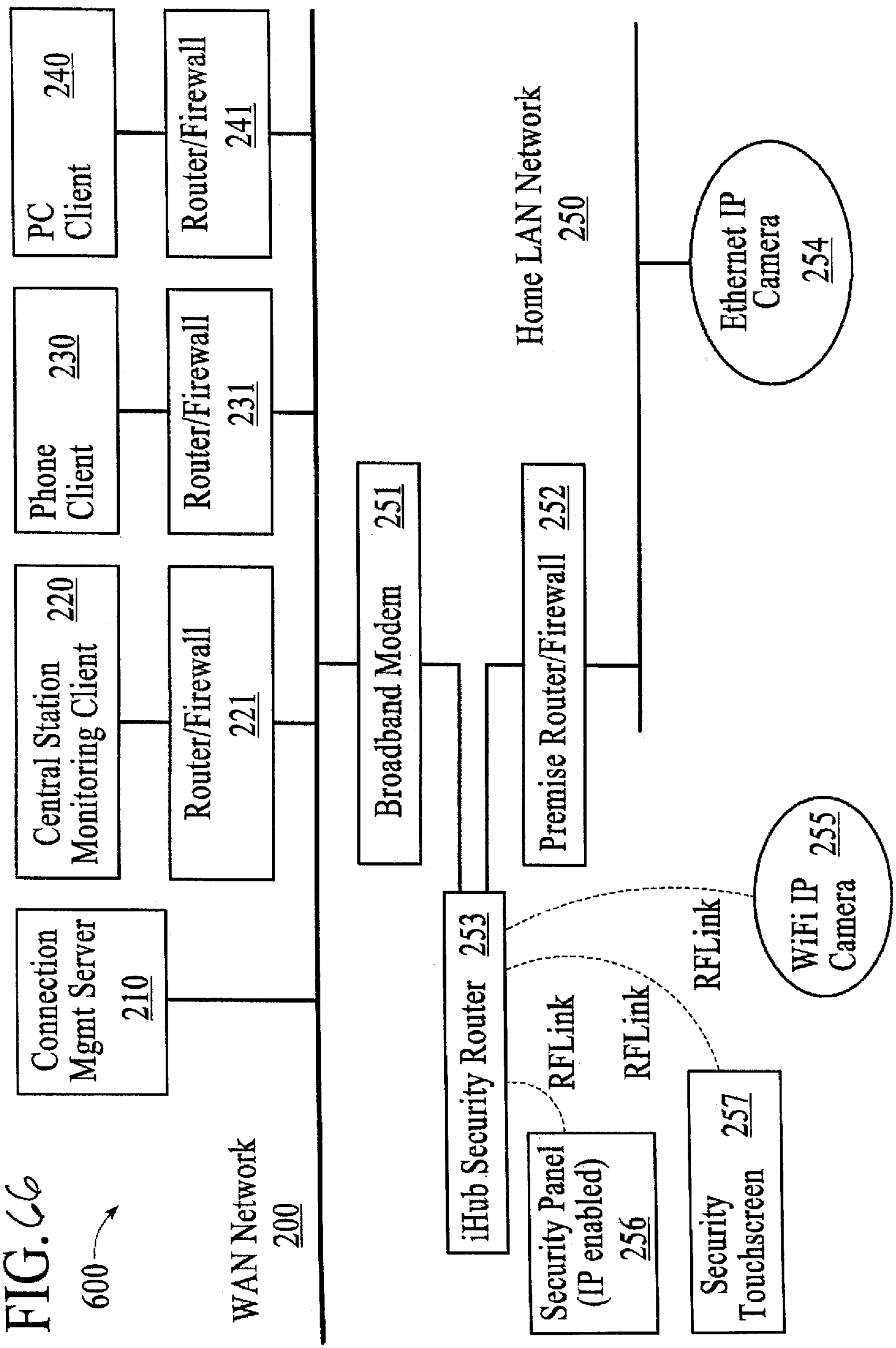

FIG. 66 is a block diagram of IP device integration with a premise network, under an alternative embodiment.

Figure 67:
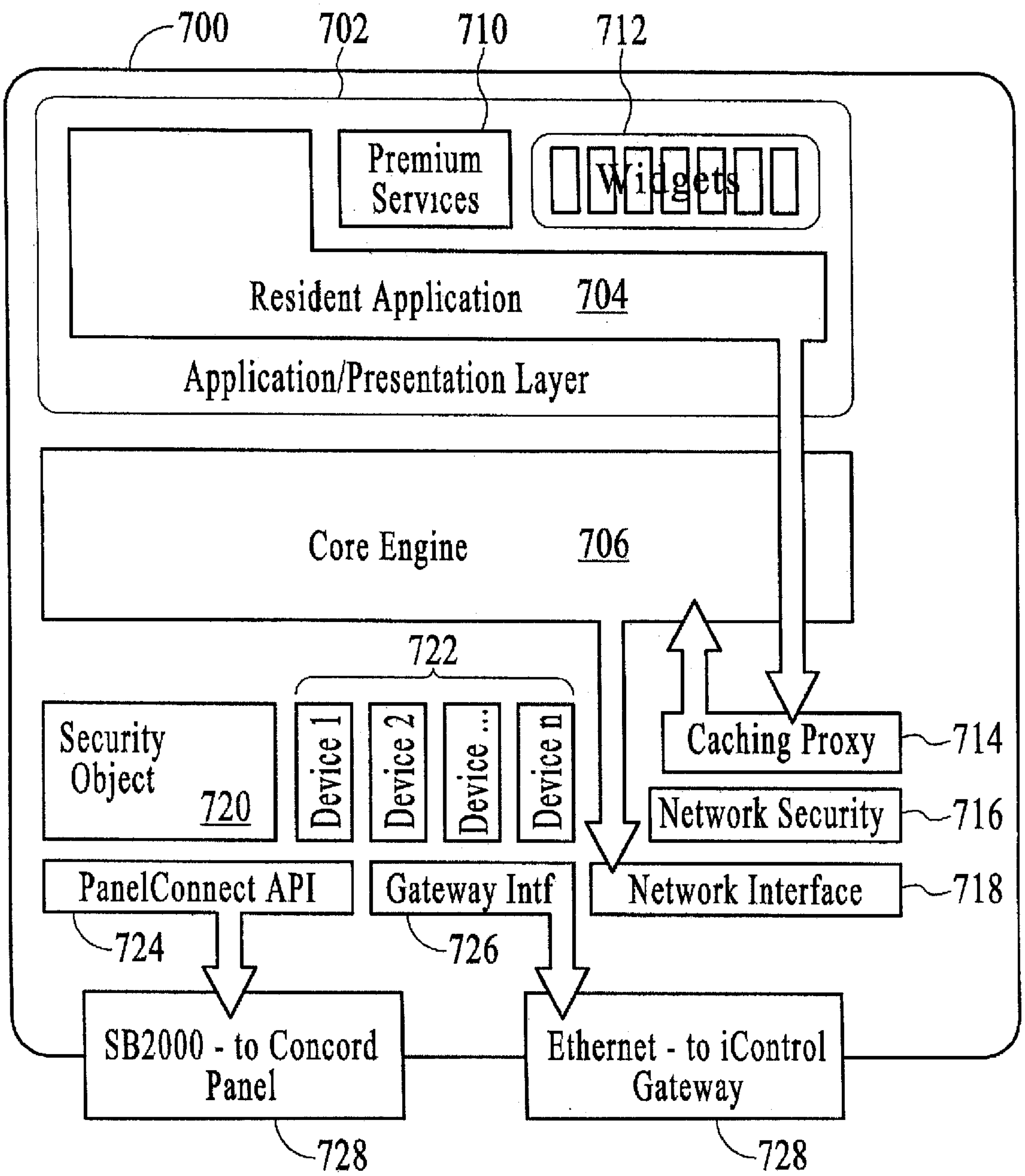

FIG. 67 is a block diagram of a touchscreen, under an embodiment.

Figure 68:
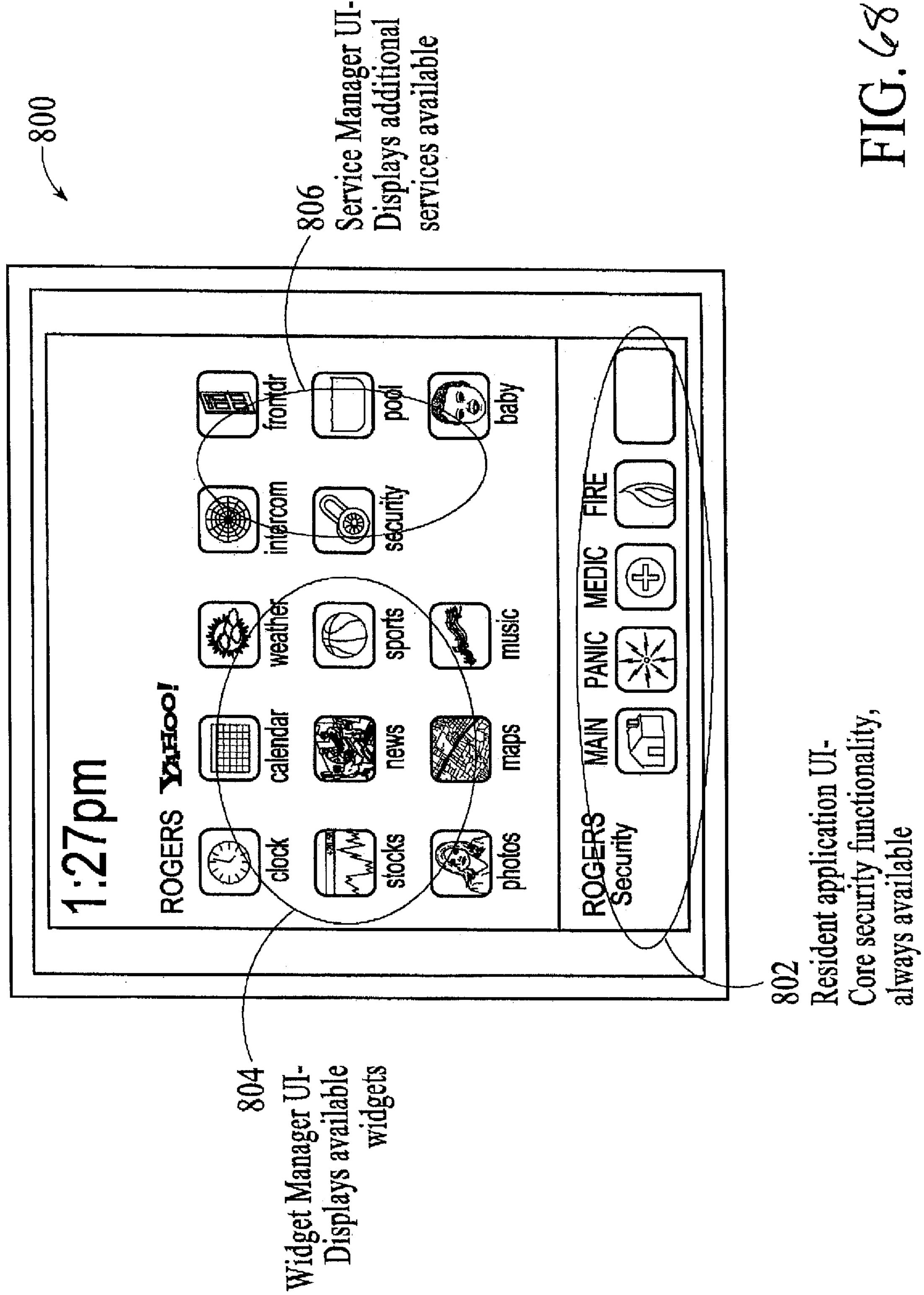

FIG. 68 is an example screenshot of a networked security touchscreen, under an embodiment.

Figure 69:
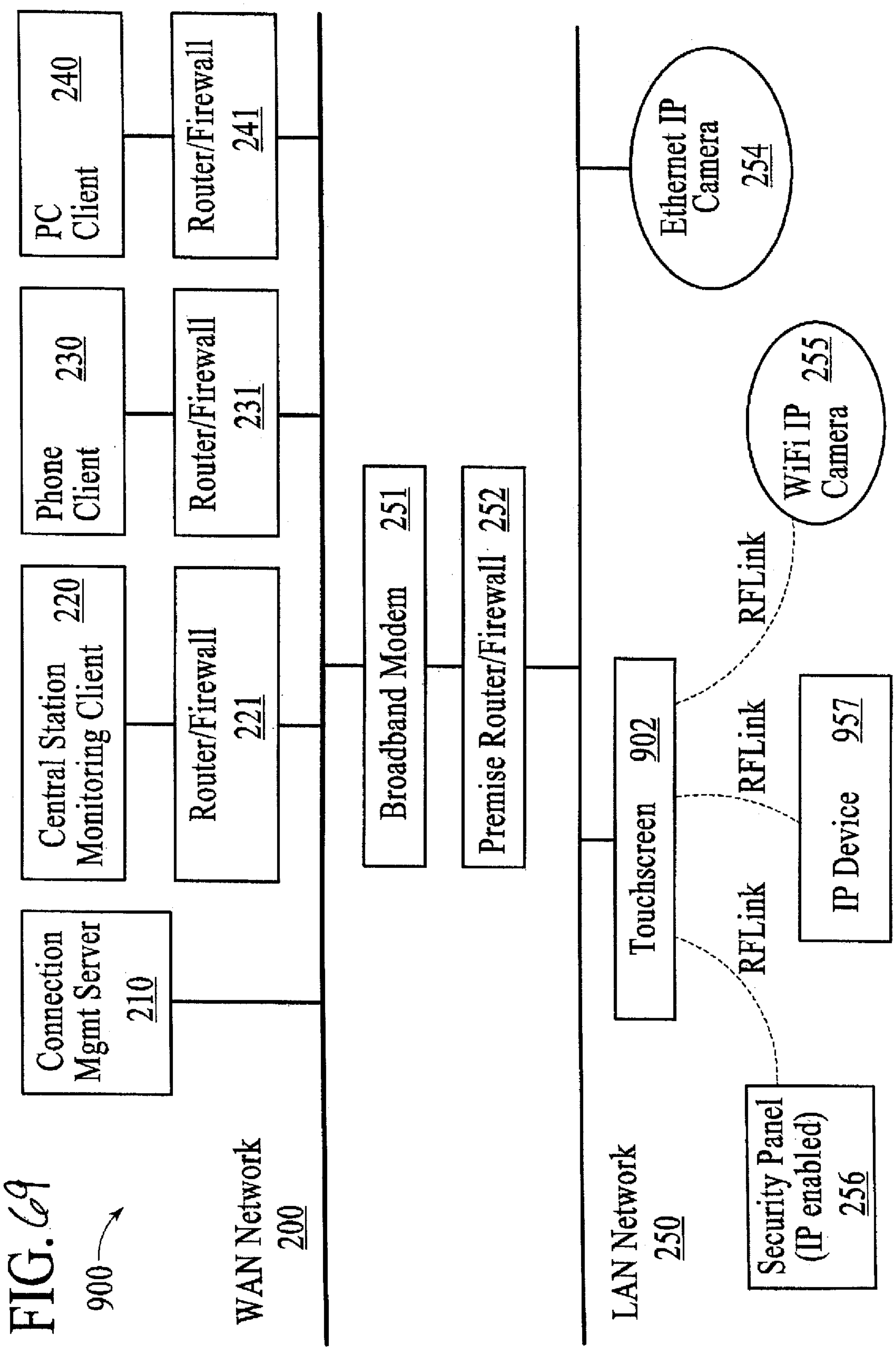

FIG. 69 is a block diagram of network or premise device integration with a premise network, under an embodiment.

Figure 70:
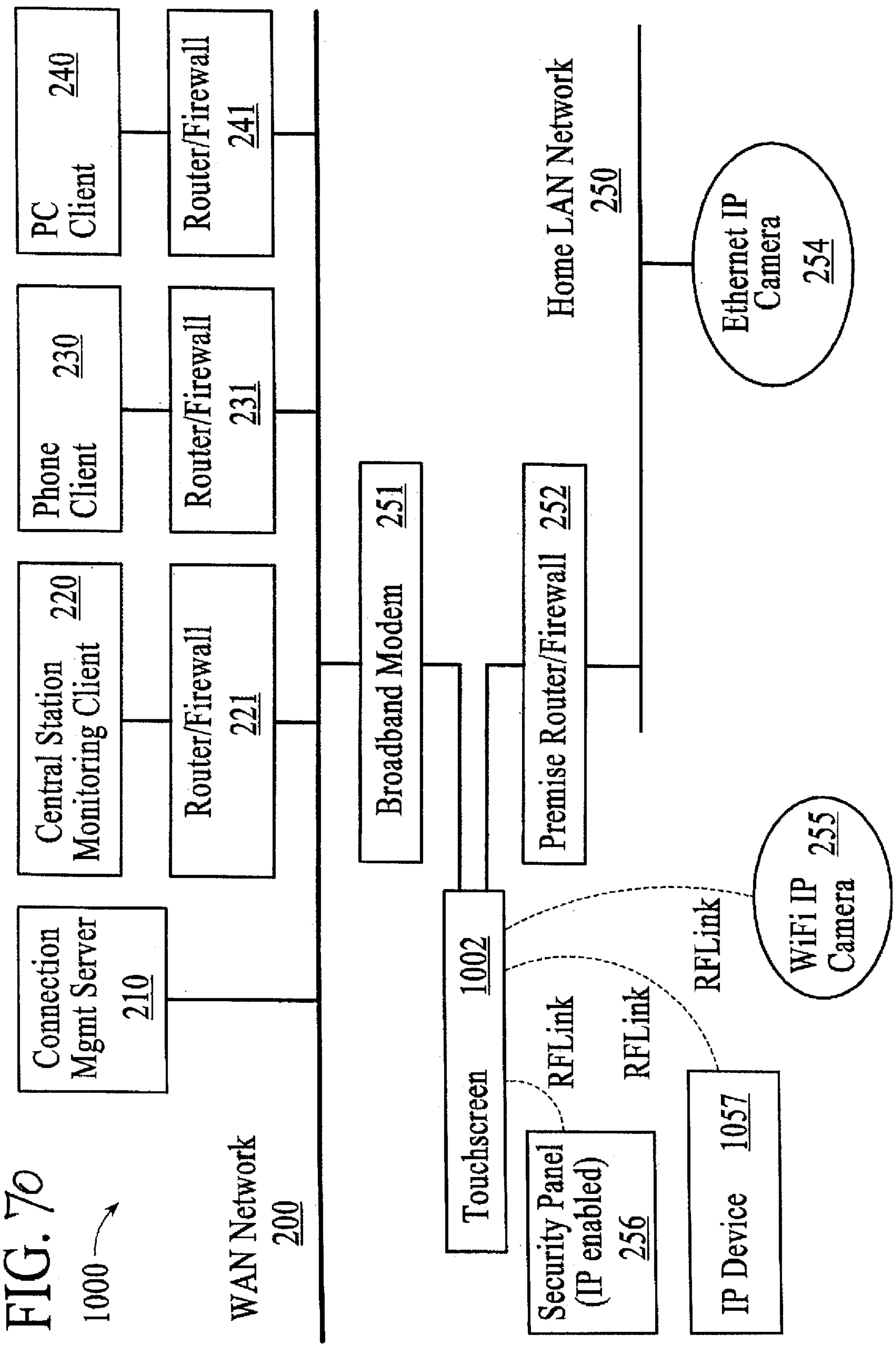

FIG. 70 is a block diagram of network or premise device integration with a premise network, under an alternative embodiment.

Figure 71:
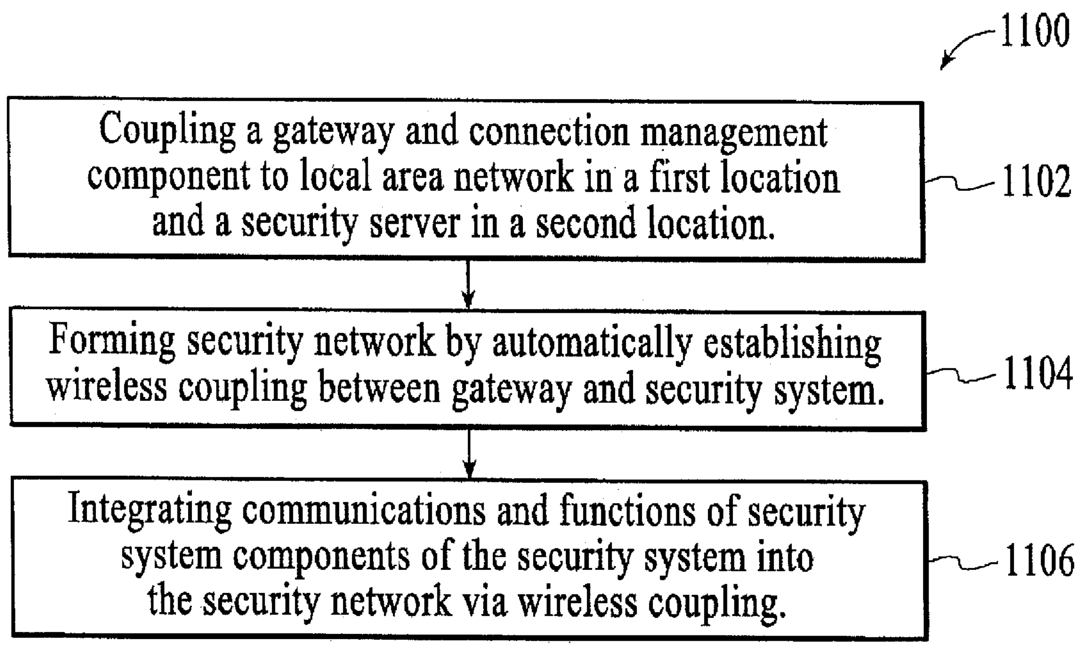

FIG. 71 is a flow diagram for a method of forming a security network including integrated security system components, under an embodiment.

Figure 72:
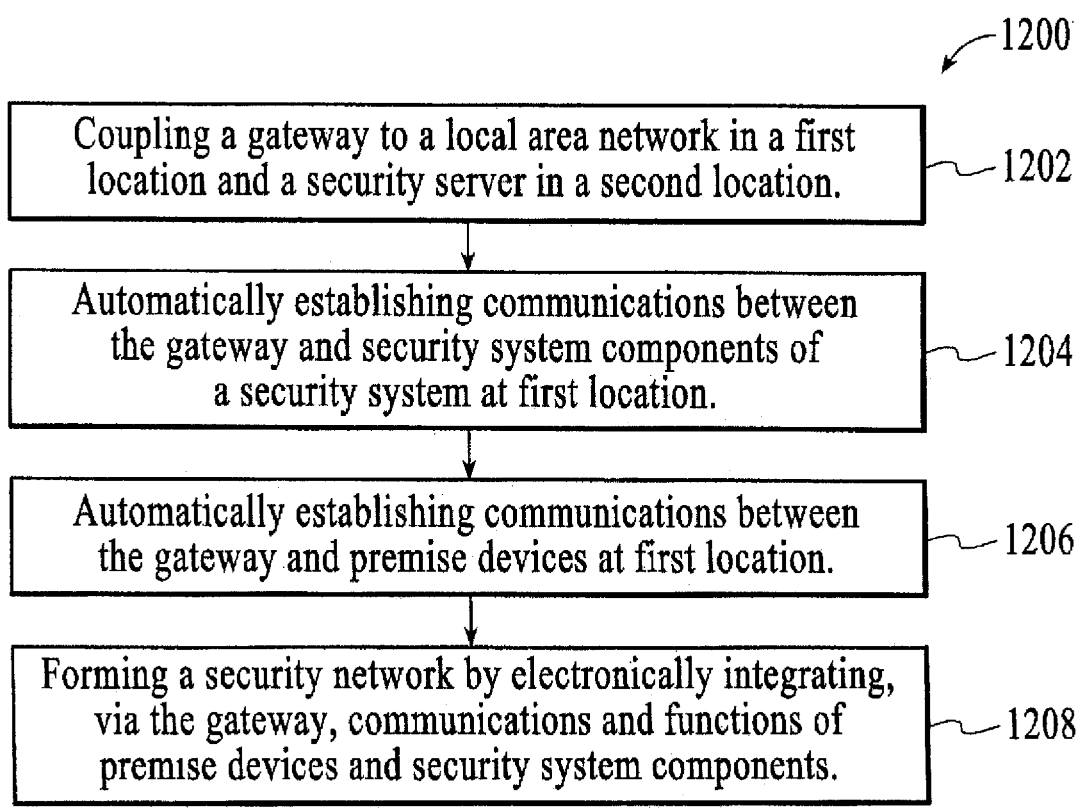

FIG. 72 is a flow diagram for a method of forming a security network including integrated security system components and network devices, under an embodiment.

Figure 73:
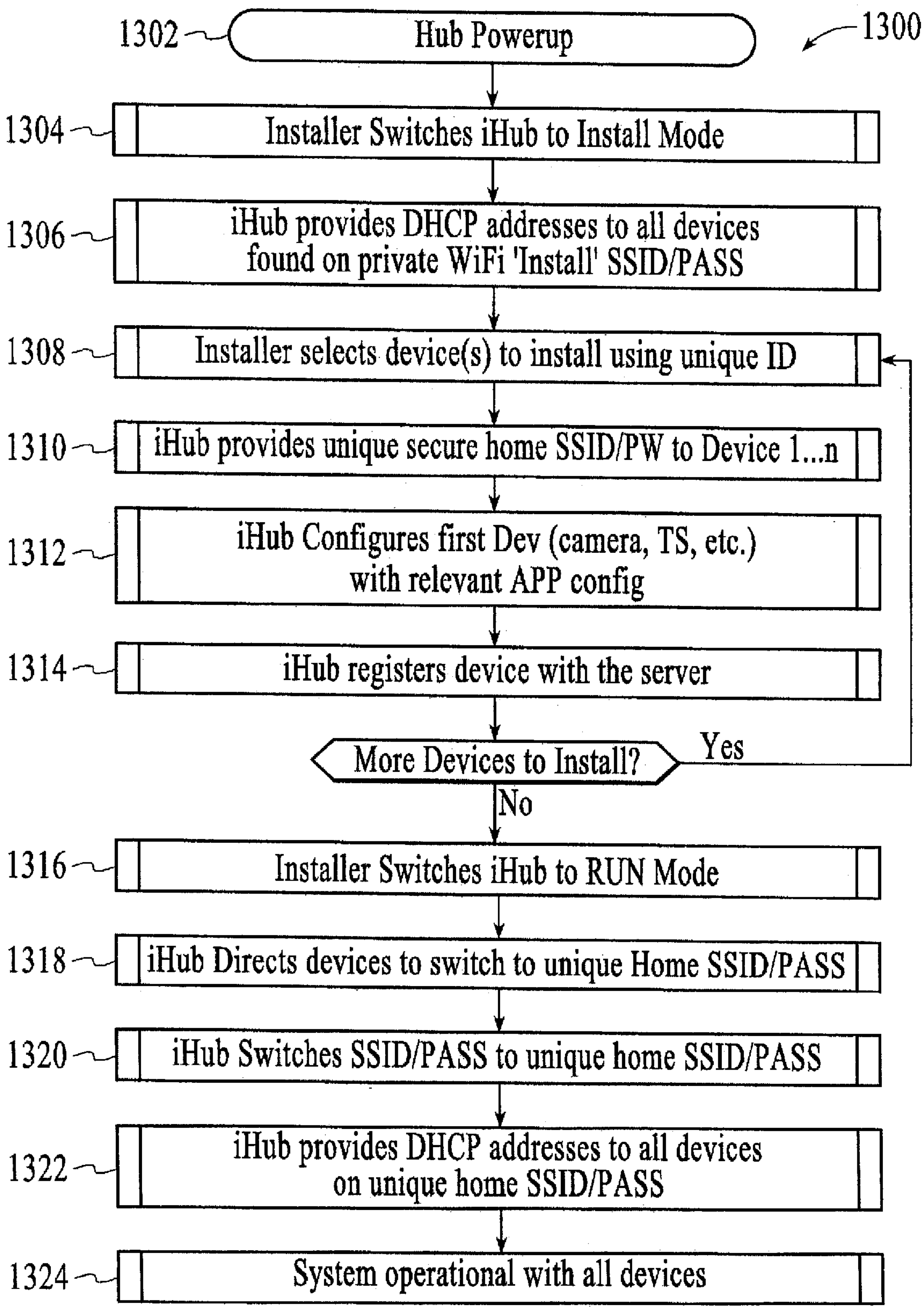

FIG. 73 is a flow diagram for installation of an IP device into a private network environment, under an embodiment.

Figure 74:
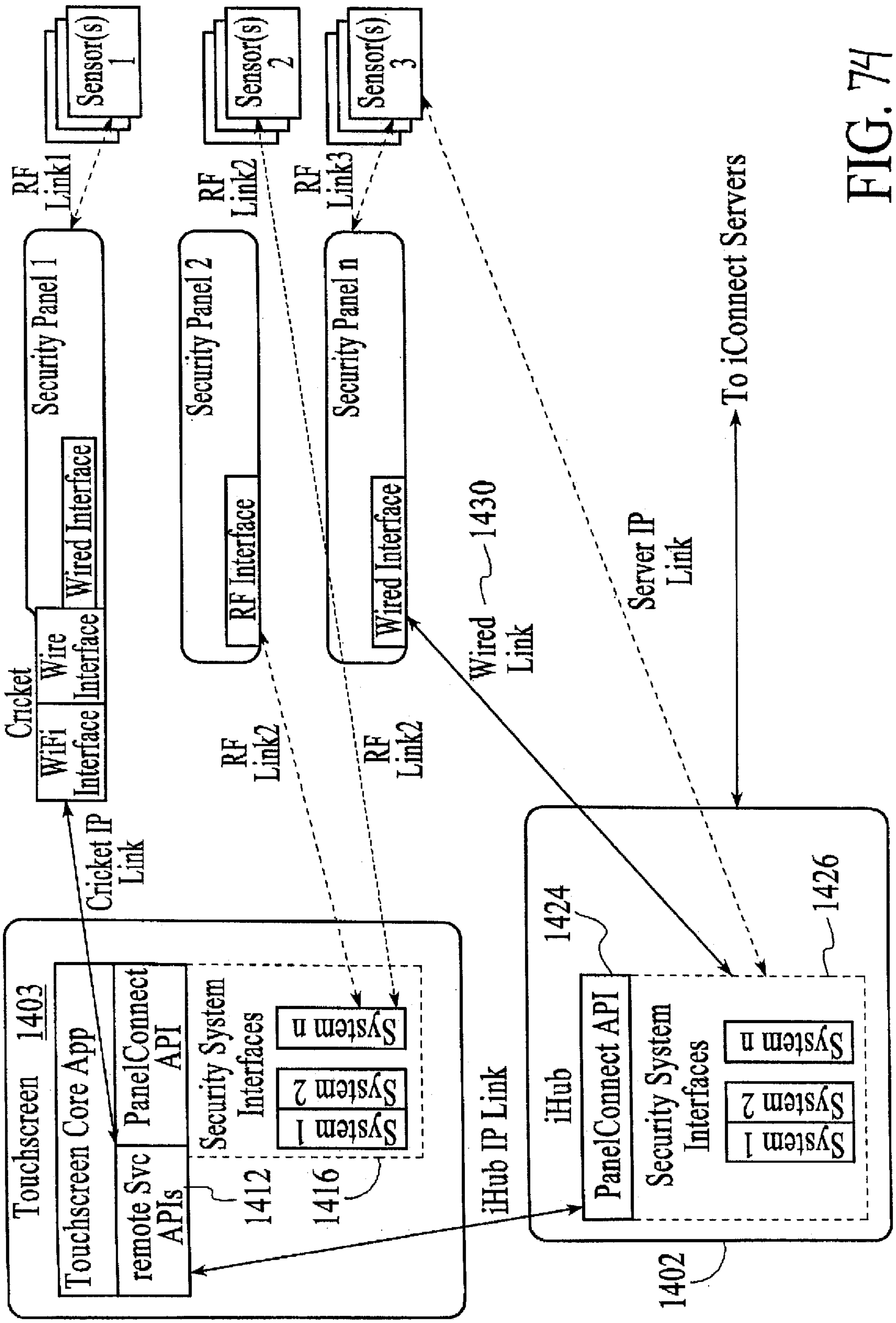

FIG. 74 is a block diagram showing communications among IP devices of the private network environment, under an embodiment.

Figure 75:
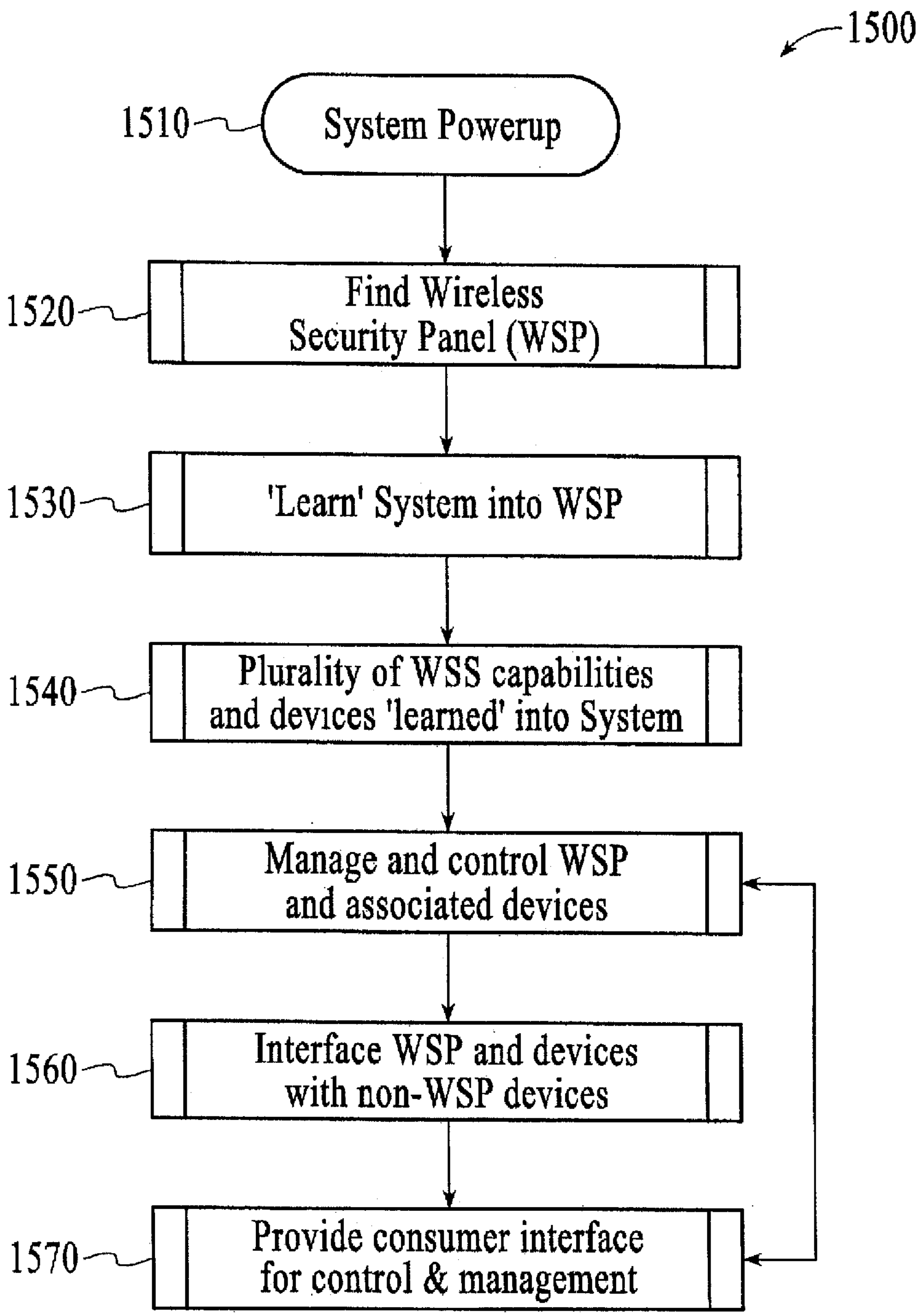

FIG. 75 is a flow diagram of a method of integrating an external control and management application system with an existing security system, under an embodiment.

Figure 76:
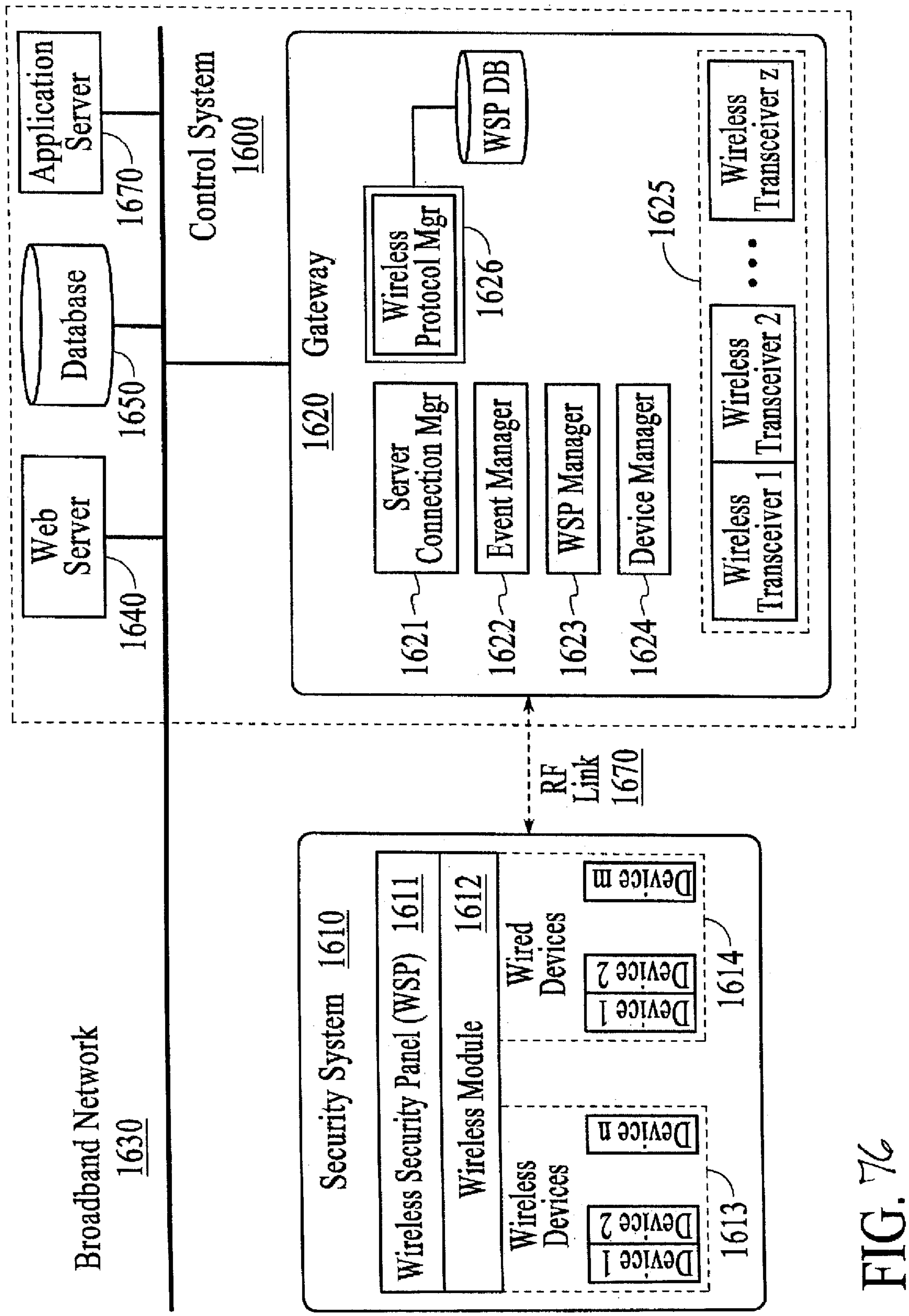

FIG. 76 is a block diagram of an integrated security system wirelessly interfacing to proprietary security systems, under an embodiment.

Figure 77:
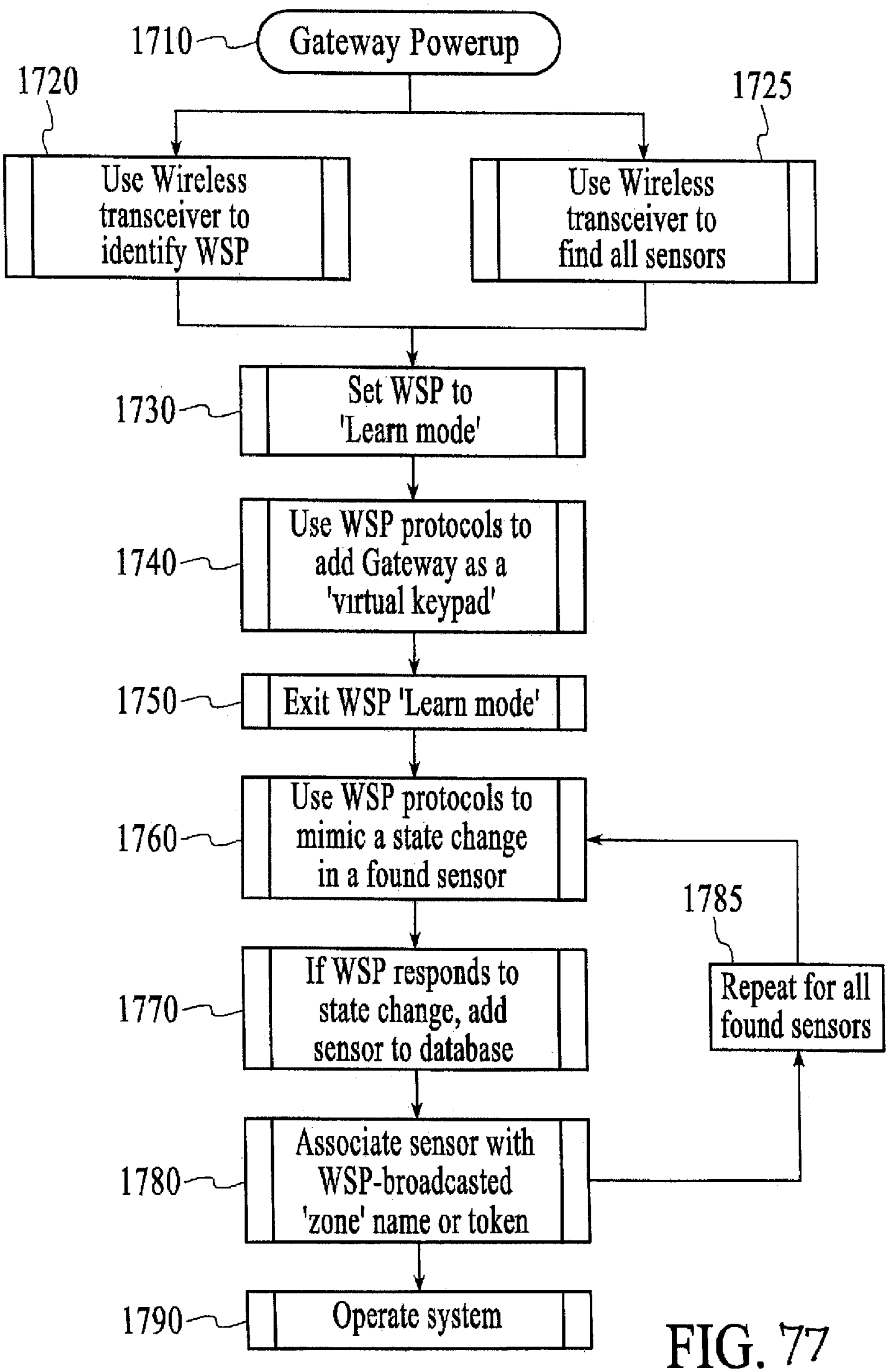

FIG. 77 is a flow diagram for wirelessly 'learning' the gateway into an existing security system and discovering extant sensors, under an embodiment.

Figure 78:
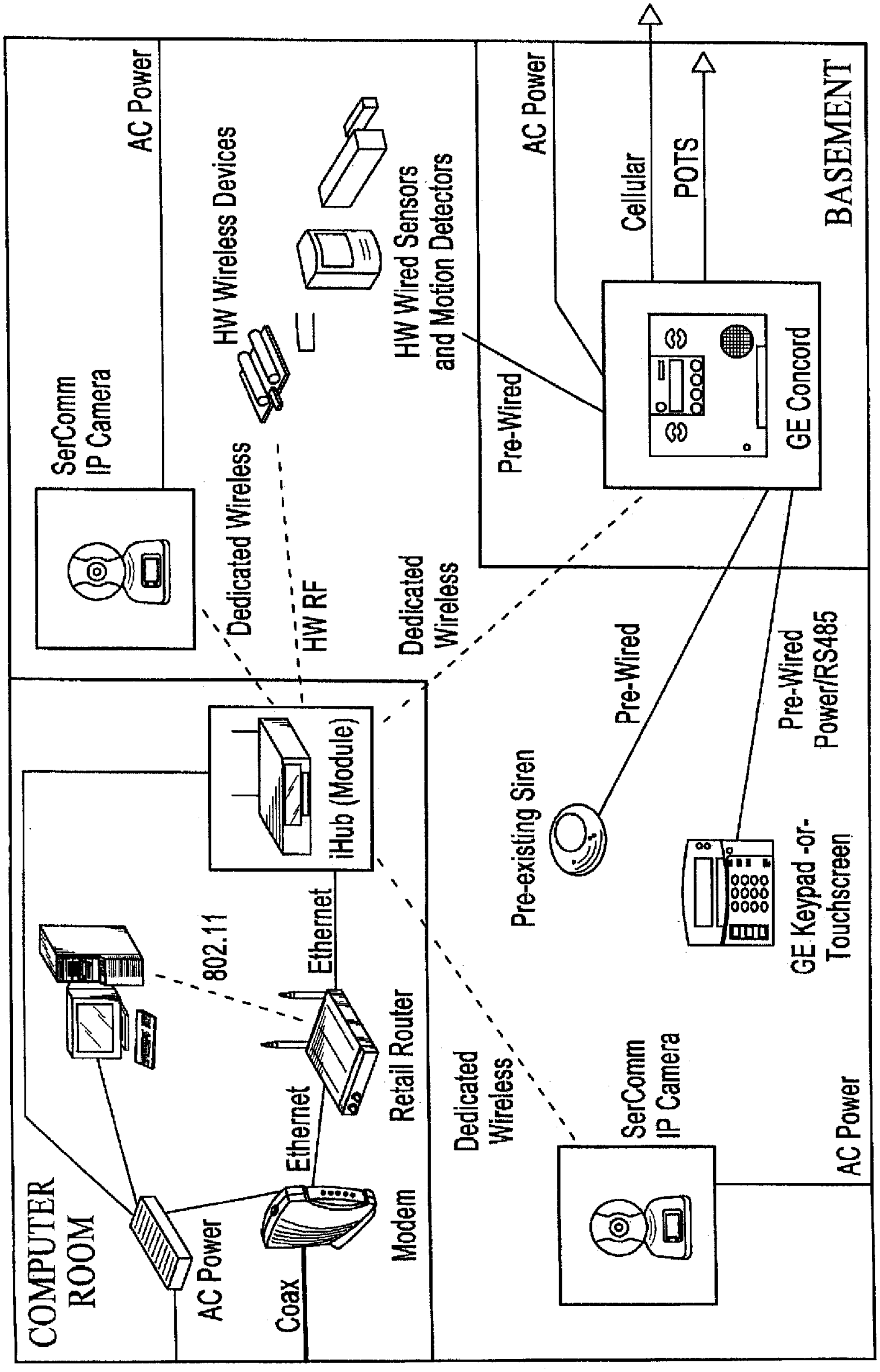

FIG. 78 is a block diagram of a security system in which the legacy panel is replaced with a wireless security panel wirelessly coupled to a gateway, under an embodiment.

Figure 79:
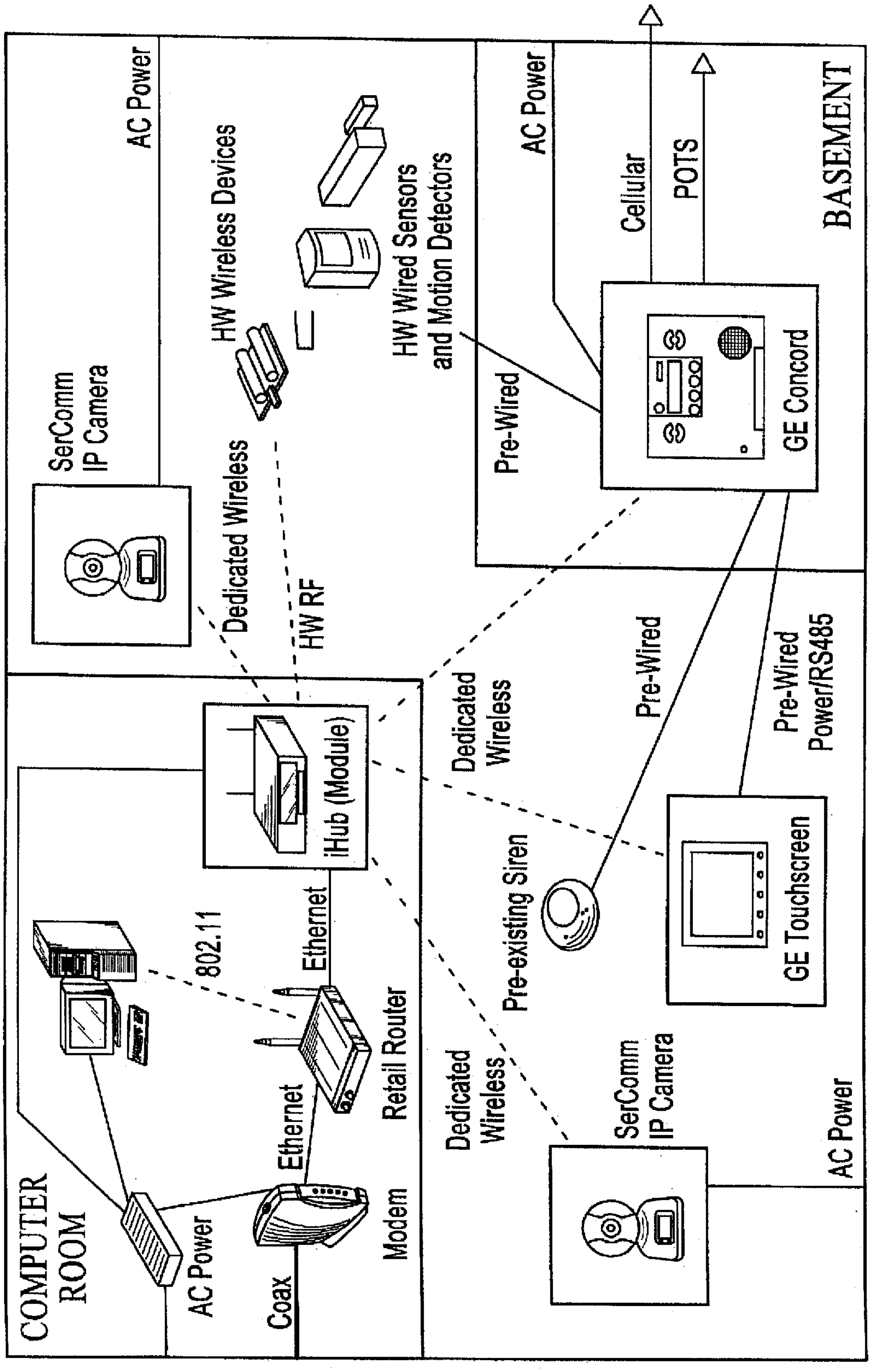

FIG. 79 is a block diagram of a security system in which the legacy panel is replaced with a wireless security panel wirelessly coupled to a gateway, and a touchscreen, under an alternative embodiment.

Figure 80:
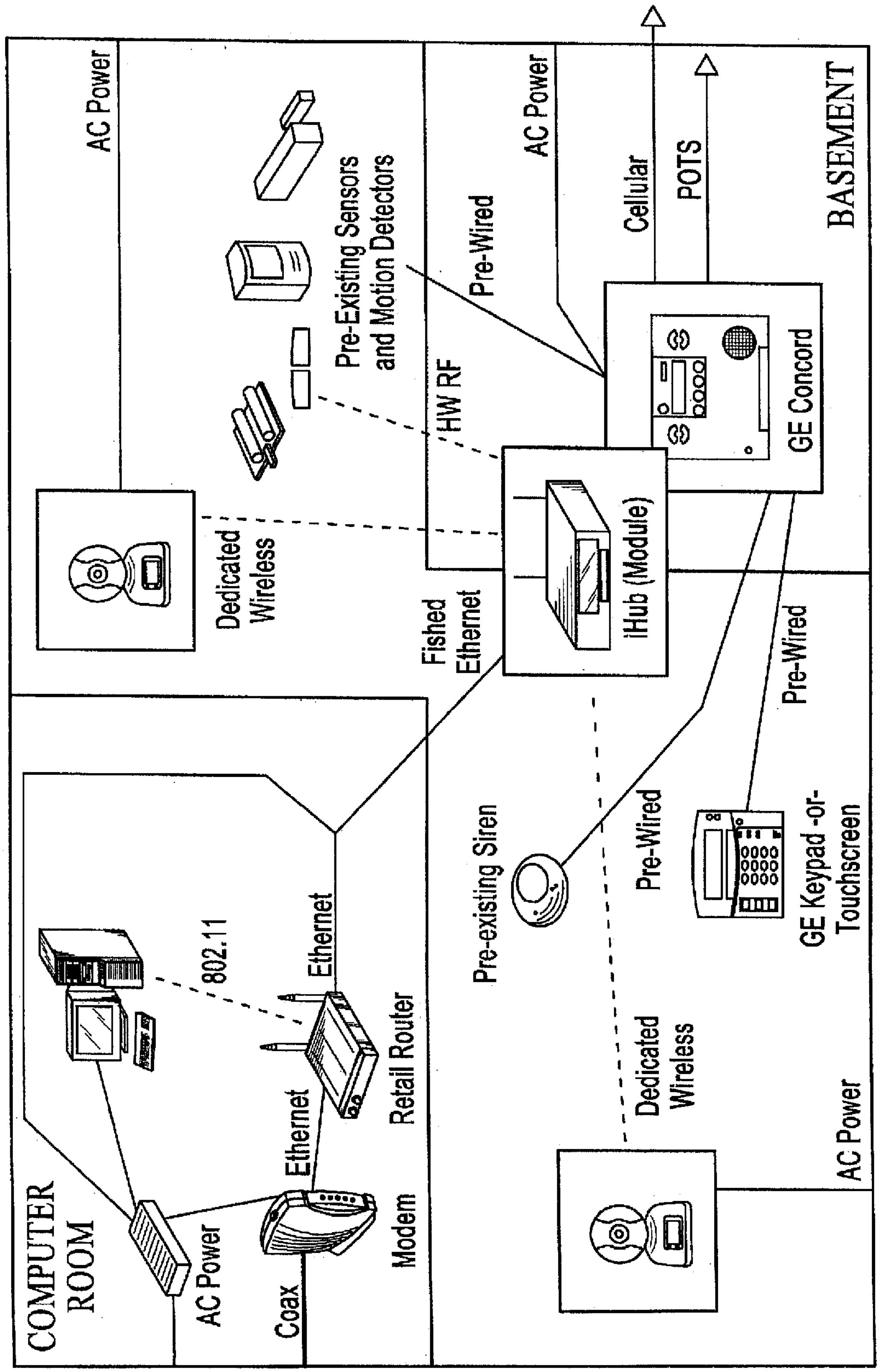

FIG. 80 is a block diagram of a security system in which the legacy panel is replaced with a wireless security panel connected to a gateway via an Ethernet coupling, under another alternative embodiment.

Figure 81:
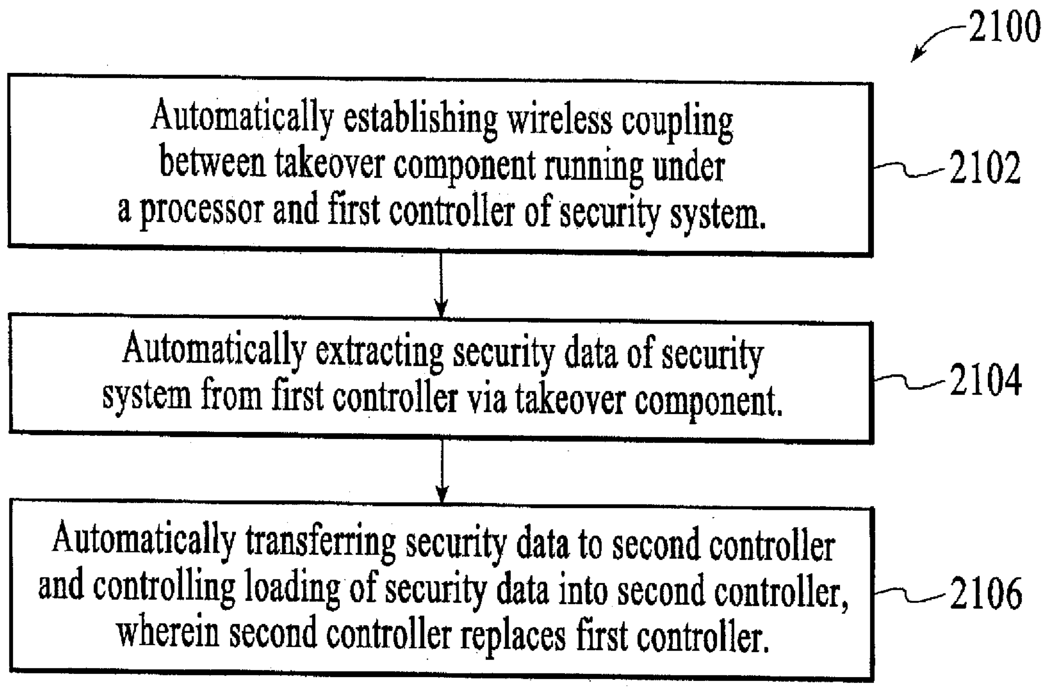

FIG. 81 is a flow diagram for automatic takeover of a security system, under an embodiment.

Figure 82:
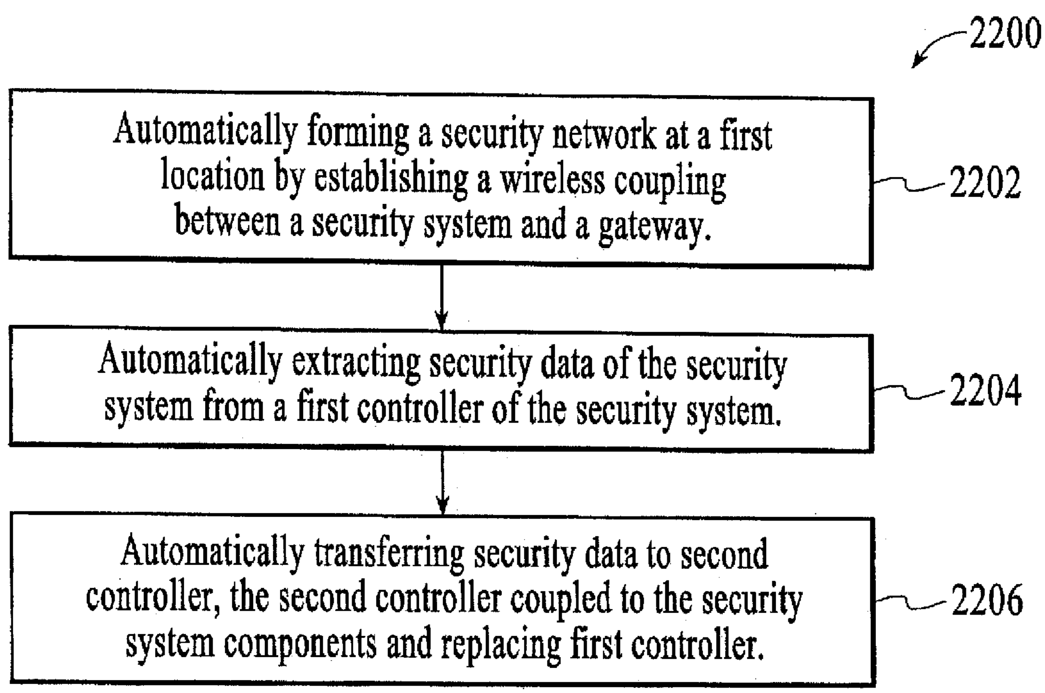

FIG. 82 is a flow diagram for automatic takeover of a security system, under an alternative embodiment.

DETAILED DESCRIPTION

An integrated security system is described that integrates broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

In accordance with the embodiments described herein, a wireless system (e.g., radio frequency (RF)) is provided that enables a security provider or consumer to extend the capabilities of an existing RF-capable security system or a non-RF-capable security system that has been upgraded to support RF capabilities. The system includes an RF-capable Gateway device (physically located within RF range of the RF-capable security system) and associated software operating on the Gateway device. The system also includes a web server, application server, and remote database providing a persistent store for information related to the system.

The security systems of an embodiment, referred to herein as the iControl security system or integrated security system, extend the value of traditional home security by adding broadband access and the advantages of remote home monitoring and home control through the formation of a security network including components of the integrated security system integrated with a conventional premise security system and a premise local area network (LAN). With the integrated security system, conventional home security sensors, cameras, touchscreen keypads, lighting controls, and/or Internet Protocol (IP) devices in the home (or business) become connected devices that are accessible anywhere in the world from a web browser, mobile phone or through content-enabled touchscreens. The integrated security system experience allows security operators to both extend the value proposition of their monitored security systems and reach new consumers that include broadband users interested in staying connected to their family, home and property when they are away from home.

The integrated security system of an embodiment includes security servers (also referred to herein as iConnect servers or security network servers) and an iHub gateway (also referred to herein as the gateway, the iHub, or the iHub client) that couples or integrates into a home network (e.g., LAN) and communicates directly with the home security panel, in both wired and wireless installations. The security system of an embodiment automatically discovers the security system components (e.g., sensors, etc.) belonging to the security system and connected to a control panel of the security system and provides consumers with full two-way access via web and mobile portals. The gateway supports various wireless protocols and can interconnect with a wide range of control panels offered by security system providers. Service providers and users can then extend the system's capabilities with the additional IP cameras, lighting modules or security devices such as interactive touchscreen keypads. The integrated security system adds an enhanced value to these security systems by enabling consumers to stay connected through email and SMS alerts, photo push, event-based video capture and rule-based monitoring and notifications. This solution extends the reach of home security to households with broadband access.

The integrated security system builds upon the foundation afforded by traditional security systems by layering broadband and mobile access, IP cameras, interactive touchscreens, and an open approach to home automation on top of traditional security system configurations. The integrated security system is easily installed and managed by the security operator, and simplifies the traditional security installation process, as described below.

The integrated security system provides an open systems solution to the home security market. As such, the foundation of the integrated security system customer premises equipment (CPE) approach has been to abstract devices, and allows applications to manipulate and manage multiple devices from any vendor. The integrated security system DeviceConnect technology that enables this capability supports protocols, devices, and panels from GE Security and Honeywell, as well as consumer devices using Z-Wave, IP cameras (e.g., Ethernet, wifi, and Homeplug), and IP touchscreens. The DeviceConnect is a device abstraction layer that enables any device or protocol layer to interoperate with integrated security system components. This architecture enables the addition of new devices supporting any of these interfaces, as well as add entirely new protocols.

The benefit of DeviceConnect is that it provides supplier flexibility. The same consistent touchscreen, web, and mobile user experience operate unchanged on whatever security equipment selected by a security system provider, with the system provider's choice of IP cameras, backend data center and central station software.

The integrated security system provides a complete system that integrates or layers on top of a conventional host security system available from a security system provider. The security system provider therefore can select different components or configurations to offer (e.g., CDMA, GPRS, no cellular, etc.) as well as have iControl modify the integrated security system configuration for the system provider's specific needs (e.g., change the functionality of the web or mobile portal, add a GE or Honeywell-compatible TouchScreen, etc.).

The integrated security system integrates with the security system provider infrastructure for central station reporting directly via Broadband and GPRS alarm transmissions. Traditional dial-up reporting is supported via the standard panel connectivity. Additionally, the integrated security system provides interfaces for advanced functionality to the CMS, including enhanced alarm events, system installation optimizations, system test verification, video verification, 2-way voice over IP and GSM.

The integrated security system is an IP centric system that includes broadband connectivity so that the gateway augments the existing security system with broadband and GPRS connectivity. If broadband is down or unavailable GPRS may be used, for example. The integrated security system supports GPRS connectivity using an optional wireless package that includes a GPRS modem in the gateway. The integrated security system treats the GPRS connection as a higher cost though flexible option for data transfers. In an embodiment the GPRS connection is only used to route alarm events (e.g., for cost), however the gateway can be configured (e.g., through the iConnect server interface) to act as a primary channel and pass any or all events over GPRS. Consequently, the integrated security system does not interfere with the current plain old telephone service (POTS) security panel interface. Alarm events can still be routed through POTS; however the gateway also allows such events to be routed through a broadband or GPRS connection as well. The integrated security system provides a web application interface to the CSR tool suite as well as XML web services interfaces for programmatic integration between the security system provider's existing call center products. The integrated security system includes, for example, APIs that allow the security system provider to integrate components of the integrated security system into a custom call center interface. The APIs include XML web service APIs for integration of existing security system provider call center applications with the integrated security system service. All functionality available in the CSR Web application is provided with these API sets. The Java and XML-based APIs of the integrated security system support provisioning, billing, system administration, CSR, central station, portal user interfaces, and content management functions, to name a few. The integrated security system can provide a customized interface to the security system provider's billing system, or alternatively can provide security system developers with APIs and support in the integration effort.

The integrated security system provides or includes business component interfaces for provisioning, administration, and customer care to name a few. Standard templates and examples are provided with a defined customer professional services engagement to help integrate OSS/BSS systems of a Service Provider with the integrated security system.

The integrated security system components support and allow for the integration of customer account creation and deletion with a security system. The iConnect APIs provides access to the provisioning and account management system in iConnect and provide full support for account creation, provisioning, and deletion. Depending on the requirements of the security system provider, the iConnect APIs can be used to completely customize any aspect of the integrated security system backend operational system.

The integrated security system includes a gateway that supports the following standards-based interfaces, to name a few: Ethernet IP communications via Ethernet ports on the gateway, and standard XML/TCP/IP protocols and ports are employed over secured SSL sessions; USB 2.0 via ports on the gateway; 802.11b/g/n IP communications; GSM/GPRS RF WAN communications; CDMA 1×RTT RF WAN communications (optional, can also support EVDO and 3G technologies).

The gateway supports the following proprietary interfaces, to name a few: interfaces including Dialog RF network (319.5 MHz) and RS485 Superbus 2000 wired interface; RF mesh network (908 MHz); and interfaces including RF network (345 MHz) and RS485/RS232bus wired interfaces.

Regarding security for the IP communications (e.g., authentication, authorization, encryption, anti-spoofing, etc), the integrated security system uses SSL to encrypt all IP traffic, using server and client-certificates for authentication, as well as authentication in the data sent over the SSL-encrypted channel. For encryption, integrated security system issues public/private key pairs at the time/place of manufacture, and certificates are not stored in any online storage in an embodiment.

The integrated security system does not need any special rules at the customer premise and/or at the security system provider central station because the integrated security system makes outgoing connections using TCP over the standard HTTP and HTTPS ports. Provided outbound TCP connections are allowed then no special requirements on the firewalls are necessary.

Figure 1:
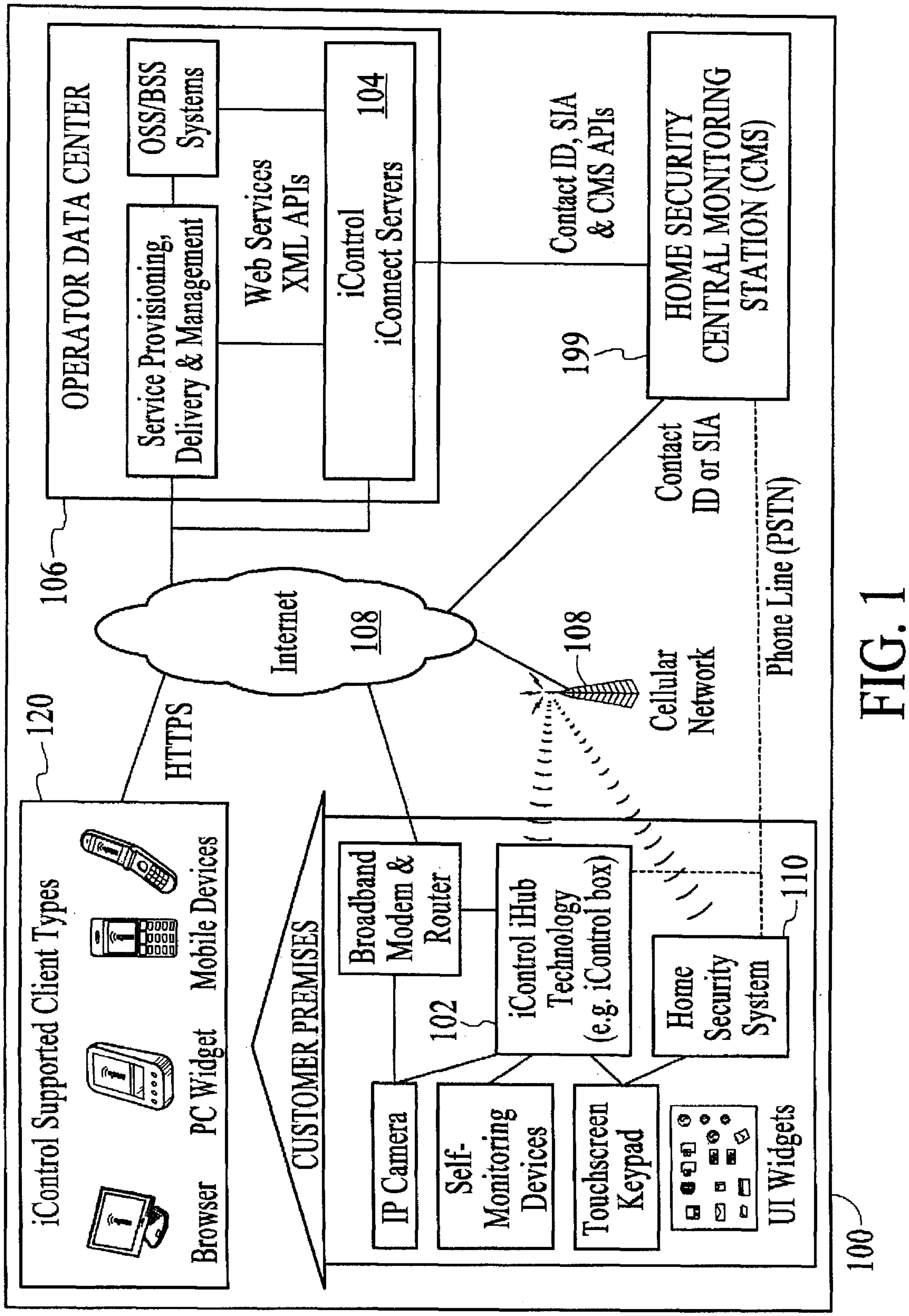
FIG. 1 is a block diagram of the integrated security system, under an embodiment.

FIG. 1 is a block diagram of the integrated security system 100, under an embodiment. The integrated security system 100 of an embodiment includes the gateway 102 and the security servers 104 coupled to the conventional home security system 110. At a customer's home or business, the gateway 102 connects and manages the diverse variety of home security and self-monitoring devices. The gateway 102 communicates with the iConnect Servers 104 located in the service provider's data center 106 (or hosted in integrated security system data center), with the communication taking place via a communication network 108 or other network (e.g., cellular network, interne, etc.). These servers 104 manage the system integrations necessary to deliver the integrated system service described herein. The combination of the gateway 102 and the iConnect servers 104 enable a wide variety of remote client devices 120 (e.g., PCs, mobile phones and PDAs) allowing users to remotely stay in touch with their home, business and family. In addition, the technology allows home security and self-monitoring information, as well as relevant third party content such as traffic and weather, to be presented in intuitive ways within the home, such as on advanced touchscreen keypads.

The integrated security system service (also referred to as iControl service) can be managed by a service provider via browser-based Maintenance and Service Management applications that are provided with the iConnect Servers. Or, if desired, the service can be more tightly integrated with existing OS SB SS and service delivery systems via the iConnect web services-based XML APIs.

The integrated security system service can also coordinate the sending of alarms to the home security Central Monitoring Station (CMS) 199. Alarms are passed to the CMS 199 using standard protocols such as Contact ID or SIA and can be generated from the home security panel location as well as by iConnect server 104 conditions (such as lack of communications with the integrated security system). In addition, the link between the security servers 104 and CMS 199 provides tighter integration between home security and self-monitoring devices and the gateway 102. Such integration enables advanced security capabilities such as the ability for CMS personnel to view photos taken at the time a burglary alarm was triggered. For maximum security, the gateway 102 and iConnect servers 104 support the use of a mobile network (both GPRS and CDMA options are available) as a backup to the primary broadband connection.

Figure 2:
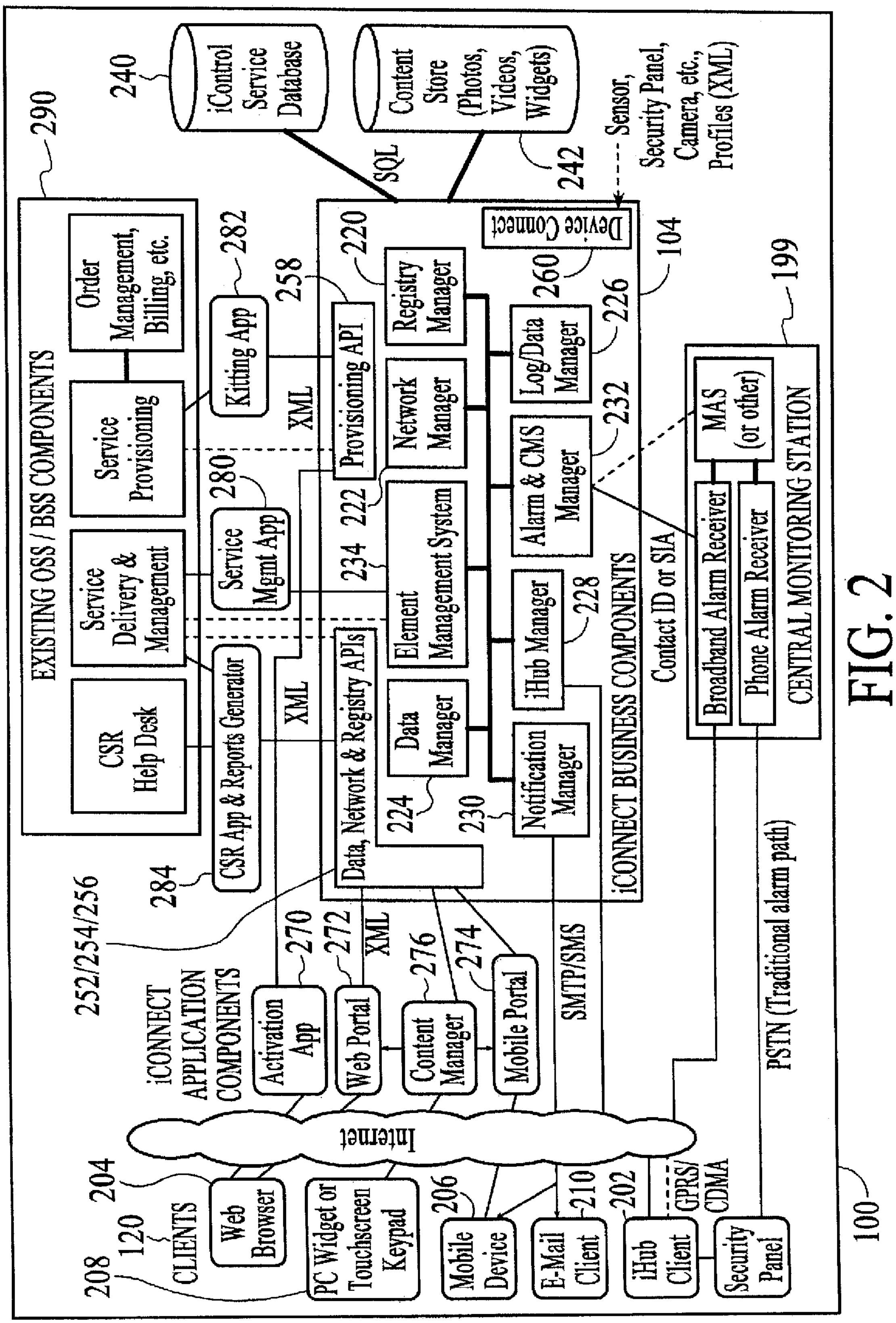
FIG. 2 is a block diagram of components of the integrated security system, under an embodiment.

The integrated security system service is delivered by hosted servers running software components that communicate with a variety of client types while interacting with other systems. FIG. 2 is a block diagram of components of the integrated security system 100, under an embodiment. Following is a more detailed description of the components.

The iConnect servers 104 support a diverse collection of clients 120 ranging from mobile devices, to PCs, to in-home security devices, to a service provider's internal systems. Most clients 120 are used by end-users, but there are also a number of clients 120 that are used to operate the service.

Clients 120 used by end-users of the integrated security system 100 include, but are not limited to, the following:

- Clients based on gateway client applications 202 (e.g., a processor-based device running the gateway technology that manages home security and automation devices).
- A web browser 204 accessing a Web Portal application, performing end-user configuration and customization of the integrated security system service as well as monitoring of in-home device status, viewing photos and video, etc. Device and user management can also be performed by this portal application.
- A mobile device 206 (e.g., PDA, mobile phone, etc.) accessing the integrated security system Mobile Portal. This type of client 206 is used by end-users to view system status and perform operations on devices (e.g., turning on a lamp, arming a security panel, etc.) rather than for system configuration tasks such as adding a new device or user.
- PC or browser-based "widget" containers 208 that present integrated security system service content, as well as other third-party content, in simple, targeted ways (e.g. a widget that resides on a PC desktop and shows live video from a single in-home camera). "Widget" as used herein means applications or programs in the system.

Touchscreen home security keypads 208 and advanced in-home devices that present a variety of content widgets via an intuitive touchscreen user interface.

Notification recipients 210 (e.g., cell phones that receive SMS-based notifications when certain events occur (or don't occur), email clients that receive an email message with similar information, etc.).

Custom-built clients (not shown) that access the iConnect web services XML API to interact with users' home security and self-monitoring information in new and unique ways. Such clients could include new types of mobile devices, or complex applications where integrated security system content is integrated into a broader set of application features.

In addition to the end-user clients, the iConnect servers 104 support PC browser-based Service Management clients that manage the ongoing operation of the overall service. These clients run applications that handle tasks such as provisioning, service monitoring, customer support and reporting.

There are numerous types of server components of the iConnect servers 104 of an embodiment including, but not limited to, the following: Business Components which manage information about all of the home security and self-monitoring devices; End-User Application Components which display that information for users and access the Business Components via published XML APIs; and Service Management Application Components which enable operators to administer the service (these components also access the Business Components via the XML APIs, and also via published SNMP MIBs).

The server components provide access to, and management of, the objects associated with an integrated security system installation. The top-level object is the "network." It is a location where a gateway 102 is located, and is also commonly referred to as a site or premises; the premises can include any type of structure (e.g., home, office, warehouse, etc.) at which a gateway 102 is located. Users can only access the networks to which they have been granted permission. Within a network, every object monitored by the gateway 102 is called a device. Devices include the sensors, cameras, home security panels and automation devices, as well as the controller or processor-based device running the gateway applications.

Various types of interactions are possible between the objects in a system. Automations define actions that occur as a result of a change in state of a device. For example, take a picture with the front entry camera when the front door sensor changes to "open". Notifications are messages sent to users to indicate that something has occurred, such as the front door going to "open" state, or has not occurred (referred to as an iWatch notification). Schedules define changes in device states that are to take place at predefined days and times. For example, set the security panel to "Armed" mode every weeknight at 11:00 pm.

The iConnect Business Components are responsible for orchestrating all of the low-level service management activities for the integrated security system service. They define all of the users and devices associated with a network (site), analyze how the devices interact, and trigger associated actions (such as sending notifications to users). All changes in device states are monitored and logged. The Business Components also manage all interactions with external systems as required, including sending alarms and other related self-monitoring data to the home security Central Monitoring System (CMS) 199. The Business Components are implemented as portable Java J2EE Servlets, but are not so limited.

The following iConnect Business Components manage the main elements of the integrated security system service, but the embodiment is not so limited:

- A Registry Manager 220 defines and manages users and networks. This component is responsible for the creation, modification and termination of users and networks. It is also where a user's access to networks is defined.
- A Network Manager 222 defines and manages security and self-monitoring devices that are deployed on a network (site). This component handles the creation, modification, deletion and configuration of the devices, as well as the creation of automations, schedules and notification rules associated with those devices.
- A Data Manager 224 manages access to current and logged state data for an existing network and its devices. This component specifically does not provide any access to network management capabilities, such as adding new devices to a network, which are handled exclusively by the Network Manager 222.
- To achieve optimal performance for all types of queries, data for current device states is stored separately from historical state data (a.k.a. "logs") in the database. A Log Data Manager 226 performs ongoing transfers of current device state data to the historical data log tables.

Additional iConnect Business Components handle direct communications with certain clients and other systems, for example:

- An iHub Manager 228 directly manages all communications with gateway clients, including receiving information about device state changes, changing the configuration of devices, and pushing new versions of the gateway client to the hardware it is running on.
- A Notification Manager 230 is responsible for sending all notifications to clients via SMS (mobile phone messages), email (via a relay server like an SMTP email server), etc.
- An Alarm and CMS Manager 232 sends critical server-generated alarm events to the home security Central Monitoring Station (CMS) and manages all other communications of integrated security system service data to and from the CMS.
- The Element Management System (EMS) 234 is an iControl Business Component that manages all activities associated with service installation, scaling and monitoring, and filters and packages service operations data for use by service management applications. The SNMP MIBs published by the EMS can also be incorporated into any third party monitoring system if desired.

The iConnect Business Components store information about the objects that they manage in the iControl Service Database 240 and in the iControl Content Store 242. The iControl Content Store is used to store media objects like video, photos and widget content, while the Service Database stores information about users, networks, and devices. Database interaction is performed via a JDBC interface. For security purposes, the Business Components manage all data storage and retrieval.

The iControl Business Components provide web services-based APIs that application components use to access the Business Components' capabilities. Functions of application components include presenting integrated security system service data to end-users, performing administrative duties, and integrating with external systems and back-office applications.

The primary published APIs for the iConnect Business Components include, but are not limited to, the following:

- A Registry Manager API 252 provides access to the Registry Manager Business Component's functionality, allowing management of networks and users.
- A Network Manager API 254 provides access to the Network Manager Business Component's functionality, allowing management of devices on a network.
- A Data Manager API 256 provides access to the Data Manager Business Component's functionality, such as setting and retrieving (current and historical) data about device states.
- A Provisioning API 258 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The iConnect Business Components also have an XML-based interface 260 for quickly adding support for new devices to the integrated security system. This interface 260, referred to as DeviceConnect 260, is a flexible, standards-based mechanism for defining the properties of new devices and how they can be managed. Although the format is flexible enough to allow the addition of any type of future device, pre-defined XML profiles are currently available for adding common types of devices such as sensors (SensorConnect), home security panels (PanelConnect) and IP cameras (CameraConnect).

The iConnect End-User Application Components deliver the user interfaces that run on the different types of clients supported by the integrated security system service. The components are written in portable Java J2EE technology (e.g., as Java Servlets, as JavaServer Pages (JSPs), etc.) and they all interact with the iControl Business Components via the published APIs.

The following End-User Application Components generate CSS-based HTML/JavaScript that is displayed on the target client. These applications can be dynamically branded with partner-specific logos and URL links (such as Customer Support, etc.). The End-User Application Components of an embodiment include, but are not limited to, the following:

- An iControl Activation Application 270 that delivers the first application that a user sees when they set up the integrated security system service. This wizard-based web browser application securely associates a new user with a purchased gateway and the other devices included with it as a kit (if any). It primarily uses functionality published by the Provisioning API.
- An iControl Web Portal Application 272 runs on PC browsers and delivers the web-based interface to the integrated security system service. This application allows users to manage their networks (e.g. add devices and create automations) as well as to view/change device states, and manage pictures and videos. Because of the wide scope of capabilities of this application, it uses three different Business Component APIs that include the Registry Manager API, Network Manager API, and Data Manager API, but the embodiment is not so limited.
- An iControl Mobile Portal 274 is a small-footprint web-based interface that runs on mobile phones and PDAs. This interface is optimized for remote viewing of device states and pictures/videos rather than network management. As such, its interaction with the Business Components is primarily via the Data Manager API.
- Custom portals and targeted client applications can be provided that leverage the same Business Component APIs used by the above applications.
- A Content Manager Application Component 276 delivers content to a variety of clients. It sends multimedia-rich user interface components to widget container clients (both PC and browser-based), as well as to advanced touchscreen keypad clients. In addition to providing content directly to end-user devices, the Content Manager 276 provides widget-based user interface components to satisfy requests from other Application Components such as the iControl Web 272 and Mobile 274 portals.

A number of Application Components are responsible for overall management of the service. These pre-defined applications, referred to as Service Management Application Components, are configured to offer off-the-shelf solutions for production management of the integrated security system service including provisioning, overall service monitoring, customer support, and reporting, for example. The Service Management Application Components of an embodiment include, but are not limited to, the following:

- A Service Management Application 280 allows service administrators to perform activities associated with service installation, scaling and monitoring/alerting. This application interacts heavily with the Element Management System (EMS) Business Component to execute its functionality, and also retrieves its monitoring data from that component via protocols such as SNMP MIBs.
- A Kitting Application 282 is used by employees performing service provisioning tasks. This application allows home security and self-monitoring devices to be associated with gateways during the warehouse kitting process.
- A CSR Application and Report Generator 284 is used by personnel supporting the integrated security system service, such as CSRs resolving end-user issues and employees enquiring about overall service usage. Pushes of new gateway firmware to deployed gateways is also managed by this application.

The iConnect servers 104 also support custom-built integrations with a service provider's existing OSS/BSS, CSR and service delivery systems 290. Such systems can access the iConnect web services XML API to transfer data to and from the iConnect servers 104. These types of integrations can compliment or replace the PC browser-based Service Management applications, depending on service provider needs.

As described above, the integrated security system of an embodiment includes a gateway, or iHub. The gateway of an embodiment includes a device that is deployed in the home or business and couples or connects the various third-party cameras, home security panels, sensors and devices to the iConnect server over a WAN connection as described in detail herein. The gateway couples to the home network and communicates directly with the home security panel in both wired and wireless sensor installations. The gateway is configured to be low-cost, reliable and thin so that it complements the integrated security system network-based architecture.

The gateway supports various wireless protocols and can interconnect with a wide range of home security control panels. Service providers and users can then extend the system's capabilities by adding IP cameras, lighting modules and additional security devices. The gateway is configurable to be integrated into many consumer appliances, including set-top boxes, routers and security panels. The small and efficient footprint of the gateway enables this portability and versatility, thereby simplifying and reducing the overall cost of the deployment.

Figure 3:
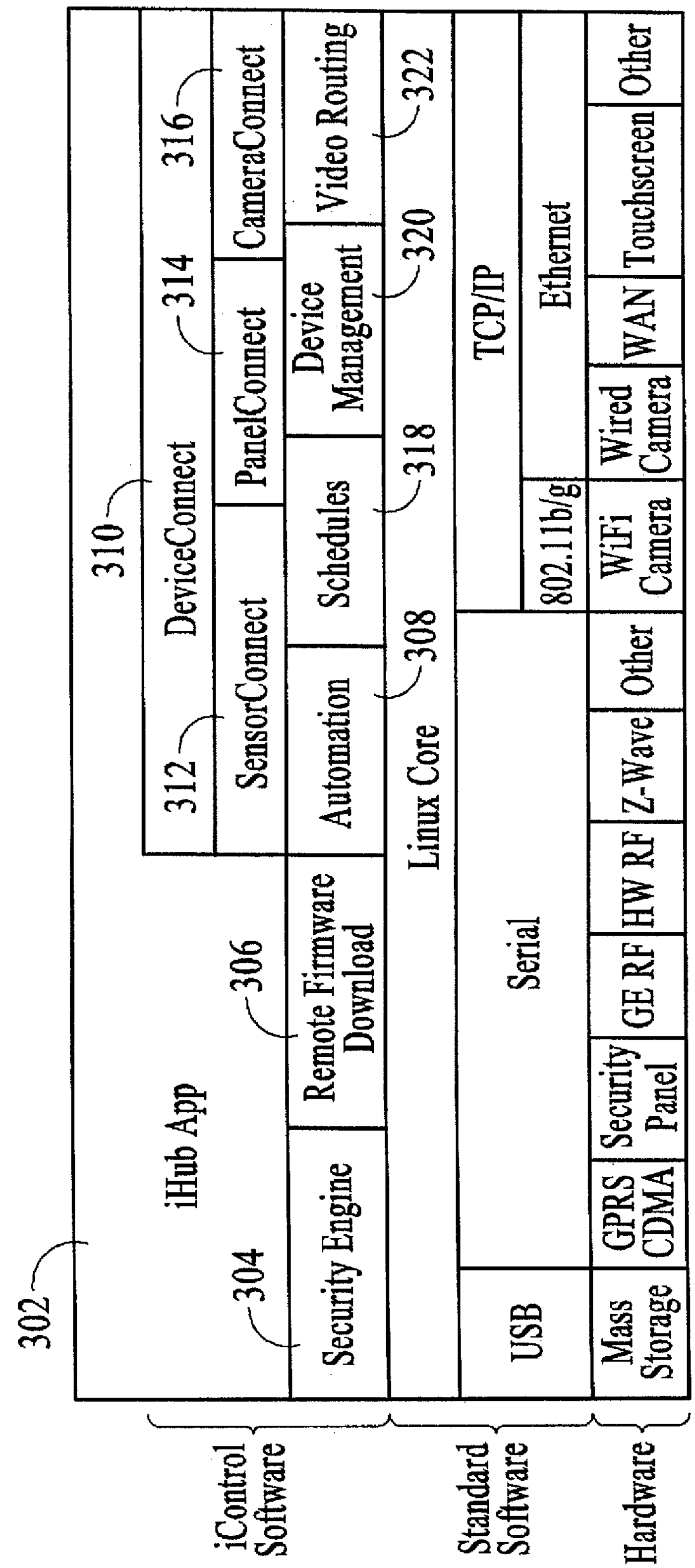
FIG. 3 is a block diagram of the gateway software or applications, under an embodiment.

FIG. 3 is a block diagram of the gateway 102 including gateway software or applications, under an embodiment. The gateway software architecture is relatively thin and efficient, thereby simplifying its integration into other consumer appliances such as set-top boxes, routers, touch screens and security panels. The software architecture also provides a high degree of security against unauthorized access. This section describes the various key components of the gateway software architecture.

The gateway application layer 302 is the main program that orchestrates the operations performed by the gateway. The Security Engine 304 provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

- Encryption including 128-bit SSL encryption for gateway and iConnect server communication to protect user data privacy and provide secure communication.
- Bi-directional authentication between the gateway and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The gateway provides for 128-bit SSL encapsulation of the user picture and video data sent over the internet for complete user security and privacy.

802.11b/g/n with WPA-2 security to ensure that wireless camera communications always takes place using the strongest available protection.

A gateway-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying gateway-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Gateway firmware can be remotely download either for one gateway at a time, a group of gateways, or in batches.

The Automations engine 308 manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application. The Schedules Engine 318 then interfaces with SensorConnect 312 to ensure that scheduled events occur at precisely the desired time.

The Device Management module 320 is in charge of all discovery, installation and configuration of both wired and wireless IP devices (e.g., cameras, etc.) coupled or connected to the system. Networked IP devices, such as those used in the integrated security system, require user configuration of many IP and security parameters—to simplify the user experience and reduce the customer support burden, the device management module of an embodiment handles the details of this configuration. The device management module also manages the video routing module described below.

The video routing engine 322 is responsible for delivering seamless video streams to the user with zero-configuration. Through a multi-step, staged approach the video routing engine uses a combination of UPnP port-forwarding, relay server routing and STUN/TURN peer-to-peer routing.

Figure 4:
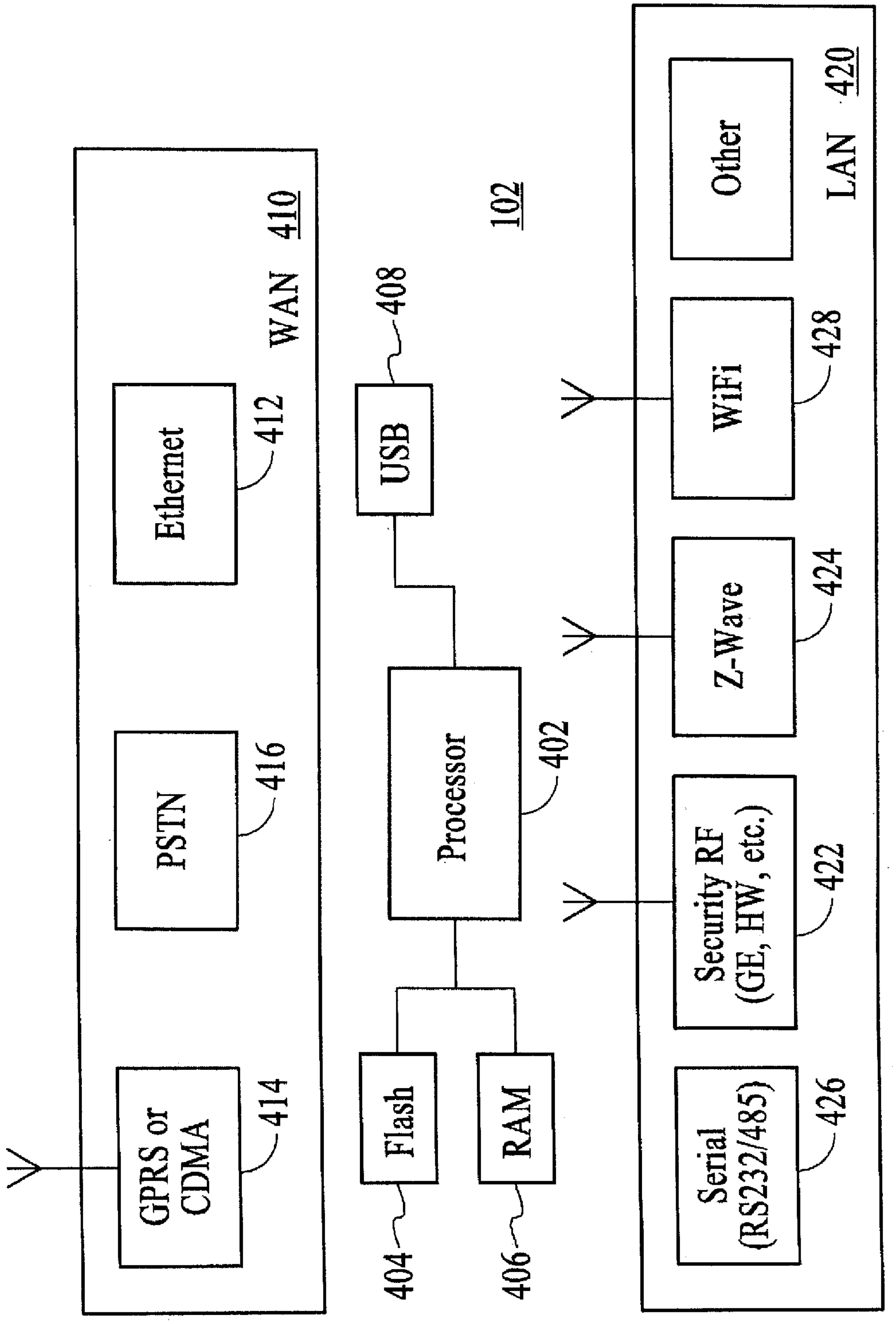
FIG. 4 is a block diagram of the gateway components, under an embodiment.

FIG. 4 is a block diagram of components of the gateway 102, under an embodiment. Depending on the specific set of functionality desired by the service provider deploying the integrated security system service, the gateway 102 can use any of a number of processors 402, due to the small footprint of the gateway application firmware. In an embodiment, the gateway could include the Broadcom BCM5354 as the processor for example. In addition, the gateway 102 includes memory (e.g., FLASH 404, RAM 406, etc.) and any number of input/output (I/O) ports 408.

Referring to the WAN portion 410 of the gateway 102, the gateway 102 of an embodiment can communicate with the iConnect server using a number of communication types and/or protocols, for example Broadband 412, GPRS 414 and/or Public Switched Telephone Network (PTSN) 416 to name a few. In general, broadband communication 412 is the primary means of connection between the gateway 102 and the iConnect server 104 and the GPRS/CDMA 414 and/or PSTN 416 interfaces acts as back-up for fault tolerance in case the user's broadband connection fails for whatever reason, but the embodiment is not so limited.

Referring to the LAN portion 420 of the gateway 102, various protocols and physical transceivers can be used to communicate to off-the-shelf sensors and cameras.

The gateway 102 is protocol-agnostic and technology-agnostic and as such can easily support almost any device networking protocol. The gateway 102 can, for example, support GE and Honeywell security RF protocols 422, Z-Wave 424, serial (RS232 and RS485) 426 for direct connection to security panels as well as WiFi 428 (802.11b/g) for communication to WiFi cameras.

The system of an embodiment uses or includes a system user interface (SUI) that provides an iconic, at-a-glance representation of security system status. The SUI is for use across all client types as described above with reference to FIG. 1. The SUI includes a number of display elements that are presented across all types of client devices used to monitor status of the security system. The clients of an embodiment include, but are not limited to, the iPhone®, the iPad®, a mobile portal, a web portal, and a touchscreen. The display elements of the SUI of an embodiment include, but are not limited to, an orb icon, text summary, security button, device and system warnings, interesting sensors, and quiet sensors, as described in detail below. The SUI thus provides system status summary information (e.g., security and sensors) uniformly across all clients. Additionally, the SUI provides consistent iconography, terminology, and display rules across all clients as well as consistent sensor and system detail across clients.

Following is a description of the various states of the iControl sensors, and how these states are indicated uniformly across all clients using the SUI and other sensor information displays such as sensor lists and timelines.

Figure 5A:
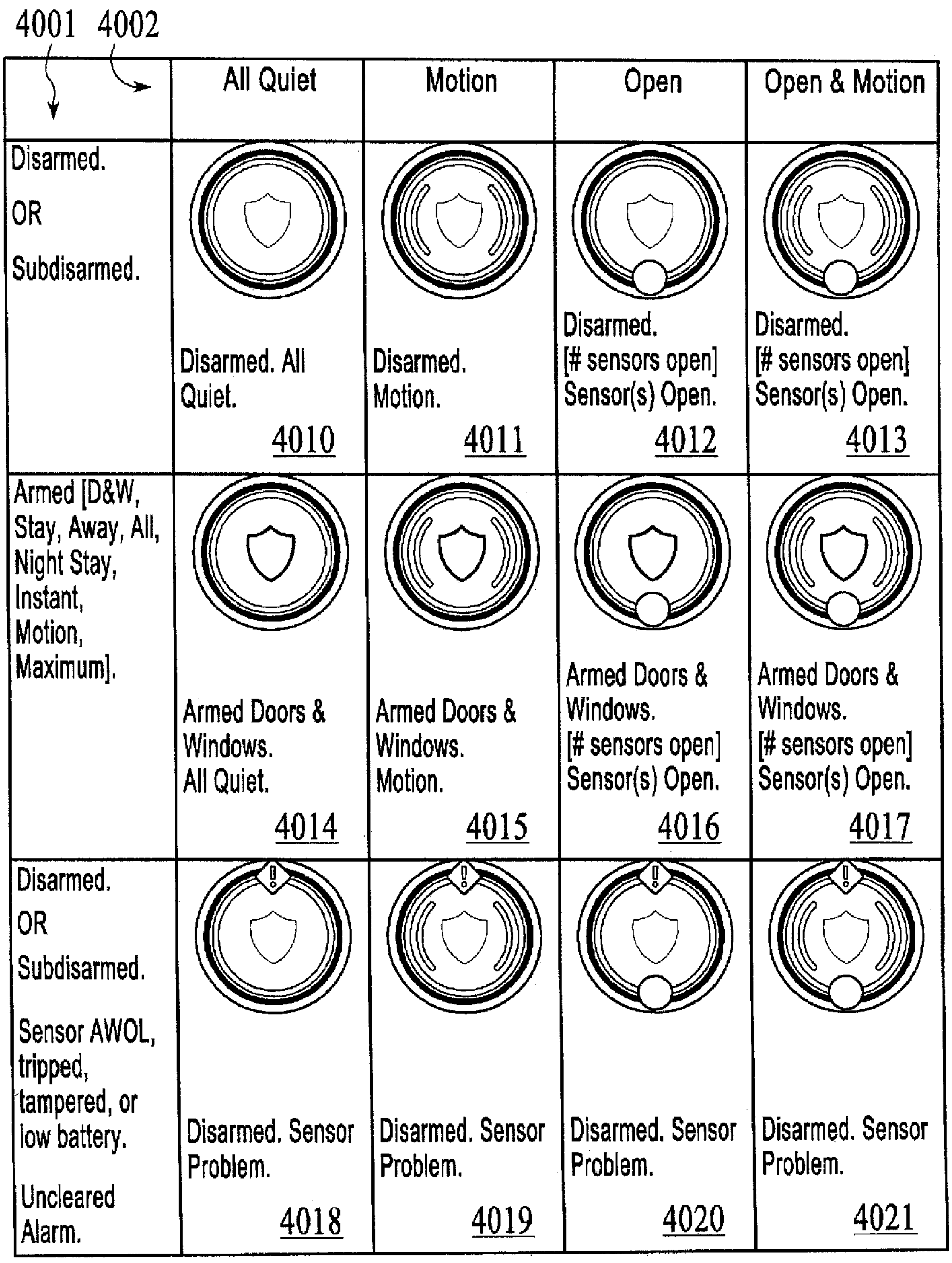
FIG. 5 (collectively FIGS. 5A and 5B) shows the orb icon and corresponding text summary display elements, under an embodiment.
Figure 5B:
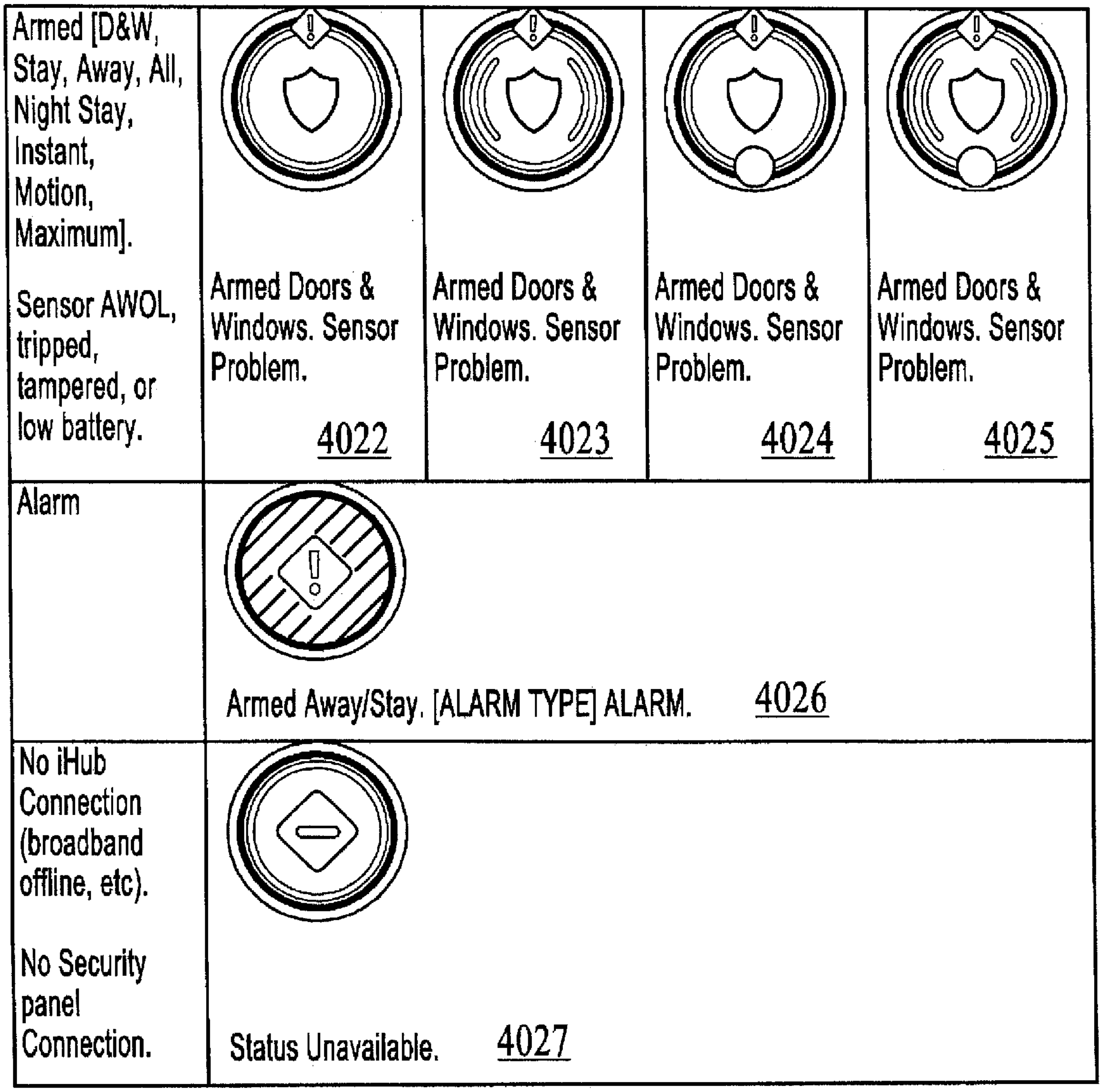

Regarding the display elements of the SUI, the orb icon visually indicates the current arm state and sensor status of a single site. FIG. 5 (collectively FIGS. 5A and 5B) shows the orb icon and corresponding text summary display elements, under an embodiment. Across all clients, when sensor detail is shown in a list or timeline, state is indicated using the proper icon, text summary and grouping. The orb icons and text summary elements of an embodiment generally represent system state 4001 to include the following states: "Disarmed" or "Subdisarmed; "Armed (Doors and Windows, Stay, Away, All, Night Stay, Instant, Motion, Maximum)"; "Disarmed", or "Subdisarmed" (sensor absent; sensor tripped; sensor tampered; low battery; uncleared alarm); "Armed (Doors and Windows, Stay, Away, All, Night Stay, Instant, Motion, Maximum)" (sensor absent; sensor tripped; sensor tampered; low battery); "Alarm"; and "No iHub Connection" (broadband offline, etc.) (no security panel connection). In addition to representing system state, the orb icons and text summary elements of an embodiment generally represent system status 4002 to include the following status: "All Quiet"; "Motion"; "Open"; "Open & Motion".

Using various combinations of system state 4001 and status 4002, the orb icons of an embodiment indicate or represent numerous system states.

When the system state 4001 is "Disarmed" or "Subdisarmed", the orb icons of an embodiment indicate or represent status 4002 as follows: Disarmed (status: all quiet) 4010 (e.g., icon color is green); Disarmed (status: motion) 4011 (e.g., icon color is green); Disarmed, (number of sensors open) Sensor(s) Open (status: open) 4012 (e.g., icon color is green, bottom region for sensor number is yellow); Disarmed, (number of sensors open) Sensor(s) Open (status: open and motion) 4013 (e.g., icon color is green, bottom region for sensor number is yellow).

When the system state 4001 is "Armed (Doors and Windows, Stay, Away, All, Night Stay, Instant, Motion, Maximum)", the orb icons of an embodiment indicate or represent status 4002 as follows: Armed Doors & Windows (status: all quiet) 4014 (e.g., icon color is red); Armed Doors & Windows (status: motion) 4015 (e.g., icon color is red); Armed Doors & Windows, (number of sensors open) Sensor(s) Open (status: open) 4016 (e.g., icon color is red, bottom region for sensor number is yellow); Armed Doors & Windows, (number of sensors open) Sensor(s) Open (status: open and motion) 4017 (e.g., icon color is red, bottom region for sensor number is yellow).

When the system state 4001 is "Disarmed", or "Subdisarmed" (sensor absent; sensor tripped; sensor tampered; low battery; uncleared alarm), the orb icons of an embodiment indicate or represent status 4002 as follows: Disarmed, sensor problem (status: all quiet) 4018 (e.g., icon color is green, badge in top region with "!" symbol is red); Disarmed, sensor problem (status: motion) 4019 (e.g., icon color is green, badge in top region with "!" symbol is red); Disarmed, sensor problem (status: open) 4020 (e.g., icon color is green, badge in top region with "!" symbol is red, bottom region for sensor number is yellow); Disarmed, sensor problem (status: open and motion) 4021 (e.g., icon color is green, badge in top region with "!" symbol is red, bottom region for sensor number is yellow).

When the system state 4001 is "Armed (Doors and Windows, Stay, Away, All, Night Stay, Instant, Motion, Maximum)" (sensor absent; sensor tripped; sensor tampered; low battery), the orb icons of an embodiment indicate or represent status 4002 as follows: Armed Doors & Windows, sensor problem (status: all quiet) 4022 (e.g., icon color is red, badge in top region with "!" symbol is red); Armed Doors & Windows, sensor problem (status: motion) 4023 (e.g., icon color is red, badge in top region with "!" symbol is red); Armed Doors & Windows, sensor problem (status: open) 4024 (e.g., icon color is red, badge in top region with "!" symbol is red, bottom region for sensor number is yellow); Armed Doors & Windows, sensor problem (status: open & motion) 4025 (e.g., icon color is red, badge in top region with "!" symbol is red, bottom region for sensor number is yellow).

When the system state 4001 is "Alarm", the orb icons of an embodiment indicate or represent status 4002 as follows: Armed Away/Stay, (alarm type) ALARM 4026 (e.g., icon color is red).

When the system state 4001 is "No iHub Connection" (broadband offline, etc.) (no security panel connection), the orb icons of an embodiment indicate or represent status 4002 as follows: Status Unavailable 4027 (e.g., icon color is grey).

When the client of an embodiment is a touchscreen, a mini orb is presented at the bottom of the touch screen in all widgets and settings screens. The mini orb is green when the security panel is disarmed, and it is red when the security panel is armed, but is not so limited. The form factor of the mini orb, and the text corresponding to the mini orb, is the same or similar to that described above as corresponding to the orb icon on the home screen.

The orb icons of an embodiment include motion indicators that animate to indicate motion detected by a corresponding sensor or detector. Furthermore, the orb icons of an embodiment show an animation during the exit delay when arming the security system and, additionally, indicate a countdown time showing the time remaining before the security system is fully armed. Moreover, selection of the orb of an embodiment causes additional information (e.g., list of sensors, etc.) of the security system and/or premise to be displayed.

The text summary display element of the SUI includes or displays information including a direct description of the current state of the security system to support the visual appearance of the orb icon. In an embodiment, two phrases are shown, including a first phrase for security state and a second phrase for sensor status (e.g., "Armed Stay. All Quiet"), as described herein. FIG. 6 is a table of security state and the corresponding sensor status displayed on the SUI, under an embodiment. The possible values for the text summary are (in priority order): Status Unavailable; if the security panel and control box are online and there are no current alarms, the text summary section is a combination of one phrase from each of the security state 4030 and the sensor status 4032. The security state 4030 of an embodiment is selected from among the following, but is not so limited: Armed Doors & Windows; Armed All; Armed Stay; Armed Away; Disarmed; Armed Maximum; Armed Night Stay; Armed Stay Instant; Armed Away Instant; Armed Motion; Subdisarmed. The sensor status 4032 of an embodiment is selected from among the following, but is not so limited: Uncleared Alarm; Sensor Tripped; Sensor Problem; Sensor(s) Bypassed; Motion; All Quiet; (number of sensors open) Sensor(s) Open.

The display elements of the SUI also include security buttons. The security buttons are used to control or arm/disarm the security panel. A single arm button (e.g., button labeled "Arm") can be used on the SUI of a first client device type (e.g., Touchscreen, iPhone®, etc.). Two different buttons (e.g., buttons labeled "Arm Away/Arm Stay" or "Arm All/Doors and Windows") can be used on the SUI of a second client device type (e.g., web portal, mobile portal, etc.). In either embodiment, when the system is armed, the arm button (e.g., "Arm", "Arm Stay" and "Arm Away") label will change to a "Disarm" label. If the system is in the process of arming, the button is disabled.

The display elements of the SUI include system and device warnings, as described above. The system and device warning are informational warnings that are not associated with specific sensors, and involve more detail than can be displayed in the text summary display element. FIG. 7 is a table of system state and the corresponding icons and warning text displayed as system warnings on the SUI, under an embodiment. Where an icon is displayed, an embodiment uses a red color for the icon, but it is not so limited. The system states/warnings of an embodiment include, but are not limited to, the following: primary connection is broadband, broadband is down, cellular is being used/using cellular connection; primary connection is broadband, broadband and cellular are down/no cellular connection; primary connection is broadband, broadband is down, no cellular backup installed/broadband connection unknown; primary connection is cellular, cellular is down/no cellular connection; security panel not connected to AC power/security panel AC power loss; security panel low battery/security panel low battery; security panel tampered/security panel tampered; sensor(s) bypassed/sensor bypassed.

The device warnings of an embodiment include, but are not limited to, the following: camera(s) offline; light(s) offline; thermostat(s) offline. The device and system warnings may be combined into one box, or indicated separately in respective regions or portions of the SUI, depending on a type of the client device (e.g., combined into one box on a web portal or a mobile portal, but indicated in separate boxes on a Touchscreen or iPhone® device).

The device and system warnings display element is cumulative (e.g., built up in a list), but is not so limited. On the web and mobile portals the system and device warnings of an embodiment are combined into one area, but are not so limited. On the touchscreen device and mobile phone (e.g., iPhone®), device warnings are indicated separately so that, in an embodiment, the iPhone® tab bar and the touchscreen home screen indicate device warnings with icon badges, and system warnings are placed on the sensors screen.

The list of all sensors includes, but is not limited to, door/window sensors, motion detectors, smoke, flood, fire, glass break, etc. The list of all sensors of an embodiment does not include cameras or locks, or non-security related devices such as lights, thermostats, energy, water etc. The list of sensors is split into groups that, in an embodiment, include interesting sensors as a first group, and quiet sensors as a second group. The interesting sensor group is positioned above or sorted to the top portion of the sensor list and the quiet sensors are sorted to the bottom portion of the sensor list. Any sensor that is triggered (e.g. open, motion, etc.) is categorized as an interesting sensor and placed in the interesting sensor group and list. Additionally, other sensor states such as tampered, tripped, absent, installing, low battery, or bypassed make a sensor "interesting" regardless of their state.

FIG. 8 is a table of sensor state/sort order and the corresponding icon, sensor name and status text of the SUI, under an embodiment. Generally, the list of interesting sensors is sorted according to the following categories: motion; open/tripped; tampered; low battery; offline; installing; bypassed. Sensors are sorted alphabetically by sensor name within each category or interest type when multiple interesting sensors have the same state. The sensor state/sort order of an embodiment includes, but is not limited to, the following: breached & any sensor state (e.g., red icon) (interesting sensor); tripped (smoke, water, gas, freeze, etc.) (e.g., red icon) (interesting sensor); tampered (e.g., red icon) (interesting sensor); low battery (e.g., red icon) (interesting sensor); offline/AWOL (e.g., red icon) (interesting sensor); unknown (if the iHub or Security Panel is offline, all sensors have a grey diamond icon and "Unknown" for the status text) (e.g., grey icon) (interesting sensor); installing (e.g., grey icon) (interesting sensor); open (e.g., yellow icon) (interesting sensor); motion (e.g., yellow icon) (interesting sensor); bypassed (e.g., yellow or green icon) (interesting sensor); okay, closed, no motion (e.g., green icon) (quiet sensor).

The interesting sensors are shown or displayed with an icon. FIG. 9 shows icons of the interesting sensors, under an embodiment. A red diamond bang icon represents tamper, offline, bypassed, installing, and/or battery. A yellow triangle icon represents open or triggered. A wavy lines icon represents motion. It is possible for an interesting sensor to have a green/closed icon (e.g., any quiet sensor that has been bypassed).

Following the state icon and the sensor name an embodiment displays status text. The status of an embodiment includes, but is not limited to, the following: ALARM, (sensor state); tripped; tampered, (sensor state); low battery, (sensor state); offline; unknown; installing; bypassed, (sensor state). If a sensor is offline or tampered, it will show that text; otherwise the status text will show the tripped state: open, motion, tripped, etc. In addition, if a sensor is bypassed its state is "Bypassed, (sensor state)". For example, a bypassed motion sensor that has recently detected motion would have the status: "Motion, bypassed". If a sensor has a low battery its state does not change, but it still joins the interesting sensors group.

The quiet sensors include the remaining sensors that are not currently active, and so are not categorized as interesting sensors. Quiet sensor states of an embodiment include closed, no motion or otherwise not tripped or faulted. FIG. 10 shows the quiet sensor icon, under an embodiment. A green circle icon is a quiet sensor icon in an embodiment, and represents closed/no motion/okay/quiet. In addition to the state icon and sensor name, each quiet sensor shows status text as follows: if a door/window sensor is closed its state is "closed"; if a motion sensor has not recently detected motion then its state is "no motion"; other sensors, such as a smoke detector, indicate "quiet" or "okay". Quiet sensors are listed alphabetically.

Figure 11:
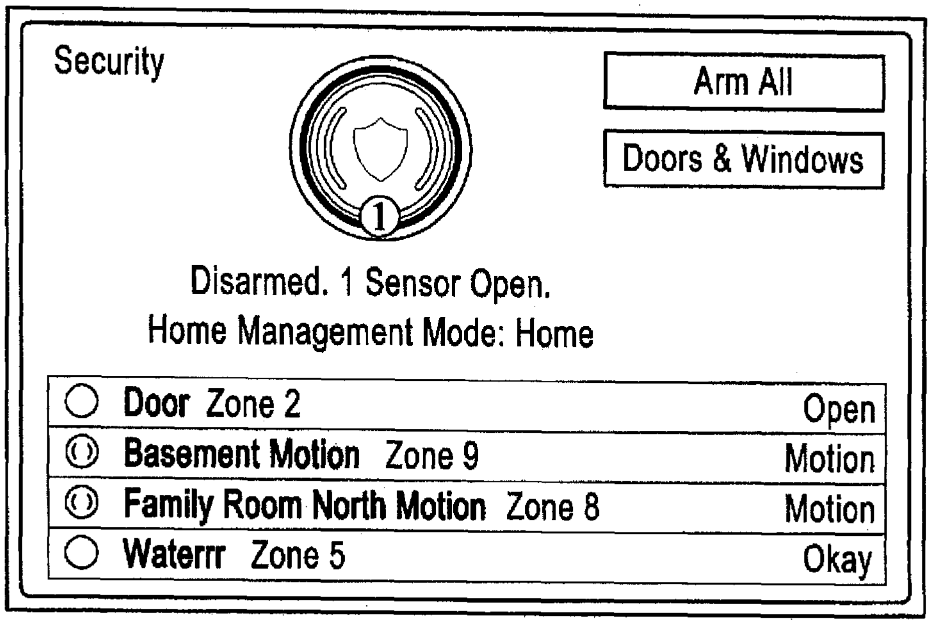
FIG. 11 is an example Home Management Mode (HMM) screen presented via the web portal SUI, under an embodiment.

The SUI of an embodiment includes control icons for a Home Management Mode (HMM). If the user deselects the "Set home management modes automatically" setting via the web portal, then the Home Management Mode (HMM) screen will appear in the web and mobile Portals. FIG. 11 is an example Home Management Mode (HMM) screen presented via the web portal SUI, under an embodiment. The MINI screen includes an orb icon and corresponding text summary display elements, along with security buttons that control or arm/disarm the security panel. Furthermore, the HMM screen includes sensor status information (e.g., "Door", status is "open", icon is yellow; "Basement Motion", status is "motion", icon is yellow; "Family Room North Motion", status is "motion", icon is yellow; "Water", status is "okay", icon is green).

Figure 12:
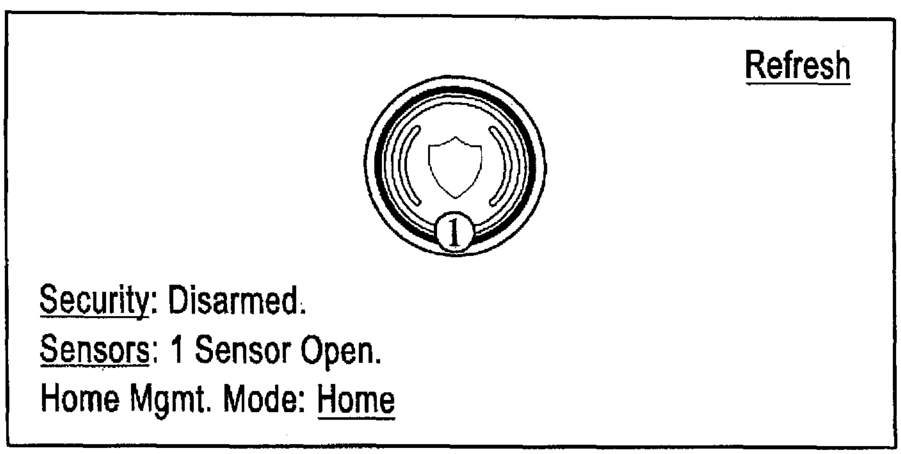
FIG. 12 is an example Home Management Mode (HMM) screen presented via the mobile portal SUI, under an embodiment.

FIG. 12 is an example Home Management Mode (MINI) screen presented via the mobile portal SUI, under an embodiment. The HMM screen of the mobile portal includes an orb icon and corresponding text summary display elements, along with security buttons that control or arm/disarm the security panel.

The SUI of an embodiment is supported on numerous client types, for example, mobile telephones (e.g., iPhone®, etc.), client access via mobile portal, client access via web portal, and touchscreen to name a few. All clients types supported in an embodiment have the same status related sections, but their locations change slightly depending on the client. The status related sections of an embodiment include the following: orb; arm state/sensor summary; change mode; device summary and system warnings; interesting sensors; and quiet sensors.

Figure 13:
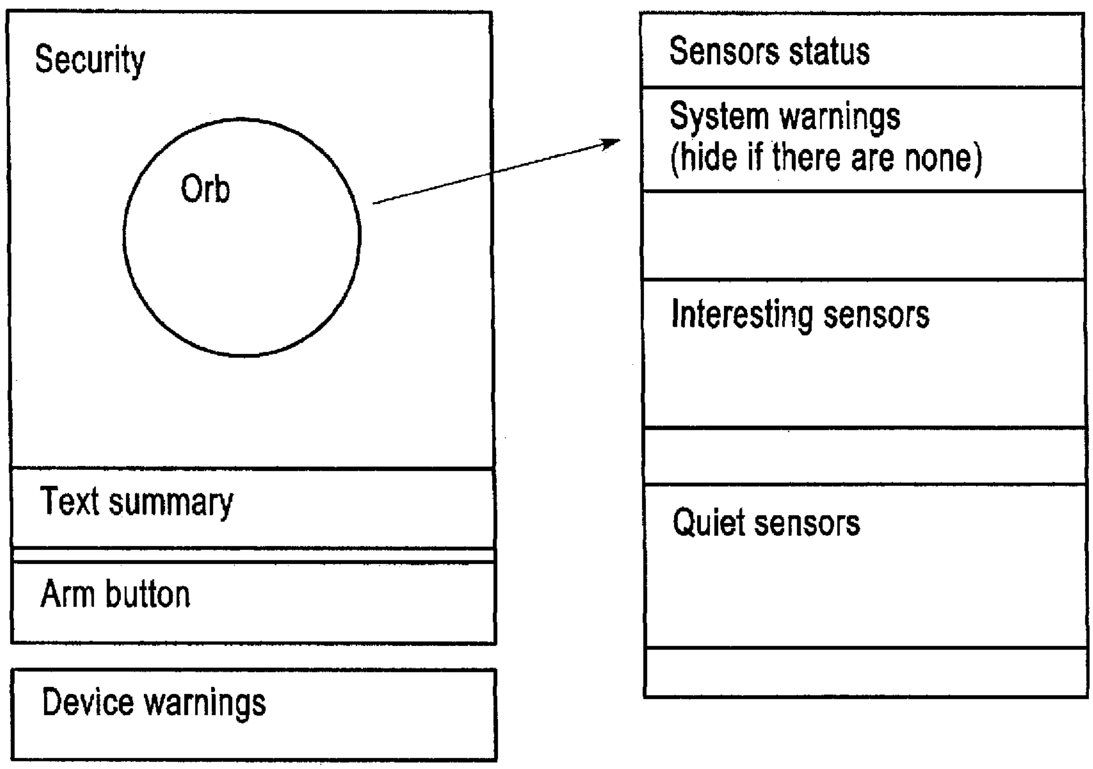
FIG. 13 is a block diagram of an iPhone® client device SUI, under an embodiment.
Figure 14:
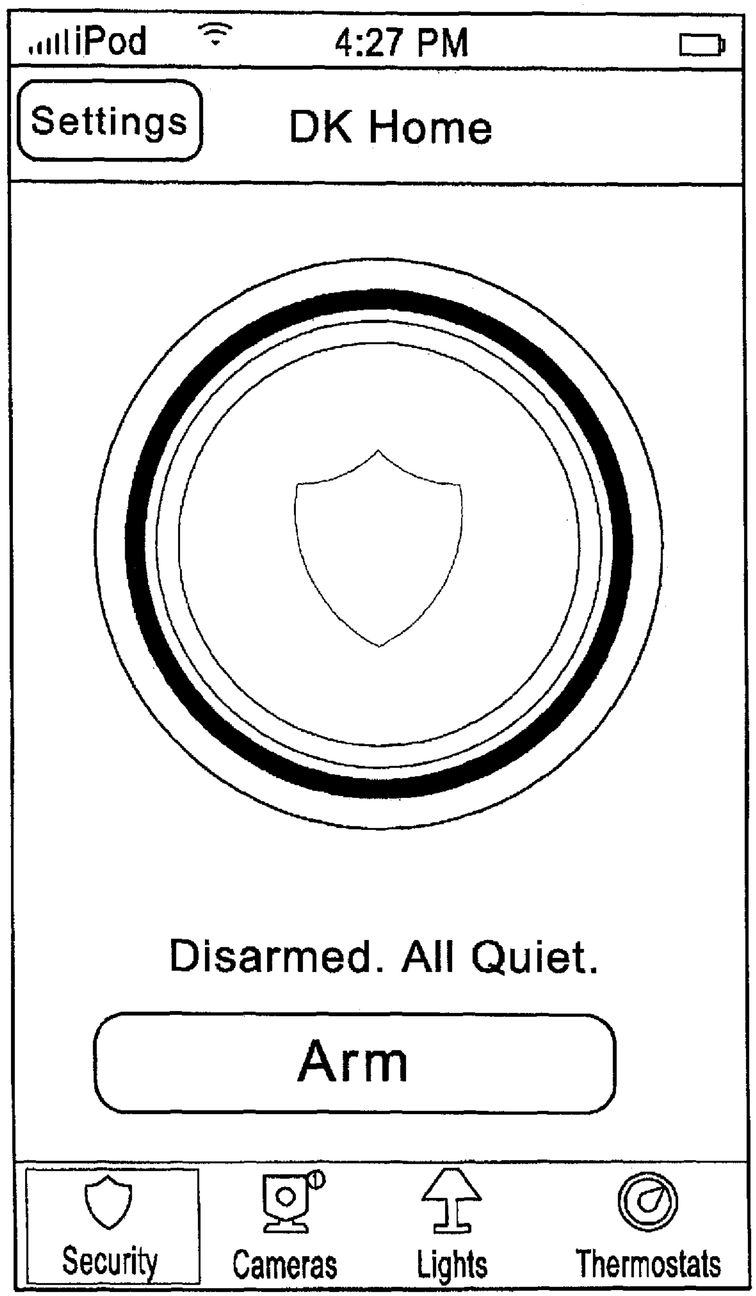
FIG. 14 is a first example iPhone® client device SUI, under an embodiment.

FIG. 13 is a block diagram of an iPhone® client device SUI, under an embodiment. The client interface of the iPhone®, as one example client, has the orb on the security page. The text summary is below the orb. The security button (e.g., arm, disarm, etc.) is below the text summary. A tab bar is presented at the bottom of the screen. The SUI of an embodiment represents device warnings by the icons in the bottom horizontal tab bar. If a camera, light, lock, or thermostat is offline then a red circle will badge the corresponding icon in the tab bar. The number of offline devices is shown in the badge. FIG. 14 is a first example iPhone® client device SUI, under an embodiment. In this first example screenshot, the security page indicates one camera is offline, as indicated by the "1" in a "circle" badge displayed corresponding to the "camera" icon in the tab bar.

Figure 15:
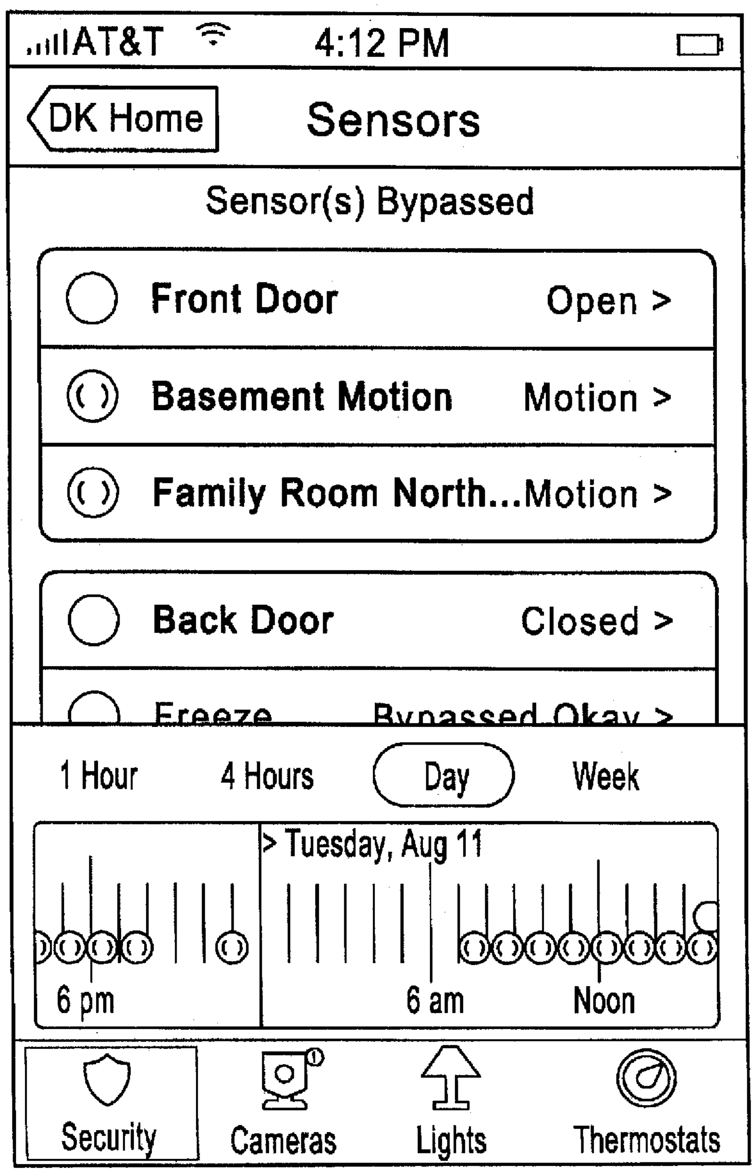
FIG. 15 is a second example iPhone® client device SUI, under an embodiment.

System warnings appear as a group in an area (e.g., yellow area) at the top of the sensor status screen. This area at the top of the sensor status screen appears only when there is a device or system warning; otherwise, it is not presented. Multiple messages appear as a vertical list with one message on each line. The yellow bar will grow in length to fit additional messages. If there are no system warnings then the interesting sensors group is at the top of the sensor status screen. Interesting sensors are presented below system warnings. Quiet sensors are presented below interesting sensors. FIG. 15 is a second example iPhone® client device SUI, under an embodiment. In this second example screenshot, the sensor status page indicates at least one sensor is bypassed, as indicated by the "Sensor(s) bypassed" message displayed at the top of the sensor status screen.

Figure 16:
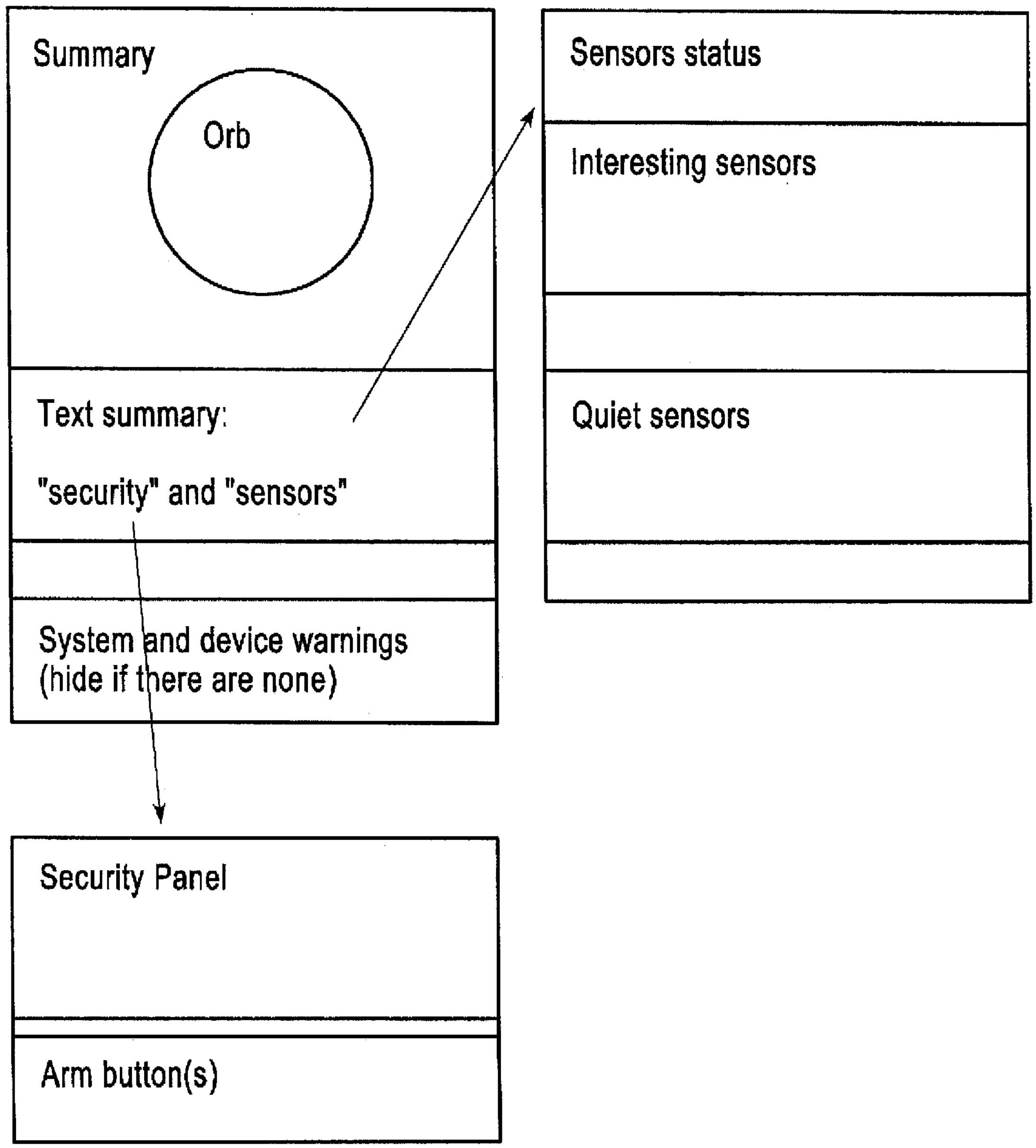
FIG. 16 is a block diagram of a mobile portal client device SUI, under an embodiment.

FIG. 16 is a block diagram of a mobile portal client device SUI, under an embodiment. The mobile portal of an embodiment comprises three (3) pages or screens presented to the client, including a summary page ("summary"), a security panel page ("security panel"), and a sensor status page ("sensors status"), but the embodiment is not so limited. The client interface of the mobile portal, as one example client, has the orb at the top of the summary page below the site name. The text summary is below the orb. The security buttons (e.g., arm, disarm, etc.) (plural on mobile portal) are on the security panel page (accessible via the "Security" link on the summary page). Device and system warnings are presented in an area (e.g., yellow area) below the text summary; in an embodiment this area is presented only when device or system warnings are present. Interesting sensors presented are at the top of the sensor status page. Quiet sensors are presented below interesting sensors on the sensor status page.

Figure 17:
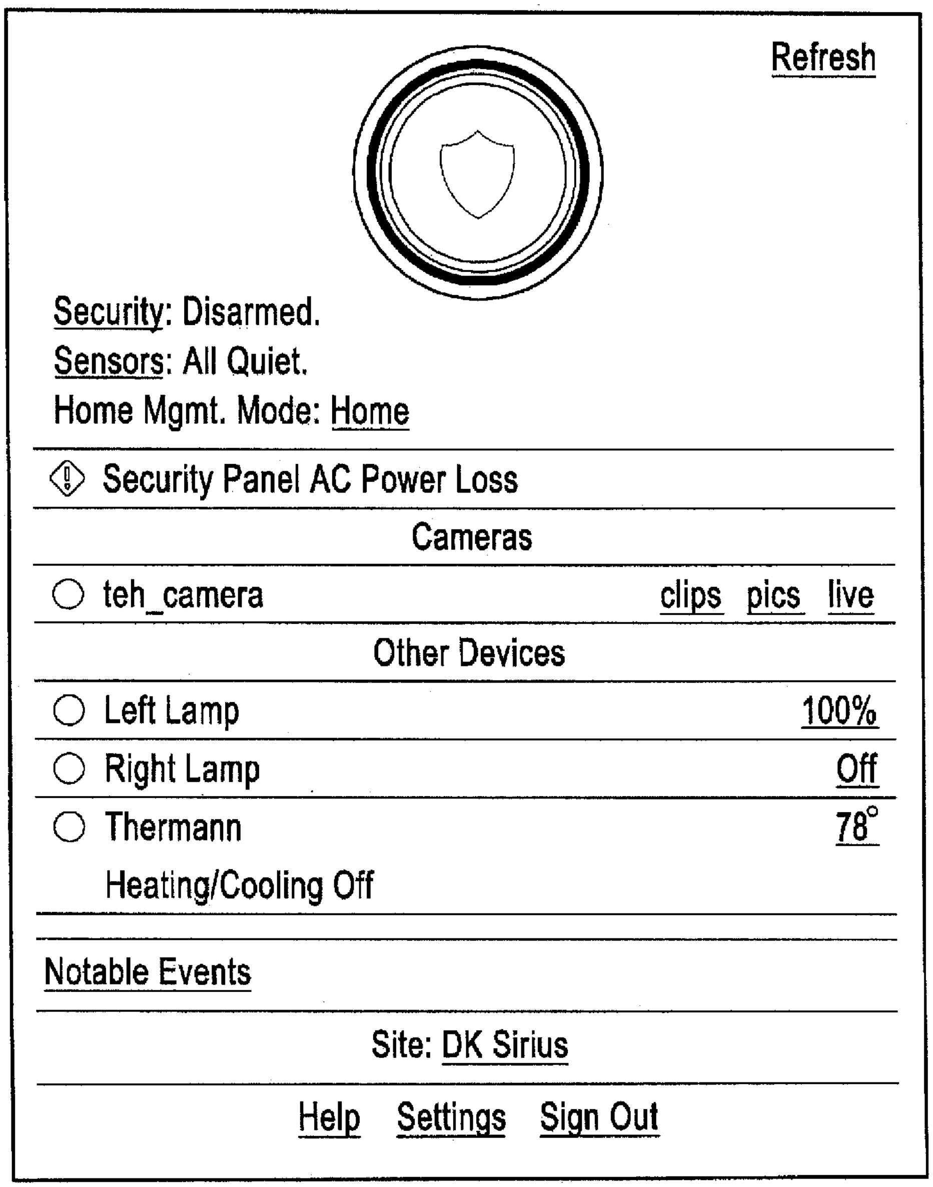
FIG. 17 is an example summary page or screen presented via the mobile portal SUI, under an embodiment.
Figure 18:
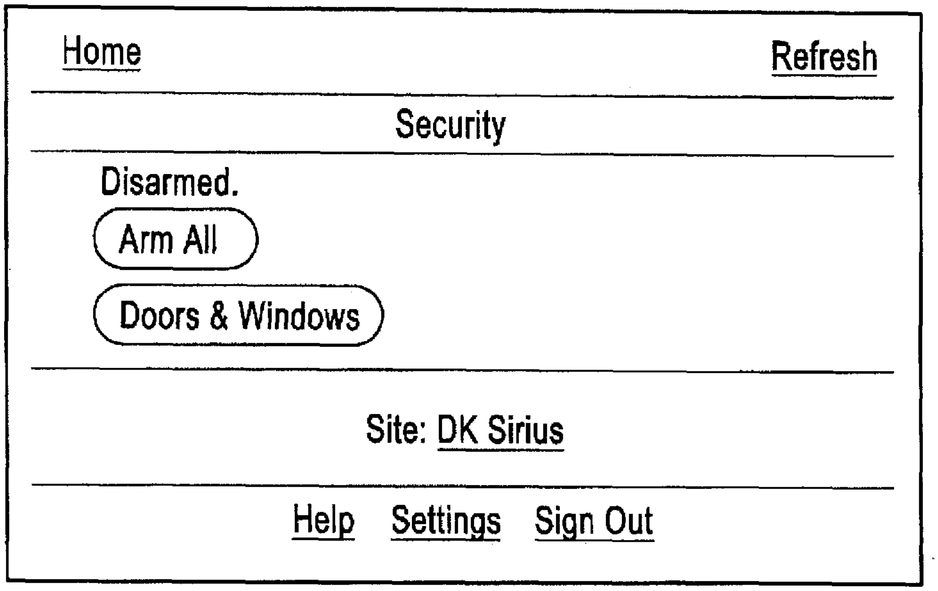
FIG. 18 is an example security panel page or screen presented via the mobile portal SUI, under an embodiment.
Figure 19:
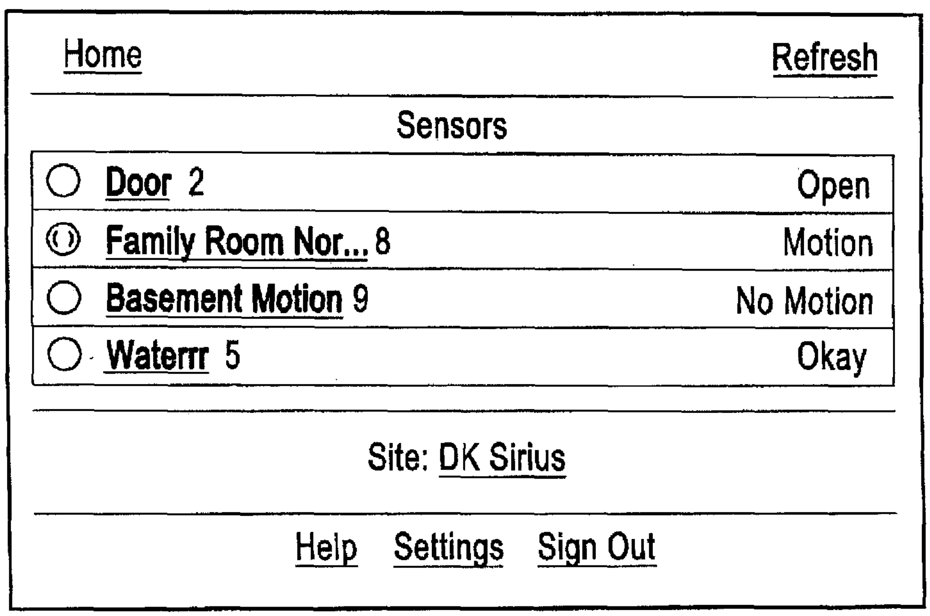
FIG. 19 is an example sensor status page or screen presented via the mobile portal SUI, under an embodiment.

FIG. 17 is an example summary page or screen presented via the mobile portal SUI, under an embodiment. FIG. 18 is an example security panel page or screen presented via the mobile portal SUI, under an embodiment. FIG. 19 is an example sensor status page or screen presented via the mobile portal SUI, under an embodiment.

Figure 20:
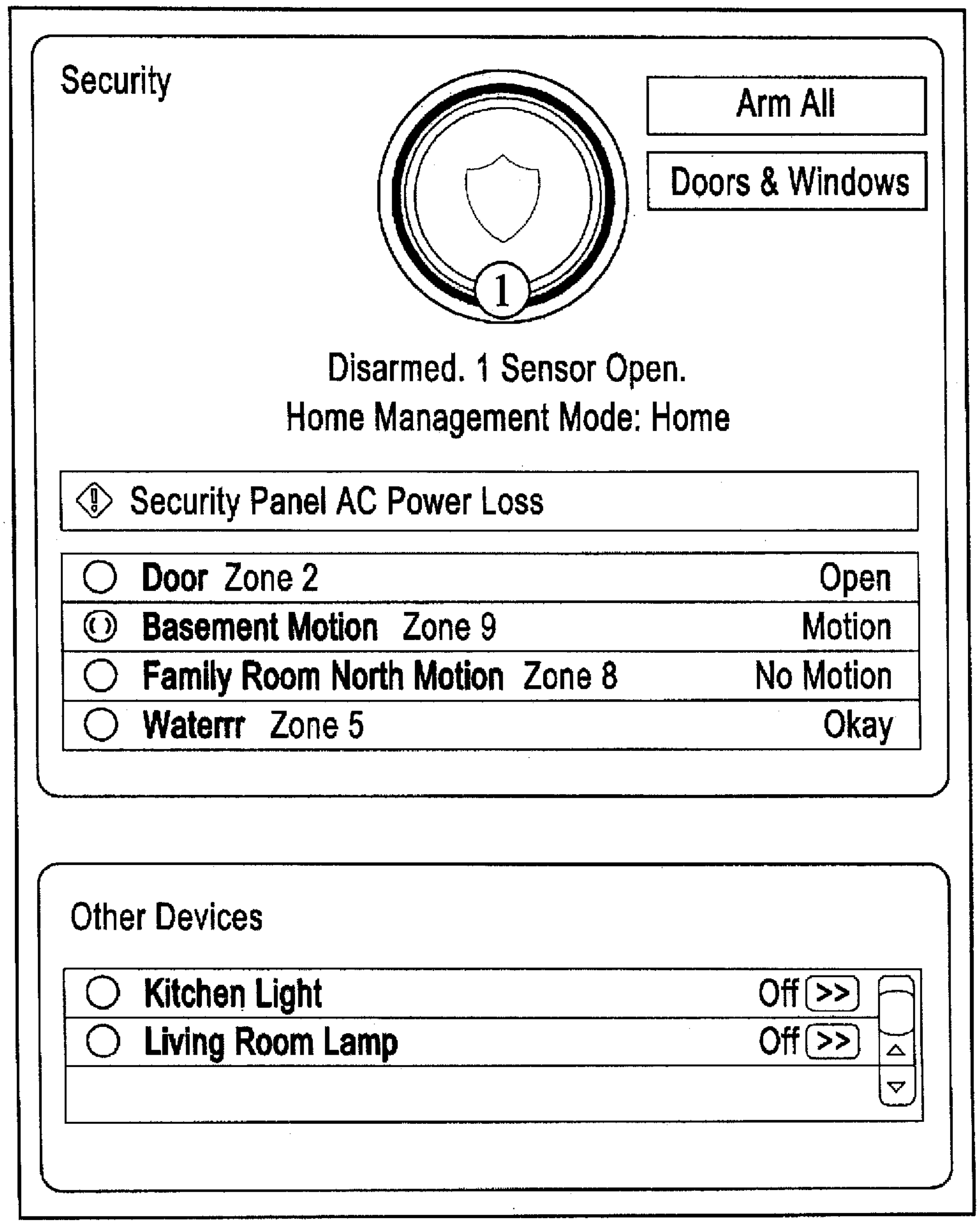
FIG. 20 is an example interface page or screen presented via the web portal SUI, under an embodiment.

FIG. 20 is an example interface page or screen presented via the web portal SUI, under an embodiment. The client interface of the web portal, as one example client, has the orb in the center of the security widget. The text summary is below the orb. The security button (plurality in the web portal) is adjacent to the orb's right side. System warnings are presented in an area (e.g., yellow area) below the text summary; in an embodiment this area is presented only when device or system warnings are present. Multiple system warning messages are presented as a vertical list with one message on each line, and the area dedicated to the system warnings grows in length to accommodate additional messages. Interesting sensors span across the entire security widget below the text summary. Quiet sensors span across the entire security widget below interesting sensors.

Figure 21:
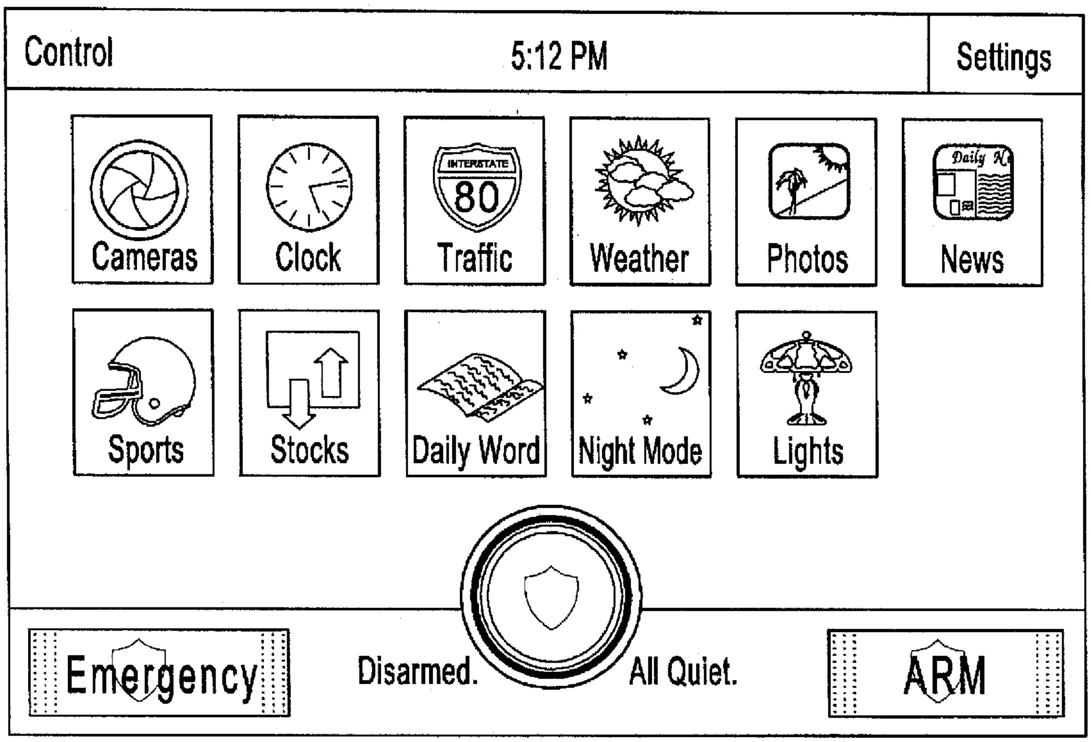
FIG. 21 is an example summary page or screen presented via the touchscreen SUI, under an embodiment.

FIG. 21 is an example summary page or screen presented via the touchscreen SUI, under an embodiment. The summary page of the touchscreen, as one example, has the orb in the center of the security bar. The text summary is split into sections or parts on each side of the orb. The security button is presented on the right side of the security bar.

In addition to the orb, text summary, and security button, the summary page also includes one or more icons that enable a transfer of content to and from the remote network, as described in detail herein. The touchscreen integrates the content with access and control of the security system. The content includes interactive content in the form of internet widgets. The summary page of an embodiment also comprises at least one icon enabling communication and control of the premise devices coupled to the subnetwork. The summary page also comprises one or more icons enabling access to live video from a camera, wherein the camera is an Internet Protocol (IP) camera.

Figure 22:
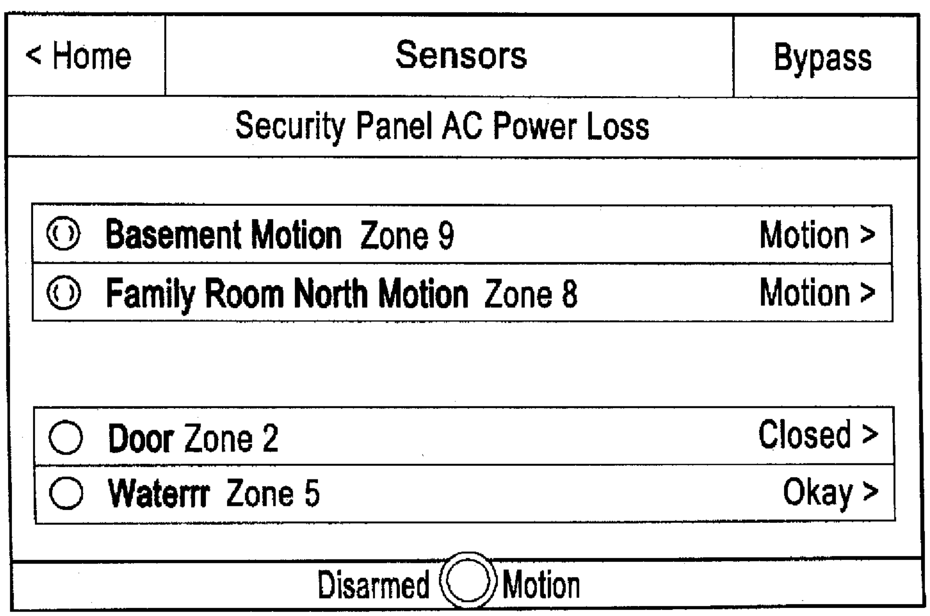
FIG. 22 is an example sensor status page or screen presented via the touchscreen SUI, under an embodiment.

FIG. 22 is an example sensor status page or screen presented via the touchscreen SUI, under an embodiment. The sensor status page of the touchscreen, as one example, displays widget badges or icons representing device warnings. System warnings are at the top of the sensor status screen; in an embodiment this area is presented only when system warnings are present. Multiple system warning messages are presented as a vertical list with one message on each line, and the area dedicated to the system warnings grows in length to accommodate additional messages. Interesting sensors are below system warnings. Quiet sensors are below interesting sensors. The sensors screen also includes the mini-orb which indicates the arm state with text and color.

The integrated security system of an embodiment includes a component referred to herein as "Home View" that provides end users an at-a-glance representation of their home security status using the layout of their home. Like the System Icon or "orb" as described in detail herein, Home View is intended to complement a set of common elements including, but not limited to, the security text summary, arm/disarm button, system warnings, and sensor status list. These UI elements are in the primary display of every iControl client application, and Home View adds to that set of UI elements.

Home View can be an alternative to the System Icon, adding sensor location and information about other devices like lights, thermostats, cameras, locks, and energy devices, to name a few. Home View is an optional view, and users who set up Home View are able to switch between the System Icon view and Home View. Home View provides the user or installer a way to express the floor plans of their home, where the layout of Home View is representational and, as such, is not meant to be a precise rendering of a home. The rendering of Home View can vary on each device depending on screen size and display capabilities.

Figures 23, 24:
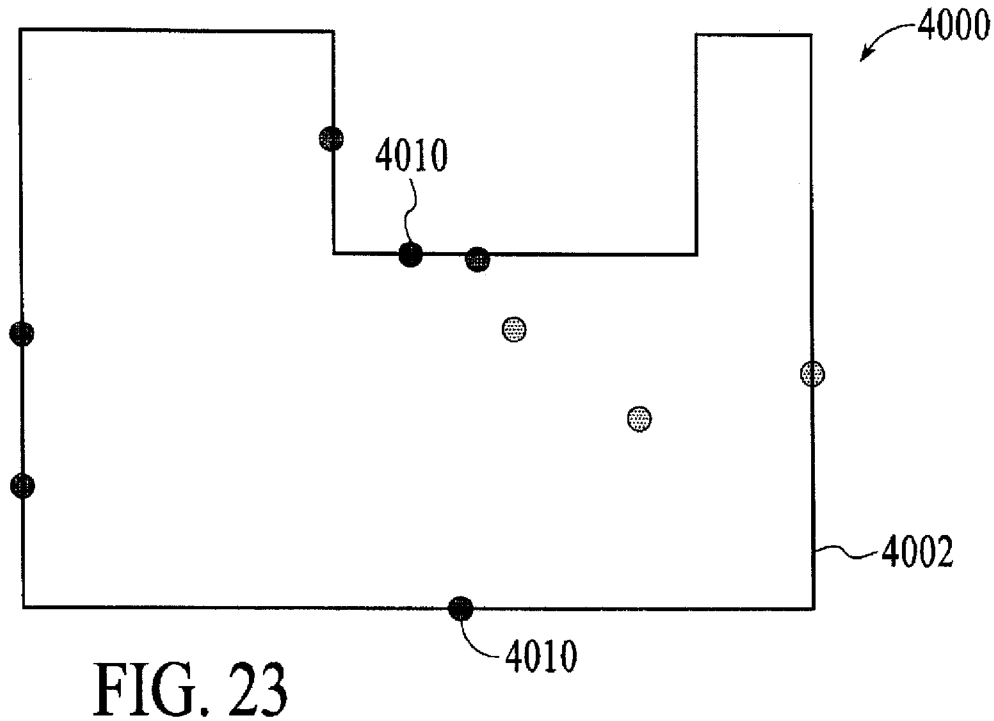
FIG. 23 is an example Home View display, under an embodiment.
FIG. 24 shows a table of sensor icons displayed on the Home View floor plan, under an embodiment.

FIG. 23 is an example Home View display 4000, under an embodiment. Using this example, Home View 4000 expresses or represents with a display the floor plan 4002 of a relatively large premise (e.g., home) or structure (e.g., 5 rooms wide and 5 rooms tall). Home View accommodates multi-story homes or structures (e.g., 4 stories). This mechanism can also be used to express other parts of a property, such as outbuildings. Home View allows the user to see all devices 4010 present on a selected floor, and indications if other floors have interesting/active devices (such as an open door, or a light that is on).

Home View information defined on one client affects all clients. In other words, if a change is made to the floor plans on one client, all clients display that change if they are using Home View. Home View is provided on the iPhone, and is also supported on one or more clients common to all users (web portal and/or touch screen).

Home View of an embodiment includes an editing tool that supports basic sensors and common devices. Using the sensor state display of Home View, and while editing, the user can position each sensor device on each floor, and the sensor icon is displayed over each floor plan.

Under an embodiment and as further described below, basic device states are represented by device and/or sensor state icons in Home View. FIG. 24 shows a table of sensor state icons displayed on the Home View floor plan, under an embodiment. The sensor states displayed in an embodiment include, but are not limited to, the following: breached or alarmed, tripped, or tampered (e.g., red icon) (interesting sensor); low battery (e.g., red icon) (interesting sensor); offline/AWOL (e.g., red icon) (interesting sensor); unknown (if the iHub or Security Panel is offline, all sensors have a grey diamond icon and "Unknown" for the status text) (e.g., grey icon) (interesting sensor); installing (e.g., grey icon) (interesting sensor); open door/window (e.g., yellow icon) (interesting sensor); motion sensor active (e.g., yellow icon) (interesting sensor); okay, closed, no motion (e.g., green icon) (quiet sensor). The states of each sensor icon of an embodiment are updated periodically (typically 15-30 seconds) to reflect their status.

A touch sensed anywhere in Home View navigates the UI to the sensor list available in System Icon view. The user can also touch any sensor icon in Home View and see a popup display showing the sensor name. The popup box is presented above the sensor with a connector pointing to and indicating the sensor selected. If the sensor is at the top of the screen, the popup box may appear below the sensor with a connector pointing up to and indicating the selected sensor. The popup box also includes a "more" button for navigating to detailed information about that sensor (in this case, sensor history). An embodiment presents sensor icon, name, and status text, and the last event for that sensor, plus a navigation arrow e.g., (a blue circle on some UIs) the selection of which switches screens to the sensor detail or history (same as clicking sensor name in each client).

Figure 25:
FIG. 25 shows example device icons of Home View, under an embodiment.

Using the device state display of Home View, a set of device and/or sensor icons can be placed on each floor. FIG. 25 shows example sensor status and device icons of Home View, under an embodiment. The device icons include, but are not limited to, icons representing lights, thermostats, cameras, locks, and energy devices, to name a few. Each of the device icons change states in the same way they change in their device list. These states include offline, installing, quiet, and active states but are not so limited. In an embodiment, cameras do no indicate an active state with an icon change. When the user touches a device icon, the device name pops up or is displayed. The popup box includes a "more" button for navigating to more information about that device as follows: camera icon (the popup box "more" button jumps to live video for that camera; exiting live video returns to Home View); lights, thermostats, energy, locks icon ("more" button jumps to the detail screen for controlling each device; the back buttons from those screens behave as they always do).

Home View visually indicates changes in device state under an embodiment. Under one embodiment device icons represent an underlying device component and its current state by modeling the device itself. For example (and as set forth in FIG. 25), an iconic image of a lock represents an actual lock device. As another example (and as set forth in FIG. 25), an iconic image of a lamp represents an actual lamp device monitored/controlled by the integrated security system. Home View may then use the device icon itself to indicate change in state. For example, Home View may express an unlocked or open status of a lock device by replacing the symbol of a closed or engaged lock with a symbol clearly depicting a lock that is unlocked or disengaged. As another example, Home View may indicate an inactive lamp device by replacing an iconic lamp representation in an "on" state (i.e., indicating emanation of light) with a darkened lamp representation (using a darkened lamp shade) indicating an "off" status. In other words, change in appearance of the device icon expresses a change in state of the underlying device.

Under another embodiment a generic sensor icon may be used to represent a device and its operational status. For example, a user may use an edit feature of Home View (described in greater detail below) to place a generic sensor icon on the Home View floor plan. When the user touches the icon on an iPhone client or mouses over the icon in a web application, the name/type of device appears above the icon (along with other relevant information and options as further described herein). The icon itself then displays status by shifting to a state specific status icon. As described above, Home View may use one of the status icons described in FIG. 24 as appropriate to the operational status of the represented device but is not so limited.

Under another embodiment, Home View may indicate a change in state of the device by simply replacing the device icon with a status icon. For example, a lock device may be offline at which time the Home View would replace the lock icon representation with a status icon representation that indicates an offline status. The offline status icon may correspond to the offline status symbol set forth in FIG. 24 but is not so limited.

Under another embodiment, Home View may visually superimpose or visually annotate a device icon with status representations. As an example, Home View may visually annotate a lock device icon with a status icon to indicate its current operational status. The Home View may use the status icons described in FIG. 24 to visually append status information to device representations but is not so limited. Under an embodiment, the Home View may use smaller representations of such icons to serve as status badges on a portion of the device icons. The Home View may also superimpose a partially transparent status icon as a palimpsest layer over the device icon or alternatively integrate a partially transparent status icon into the device icon as a watermark representation. Home View may use one of the status icons described in FIG. 24 as appropriate to the operational status of the represented device but is not so limited.

Under yet another embodiment, Home View may use any combination and/or manipulation of status/device icons to represent operational status of system components.

Figure 26:
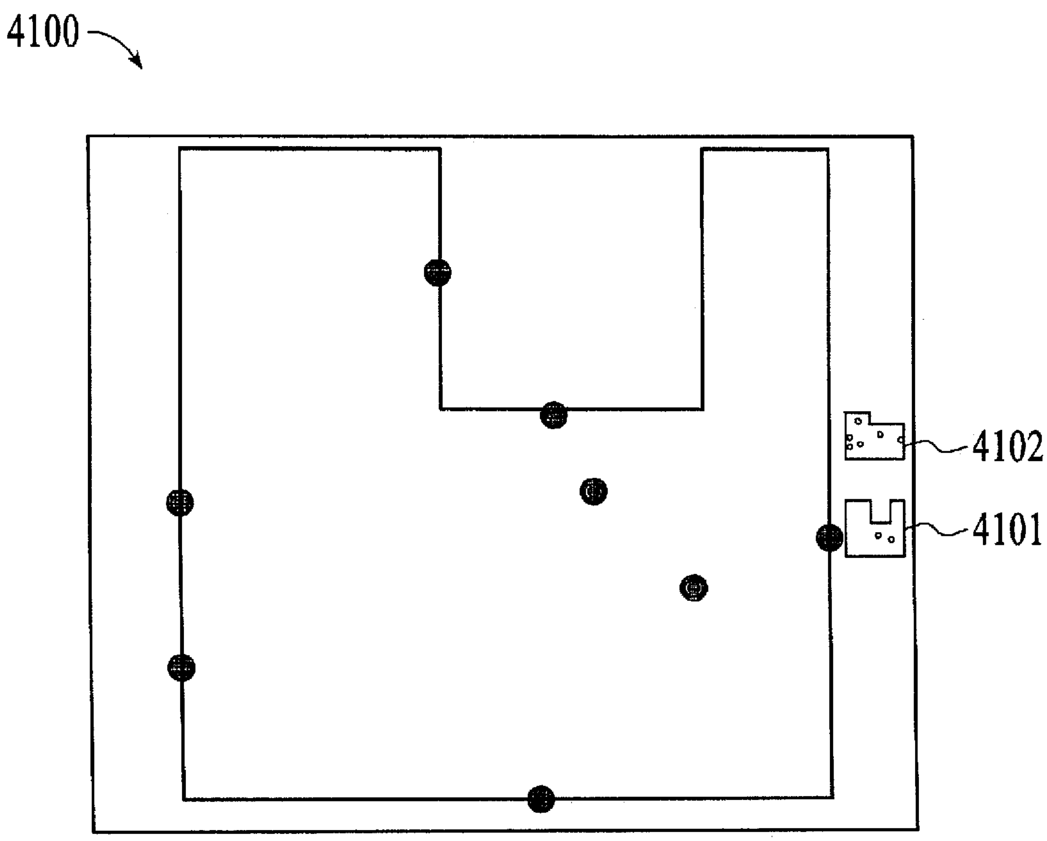
FIG. 26 shows a Home View display that includes indicators for multiple floors, under an embodiment.

If more than one floor has been defined in Layout mode of Home View, thumbnails on a portion of the display indicate that there are floors above or below the current one, and a means provided to switch floors. FIG. 26 shows a Home View display 4100 that includes indicators 4101/4102 for multiple floors, under an embodiment. In this example, two icons are presented to indicate a first (lower) floor 4101 and a second (upper) floor 4102. The currently-displayed floor 4101 (e.g., first (lower) floor) is outlined in white or otherwise highlighted. The last-viewed floor will be remembered across sessions.

The display of indicators for multiple floors through a mobile portal includes numbered links on a portion of the display (e.g., right), starting from "1". The currently-displayed floor is shown as bold, and not a link, as in:

Floor: 1 2 3

Like the System Icon, Home View indicates the overall system state by using background color. For accessibility, this may also be presented using corresponding text located adjacent to the icon. FIG. 27 shows the system states along with the corresponding Home View display and system or orb icon, under an embodiment. Across all clients, system state is indicated using a representative color. The disarmed or subdisarmed system state is displayed in Home View using a green background or green border 4202 on the floor plan. The armed (any type) system state is displayed in Home View using a red background or red border 4204 on the floor plan. The alarm system state is displayed in Home View using a red background (with or without black diagonal stripes) 4206 on the floor plan. The offline (iHub or panel) system state is displayed in Home View using a grey background 4208 on the floor plan.

Figure 28:
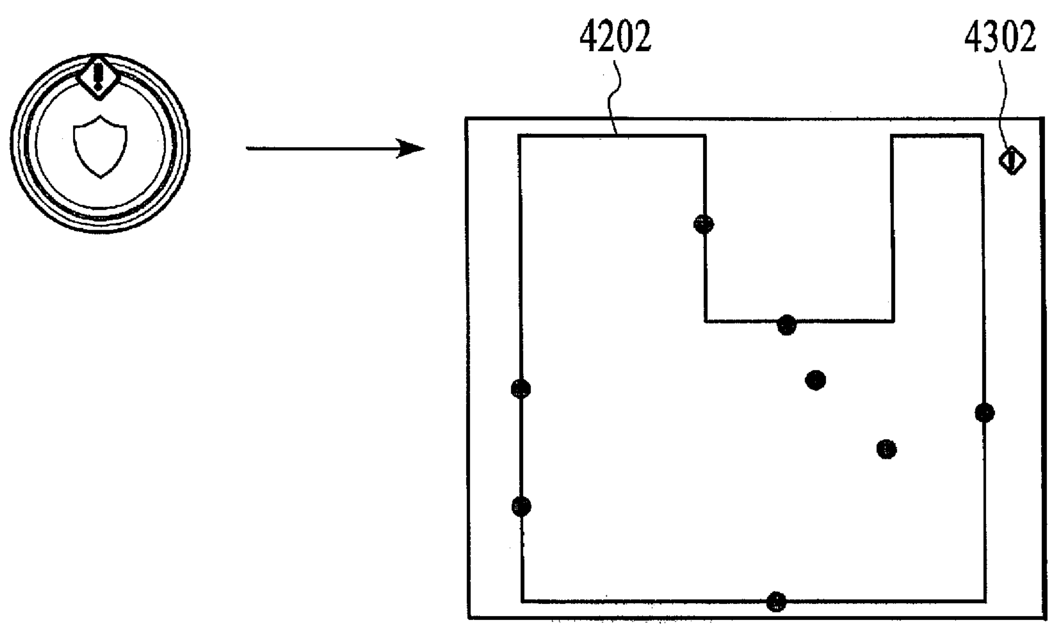
FIG. 28 shows a Home View floor display (disarmed) that includes a warning indicator, under an embodiment.

The System Icon of some client device UIs (e.g., the iPhone, the Touch Screen) also includes a warning badge to indicate that there are warnings to see in the sensor list. In Home View, a general warning indicator 4302 is shown in a region (e.g., on one side) of the Home View floor display. FIG. 28 shows a Home View floor display (disarmed 4202) that includes a warning indicator 4302, under an embodiment. The Home View display and warning indicator correspond to the system icon or "orb" set forth in the upper left corner of FIG. 28.

Figure 29:
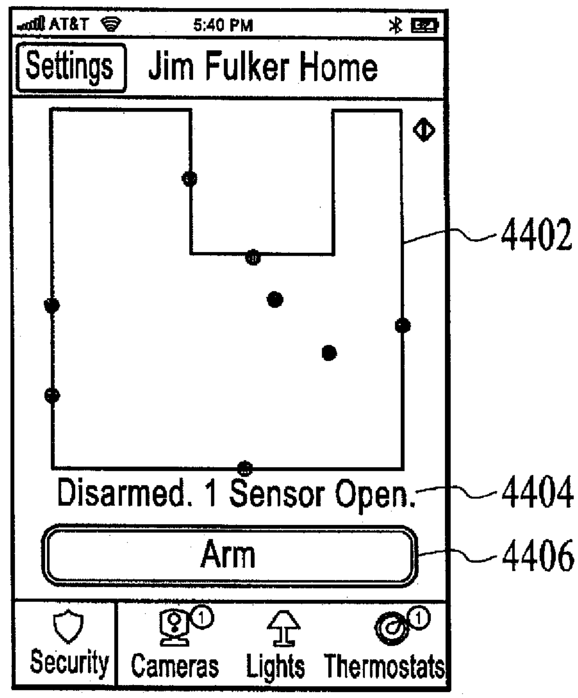
FIG. 29 shows an example of the Home View using the iPhone security tab, under an embodiment.

The use of Home View as a user interface includes Summary Text as described in detail herein, and the Summary Text provides definitive information on the current arm state, and a summary of any sensor issues. Additionally, the system arm/disarm buttons are displayed separately. FIG. 29 shows an example of the Home View 4402 using the iPhone security tab, under an embodiment. System state information 4404 is displayed ("Disarmed. 1 Sensor Open"), and an "Arm" button 4406 is displayed by which a user arms the system.

Figure 30:
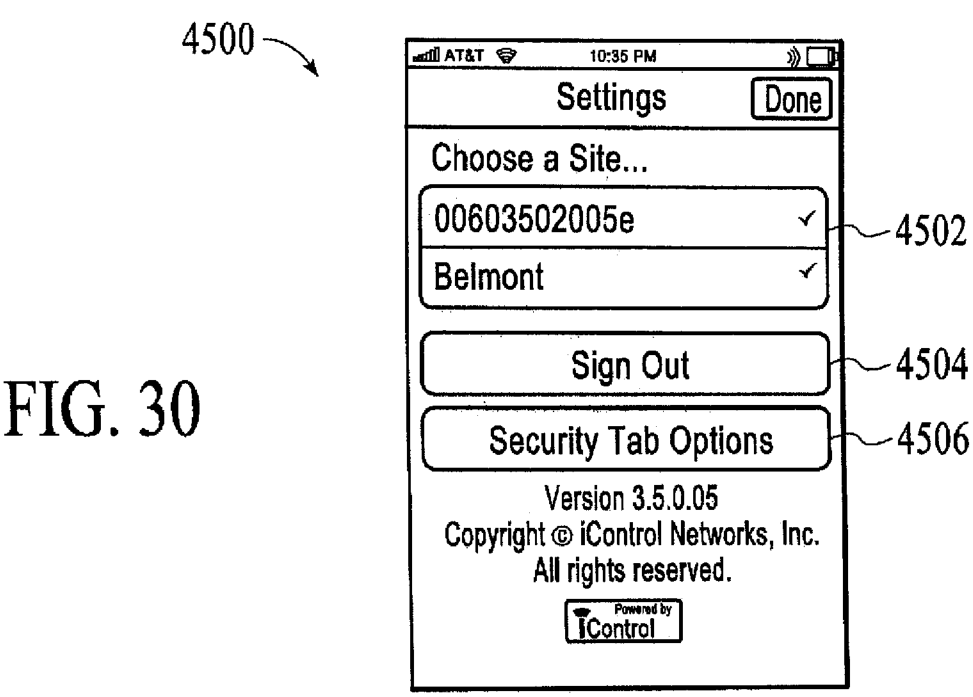
FIG. 30 shows an example screen for site Settings, under an embodiment.

Home View is an alternative to the System Icon, as described herein, and is configured via site settings. Each application retains the user's preferred mode across sessions. FIG. 30 shows an example screen for site Settings 4500, under an embodiment. The Settings screen 4500 includes a list of sites 4502 that can be selected, along with a Sign Out button 4504. The Settings screen 4500 also includes a Security Tab Options button 4506. Selection of the Security Tab Options button 4506 displays the Security Tab Options screen 4600.

Figure 31:
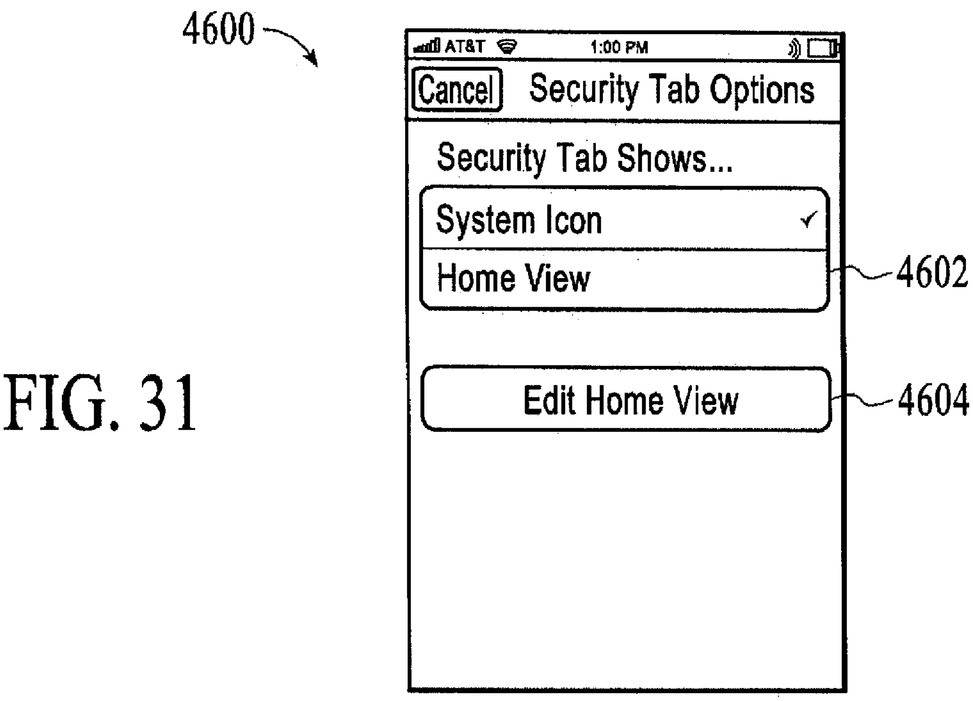
FIG. 31 shows an example screen for Security Tab Options, under an embodiment.

FIG. 31 shows an example screen for Security Tab Options 4600, under an embodiment. The Security Tab Options screen 4600 displays a list of options 4602 to select what the security tab displays (i.e., the System Icon display or the Home View display), along with an Edit Home View button 4604. When the user first attempts to switch to Home View from the Security Tab Options screen 4600 the following modal dialog is displayed: "Home View must be set up before use." This dialog includes but is not limited to the following two buttons: "Set Up Now" and "Cancel".

Any time the user wants to alter their Home View floor plans or device positions, they can choose Settings 4500, then select the Security Tab Options button 4506, then the Edit Home View button 4604. If a device has been deleted, then the Home View display code removes it from the device settings table. If a device has been installed or added to the system, it does not automatically appear in Home View, but it will be available in Edit Home View mode, ready to be placed on a floor.

The Home View mode of an embodiment includes an editor or Edit Mode. On the Settings screen 4500, the user can select Security Tab Options 4506, then Edit Home View 4604, as described above. This puts the user in Edit mode, where they can make changes to device positions, floor plans, and add/remove floors, for example. When editing is complete, selection of a "Done" button on the screen returns a user to the Security Tab Options screen 4600. If the user has made changes, then a dialog slides up that includes buttons for "Save Changes", "Don't Save", and "Cancel". Once saved, Home View data is saved on the iHub/iServer with other site settings, and can appear in any client that has Home View enabled for display.

Figure 32:
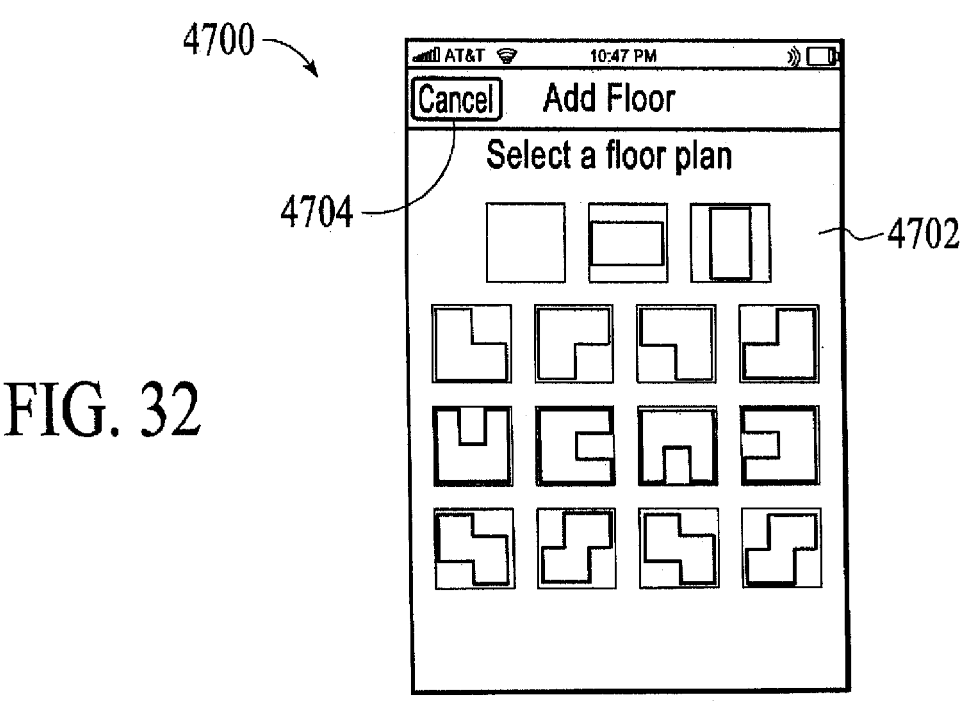
FIG. 32 shows an example "Add Floor" screen for use in selecting a floor plan, under an embodiment.

When the user first enters Edit mode, the user selects a basic floor plan which defines the perimeter shape of each floor of the premise. FIG. 32 shows an example "Add Floor" screen for use in selecting a floor plan, under an embodiment. Numerous floor plan selections are presented in a region of the screen labeled "Select a floor plan" 4702, and the floor plan selections 4702 of an embodiment comprise, but are not limited to, the following: square; horizontal; vertical; four different L-shapes; four different U-shapes; four different zigzag shapes. The title bar of the "Add Floor" screen 4700 includes a Cancel button 4704. At the point when there are no floors, there are no other buttons.

Figure 33:
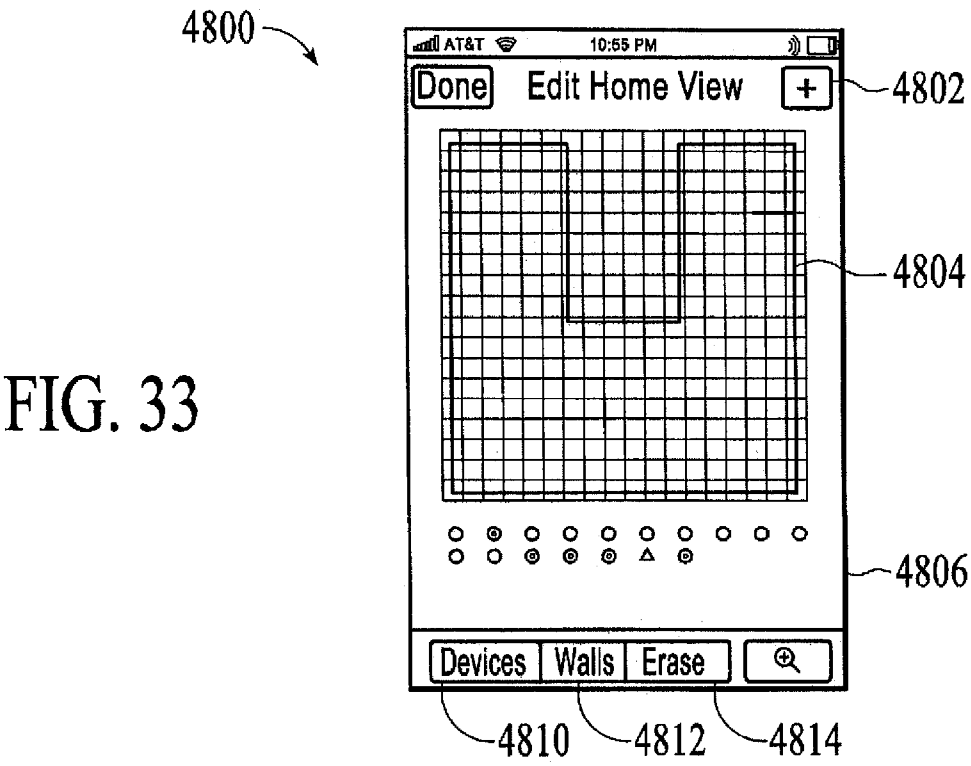
FIG. 33 shows an "Edit Home View" screen of the editor, under an embodiment.

Upon selection of a basic floor plan, the editor is displayed. FIG. 33 shows an "Edit Home View" screen 4800 of the editor, under an embodiment. The title bar includes an add floor button [+] 4802. In this example only one floor is defined, so there is no delete button (cannot delete the last floor). In addition to adding and deleting floors, the editor of an embodiment displays selection buttons 4810-4814 for three editing modes: Devices mode 4810 (used for placing devices on each floor); Walls mode 4812 (used for adding or changing walls); Erase mode 4814 (used for deleting walls). If the default floor plan matches the user's home, then the user has only to position devices on that floor. However, if the user wishes to modify a floor plan or define interiors then the Walls Mode and Erase mode are used to make changes.

Figure 34:
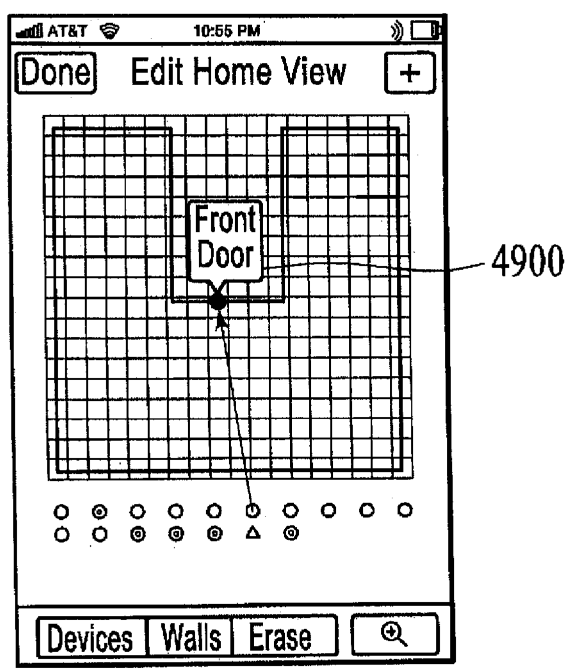
FIG. 34 shows an example of dragging a device icon during which a name of the device ("Front Door") is displayed, under an embodiment.

Devices are represented by icons in the editor, and the icons can be positioned by dragging to the appropriate location on the floor plan 4804. Below the displayed floor 4804 is a dock area 4806 that includes all devices displayed in rows. The user can drag a device to any tile on the floor 4804 that does not already contain a device icon. Devices can also be dragged back off the floor 4804 and onto the dock 4806. To identify a device the user can tap a device icon or start dragging and the name will appear above the device icon. FIG. 34 shows an example of dragging a device icon during which a name of the device 4900 ("Front Door") is displayed, under an embodiment. Devices are not required to be placed on floors, and any devices left in the dock 4806 are ignored when Home View is displayed. These can be added to any floor at a subsequent time. Newly installed devices are also left on the dock 4806, ready to be placed when editing.

The dock 4806 has a grid of tiles, similar to the floor plans. The user can move devices around on that grid. Upon exiting the editor and then returning, the dock is drawn in ordered rows. Devices of an embodiment are placed every-other-tile, up to 11 devices per row and up to 3 rows for a total of up to 33 devices on screen, but are not so limited. If the site has more than 33 devices in the dock, they are not shown until some devices are moved onto the floor, so that the dock condenses after each device is placed on a floor.

The selected floor plan provides a basic perimeter for the floor. If the user wishes to change the default perimeter walls or define interior walls, the user can switch to Walls mode. The user can tap any tile to customize that tile, and tapping a tile cycles the tile through twelve different tile shapes. Tile cycles start with the best-fit tile based on context, then cycle through all possible tile shapes in best-fit order. For example, if the user taps a blank tile with a horizontal line to the right and a vertical line below it, then the first tile drawn will be a corner tile that connects those lines, then a tile that connects one line, then the other line, etc.

Figure 35:
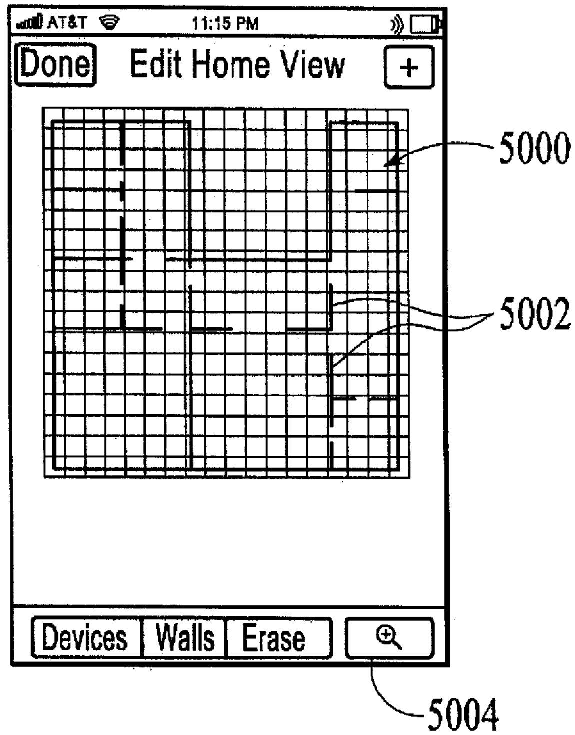
FIG. 35 is an example of a U-shaped floor plan customized by changing interior tiles to define walls, under an embodiment.

For example, a typical task is to draw an interior wall. Each tile should require only one tap to draw as a user progresses across tiles of the floor plan. FIG. 35 is an example of a U-shaped floor plan 5000 customized by changing interior tiles to define walls 5002, under an embodiment.

The editor of an embodiment includes a Walls mode and an Erase mode, as described above. In the Walls mode and the Erase mode the device icons are hidden. Erase mode is used to change wall tiles into blank tiles, to remove mistakes, and/or begin to move a wall. For example, a user wanting to narrow a rectangular floor plan by moving an entire wall inward first switches to Erase mode and taps every tile of the vertical wall they wish to move, and then switches to Walls mode and taps every tile where they wish a wall to be placed.

An embodiment may adopt an alternative floor plan editing scheme in the form of a commercial diagramming tool. The alternative approach replaces the tile based diagramming described above with a vector based graphics approach. A user may choose design primitives to establish and subsequently manipulate (via touch/drag interactions or keyboard/mouse operations) basic floor plan shapes and representations. Such approach may incorporate a "free hand" ability to trace lines or other floor plan elements (via touch/drag interactions or keyboard/mouse operations).

Figure 36:
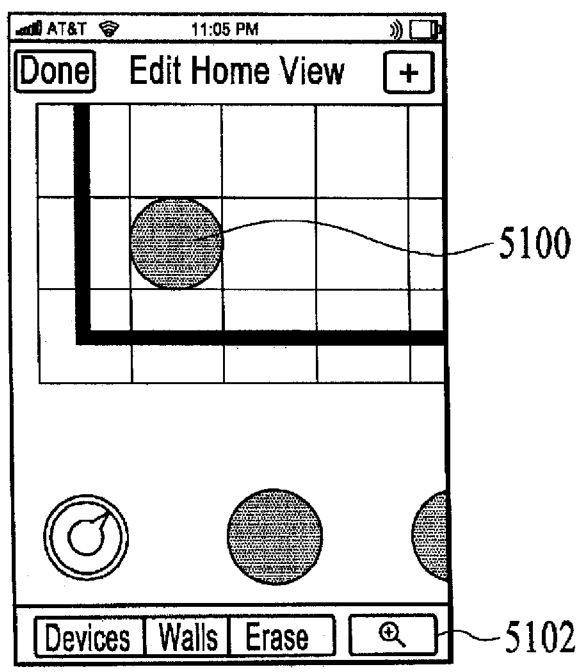
FIG. 36 shows an example in which the zoom level is increased and dragging has been used to focus on a sensor location, under an embodiment.

While editing tiles or positioning sensors, more precision may be needed in which case the user can toggle the zoom level of the editor (includes the dock) in any edit mode. To zoom to 300%, for example, the user taps the + magnifying glass 5004, and to return to 100% zoom, the user taps the – magnifying glass 5102. If there are multiple floors, tapping a floor thumbnail returns to 100% zoom. Once zoomed, the user scrolls around the floor by a dragging operation. FIG. 36 shows an example in which the zoom level is increased and dragging has been used to focus on a sensor location 5100, under an embodiment. When zoomed in, if the user touches and drags a device, the device moves and not the floor. If the user taps and drags a tile, the floor scrolls around and the tile is not altered.

Figure 37:
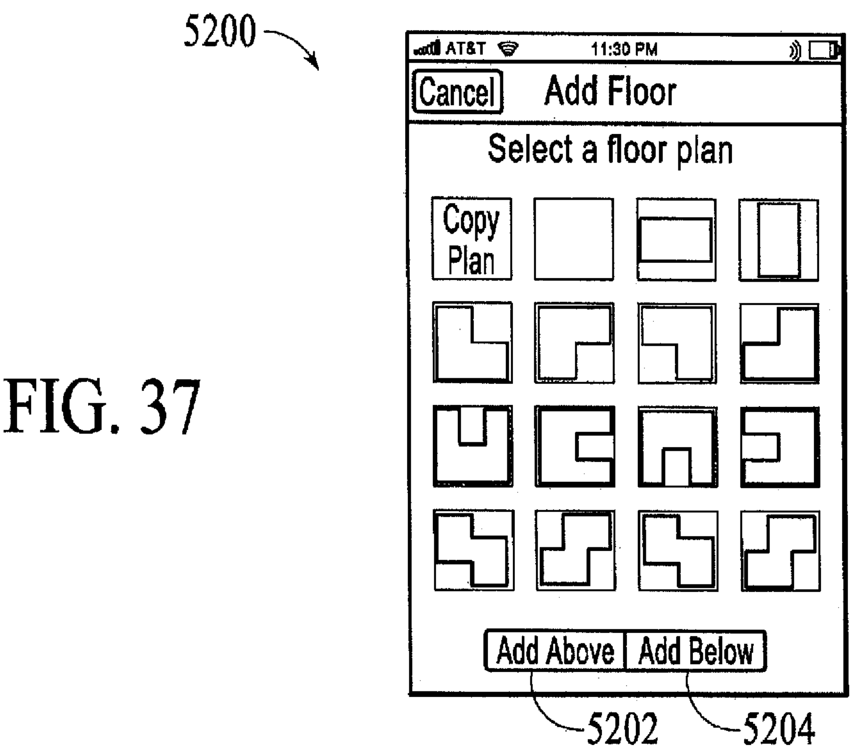
FIG. 37 is an example "Add Floor" page, under an embodiment.

Home View of an embodiment supports up to four (4) floors but is not so limited. These floors can also be used for other physical spaces, such as outbuildings or garages for example, so floor numbering is generally avoided. To define a new floor in Edit mode, the user touches a + button 4802 at the top of the screen and the Add Floor page appears. FIG. 37 is an example "Add Floor" page 5200, under an embodiment. If at least one floor has previously been defined, a new control appears to help add this new floor above ("Add Above" 5202) or below ("Add Below" 5204) the current floor. The default option adds the new floor above ("Add Above") the current floor. By selecting a floor in Edit mode, touching +, and changing this control in the Add Floor page, the user can add basements, insert floors etc.

Figure 38:
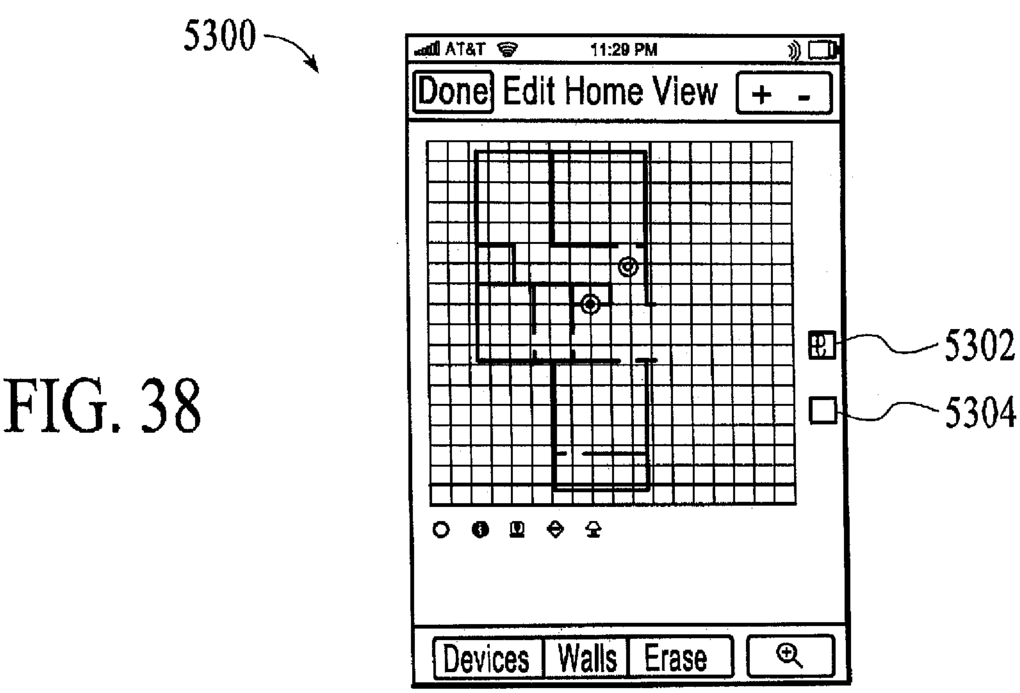
FIG. 38 is an example Edit Home View screen showing the floor thumbnails for use in selecting a floor, under an embodiment.

When more than one floor is defined in Home View, some differences appear on the Edit Home View screen. Among the changes, a column of floor thumbnails appears on the right portion of the screen. The currently selected floor thumbnail is highlighted, and the user can tap any floor to switch to that floor. For example, the user can move a device to the dock, switch floors by touching the other floor thumbnail, then drag the device onto the new floor. FIG. 38 is an example Edit Home View screen 5300 showing the floor thumbnails 5302/5304 for use in selecting a floor, under an embodiment.

Figure 39:
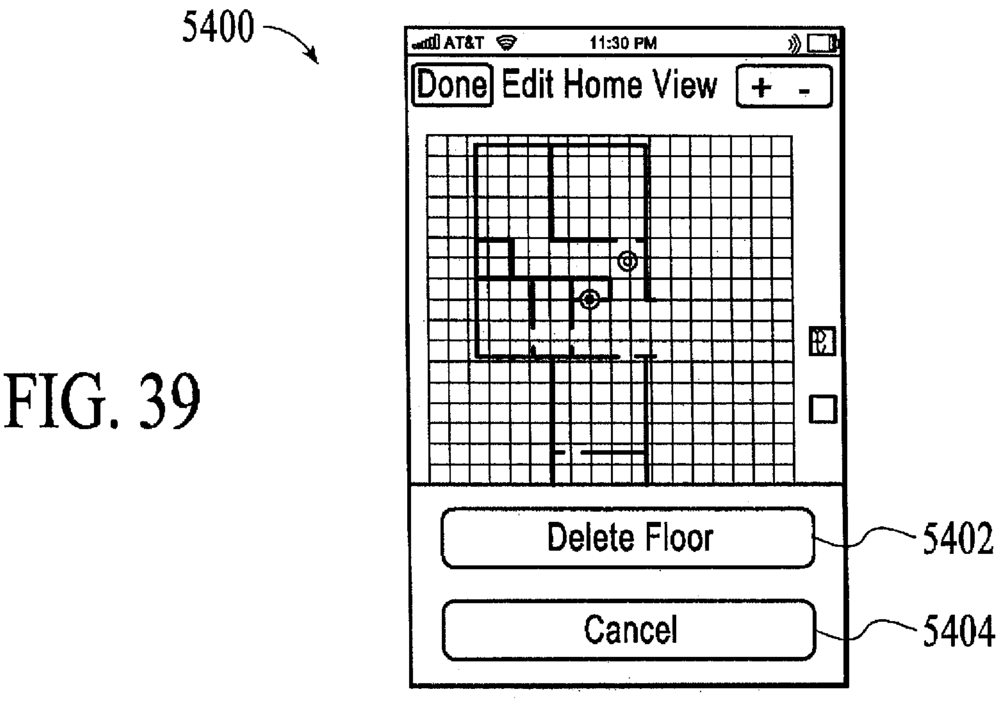
FIG. 39 shows the Edit Home View screen with a delete floor selector, under an embodiment.

An additional change displayed on the Edit Home View screen includes the display of a delete floor button [–] in the title bar of the editor, to the right of the add floor button [+]. If more than one floor is defined, the user selects the [–] button to delete the current floor. The user is prompted with a warning with the options to Delete Floor or Cancel 5404. FIG. 39 shows the Edit Home View screen 5400 with a delete floor selector 5402, under an embodiment.

Figure 40:
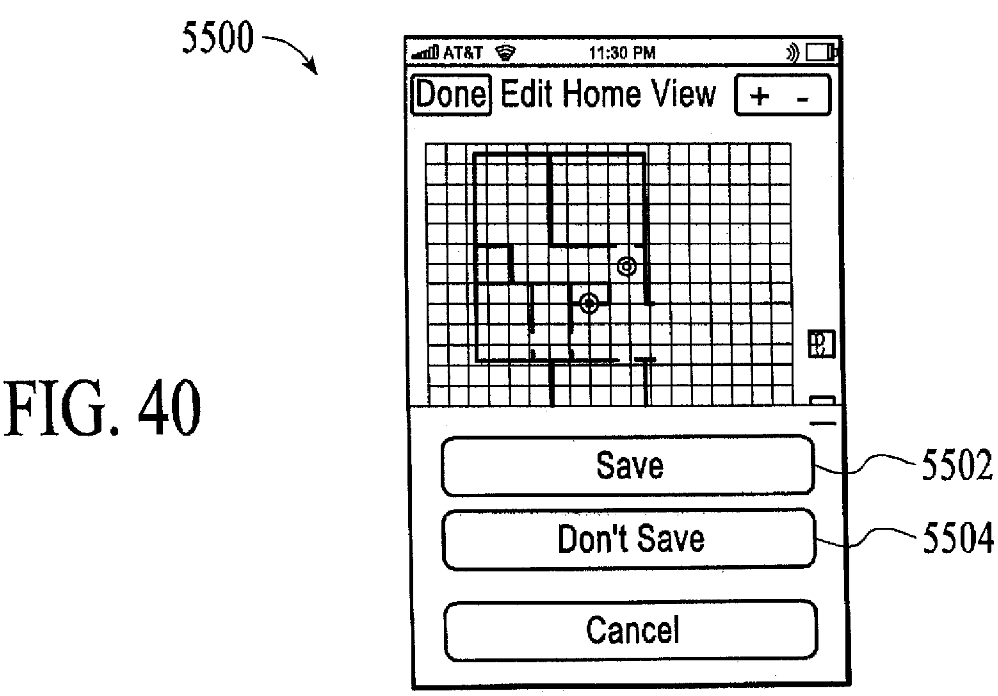
FIG. 40 is an example Edit Home View screen displaying options to "Save" and "Don't Save" changes following selection of the Done button, under an embodiment.

Selection of the Done button on the Edit Home View screen allows the user to exit the editor. If upon selecting the Done button the user has made changes to the floors or device locations, the user is prompted to save the changes before exiting back to the Settings screen. FIG. 40 is an example Edit Home View screen 5500 displaying options to "Save" 5502 and "Don't Save" 5504 changes following selection of the Done button, under an embodiment.

For each premise, Home View allows users to define the floors of their home and the locations of all devices on those floors using the Edit Home View layout editor described above. The output of the layout editor includes two strings that are stored in site preferences on the server. All client applications share this static definition of the site layout, and locally combine it with the current state of the sensors and panel to produce a graphical view.

Home View is presented in an embodiment using tiles, and allows a user to define up to a pre-specified number of floors (e.g., four floors, etc.), but is not so limited. Each floor in Home View is presented as a layout of tiles in two layers or structures. A first layer, or bottom layer, is a static layout of a single floor (e.g., 19 tiles by 19 tiles, etc.). FIG. 41 is an example of the floor grid data, under an embodiment. A second layer, or top layer, is a set of sensor/device icons (states changing) placed or overlaid over the grid (first layer). FIG. 42 is an example sensor hash table for a single-floor site, under an embodiment.

The server (e.g., iServer) of an embodiment stores the two structures in two variables in site preferences, but the embodiment is not so limited. A first variable comprises a series of floor layouts corresponding to the number of floors. Each floor layout is a floor grid represented by a single string of characters (e.g., 19×19 or 361 ASCII characters), with one character corresponding to each tile as described above.

The homeViewLayouts preference strings represents between 1 and 4 tile grids. Each tile grid is 19 tiles by 19 tiles for a total of 361 tiles. The grids comprise odd numbers to support centering of walls. The first 361 tiles represent the first floor of the premise. If there are multiple floors, the next 361 tiles represent the second floor of the premise. Therefore, homeViewLayouts length is 361 characters (premise having one floor), 722 characters (premise having two floors), 1083 characters (premise having three floors), or 1444 characters (premise having four floors). FIG. 43 shows an example homeViewLayouts string, under an embodiment.

A second variable comprises a hash table mapping specific tiles to sensors, separated by commas, and every sensor is represented. A homeViewDevice preference string represents such information and comprises key,value pairs separated by commas. As example homeViewDevices character string is as follows:

homeViewDevices="3,zone2,74,zone5,88,zone1,129, zone2,166,
cameraFront Door Cam,200,lightUpstairs Light 2,226, thermoUpstairs".

The key of the key,value pair is an integer representing the absolute offset into the homeViewLayouts array. The value of the key,value pair represents a way to precisely identify the device. For sensors, this value is "zone" followed by the zone ID. For example, if the front door (zone id 7) is on the third tile over, then the key value pair is 2,zone7 (e.g., zero-based offset).

Each tile set includes twelve basic shapes. The shapes of an embodiment include, but are not limited to the following: empty; horizontal wall; vertical wall; top left corner; top right corner; bottom left corner; bottom right corner; T-shape down; T-shape right; T-shape up; T-shape left; 4 corner shape. FIG. 44 shows the twelve shapes of a tile set, under an embodiment. Wall lines are centered within each tile to ensure alignment. The user draws the floor(s) of their premise using the shapes, and the set of tile shapes is used while editing (generally blue, like blueprints), and for two of the rendered states of the security system: when alarmed (red and black striped) and when offline (gray tiles).

As stated above, the user defines the walls of each floor of their home using twelve basic tile shapes. However, when a floor is rendered, the building exteriors should be readily distinguished from the interiors. For rendering Home View in armed and disarmed states, algorithms determine the interior of the home and compute which tiles are transparent and which tiles are filled. For perimeter walls, the algorithm clears the exterior side but not the interior side. A larger set of tiles is used to handle all possible transparent/filled tile renderings. FIG. 45 shows the tile shapes and corresponding fill options for rendered tiles, under an embodiment.

As stated above, the user defines the walls of each floor of their home using twelve basic tile shapes. However, when a floor is rendered, the building exteriors should be readily distinguished from the interiors. This achieved when the editor is exited and tiles exterior to each building are replaced with transparent tiles. Similarly, tiles with walls facing the exterior are replaced with tiles where the exterior portions are transparent.

FIG. 46 is an example tile rendering for a room of a premise, under an embodiment. In this example, there are two perimeter versions of the top-right corner tile "t", and one perimeter version is filled on the bottom right (tile "u"), and one perimeter version is filled on the top left (tile "U").

A description follows for operation of the algorithm for determining an interior and an exterior. The algorithms generate a list of all tiles on the edge of each floor that are empty (top row, bottom row, left column, right column, up to 19+19+2*17=72 tiles per floor). With each tile, a function is called to clear the tile. In that function, the empty tile is changed to an empty exterior tile (for example, "e" changes to "E"). The algorithm then examines the four tiles on each side (top, right, bottom, left) of the current tile and, if they are non-empty, replaces them with tiles where the side facing the current tile is transparent. The algorithm then examines the four tiles diagonal to this exterior tile and, if they are non-empty and have a corner (T shapes, plus shape, corners), replaces them with tiles where the corner facing the current tile is transparent. A list is generated comprising any of the four tiles on each side (top, right, bottom, left) of the current tile that are empty. With each empty tile, a recursive function is called and the process repeats as described above.

In order to avoid stepping into "doors", the algorithm does not call the recursive function in response to empty tiles if there are wall edges touching the current tile. For example, the process only recurses down to an empty tile if the tiles to the right and left are not horizontal tiles (or similar) touching the current tile. This works for doors one and two tiles wide; wider openings get filled.

The fully computed floor definition is stored in the gateway (e.g., iHub) and/or server (e.g., iServer) but is not so limited. If the Home View editor is used, these computed tiles can be converted back to the twelve-tile set while editing. The Home View data output from Edit mode is checked to ensure integrity of parameters, for example: the number of tiles (and number of floors) is correct; the tile data only includes valid tile characters; all sensors and devices still exist. At the time Home View is rendered, the same checks are again performed to verify data integrity. If any checks fail, the user is presented a dialog, and the preference returns to the System Icon (the "orb"). Essentially the feature is turned off for display, but the data is still there until edited. If the user tries to edit home view and the data is corrupted, they are given the option to reset the data and start over.

An alternative embodiment of Home View also provides methods for generating and presenting floor plans and icons representing sensors overlaid on a floor plan for a home, thereby enabling users to quickly see the state of each sensor (such as open doors, status of lights and thermostats, etc.), and click on any sensor to get more information about that sensor. As described in detail herein, FIG. 24 shows a table of sensor state icons displayed on the Home View floor plan, and FIG. 25 shows example sensor status and device icons of Home View, under an embodiment. The device icons include, but are not limited to, icons representing lights, thermostats, cameras, locks, and energy devices, to name a few. Each of the device icons change states in the same way they change in their device list. These states include offline, installing, quiet, and active states but are not so limited. The sensor states displayed in an embodiment include, but are not limited to, the following: breached or alarmed, tripped, or tampered (e.g., red icon) (interesting sensor); low battery (e.g., red icon) (interesting sensor); offline/AWOL (e.g., red icon) (interesting sensor); unknown (if the iHub or Security Panel is offline, all sensors have a grey diamond icon and "Unknown" for the status text) (e.g., grey icon) (interesting sensor); installing (e.g., grey icon) (interesting sensor); open door/window (e.g., yellow icon) (interesting sensor); motion sensor active (e.g., yellow icon) (interesting sensor); okay, closed, no motion (e.g., green icon) (quiet sensor). The states of each sensor icon of an embodiment are updated periodically (typically 15-30 seconds) to reflect their status.

Figure 47:
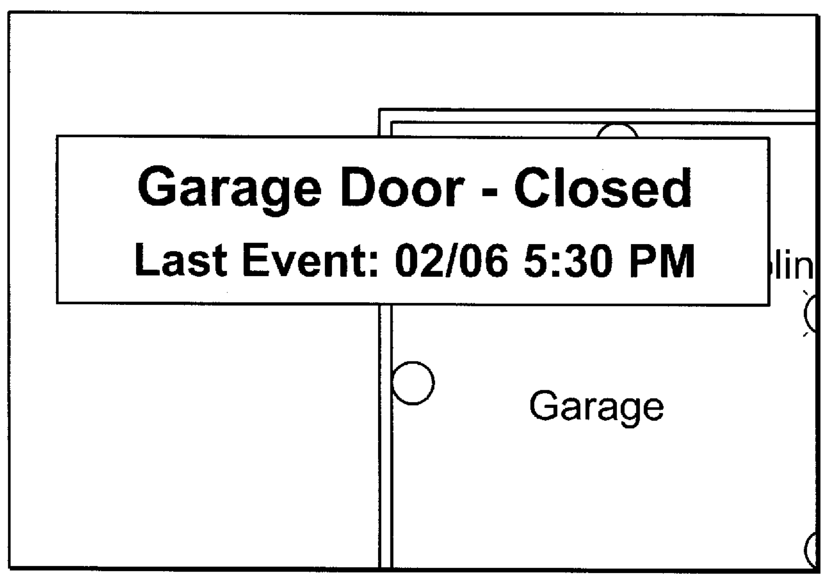
FIG. 47 is an example popup display in response to hovering near/adjacent a sensor icon (e.g., "Garage" sensor), under an embodiment.

A touch sensed anywhere in Home View navigates the user interface to the sensor list available in the System Icon view. The sensor icons of an embodiment update periodically (e.g., frequently) to reflect their current status (e.g., an open window). The sensor icon also represents the "health" of that sensor (offline, low battery etc.). A user can hover over (in desktop web browser) or tap (tablet/touch device) any sensor icon and see a popup display showing the name, state, and the last event for that sensor. FIG. 47 is an example popup display in response to hovering near/adjacent a sensor icon (e.g., "Garage" sensor), under an embodiment. If the device is at the very top of the screen, the popup box may appear below the sensor. Alternatively, if the device is on the edge of the screen the popup box may be pushed inward or displayed in another portion of the interface. Clicking (desktop) or double-tapping (tablets) in regions of the display causes the system to navigate to sensor history. When the interface is displayed on an iPhone, for example, the popup box may also have a blue "more" button for that same navigation.

Figure 48:
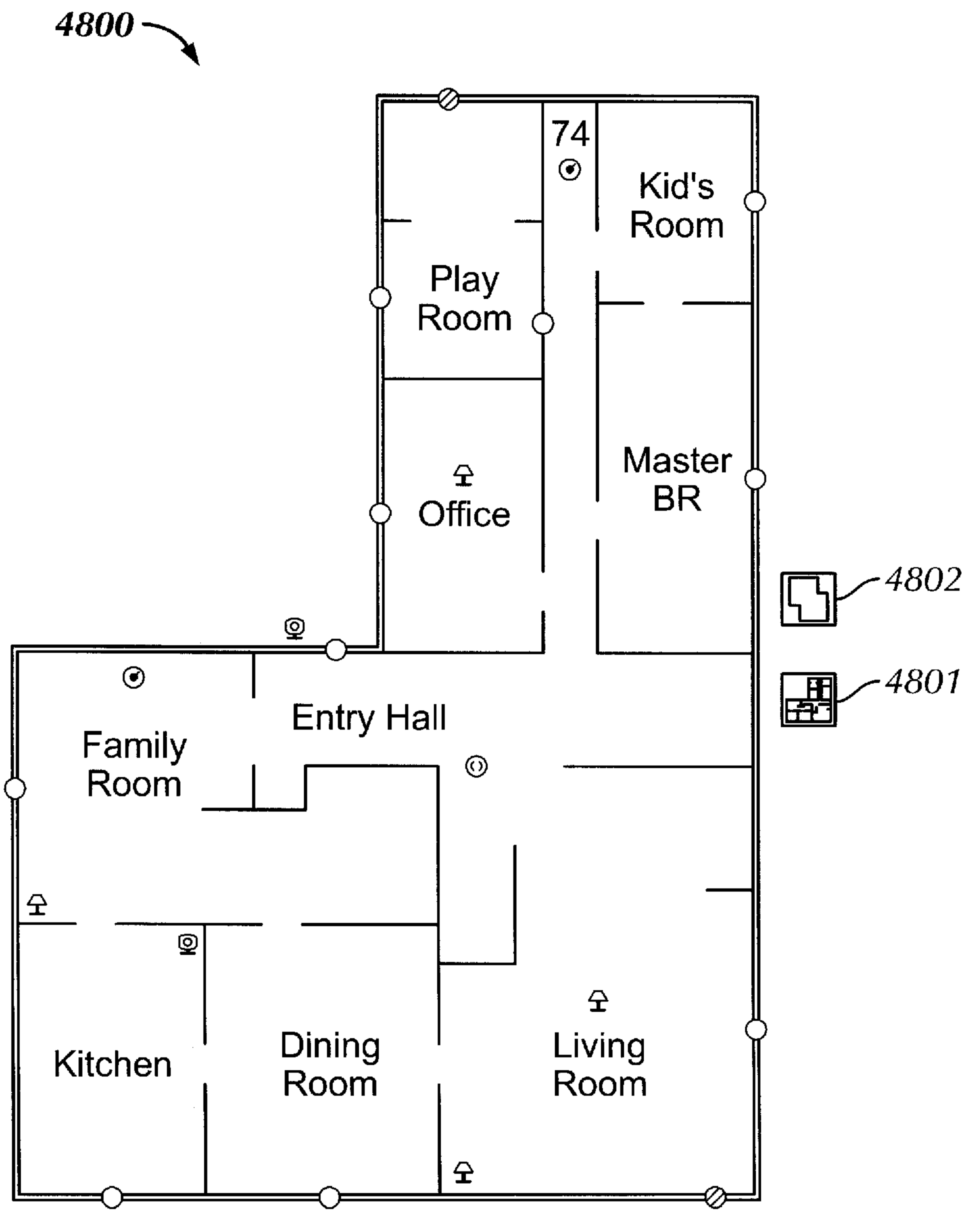
FIG. 48 shows a Home View display that includes a floor plan display 4800 of a selected floor along with indicators 4801/4802 for multiple floors, under an embodiment.

If more than one floor has been defined in Layout mode of Home View, the display includes thumbnails on a portion of the display that indicate the existence of floors above or below the current one, and a process to switch floors. FIG. 48 shows a Home View display that includes a floor plan display 4800 of a selected floor along with indicators 4801/4802 for multiple floors, under an embodiment. In this example, two icons are presented to indicate a first (lower) floor 4801 and a second (upper) floor 4802. Alternatively, other notations (e.g., dots, etc.) can be used to indicate multiple floors. The currently-displayed floor 4801 (e.g., first (lower) floor) is highlighted. The last-viewed floor will be remembered across sessions. When accessing Home View via a mobile portal, the display of indicators for multiple floors through the mobile portal includes numbered links on a portion of the display (e.g., right), starting from "1". The currently-displayed floor is shown as bold, and not a link, for example:

Floor: 1 2 3

Figure 49:
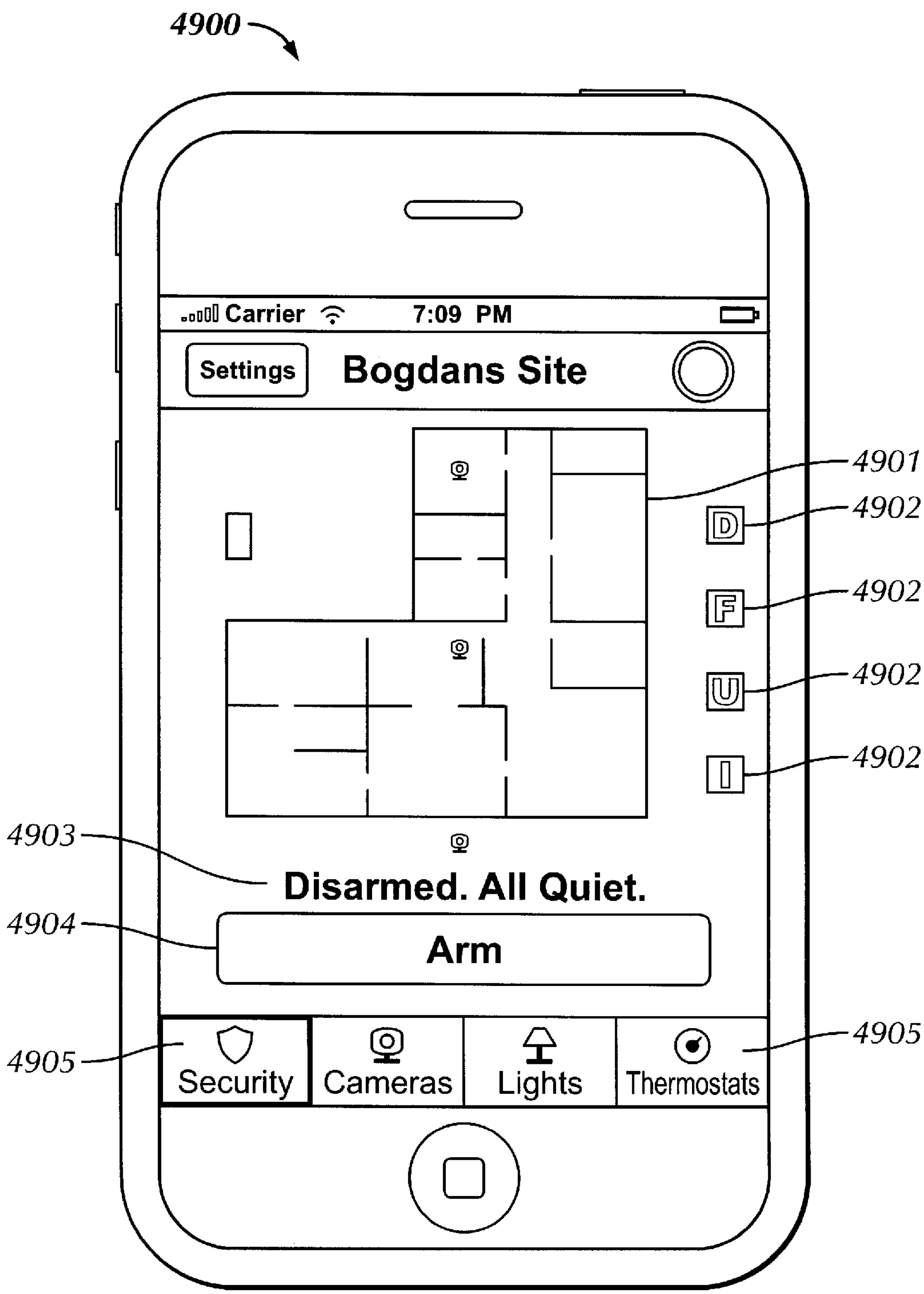
FIG. 49 shows an example of the Home View user interface displayed via a mobile device (e.g., iPhone), under an embodiment.

The use of Home View as a user interface includes a system icon or Summary Text that provides definitive information on the current arm state, and a summary of any sensor issues. Additionally, the system arm/disarm buttons are displayed separately. FIG. 49 shows an example of the Home View user interface displayed via a mobile device (e.g., iPhone), under an embodiment. The user interface 4900 includes a floor plan display 4901 of a selected floor along with indicators 4902 for selecting among corresponding multiple floors of a building. System state information is displayed 4903 ("Disarmed. All Quiet"), and an "Arm" button 4904 is displayed by which a user controls arming of the system. A toolbar 4905 is included by which a user selects a device type (e.g., security, cameras, lights, thermostats, etc.) for which status and control information is available via Home View.

Home View is configured via site settings as described in detail herein. Each application retains or remembers the user's preferred mode across sessions. FIG. 50 shows an example of a Settings page of Home View, under an embodiment. The Settings page includes a Sites list, a "Home View" button 5001, and a corresponding On/Off switch 5002. For site owners, there is also a "Set Up Home View" button (not shown), the selection of which directs the system to the editor. Once Home View is defined by a user, the interface presents the "Set Up Home View" button as an "Edit Home View" button 5003. In the web portal of an embodiment, Home View can be enabled and edited using a Customize link on the Summary tab. Users can check the box to show Home View, and site owners will have an Edit button.

Any time the user wants to alter their Home View floor plans or device positions, they can choose Settings and then select the Edit Home View button. If a device has been deleted, then the Home View display code removes it from the device settings table. If a device has been installed or added to the system, it does not automatically appear in Home View, but it will be available in Edit Home View mode, ready to be placed on a floor.

The Home View mode of an embodiment includes an editor or Edit Mode, as described in detail herein. On the Settings screen, the user can select the Edit Home View button, as described above. This puts the user in Edit mode, where they can make changes to device positions, floor plans, labels, and add/remove floors, for example. When editing is complete, selection of a "Done" button on the screen returns a user to the Security Tab Options screen. If the user has made changes, then a dialog slides up that includes buttons for "Save Changes", "Don't Save", and "Cancel". Once saved, Home View data is saved on the iHub/iServer with other site settings, and can appear in any client that has Home View enabled for display.

When the user first enters Edit mode, the user selects a basic floor plan that defines the perimeter shape of each floor of the premises. FIG. 51 shows an example "Home View Setup" editor page 5100 for use in selecting a floor plan, under an embodiment. Numerous floor plan selections 5102 are presented in a region of the screen labeled "Select a floor plan" 5102, and the floor plan selections of an embodiment comprise, but are not limited to, the following: square; horizontal; vertical; numerous different L-shapes; numerous different U-shapes; numerous different zigzag shapes. The title bar 5103 is labeled "Home View Setup" and includes a Back button 5104.

Upon selection of a basic floor plan, the selected floor plan is displayed. FIG. 52 shows a "Home View Setup" editor screen 5200 with a selected floor plan 5201, under an embodiment. The editor screen 5200 displays a selected floor plan 5201, and includes a device dock 5202, or dock 5202, that includes devices 5203 as represented by icons. The editor 5200 includes an "Options" 5204 icon, the selection of which presents editing options. For example, FIG. 59 shows a Home View Setup page 5900 with options displayed, under an embodiment. The editor 5200 includes numerous editing operations including, but not limited to, positioning devices (dragging device icons from the dock and placing devices on the floor), editing walls (adding new horizontal or vertical walls, or deleting existing walls), and adding or editing labels (changing or deleting room labels). If the default floor plan matches the user's home, then the user has only to position devices on that floor plan. Optionally, the user can add labels. If the user wishes to modify a floor plan or define interiors, however, then walls can be drawn or erased.

Devices are represented by icons that are presented in a device icon dock 5202 of the interface. The interface includes a dock area that includes device icons displayed in rows. Device icons are positioned on the floor plan by dragging them from the dock to the appropriate location on the floor plan. To identify a device the user can tap a device icon or start dragging the device and the name will appear above the device icon. Devices can also be dragged back off the floor and into the dock. Furthermore, labels can be added to devices of the home (e.g., front door 5301). FIG. 53 shows an example editor screen 5300 for which a label 5301 with a name of the device ("Front Door") is displayed, under an embodiment.

There is no requirement under an embodiment for devices to be placed on floors, and any device left in the dock is ignored when Home View is displayed. The devices remaining in the dock can be added to any floor of a floor plan at a subsequent time. Newly installed devices are also left on the dock, ready to be placed when editing. The dock of an embodiment is rendered in ordered rows, and the dock can be scrolled vertically to access all devices in the dock.

The selected floor plan of Home View provides a basic perimeter for the floor, but is not so limited. A user wishing to draw new perimeter walls or define interior walls drags across the grid lines to create new walls. The user deletes walls in much the same way by dragging along the gridline over an existing wall. The process of erasing old walls then drawing new ones can be used to "move" a wall but the embodiment is not so limited. For example, the process of narrowing a rectangular floor plan by moving an entire wall inward includes dragging over the vertical wall that is to be moved and then dragging on the new gridline where the wall is to be placed. FIG. 54 shows a Home View Setup page 5400 with a selected floor plan 5201 that has been edited to add numerous interior walls 5401, under an embodiment.

A user can edit labels on any location of a floor plan, where editing includes adding, editing, and deleting labels. FIG. 55 shows a Home View Setup page with a label editing prompt 5501, under an embodiment. To add a new label, the user selects the option to add a room label and then touches a location for that label. In response the interface presents a label editing prompt 5501 for the label text. In order to edit an existing label, the user taps that location and the same label editing prompt 5501 is presented for use in editing the label. To delete a label the user clears the text.

The floor plan editing of an embodiment includes zoom editing in order to offer increased precision when editing. FIG. 56 shows a Home View Setup page 5600 in a zoomed editing mode to zoom on one room 5601 in a building, under an embodiment. The user edits in a zoomed mode by tapping a magnifying glass icon 5206 displayed on Home View Setup. When using zoom editing, the magnifying glass icon 5206 of the Home View Setup page is replaced with a floor plan icon 5602 displaying the entire floor plan with an overlay 5603 showing the region of the floor plan on which the user has zoomed. Once zoomed, the user scrolls around the floor by dragging the view rectangle in the zoom thumbnail area. Tapping the zoom thumbnail area returns the display to full zoom. When zoom editing, the touching and dragging of a device results in the device being moved instead of the floor. When the user draws a wall and drags the wall, the editor scrolls the floor automatically.

Home View of an embodiment supports the addition of multiple floors, and these floors can also be used for other physical spaces (e.g., outbuildings, garages, etc.). FIG. 57 shows a Home View Setup page for adding at least one floor to a floor plan, under an embodiment. In order to define a new floor in Edit mode, the user touches the Options button 5204 at the top of the Home View Setup page and chooses Add Floor Above (e.g., FIG. 59, element 5902). In response the Add Floor page 5700 appears. In addition to the predefined floor plans, the current user floor is also available for copying to a new floor. The Add Floor page 5702 presents a prompt 5703 to select a floor plan along with numerous floor plans 5704 available for selection.

The Home View editor supports editing with multiple floors. FIG. 58 shows a Home View Setup page 5800 with editing for multiple floors, under an embodiment. When more than one floor is defined, the editor has a few changes. For example, a column of floor thumbnails 5802 appears in a portion of the interface, and the currently selected floor thumbnail 5801 is highlighted. At any time, the user can tap any floor to switch to that floor. As another example, a Remove Floor option is available in the Options menu (see FIG. 59, element 5902).

The Home View editor enables the setting of a default floor when multiple floors are included. Generally, the first floor is drawn first on any client. However, if multiple floors are included and the bottom floor is not the default (e.g., a basement is included), Home View enables changing of this default. The default floor is changed, for example, by tapping the icon for the second floor and then choosing the option "Set As Default Floor" (see FIG. 59, element 5902).

The Home View editor supports the moving of devices between floors when multiple floors are included. At any time, the user can move a device to the dock, switch floors by touching the floor thumbnail corresponding to the desired floor, then drag the device onto the new floor.

The Home View editor of an embodiment includes auto-fill interiors. By default, the interiors of each floor of an embodiment are "filled" to look different from the exteriors, and the interior walls are less prominent than the exterior walls. The auto-fill interiors can be selectively enabled.

The Home View editor is exited by tapping a "Done" button 5204. If changes have been introduced to the floors, device locations, or labels during an editing session, the editor prompts the user to save the changes before exiting back to the Settings screen. FIG. 60 shows a Home View Setup page 6000 with editor exit option prompts 6001 displayed, under an embodiment.

Home View of an embodiment includes or couples to a common data model. For each site, the site owner can use the Edit Home View layout editor to define the floors of the home, label the rooms of the home, and indicate the locations of the devices in the home. FIG. 61 is an example floor plan, under an embodiment. The output of the layout editor of an embodiment is represented using compact ASCII strings stored in site preferences on the server, but is not so limited. This storage scheme uses a virtual grid, and stores simple vector and x,y locations on that grid. For example, given a single-story home, the data describes the visual components as follows: the lighter-shade interior tile areas are described as two large rectangles; the stronger, exterior walls are described as four horizontal and three vertical vectors; the lighter interior walls are described as one horizontal and one vertical vector; the two device icons are each described with an x,y coordinate plus device identifier; the two room labels are each described with an x,y coordinate plus the text.

This static ASCII data model of the home is stored by the editor so that client applications can fetch this static data model and combine it locally with the current state of their devices to render a graphical view. The only thing that subsequently changes are the device icons as users take actions that affect the status of devices (e.g., open doors, turn on lights, etc.).

The data model strings are stored in three variables in site preferences on the server. The three variables include homeview/floors, homeview/devices, and homeview/labels. The variable homeview/floors specifies where the walls should be drawn for each floor, and whether interior floor space should be filled. The variable homeview/floors includes a single floor, or multiple floors (separated in the data by semicolons). If multiple floors are included, a default floor can be indicated so apps will display the default floor first.

The variable homeview/devices includes a list of floor locations and device IDs to draw on those locations. For multi-floor homes, per-floor data is separated by semicolons, but is not so limited. The list of floor locations and device IDs may be a subset of devices (the data model does not include information about devices that have not been placed on a floor).

The variable homeview/labels includes a list of locations, and text labels to draw centered on those locations. For multi-floor homes the data per floor is separated by semicolons.

Home View of an embodiment includes a compact method for storing numbers wherein, throughout this model, numbers such as x,y coordinates and vector lengths are compactly represented using an ASCII-offset model starting with the lowercase alphabet (plus a few characters that follow z in ASCII for >26), as follows:

a=0, b=1, c=2, . . . , x=23, y=24, z=25, {=26, |=27, }=28

The use of this model enables specification of any (x,y) coordinate using two characters. For example, a horizontal line drawn from x,y position 2,5 with a length of 20 (2,5,20) can be represented by storing the "2" as "c", storing "5" as "f", and storing 20 as t, compactly storing the line as "cft".

The homeview/floors variable includes specific data elements, but the embodiments are not so limited. The data elements of an embodiment include the following: [max # of tiles across] [optional flag: don't autofill interiors]; [floorplan data for 1st floor] [; floorplan data for 2nd floor] [; 3rd floor] [; 4th floor] [; 5th floor].

The data element "max # of tiles across" is saved as 28 by default. The result is that the user can draw a floor plan using up to 28 walls horizontally (29 walls vertically), containing 28 "tiles," which supports a house with up to five rooms across.

The data element optional flag to prevent autofill interiors, when included, instructs the Home View editor to never fill any floor interiors when exporting the floor data. While the data may not include any interior tiles, depending on how the walls were drawn, but this flag prevents any interior tiles from being computed by the editor.

The data element "semicolon" separates the general settings from the first floor data.

The data element "floorplan data for a single floor" includes an optional flag plus a number of blocks of text representing vectors to draw, each block separated by spaces. The first character of each block indicates the type of vector to draw, and the characters that follow represent the vectors. When a floor should be shown first, the flag "default" is added before the vector data for that floor. Generally, the first floor is the default, so in that case (or in a single-floor house) this flag is not needed. The blocks of text representing the vectors include but are not limited to an H block, V block, h block, v block, and t block.

The H block, when there are horizontal exterior walls to draw, starts with a capital H, followed by three characters for each horizontal wall to draw (startX, startY, length). For example, a 15-tile wall drawn from the top corner is represented as H(0,0,15), which is compactly represented as Haap. A second horizontal wall drawn elsewhere appends another block of three coordinates. So Haap might become Haappph if there are two horizontal exterior walls. In the full example there are four exterior walls to draw so the data block is H followed by 4 triples: Haappphxpfa}}.

The V block, when there are vertical exterior walls to draw, starts with a capital V, followed by three characters for each vertical wall to draw (startX, startY, length). A vertical exterior wall drawn down the left side is represented as V(0,0,28) as Vaa}. Again, another three characters are added for each additional vertical exterior wall to draw.

The h block is similar to the H block except these are rendered as horizontal interior walls. This block starts with the letter h, followed by three characters for each horizontal line to draw (startX, startY, length). For example, a 15-tile line drawn in the middle is represented as h(0,15,15), which is compactly represented as happ. Another wall drawn in another area appends another block of three coordinates for each additional wall.

The v block is similar to the V block except these are rendered as vertical interior walls. This block starts with the letter v, followed by three characters for each vertical wall to draw (startX, startY, length).

The t block, when there are interior tiles to draw, starts with the letter t, followed by four characters for each rectangle to draw (x, y, width, height). For example, a 15-tile square is drawn in the corner is represented as t(0,0,15,15), which is compactly represented as taapp. Another rectangle of tiles drawn in another area appends another block of four coordinates. So taapp might become taappap}n.

If there are multiple floors, a semicolon is added and then another block of floor plan data can be added. For an empty floor there can be nothing between floors. For example, a three-story house with nothing defined for the middle floor is represented as follows: 28; Haapppgxpfa Vaa}pap}pn; ; Haapppgxpfa Vaa}pap}pn.

FIG. 62 is an example Home View one-story floor plan, under an embodiment. This floor plan is represented in an embodiment as follows: 28 (draw on a grid 28 tiles wide by 28 tiles tall); taappap}n (draw interior tiles as two large rectangles (x,y,w,h): (0,0,15,15) and (0,15,28,13)); happ (draw an interior horizontal wall (x,y,w): (0,15,15)); vhui (draw an interior vertical wall (x,y,h): (7,20,8)); Haappphxpfa}} (draw 4 exterior horizontal walls); Vaa}pap}pn (draw 3 vertical exterior walls). The complete homeview/floors data for this single-story home would be: 28; taappap}n happ vhui Haappphxpfa}} Vaa}pap}pn.

The homeview/devices variable includes specific data elements, but the embodiments are not so limited. The data elements of an embodiment include the following: [device location+id on 1st floor] [another device location+id on 1st floor] [ . . . ] [; device data for 2nd floor] [; 3rd floor] [; 4th floor] [; 5th floor].

Regarding the device location data element, each device location starts with a letter indicating location type: t (center the device over the middle of a tile); h (center the device over the middle of a horizontal segment); v (center the device over the middle of a vertical segment). The device location is followed by two characters that specify the (x,y) location of that tile or wall segment. For example, to place a device in the center of the first tile an embodiment uses t(0,0), represented as taa.

The device identifier data element is the unique identifier for the device. Note that some IDs can be long, so an embodiment only stores the last six characters of the device ID. For example, if the identifier is "ZONE12VER1", an embodiment stores "12VER1", and if the identifier is "ZONE5VER1" the embodiment stores "E5VER1".

A complete device location+id element is a minimum of four characters (type, x, y, id) and can be up to nine characters. An example of a complete device location and identification is as follows: Draw camera "SC0FEBED" centered on the third horizontal wall segment across the top: t+(2, 0)+SC0FEBED, stored compactly as tca0FEBED. Another example of a complete device location and identification is as follows: Draw z-wave light with ID "7" centered over vertical wall segment 11 across and 5 down: vke7.

Data for multiple floors are separated by semicolons as described herein. Therefore, for a three-story house with just two devices on the third floor the data is as follows: ; ; t{qE5VER1 h{w0FEBED.

FIG. 63 is an example Home View floor plan that includes two devices, under an embodiment. This floor plan is represented in an embodiment as follows: t{qE5VER1: draw a motion sensor "ZONE5VER1" centered over tile at x,y location (26, 16); h{w0FEBED: draw camera "SC0FEBED" centered over horizontal wall at x,y location (26, 22). The complete homeview/devices data for this single-story home are: t{qE5VER1 h{w0FEBED.

The homeview/labels variable includes specific data elements, but the embodiments are not so limited. The data elements of an embodiment include the following: [label location+label text on 1st floor] [another location+label on 1st floor] [ . . . ] [; label data for 2nd floor] [; 3rd floor] [; 4th floor] [; 5th floor].

Each label location data element starts with a letter indicating location type: t (center the label over the middle of a tile; h (center the label over the middle of a horizontal segment; v (center the label over the middle of a vertical segment). The label location data element is followed by two characters that specify the (x,y) location of that tile or wall segment. For example, to place a label in the center of the first tile of an embodiment uses t(0,0), represented as taa.

The label text data element can be almost any string, enclosed in brackets [ ]. The text encoding of an embodiment follows the W3C definition for encodeURLComponent( ) method in javascript, which encodes everything except ~!*( ). The only characters not allowed in labels are brackets themselves ([ ]). These should be stripped out when labels are defined in the editor.

Empty labels should not be stored. A complete label location+text element includes a minimum of six characters (type, x, y, [text]), as in vhg[Bedroom].

FIG. 64 is an example Home View floor plan that includes two labels, under an embodiment. This floor plan is represented in an embodiment as follows: vhg[Bedroom]: draw label "Bedroom" centered over vertical wall at x,y location (7, 6); tsv[Living%20Room]: draw label "Living Room" centered over tile at x,y location (26, 22). The complete homeview/labels data for this single-story home are: vhg [Bedroom] tsv[Living%20Room].

As described in detail herein, the user defines the walls of each floor of a home by drawing basic vectors. However, when a floor is rendered, the building exteriors should be readily distinguished from the interiors. For rendering Home View, an embodiment includes algorithms that determine the interior of the home and compute which tiles should be transparent and which are filled. Perimeter walls are rendered to be more vivid than interior walls. The user may draw openings in the external walls.

The algorithm of an embodiment for determining interior and exterior walls begins by marking all tiles as interior tile. A list is generated of tiles on the edge of each floor that are empty (top row, bottom row, left column, right column), and a function is called to clear each tile having no outside wall. Any edge tiles having no walls outside of them are marked as exterior tiles. For each exterior tile, the algorithm recursively searches the surrounding tiles. If there are no walls separating that tile from the next, then the next one is also marked as exterior.

In this way, Home View recursively crawls into the house from the edges, marking tiles as "exterior" as operation proceeds. Once all exterior tiles are determined, walls adjacent to them are also considered "exterior", and any walls bounded by interior tiles are considered "interior". The algorithm identifies small openings, before recursing from one exterior tile to an adjacent tile, by examining the walls nearby to ensure the opening is wide enough before proceeding. This interior/exterior computation is computed by the Home View editor, and stored with the floor data on the server. Client renderers have an easier job since the data indicates interior/exterior information as defined above in homeview/floors.

The Home View data output from Edit mode is checked to ensure integrity through performance of the following: the home vectors fit without bounds of each floor; all sensors and devices still exist. At the time of rendering of the home view, the same checks are repeated to verify data integrity. If any checks fail, a dialog is presented to the user, and the preference returns to the System Icon (the "orb"). The feature therefore is turned off for display, but the data is still there until subsequently edited; if a user attempts to edit home view and the data is corrupted, the user is given the option to reset the data and start over.

The integrated security system includes couplings or connections among a variety of IP devices or components, and the device management module is in charge of the discovery, installation and configuration of the IP devices coupled or connected to the system, as described above. The integrated security system of an embodiment uses a "sandbox" network to discover and manage all IP devices coupled or connected as components of the system. The IP devices of an embodiment include wired devices, wireless devices, cameras, interactive touchscreens, and security panels to name a few. These devices can be wired via ethernet cable or Wifi devices, all of which are secured within the sandbox network, as described below. The "sandbox" network is described in detail below.

FIG. 65 is a block diagram 500 of network or premise device integration with a premise network 250, under an embodiment. In an embodiment, network devices 255-257 are coupled to the gateway 102 using a secure network coupling or connection such as SSL over an encrypted 802.11 link (utilizing for example WPA-2 security for the wireless encryption). The network coupling or connection between the gateway 102 and the network devices 255-257 is a private coupling or connection in that it is segregated from any other network couplings or connections. The gateway 102 is coupled to the premise router/firewall 252 via a coupling with a premise LAN 250. The premise router/firewall 252 is coupled to a broadband modem 251, and the broadband modem 251 is coupled to a WAN 200 or other network outside the premise. The gateway 102 thus enables or forms a separate wireless network, or sub-network, that includes some number of devices and is coupled or connected to the LAN 250 of the host premises. The gateway sub-network can include, but is not limited to, any number of other devices like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

FIG. 66 is a block diagram 600 of network or premise device integration with a premise network 250, under an alternative embodiment. The network or premise devices 255-257 are coupled to the gateway 102. The network coupling or connection between the gateway 102 and the network devices 255-257 is a private coupling or connection in that it is segregated from any other network couplings or connections. The gateway 102 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the gateway 102 can be configured or function as the premise router routing specified data between the outside network (e.g., WAN 200) and the premise router/firewall 252 of the LAN 250. As described above, the gateway 102 in this configuration enables or forms a separate wireless network, or sub-network, that includes the network or premise devices 255-257 and is coupled or connected between the LAN 250 of the host premises and the WAN 200. The gateway sub-network can include, but is not limited to, any number of network or premise devices 255-257 like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

The examples described above with reference to FIGS. 47 and 48 are presented only as examples of IP device integration. The integrated security system is not limited to the type, number and/or combination of IP devices shown and described in these examples, and any type, number and/or combination of IP devices is contemplated within the scope of this disclosure as capable of being integrated with the premise network.

The integrated security system of an embodiment includes a touchscreen (also referred to as the iControl touchscreen or integrated security system touchscreen), as described above, which provides core security keypad functionality, content management and presentation, and embedded systems design. The networked security touchscreen system of an embodiment enables a consumer or security provider to easily and automatically install, configure and manage the security system and touchscreen located at a customer premise. Using this system the customer may access and control the local security system, local IP devices such as cameras, local sensors and control devices (such as lighting controls or pipe freeze sensors), as well as the local security system panel and associated security sensors (such as door/window, motion, and smoke detectors). The customer premise may be a home, business, and/or other location equipped with a wired or wireless broadband IP connection.

The system of an embodiment includes a touchscreen with a configurable software user interface and/or a gateway device (e.g., iHub) that couples or connects to a premise security panel through a wired or wireless connection, and a remote server that provides access to content and information from the premises devices to a user when they are remote from the home. The touchscreen supports broadband and/or WAN wireless connectivity. In this embodiment, the touchscreen incorporates an IP broadband connection (e.g., Wifi radio, Ethernet port, etc.), and/or a cellular radio (e.g., GPRS/GSM, CDMA, WiMax, etc.). The touchscreen described herein can be used as one or more of a security system interface panel and a network user interface (UI) that provides an interface to interact with a network (e.g., LAN, WAN, internet, etc.).

The touchscreen of an embodiment provides an integrated touchscreen and security panel as an all-in-one device. Once integrated using the touchscreen, the touchscreen and a security panel of a premise security system become physically co-located in one device, and the functionality of both may even be co-resident on the same CPU and memory (though this is not required).

The touchscreen of an embodiment also provides an integrated IP video and touchscreen UI. As such, the touchscreen supports one or more standard video CODECs/players (e.g., H.264, Flash Video, MOV, MPEG4, M-JPEG, etc.). The touchscreen UI then provides a mechanism (such as a camera or video widget) to play video. In an embodiment the video is streamed live from an IP video camera. In other embodiments the video comprises video clips or photos sent from an IP camera or from a remote location.

The touchscreen of an embodiment provides a configurable user interface system that includes a configuration supporting use as a security touchscreen. In this embodiment, the touchscreen utilizes a modular user interface that allows components to be modified easily by a service provider, an installer, or even the end user. Examples of such a modular approach include using Flash widgets, HTML-based widgets, or other downloadable code modules such that the user interface of the touchscreen can be updated and modified while the application is running. In an embodiment the touchscreen user interface modules can be downloaded over the internet. For example, a new security configuration widget can be downloaded from a standard web server, and the touchscreen then loads such configuration app into memory, and inserts it in place of the old security configuration widget. The touchscreen of an embodiment is configured to provide a self-install user interface.

Embodiments of the networked security touchscreen system described herein include a touchscreen device with a user interface that includes a security toolbar providing one or more functions including arm, disarm, panic, medic, and alert. The touchscreen therefore includes at least one screen having a separate region of the screen dedicated to a security toolbar. The security toolbar of an embodiment is present in the dedicated region at all times that the screen is active.

The touchscreen of an embodiment includes a home screen having a separate region of the screen allocated to managing home-based functions. The home-based functions of an embodiment include managing, viewing, and/or controlling IP video cameras. In this embodiment, regions of the home screen are allocated in the form of widget icons; these widget icons (e.g. for cameras, thermostats, lighting, etc) provide functionality for managing home systems. So, for example, a displayed camera icon, when selected, launches a Camera Widget, and the Camera widget in turn provides access to video from one or more cameras, as well as providing the user with relevant camera controls (take a picture, focus the camera, etc.)

The touchscreen of an embodiment includes a home screen having a separate region of the screen allocated to managing, viewing, and/or controlling internet-based content or applications. For example, the Widget Manager UI presents a region of the home screen (up to and including the entire home screen) where internet widgets icons such as weather, sports, etc. may be accessed). Each of these icons may be selected to launch their respective content services.

The touchscreen of an embodiment is integrated into a premise network using the gateway, as described above. The gateway as described herein functions to enable a separate wireless network, or sub-network, that is coupled, connected, or integrated with another network (e.g., WAN, LAN of the host premises, etc.). The sub-network enabled by the gateway optimizes the installation process for IP devices, like the touchscreen, that couple or connect to the sub-network by segregating these IP devices from other such devices on the network. This segregation of the IP devices of the sub-network further enables separate security and privacy policies to be implemented for these IP devices so that, where the IP devices are dedicated to specific functions (e.g., security), the security and privacy policies can be tailored specifically for the specific functions. Furthermore, the gateway and the sub-network it forms enables the segregation of data traffic, resulting in faster and more efficient data flow between components of the host network, components of the sub-network, and between components of the sub-network and components of the network.

The touchscreen of an embodiment includes a core functional embedded system that includes an embedded operating system, required hardware drivers, and an open system interface to name a few. The core functional embedded system can be provided by or as a component of a conventional security system (e.g., security system available from GE Security). These core functional units are used with components of the integrated security system as described herein. Note that portions of the touchscreen description below may include reference to a host premise security system (e.g., GE security system), but these references are included only as an example and do not limit the touchscreen to integration with any particular security system.

As an example, regarding the core functional embedded system, a reduced memory footprint version of embedded Linux forms the core operating system in an embodiment, and provides basic TCP/IP stack and memory management functions, along with a basic set of low-level graphics primitives. A set of device drivers is also provided or included that offer low-level hardware and network interfaces. In addition to the standard drivers, an interface to the RS 485 bus is included that couples or connects to the security system panel (e.g., GE Concord panel). The interface may, for example, implement the Superbus 2000 protocol, which can then be utilized by the more comprehensive transaction-level security functions implemented in PanelConnect technology (e.g SetAlarmLevel (int level, int partition, char *accessCode)). Power control drivers are also provided.

FIG. 67 is a block diagram of a touchscreen 700 of the integrated security system, under an embodiment. The touchscreen 700 generally includes an application/presentation layer 702 with a resident application 704, and a core engine 706. The touchscreen 700 also includes one or more of the following, but is not so limited: applications of premium services 710, widgets 712, a caching proxy 714, network security 716, network interface 718, security object 720, applications supporting devices 722, PanelConnect API 724, a gateway interface 726, and one or more ports 728.

More specifically, the touchscreen, when configured as a home security device, includes but is not limited to the following application or software modules: RS 485 and/or RS-232 bus security protocols to conventional home security system panel (e.g., GE Concord panel); functional home security classes and interfaces (e.g. Panel ARM state, Sensor status, etc.); Application/Presentation layer or engine; Resident Application; Consumer Home Security Application; installer home security application; core engine; and System bootloader/Software Updater. The core Application engine and system bootloader can also be used to support other advanced content and applications. This provides a seamless interaction between the premise security application and other optional services such as weather widgets or IP cameras.

An alternative configuration of the touchscreen includes a first Application engine for premise security and a second Application engine for all other applications. The integrated security system application engine supports content standards such as HTML, XML, Flash, etc. and enables a rich consumer experience for all 'widgets', whether security-based or not. The touchscreen thus provides service providers the ability to use web content creation and management tools to build and download any 'widgets' regardless of their functionality.

As discussed above, although the Security Applications have specific low-level functional requirements in order to interface with the premise security system, these applications make use of the same fundamental application facilities as any other 'widget', application facilities that include graphical layout, interactivity, application handoff, screen management, and network interfaces, to name a few.

Content management in the touchscreen provides the ability to leverage conventional web development tools, performance optimized for an embedded system, service provider control of accessible content, content reliability in a consumer device, and consistency between 'widgets' and seamless widget operational environment. In an embodiment of the integrated security system, widgets are created by web developers and hosted on the integrated security system Content Manager (and stored in the Content Store database). In this embodiment the server component caches the widgets and offers them to consumers through the web-based integrated security system provisioning system. The servers interact with the advanced touchscreen using HTTPS interfaces controlled by the core engine and dynamically download widgets and updates as needed to be cached on the touchscreen. In other embodiments widgets can be accessed directly over a network such as the Internet without needing to go through the iControl Content Manager Referring to FIG. 67, the touchscreen system is built on a tiered architecture, with defined interfaces between the Application/Presentation Layer (the Application Engine) on the top, the Core Engine in the middle, and the security panel and gateway APIs at the lower level. The architecture is configured to provide maximum flexibility and ease of maintenance.

The application engine of the touchscreen provides the presentation and interactivity capabilities for all applications (widgets) that run on the touchscreen, including both core security function widgets and third party content widgets. FIG. 68 is an example screenshot 800 of a networked security touchscreen, under an embodiment. This example screenshot 800 includes three interfaces or user interface (UI) components 802-806, but is not so limited. A first UI 802 of the touchscreen includes icons by which a user controls or accesses functions and/or components of the security system (e.g., "Main", "Panic", "Medic", "Fire", state of the premise alarm system (e.g., disarmed, armed, etc.), etc.); the first UI 802, which is also referred to herein as a security interface, is always presented on the touchscreen. A second UI 804 of the touchscreen includes icons by which a user selects or interacts with services and other network content (e.g., clock, calendar, weather, stocks, news, sports, photos, maps, music, etc.) that is accessible via the touchscreen. The second UI 804 is also referred to herein as a network interface or content interface. A third UI 806 of the touchscreen includes icons by which a user selects or interacts with additional services or componets (e.g., intercom control, security, cameras coupled to the system in particular regions (e.g., front door, baby, etc.) available via the touchscreen.

A component of the application engine is the Presentation Engine, which includes a set of libraries that implement the standards-based widget content (e.g., XML, HTML, JavaScript, Flash) layout and interactivity. This engine provides the widget with interfaces to dynamically load both graphics and application logic from third parties, support high level data description language as well as standard graphic formats. The set of web content-based functionality available to a widget developer is extended by specific touchscreen functions implemented as local web services by the Core Engine.

The resident application of the touchscreen is the master service that controls the interaction of all widgets in the system, and enforces the business and security rules required by the service provider. For example, the resident application determines the priority of widgets, thereby enabling a home security widget to override resource requests from a less critical widget (e.g. a weather widget). The resident application also monitors widget behavior, and responds to client or server requests for cache updates.

The core engine of the touchscreen manages interaction with other components of the integrated security system, and provides an interface through which the resident application and authorized widgets can get information about the home security system, set alarms, install sensors, etc. At the lower level, the Core Engine's main interactions are through the PanelConnect API, which handles all communication with the security panel, and the gateway Interface, which handles communication with the gateway. In an embodiment, both the iHub Interface and PanelConnect API are resident and operating on the touchscreen. In another embodiment, the PanelConnect API runs on the gateway or other device that provides security system interaction and is accessed by the touchscreen through a web services interface.

The Core Engine also handles application and service level persistent and cached memory functions, as well as the dynamic provisioning of content and widgets, including but not limited to: flash memory management, local widget and content caching, widget version management (download, cache flush new/old content versions), as well as the caching and synchronization of user preferences. As a portion of these services the Core engine incorporates the bootloader functionality that is responsible for maintaining a consistent software image on the touchscreen, and acts as the client agent for all software updates. The bootloader is configured to ensure full update redundancy so that unsuccessful downloads cannot corrupt the integrated security system.

Video management is provided as a set of web services by the Core Engine. Video management includes the retrieval and playback of local video feeds as well as remote control and management of cameras (all through iControl CameraConnect technology).

Both the high level application layer and the mid-level core engine of the touchscreen can make calls to the network. Any call to the network made by the application layer is automatically handed off to a local caching proxy, which determines whether the request should be handled locally. Many of the requests from the application layer are web services API requests; although such requests could be satisfied by the iControl servers, they are handled directly by the touchscreen and the gateway. Requests that get through the caching proxy are checked against a white list of acceptable sites, and, if they match, are sent off through the network interface to the gateway. Included in the Network Subsystem is a set of network services including HTTP, HTTPS, and server-level authentication functions to manage the secure client-server interface. Storage and management of certificates is incorporated as a part of the network services layer.

Server components of the integrated security system servers support interactive content services on the touchscreen. These server components include, but are not limited to the content manager, registry manager, network manager, and global registry, each of which is described herein.

The Content Manager oversees aspects of handling widget data and raw content on the touchscreen. Once created and validated by the service provider, widgets are 'ingested' to the Content Manager, and then become available as downloadable services through the integrated security system Content Management APIs. The Content manager maintains versions and timestamp information, and connects to the raw data contained in the backend Content Store database. When a widget is updated (or new content becomes available) all clients registering interest in a widget are systematically updated as needed (a process that can be configured at an account, locale, or system-wide level).

The Registry Manager handles user data, and provisioning accounts, including information about widgets the user has decided to install, and the user preferences for these widgets.

The Network Manager handles getting and setting state for all devices on the integrated security system network (e.g., sensors, panels, cameras, etc.). The Network manager synchronizes with the gateway, the advanced touchscreen, and the subscriber database.

The Global Registry is a primary starting point server for all client services, and is a logical referral service that abstracts specific server locations/addresses from clients (touchscreen, gateway 102, desktop widgets, etc.). This approach enables easy scaling/migration of server farms.

The touchscreen of an embodiment operates wirelessly with a premise security system. The touchscreen of an embodiment incorporates an RF transceiver component that either communicates directly with the sensors and/or security panel over the panel's proprietary RF frequency, or the touchscreen communicates wirelessly to the gateway over 802.11, Ethernet, or other IP-based communications channel, as described in detail herein. In the latter case the gateway implements the PanelConnect interface and communicates directly to the security panel and/or sensors over wireless or wired networks as described in detail above.

The touchscreen of an embodiment is configured to operate with multiple security systems through the use of an abstracted security system interface. In this embodiment, the PanelConnect API can be configured to support a plurality of proprietary security system interfaces, either simultaneously or individually as described herein. In one embodiment of this approach, the touchscreen incorporates multiple physical interfaces to security panels (e.g. GE Security RS-485, Honeywell RF, etc.) in addition to the PanelConnect API implemented to support multiple security interfaces. The change needed to support this in PanelConnect is a configuration parameter specifying the panel type connection that is being utilized.

So for example, the setARMState( ) function is called with an additional parameter (e.g., Armstate=setARMState (type="ARM STAY|ARM AWAY|DISARM", Parameters="ExitDelay=30|Lights=OFF", panelType="GE Concord4 RS485")). The 'panelType' parameter is used by the setARMState function (and in practice by all of the PanelConnect functions) to select an algorithm appropriate to the specific panel out of a plurality of algorithms.

The touchscreen of an embodiment is self-installable. Consequently, the touchscreen provides a 'wizard' approach similar to that used in traditional computer installations (e.g. InstallShield). The wizard can be resident on the touchscreen, accessible through a web interface, or both. In one embodiment of a touchscreen self-installation process, the service provider can associate devices (sensors, touchscreens, security panels, lighting controls, etc.) remotely using a web-based administrator interface.

The touchscreen of an embodiment includes a battery backup system for a security touchscreen. The touchscreen incorporates a standard Li-ion or other battery and charging circuitry to allow continued operation in the event of a power outage. In an embodiment the battery is physically located and connected within the touchscreen enclosure. In another embodiment the battery is located as a part of the power transformer, or in between the power transformer and the touchscreen.

The example configurations of the integrated security system described above with reference to FIGS. 47 and 48 include a gateway that is a separate device, and the touchscreen couples to the gateway. However, in an alternative embodiment, the gateway device and its functionality can be incorporated into the touchscreen so that the device management module, which is now a component of or included in the touchscreen, is in charge of the discovery, installation and configuration of the IP devices coupled or connected to the system, as described above. The integrated security system with the integrated touchscreen/gateway uses the same "sandbox" network to discover and manage all IP devices coupled or connected as components of the system.

The touchscreen of this alternative embodiment integrates the components of the gateway with the components of the touchscreen as described herein. More specifically, the touchscreen of this alternative embodiment includes software or applications described above with reference to FIG. 3. In this alternative embodiment, the touchscreen includes the gateway application layer 302 as the main program that orchestrates the operations performed by the gateway. A Security Engine 304 of the touchscreen provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

- Encryption including 128-bit SSL encryption for gateway and iConnect server communication to protect user data privacy and provide secure communication.
- Bi-directional authentication between the touchscreen and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.
- Camera SSL encapsulation because picture and video traffic offered by off-the-shelf networked IP cameras is not secure when traveling over the Internet. The touchscreen provides for 128-bit SSL encapsulation of the user picture and video data sent over the internet for complete user security and privacy.
- 802.11b/g/n with WPA-2 security to ensure that wireless camera communications always takes place using the strongest available protection.
- A touchscreen-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying touchscreen-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 of the touchscreen allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Touchscreen firmware can be remotely download either for one touchscreen at a time, a group of touchscreen, or in batches.

The Automations engine 308 of the touchscreen manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 of the touchscreen touchscreen includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 of the touchscreen is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application of the touchscreen. The Schedules Engine 318 then interfaces with SensorConnect 312 to ensure that scheduled events occur at precisely the desired time.

The Device Management module 320 of the touchscreen is in charge of all discovery, installation and configuration of both wired and wireless IP devices (e.g., cameras, etc.) coupled or connected to the system. Networked IP devices, such as those used in the integrated security system, require user configuration of many IP and security parameters, and the device management module of an embodiment handles the details of this configuration. The device management module also manages the video routing module described below.

The video routing engine 322 of the touchscreen is responsible for delivering seamless video streams to the user with zero-configuration. Through a multi-step, staged approach the video routing engine uses a combination of UPnP port-forwarding, relay server routing and STUN/TURN peer-to-peer routing. The video routing engine is described in detail in the Related Applications.

FIG. 69 is a block diagram 900 of network or premise device integration with a premise network 250, under an embodiment. In an embodiment, network devices 255, 256, 957 are coupled to the touchscreen 902 using a secure network connection such as SSL over an encrypted 802.11 link (utilizing for example WPA-2 security for the wireless encryption), and the touchscreen 902 coupled to the premise router/firewall 252 via a coupling with a premise LAN 250. The premise router/firewall 252 is coupled to a broadband modem 251, and the broadband modem 251 is coupled to a WAN 200 or other network outside the premise. The touchscreen 902 thus enables or forms a separate wireless network, or sub-network, that includes some number of devices and is coupled or connected to the LAN 250 of the host premises. The touchscreen sub-network can include, but is not limited to, any number of other devices like WiFi IP cameras, security panels (e.g., IP-enabled), and IP devices, to name a few. The touchscreen 902 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 902.

FIG. 70 is a block diagram 1000 of network or premise device integration with a premise network 250, under an alternative embodiment. The network or premise devices 255, 256, 1057 are coupled to the touchscreen 1002, and the touchscreen 1002 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the touchscreen 1002 can be configured or function as the premise router routing specified data between the outside network (e.g., WAN 200) and the premise router/firewall 252 of the LAN 250. As described above, the touchscreen 1002 in this configuration enables or forms a separate wireless network, or sub-network, that includes the network or premise devices 255, 156, 1057 and is coupled or connected between the LAN 250 of the host premises and the WAN 200. The touchscreen sub-network can include, but is not limited to, any number of network or premise devices 255, 256, 1057 like WiFi IP cameras, security panels (e.g., IP-enabled), and security touchscreens, to name a few. The touchscreen 1002 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 1002.

The gateway of an embodiment, whether a stand-along component or integrated with a touchscreen, enables couplings or connections and thus the flow or integration of information between various components of the host premises and various types and/or combinations of IP devices, where the components of the host premises include a network (e.g., LAN) and/or a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

The gateway of an embodiment, as described herein, enables couplings or connections and thus the flow of information between various components of the host premises and various types and/or combinations of IP devices, where the components of the host premises include a network, a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

FIG. 71 is a flow diagram for a method 1100 of forming a security network including integrated security system components, under an embodiment. Generally, the method comprises coupling 1102 a gateway comprising a connection management component to a local area network in a first location and a security server in a second location. The method comprises forming 1104 a security network by automatically establishing a wireless coupling between the gateway and a security system using the connection management component. The security system of an embodiment comprises security system components located at the first location. The method comprises integrating 1106 communications and functions of the security system components into the security network via the wireless coupling.

FIG. 72 is a flow diagram for a method 1200 of forming a security network including integrated security system components and network devices, under an embodiment. Generally, the method comprises coupling 1202 a gateway to a local area network located in a first location and a security server in a second location. The method comprises automatically establishing 1204 communications between the gateway and security system components at the first location, the security system including the security system components. The method comprises automatically establishing 1206 communications between the gateway and premise devices at the first location. The method comprises forming 1208 a security network by electronically integrating, via the gateway, communications and functions of the premise devices and the security system components.

In an example embodiment, FIG. 73 is a flow diagram 1300 for integration or installation of an IP device into a private network environment, under an embodiment. The IP device includes any IP-capable device that, for example, includes the touchscreen of an embodiment. The variables of an embodiment set at time of installation include, but are not limited to, one or more of a private SSID/Password, a gateway identifier, a security panel identifier, a user account TS, and a Central Monitoring Station account identification.

An embodiment of the IP device discovery and management begins with a user or installer activating 1302 the gateway and initiating 1304 the install mode of the system. This places the gateway in an install mode. Once in install mode, the gateway shifts to a default (Install) Wifi configuration. This setting will match the default setting for other integrated security system-enabled devices that have been pre-configured to work with the integrated security system. The gateway will then begin to provide 1306 DHCP addresses for these IP devices. Once the devices have acquired a new DHCP address from the gateway, those devices are available for configuration into a new secured Wifi network setting.

The user or installer of the system selects 1308 all devices that have been identified as available for inclusion into the integrated security system. The user may select these devices by their unique IDs via a web page, Touchscreen, or other client interface. The gateway provides 1310 data as appropriate to the devices. Once selected, the devices are configured 1312 with appropriate secured Wifi settings, including SSID and WPA/WPA-2 keys that are used once the gateway switches back to the secured sandbox configuration from the "Install" settings. Other settings are also configured as appropriate for that type of device. Once all devices have been configured, the user is notified and the user can exit install mode. At this point all devices will have been registered 1314 with the integrated security system servers.

The installer switches 1316 the gateway to an operational mode, and the gateway instructs or directs 1318 all newly configured devices to switch to the "secured" Wifi sandbox settings. The gateway then switches 1320 to the "secured" Wifi settings. Once the devices identify that the gateway is active on the "secured" network, they request new DHCP addresses from the gateway which, in response, provides 1322 the new addresses. The devices with the new addresses are then operational 1324 on the secured network.

In order to ensure the highest level of security on the secured network, the gateway can create or generate a dynamic network security configuration based on the unique ID and private key in the gateway, coupled with a randomizing factor that can be based on online time or other inputs. This guarantees the uniqueness of the gateway secured network configuration.

To enable the highest level of performance, the gateway analyzes the RF spectrum of the 802.11x network and determines which frequency band/channel it should select to run.

An alternative embodiment of the camera/IP device management process leverages the local ethernet connection of the sandbox network on the gateway. This alternative process is similar to the Wifi discovery embodiment described above, except the user connects the targeted device to the ethernet port of the sandbox network to begin the process. This alternative embodiment accommodates devices that have not been pre-configured with the default "Install" configuration for the integrated security system.

This alternative embodiment of the IP device discovery and management begins with the user/installer placing the system into install mode. The user is instructed to attach an IP device to be installed to the sandbox Ethernet port of the gateway. The IP device requests a DHCP address from the gateway which, in response to the request, provides the address. The user is presented the device and is asked if he/she wants to install the device. If yes, the system configures the device with the secured Wifi settings and other device-specific settings (e.g., camera settings for video length, image quality etc.). The user is next instructed to disconnect the device from the ethernet port. The device is now available for use on the secured sandbox network.

FIG. 74 is a block diagram showing communications among integrated IP devices of the private network environment, under an embodiment. The IP devices of this example include a security touchscreen 1403, gateway 1402 (e.g., "iHub"), and security panel (e.g., "Security Panel 1", "Security Panel 2", "Security Panel n"), but the embodiment is not so limited. In alternative embodiments any number and/or combination of these three primary component types may be combined with other components including IP devices and/or security system components. For example, a single device which comprises an integrated gateway, touchscreen, and security panel is merely another embodiment of the integrated security system described herein. The description that follows includes an example configuration that includes a touchscreen hosting particular applications. However, the embodiment is not limited to the touchscreen hosting these applications, and the touchscreen should be thought of as representing any IP device.

Referring to FIG. 74, the touchscreen 1403 incorporates an application 1410 that is implemented as computer code resident on the touchscreen operating system, or as a web-based application running in a browser, or as another type of scripted application (e.g., Flash, Java, Visual Basic, etc.). The touchscreen core application 1410 represents this application, providing user interface and logic for the end user to manage their security system or to gain access to networked information or content (Widgets). The touchscreen core application 1410 in turn accesses a library or libraries of functions to control the local hardware (e.g. screen display, sound, LEDs, memory, etc.) as well as specialized librarie(s) to couple or connect to the security system.

In an embodiment of this security system connection, the touchscreen 1403 communicates to the gateway 1402, and has no direct communication with the security panel. In this embodiment, the touchscreen core application 1410 accesses the remote service APIs 1412 which provide security system functionality (e.g. ARM/DISARM panel, sensor state, get/set panel configuration parameters, initiate or get alarm events, etc.). In an embodiment, the remote service APIs 1412 implement one or more of the following functions, but the embodiment is not so limited: Armstate=setARMState (type="ARM STAY|ARM AWAY|DISARM", Parameters="ExitDelay=30|Lights=OFF"); sensorState=getSensors (type="ALL|SensorName|SensorNameList"); result=setSensorState(SensorName, parameters="Option1, Options2, . . . Option n"); interruptHandler=SensorEvent( ); and, interruptHandler=alarmEvent( ).

Functions of the remote service APIs 1412 of an embodiment use a remote PanelConnect API 1424 which resides in memory on the gateway 1402. The touchscreen 1403 communicates with the gateway 1402 through a suitable network interface such as an Ethernet or 802.11 RF connection, for example. The remote PanelConnect API 1424 provides the underlying Security System Interfaces 1426 used to communicate with and control one or more types of security panel via wired link 1430 and/or RF link 3. The PanelConnect API 1224 provides responses and input to the remote services APIs 1426, and in turn translates function calls and data to and from the specific protocols and functions supported by a specific implementation of a Security Panel (e.g. a GE Security Simon XT or Honeywell Vista 20P). In an embodiment, the PanelConnect API 1224 uses a 345 MHz RF transceiver or receiver hardware/firmware module to communicate wirelessly to the security panel and directly to a set of 345 MHz RF-enabled sensors and devices, but the embodiment is not so limited.

The gateway of an alternative embodiment communicates over a wired physical coupling or connection to the security panel using the panel's specific wired hardware (bus) interface and the panel's bus-level protocol.

In an alternative embodiment, the Touchscreen 1403 implements the same PanelConnect API 1414 locally on the Touchscreen 1403, communicating directly with the Security Panel 2 and/or Sensors 2 over the proprietary RF link or over a wired link for that system. In this embodiment the Touchscreen 1403, instead of the gateway 1402, incorporates the 345 MHz RF transceiver to communicate directly with Security Panel 2 or Sensors 2 over the RF link 2. In the case of a wired link the Touchscreen 1403 incorporates the real-time hardware (e.g. a PIC chip and RS232-variant serial link) to physically connect to and satisfy the specific bus-level timing requirements of the SecurityPanel2.

In yet another alternative embodiment, either the gateway 1402 or the Touchscreen 1403 implements the remote service APIs. This embodiment includes a Cricket device ("Cricket") which comprises but is not limited to the following components: a processor (suitable for handling 802.11 protocols and processing, as well as the bus timing requirements of SecurityPanel1); an 802.11 (WiFi) client IP interface chip; and, a serial bus interface chip that implements variants of RS232 or RS485, depending on the specific Security Panel.

The Cricket also implements the full PanelConnect APIs such that it can perform the same functions as the case where the gateway implements the PanelConnect APIs. In this embodiment, the touchscreen core application 1410 calls functions in the remote service APIs 1412 (such as setArmState( )). These functions in turn couple or connect to the remote Cricket through a standard IP connection ("Cricket IP Link") (e.g., Ethernet, Homeplug, the gateway's proprietary Wifi network, etc.). The Cricket in turn implements the PanelConnect API, which responds to the request from the touchscreen core application, and performs the appropriate function using the proprietary panel interface. This interface uses either the wireless or wired proprietary protocol for the specific security panel and/or sensors.

FIG. 75 is a flow diagram of a method of integrating an external control and management application system with an existing security system, under an embodiment. Operations begin when the system is powered on 1510, involving at a minimum the power-on of the gateway device, and optionally the power-on of the connection between the gateway device and the remote servers. The gateway device initiates 1520 a software and RF sequence to locate the extant security system. The gateway and installer initiate and complete 1530 a sequence to 'learn' the gateway into the security system as a valid and authorized control device. The gateway initiates 1540 another software and RF sequence of instructions to discover and learn the existence and capabilities of existing RF devices within the extant security system, and store this information in the system. These operations under the system of an embodiment are described in further detail below.

Unlike conventional systems that extend an existing security system, the system of an embodiment operates utilizing the proprietary wireless protocols of the security system manufacturer. In one illustrative embodiment, the gateway is an embedded computer with an IP LAN and WAN connection and a plurality of RF transceivers and software protocol modules capable of communicating with a plurality of security systems each with a potentially different RF and software protocol interface. After the gateway has completed the discovery and learning 1540 of sensors and has been integrated 1550 as a virtual control device in the extant security system, the system becomes operational. Thus, the security system and associated sensors are presented 1550 as accessible devices to a potential plurality of user interface subsystems.

The system of an embodiment integrates 1560 the functionality of the extant security system with other non-security devices including but not limited to IP cameras, touchscreens, lighting controls, door locking mechanisms, which may be controlled via RF, wired, or powerline-based networking mechanisms supported by the gateway or servers.

The system of an embodiment provides a user interface subsystem 1570 enabling a user to monitor, manage, and control the system and associated sensors and security systems. In an embodiment of the system, a user interface subsystem is an HTML/WL/Javascript/Java/AJAX/Flash presentation of a monitoring and control application, enabling users to view the state of all sensors and controllers in the extant security system from a web browser or equivalent operating on a computer, PDA, mobile phone, or other consumer device.

In another illustrative embodiment of the system described herein, a user interface subsystem is an HTML/XML/Javascript/Java/AJAX presentation of a monitoring and control application, enabling users to combine the monitoring and control of the extant security system and sensors with the monitoring and control of non-security devices including but not limited to IP cameras, touchscreens, lighting controls, door locking mechanisms.

In another illustrative embodiment of the system described herein, a user interface subsystem is a mobile phone application enabling users to monitor and control the extant security system as well as other non-security devices.

In another illustrative embodiment of the system described herein, a user interface subsystem is an application running on a keypad or touchscreen device enabling users to monitor and control the extant security system as well as other non-security devices.

In another illustrative embodiment of the system described herein, a user interface subsystem is an application operating on a TV or set-top box connected to a TV enabling users to monitor and control the extant security system as well as other non-security devices.

FIG. 76 is a block diagram of an integrated security system 1600 wirelessly interfacing to proprietary security systems, under an embodiment. A security system 1610 is coupled or connected to a Gateway 1620, and from Gateway 1620 coupled or connected to a plurality of information and content sources across a network 1630 including one or more web servers 1640, system databases 1650, and applications servers 1660. While in one embodiment network 1630 is the Internet, including the World Wide Web, those of skill in the art will appreciate that network 1630 may be any type of network, such as an intranet, an extranet, a virtual private network (VPN), a mobile network, or a non-TCP/IP based network.

Moreover, other elements of the system of an embodiment may be conventional, well-known elements that need not be explained in detail herein. For example, security system 1610 could be any type home or business security system, such devices including but not limited to a standalone RF home security system or a non-RF-capable wired home security system with an add-on RF interface module. In the integrated security system 1600 of this example, security system 1610 includes an RF-capable wireless security panel (WSP) 1611 that acts as the master controller for security system 1610. Well-known examples of such a WSP include the GE Security Concord, Networx, and Simon panels, the Honeywell Vista and Lynx panels, and similar panels from DSC and Napco, to name a few. A wireless module 1614 includes the RF hardware and protocol software necessary to enable communication with and control of a plurality of wireless devices 1613. WSP 1611 may also manage wired devices 1614 physically connected to WSP 1611 with an RS232 or RS485 or Ethernet connection or similar such wired interface.

In an implementation consistent with the systems and methods described herein, Gateway 1620 provides the interface between security system 1610 and LAN and/or WAN for purposes of remote control, monitoring, and management. Gateway 1620 communicates with an external web server 1640, database 1650, and application server 1660 over network 1630 (which may comprise WAN, LAN, or a combination thereof). In this example system, application logic, remote user interface functionality, as well as user state and account are managed by the combination of these remote servers. Gateway 1620 includes server connection manager 1621, a software interface module responsible for all server communication over network 1630. Event manager 1622 implements the main event loop for Gateway 1620, processing events received from device manager 1624 (communicating with non-security system devices including but not limited to IP cameras, wireless thermostats, or remote door locks). Event manager 1622 further processes events and control messages from and to security system 1610 by utilizing WSP manager 1623.

WSP manager 1623 and device manager 1624 both rely upon wireless protocol manager 1626 which receives and stores the proprietary or standards-based protocols required to support security system 1610 as well as any other devices interfacing with gateway 1620. WSP manager 1623 further utilizes the comprehensive protocols and interface algorithms for a plurality of security systems 1610 stored in the WSP DB client database associated with wireless protocol manager 1626. These various components implement the software logic and protocols necessary to communicate with and manager devices and security systems 1610. Wireless Transceiver hardware modules 1625 are then used to implement the physical RF communications link to such devices and security systems 1610. An illustrative wireless transceiver 1625 is the GE Security Dialog circuit board, implementing a 319.5 MHz two-way RF transceiver module. In this example, RF Link 1670 represents the 319.5 MHz RF communication link, enabling gateway 1620 to monitor and control WSP 1611 and associated wireless and wired devices 1613 and 1614, respectively.

In one embodiment, server connection manager 1621 requests and receives a set of wireless protocols for a specific security system 1610 (an illustrative example being that of the GE Security Concord panel and sensors) and stores them in the WSP DB portion of the wireless protocol manager 1626. WSP manager 1623 then utilizes such protocols from wireless protocol manager 1626 to initiate the sequence of processes detailed in FIG. 57 and FIG. 58 for learning gateway 1620 into security system 1610 as an authorized control device. Once learned in, as described with reference to FIG. 58 (and above), event manager 1622 processes all events and messages detected by the combination of WSP manager 1623 and the GE Security wireless transceiver module 1625.

In another embodiment, gateway 1620 incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614. For example a wireless sensor from one manufacturer may be utilized to control a device using a different protocol from a different manufacturer.

In another embodiment, gateway 1620 incorporates a wired interface to security system 1610, and incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614.

Of course, while an illustrative embodiment of an architecture of the system of an embodiment is described in detail herein with respect to FIG. 58, one of skill in the art will understand that modifications to this architecture may be made without departing from the scope of the description presented herein. For example, the functionality described herein may be allocated differently between client and server, or amongst different server or processor-based components. Likewise, the entire functionality of the gateway 1620 described herein could be integrated completely within an existing security system 1610. In such an embodiment, the architecture could be directly integrated with a security system 1610 in a manner consistent with the currently described embodiments.

FIG. 77 is a flow diagram for wirelessly 'learning' the Gateway into an existing security system and discovering extant sensors, under an embodiment. The learning interfaces gateway 1620 with security system 1610. Gateway 1620 powers up 1710 and initiates software sequences 1720 and 1725 to identify accessible WSPs 1611 and wireless devices 1613, respectively (e.g., one or more WSPs and/or devices within range of gateway 1620). Once identified, WSP 1611 is manually or automatically set into 'learn mode' 1730, and gateway 1620 utilizes available protocols to add 1740 itself as an authorized control device in security system 1610. Upon successful completion of this task, WSP 1611 is manually or automatically removed from 'learn mode' 1750.

Gateway 1620 utilizes the appropriate protocols to mimic 1760 the first identified device 1614. In this operation gateway 1620 identifies itself using the unique or pseudo-unique identifier of the first found device 1614, and sends an appropriate change of state message over RF Link 1670. In the event that WSP 1611 responds to this change of state message, the device 1614 is then added 1770 to the system in database 1650. Gateway 1620 associates 1780 any other information (such as zone name or token-based identifier) with this device 1614 in database 1650, enabling gateway 1620, user interface modules, or any application to retrieve this associated information.

In the event that WSP 1611 does not respond to the change of state message, the device 1614 is not added 1770 to the system in database 1650, and this device 1614 is identified as not being a part of security system 1610 with a flag, and is either ignored or added as an independent device, at the discretion of the system provisioning rules. Operations hereunder repeat 1785 operations 1760, 1770, 1780 for all devices 1614 if applicable. Once all devices 1614 have been tested in this way, the system begins operation 1790.

In another embodiment, gateway 1620 utilizes a wired connection to WSP 1611, but also incorporates a wireless transceiver 1625 to communicate directly with devices 1614. In this embodiment, operations under 1720 above are removed, and operations under 1740 above are modified so the system of this embodiment utilizes wireline protocols to add itself as an authorized control device in security system 1610.

A description of an example embodiment follows in which the Gateway (FIG. 58, element 1620) is the iHub available from iControl Networks, Palo Alto, Calif., and described in detail herein. In this example the gateway is "automatically" installed with a security system.

The automatic security system installation begins with the assignment of an authorization key to components of the security system (e.g., gateway, kit including the gateway, etc.). The assignment of an authorization key is done in lieu of creating a user account. An installer later places the gateway in a user's premises along with the premises security system. The installer uses a computer to navigate to a web portal (e.g., integrated security system web interface), logs in to the portal, and enters the authorization key of the installed gateway into the web portal for authentication. Once authenticated, the gateway automatically discovers devices at the premises (e.g., sensors, cameras, light controls, etc.) and adds the discovered devices to the system or "network". The installer assigns names to the devices, and tests operation of the devices back to the server (e.g., did the door open, did the camera take a picture, etc.). The security device information is optionally pushed or otherwise propagated to a security panel and/or to the server network database. The installer finishes the installation, and instructs the end user on how to create an account, username, and password. At this time the user enters the authorization key which validates the account creation (uses a valid authorization key to associate the network with the user's account). New devices may subsequently be added to the security network in a variety of ways (e.g., user first enters a unique ID for each device/sensor and names it in the server, after which the gateway can automatically discover and configure the device).

A description of another example embodiment follows in which the security system (FIG. 58, element 1610) is a Dialog system and the WSP (FIG. 58, element 1611) is a SimonXT available from General Electric Security, and the Gateway (FIG. 58, element 1620) is the iHub available from iControl Networks, Palo Alto, Calif., and described in detail herein. Descriptions of the install process for the SimonXT and iHub are also provided below.

GE Security's Dialog network is one of the most widely deployed and tested wireless security systems in the world. The physical RF network is based on a 319.5 MHz unlicensed spectrum, with a bandwidth supporting up to 19 Kbps communications. Typical use of this bandwidth—even in conjunction with the integrated security system—is far less than that. Devices on this network can support either one-way communication (either a transmitter or a receiver) or two-way communication (a transceiver). Certain GE Simon, Simon XT, and Concord security control panels incorporate a two-way transceiver as a standard component. The gateway also incorporates the same two-way transceiver card. The physical link layer of the network is managed by the transceiver module hardware and firmware, while the coded payload bitstreams are made available to the application layer for processing.

Sensors in the Dialog network typically use a 60-bit protocol for communicating with the security panel transceiver, while security system keypads and the gateway use the encrypted 80-bit protocol. The Dialog network is configured for reliability, as well as low-power usage. Many devices are supervised, i.e. they are regularly monitored by the system 'master' (typically a GE security panel), while still maintaining excellent power usage characteristics. A typical door window sensor has a battery life in excess of 5-7 years.

The gateway has two modes of operation in the Dialog network: a first mode of operation is when the gateway is configured or operates as a 'slave' to the GE security panel; a second mode of operation is when the gateway is configured or operates as a 'master' to the system in the event a security panel is not present. In both configurations, the gateway has the ability to 'listen' to network traffic, enabling the gateway to continually keep track of the status of all devices in the system. Similarly, in both situations the gateway can address and control devices that support setting adjustments (such as the GE wireless thermostat).

In the configuration in which the gateway acts as a 'slave' to the security panel, the gateway is 'learned into' the system as a GE wireless keypad. In this mode of operation, the gateway emulates a security system keypad when managing the security panel, and can query the security panel for status and 'listen' to security panel events (such as alarm events).

The gateway incorporates an RF Transceiver manufactured by GE Security, but is not so limited. This transceiver implements the Dialog protocols and handles all network message transmissions, receptions, and timing. As such, the physical, link, and protocol layers of the communications between the gateway and any GE device in the Dialog network are totally compliant with GE Security specifications.

At the application level, the gateway emulates the behavior of a GE wireless keypad utilizing the GE Security 80-bit encrypted protocol, and only supported protocols and network traffic are generated by the gateway. Extensions to the Dialog RF protocol of an embodiment enable full control and configuration of the panel, and iControl can both automate installation and sensor enrollment as well as direct configuration downloads for the panel under these protocol extensions.

As described above, the gateway participates in the GE Security network at the customer premises. Because the gateway has intelligence and a two-way transceiver, it can 'hear' all of the traffic on that network. The gateway makes use of the periodic sensor updates, state changes, and supervisory signals of the network to maintain a current state of the premises. This data is relayed to the integrated security system server (e.g., FIG. 2, element 260) and stored in the event repository for use by other server components.

This usage of the GE Security RF network is completely non-invasive; there is no new data traffic created to support this activity.

The gateway can directly (or indirectly through the Simon XT panel) control two-way devices on the network. For example, the gateway can direct a GE Security Thermostat to change its setting to 'Cool' from 'Off', as well as request an update on the current temperature of the room. The gateway performs these functions using the existing GE Dialog protocols, with little to no impact on the network; a gateway device control or data request takes only a few dozen bytes of data in a network that can support 19 Kbps.

By enrolling with the Simon XT as a wireless keypad, as described herein, the gateway includes data or information of all alarm events, as well as state changes relevant to the security panel. This information is transferred to the gateway as encrypted packets in the same way that the information is transferred to all other wireless keypads on the network.

Because of its status as an authorized keypad, the gateway can also initiate the same panel commands that a keypad can initiate. For example, the gateway can arm or disarm the panel using the standard Dialog protocol for this activity. Other than the monitoring of standard alarm events like other network keypads, the only incremental data traffic on the network as a result of the gateway is the infrequent remote arm/disarm events that the gateway initiates, or infrequent queries on the state of the panel.

The gateway is enrolled into the Simon XT panel as a 'slave' device which, in an embodiment, is a wireless keypad. This enables the gateway for all necessary functionality for operating the Simon XT system remotely, as well as combining the actions and information of non-security devices such as lighting or door locks with GE Security devices. The only resource taken up by the gateway in this scenario is one wireless zone (sensor ID).

The gateway of an embodiment supports three forms of sensor and panel enrollment/installation into the integrated security system, but is not limited to this number of enrollment/installation options. The enrollment/installation options of an embodiment include installer installation, kitting, and panel, each of which is described below.

Under the installer option, the installer enters the sensor IDs at time of installation into the integrated security system web portal or iScreen. This technique is supported in all configurations and installations.

Kits can be pre-provisioned using integrated security system provisioning applications when using the kitting option. At kitting time, multiple sensors are automatically associated with an account, and at install time there is no additional work required.

In the case where a panel is installed with sensors already enrolled (i.e. using the GE Simon XT enrollment process), the gateway has the capability to automatically extract the sensor information from the system and incorporate it into the user account on the integrated security system server.

The gateway and integrated security system of an embodiment uses an auto-learn process for sensor and panel enrollment in an embodiment. The deployment approach of an embodiment can use additional interfaces that GE Security is adding to the Simon XT panel. With these interfaces, the gateway has the capability to remotely enroll sensors in the panel automatically. The interfaces include, but are not limited to, the following: EnrollDevice(ID, type, name, zone, group); SetDeviceParameters(ID, type, Name, zone, group), GetDeviceParameters(zone); and RemoveDevice (zone).

The integrated security system incorporates these new interfaces into the system, providing the following install process. The install process can include integrated security system logistics to handle kitting and pre-provisioning. Pre-kitting and logistics can include a pre-provisioning kitting tool provided by integrated security system that enables a security system vendor or provider ("provider") to offer pre-packaged initial 'kits'. This is not required but is recommended for simplifying the install process. This example assumes a 'Basic' kit is preassembled and includes one (1) Simon XT, three (3) Door/window sensors, one (1) motion sensor, one (1) gateway, one (1) keyfob, two (2) cameras, and ethernet cables. The kit also includes a sticker page with all Zones (1-24) and Names (full name list).

The provider uses the integrated security system kitting tool to assemble 'Basic' kit packages. The contents of different types of starter kits may be defined by the provider. At the distribution warehouse, a worker uses a bar code scanner to scan each sensor and the gateway as it is packed into the box. An ID label is created that is attached to the box. The scanning process automatically associates all the devices with one kit, and the new ID label is the unique identifier of the kit. These boxes are then sent to the provider for distribution to installer warehouses. Individual sensors, cameras, etc. are also sent to the provider installer warehouse. Each is labeled with its own barcode/ID.

An installation and enrollment procedure of a security system including a gateway is described below as one example of the installation process.

1. Order and Physical Install Process
   a. Once an order is generated in the iControl system, an account is created and an install ticket is created and sent electronically to the provider for assignment to an installer.
   b. The assigned installer picks up his/her ticket(s) and fills his/her truck with Basic and/or Advanced starter kits. He/she also keeps a stock of individual sensors, cameras, iHubs, Simon XTs, etc. Optionally, the installer can also stock homeplug adapters for problematic installations.
   c. The installer arrives at the address on the ticket, and pulls out the Basic kit. The installer determines sensor locations from a tour of the premises and discussion with the homeowner. At this point assume the homeowner requests additional equipment including an extra camera, two (2) additional door/window sensors, one (1) glass break detector, and one (1) smoke detector.
   d. Installer mounts SimonXT in the kitchen or other location in the home as directed by the homeowner, and routes the phone line to Simon XT if available. GPRS and Phone numbers pre-programmed in SimonXT to point to the provider Central Monitoring Station (CMS).
   e. Installer places gateway in the home in the vicinity of a router and cable modem. Installer installs an ethernet line from gateway to router and plugs gateway into an electrical outlet.
2. Associate and Enroll gateway into SimonXT
   a. Installer uses either his/her own laptop plugged into router, or homeowners computer to go to the integrated security system web interface and log in with installer ID/pass.
   b. Installer enters ticket number into admin interface, and clicks 'New Install' button. Screen prompts installer for kit ID (on box's barcode label).
   c. Installer clicks 'Add SimonXT'. Instructions prompt installer to put Simon XT into install mode, and add gateway as a wireless keypad. It is noted that this step is for security only and can be automated in an embodiment.

d. Installer enters the installer code into the Simon XT. Installer Learns 'gateway' into the panel as a wireless keypad as a group 1 device.

e. Installer goes back to Web portal, and clicks the 'Finished Adding SimonXT' button.

3. Enroll Sensors into SimonXT via iControl a. All devices in the Basic kit are already associated with the user's account.

b. For additional devices, Installer clicks 'Add Device' and adds the additional camera to the user's account (by typing in the camera ID/Serial #).

c. Installer clicks 'Add Device' and adds other sensors (two (2) door/window sensors, one (1) glass break sensor, and one (1) smoke sensor) to the account (e.g., by typing in IDs).

d. As part of Add Device, Installer assigns zone, name, and group to the sensor. Installer puts appropriate Zone and Name sticker on the sensor temporarily.

e. All sensor information for the account is pushed or otherwise propagated to the iConnect server, and is available to propagate to CMS automation software through the CMS application programming interface (API).

f. Web interface displays 'Installing Sensors in System . . . ' and automatically adds all of the sensors to the Simon XT panel through the GE RF link.

g. Web interface displays 'Done Installing'→all sensors show green.

4. Place and Tests Sensors in Home a. Installer physically mounts each sensor in its desired location, and removes the stickers.

b. Installer physically mounts WiFi cameras in their location and plugs into AC power. Optional fishing of low voltage wire through wall to remove dangling wires. Camera transformer is still plugged into outlet but wire is now inside the wall.

c. Installer goes to Web interface and is prompted for automatic camera install. Each camera is provisioned as a private, encrypted Wifi device on the gateway secured sandbox network, and firewall NAT traversal is initiated. Upon completion the customer is prompted to test the security system.

d. Installer selects the 'Test System' button on the web portal—the SimonXT is put into Test mode by the gateway over GE RF.

e. Installer manually tests the operation of each sensor, receiving an audible confirmation from SimonXT.

f. gateway sends test data directly to CMS over broadband link, as well as storing the test data in the user's account for subsequent report generation.

g. Installer exits test mode from the Web portal.

5. Installer instructs customer on use of the Simon XT, and shows customer how to log into the iControl web and mobile portals. Customer creates a username/password at this time.

6. Installer instructs customer how to change Simon XT user code from the Web interface. Customer changes user code which is pushed to SimonXT automatically over GE RF.

An installation and enrollment procedure of a security system including a gateway is described below as an alternative example of the installation process. This installation process is for use for enrolling sensors into the SimonXT and integrated security system and is compatible with all existing GE Simon panels.

The integrated security system supports all pre-kitting functionality described in the installation process above. However, for the purpose of the following example, no kitting is used.

1. Order and Physical Install Process a. Once an order is generated in the iControl system, an account is created and an install ticket is created and sent electronically to the security system provider for assignment to an installer.

b. The assigned installer picks up his/her ticket(s) and fills his/her truck with individual sensors, cameras, iHubs, Simon XTs, etc. Optionally, the installer can also stock homeplug adapters for problematic installations.

c. The installer arrives at the address on the ticket, and analyzes the house and talks with the homeowner to determine sensor locations. At this point assume the homeowner requests three (3) cameras, five (5) door/window sensors, one (1) glass break detector, one (1) smoke detector, and one (1) keyfob.

d. Installer mounts SimonXT in the kitchen or other location in the home. The installer routes a phone line to Simon XT if available. GPRS and Phone numbers are pre-programmed in SimonXT to point to the provider CMS.

e. Installer places gateway in home in the vicinity of a router and cable modem, and installs an ethernet line from gateway to the router, and plugs gateway into an electrical outlet.

2. Associate and Enroll gateway into SimonXT a. Installer uses either his/her own laptop plugged into router, or homeowners computer to go to the integrated security system web interface and log in with an installer ID/pass.

b. Installer enters ticket number into admin interface, and clicks 'New Install' button. Screen prompts installer to add devices.

c. Installer types in ID of gateway, and it is associated with the user's account.

d. Installer clicks 'Add Device' and adds the cameras to the user's account (by typing in the camera ID/Serial #).

e. Installer clicks 'Add SimonXT'. Instructions prompt installer to put Simon XT into install mode, and add gateway as a wireless keypad.

f. Installer goes to Simon XT and enters the installer code into the Simon XT. Learns 'gateway' into the panel as a wireless keypad as group 1 type sensor.

g. Installer returns to Web portal, and clicks the 'Finished Adding SimonXT' button.

h. Gateway now is alerted to all subsequent installs over the security system RF.

3. Enroll Sensors into SimonXT via iControl a. Installer clicks 'Add Simon XT Sensors'—Displays instructions for adding sensors to Simon XT.

b. Installer goes to Simon XT and uses Simon XT install process to add each sensor, assigning zone, name, group. These assignments are recorded for later use.

c. The gateway automatically detects each sensor addition and adds the new sensor to the integrated security system.

d. Installer exits install mode on the Simon XT, and returns to the Web portal.

e. Installer clicks 'Done Adding Devices'.

f. Installer enters zone/sensor naming from recorded notes into integrated security system to associate sensors to friendly names.

g. All sensor information for the account is pushed to the iConnect server, and is available to propagate to CMS automation software through the CMS API.

4. Place and Tests Sensors in Home a. Installer physically mounts each sensor in its desired location.

b. Installer physically mounts Wifi cameras in their location and plugs into AC power. Optional fishing of low voltage wire through wall to remove dangling wires. Camera transformer is still plugged into outlet but wire is now inside the wall.

c. Installer puts SimonXT into Test mode from the keypad.

d. Installer manually tests the operation of each sensor, receiving an audible confirmation from SimonXT.

e. Installer exits test mode from the Simon XT keypad.

f. Installer returns to web interface and is prompted to automatically set up cameras. After waiting for completion cameras are now provisioned and operational.

5. Installer instructs customer on use of the Simon XT, and shows customer how to log into the integrated security system web and mobile portals. Customer creates a username/password at this time.

6. Customer and Installer observe that all sensors/cameras are green.

7. Installer instructs customer how to change Simon XT user code from the keypad. Customer changes user code and stores in SimonXT.

8. The first time the customer uses the web portal to Arm/Disarm system the web interface prompts the customer for the user code, which is then stored securely on the server. In the event the user code is changed on the panel the web interface once again prompts the customer.

The panel of an embodiment can be programmed remotely. The CMS pushes new programming to SimonXT over a telephone or GPRS link. Optionally, iControl and GE provide a broadband link or coupling to the gateway and then a link from the gateway to the Simon XT over GE RF.

In addition to the configurations described above, the gateway of an embodiment supports takeover configurations in which it is introduced or added into a legacy security system. A description of example takeover configurations follow in which the security system (FIG. 2, element 210) is a Dialog system and the WSP (FIG. 2, element 211) is a GE Concord panel (e.g., equipped with POTS, GE RF, and Superbus 2000 RS485 interface (in the case of a Lynx takeover the Simon XT is used) available from General Electric Security. The gateway (FIG. 2, element 220) in the takeover configurations is an iHub (e.g., equipped with built-in 802.11b/g router, Ethernet Hub, GSM/GPRS card, RS485 interface, and iControl Honeywell-compatible RF card) available from iControl Networks, Palo Alto, Calif. While components of particular manufacturers are used in this example, the embodiments are not limited to these components or to components from these vendors.

The security system can optionally include RF wireless sensors (e.g., GE wireless sensors utilizing the GE Dialog RF technology), IP cameras, a GE-iControl Touchscreen (the touchscreen is assumed to be an optional component in the configurations described herein, and is thus treated separately from the iHub; in systems in which the touchscreen is a component of the base security package, the integrated iScreen (available from iControl Networks, Palo Alto, Calif.) can be used to combine iHub technology with the touchscreen in a single unit), and Z-Wave devices to name a few.

The takeover configurations described below assume takeover by a "new" system of an embodiment of a security system provided by another third party vendor, referred to herein as an "original" or "legacy" system. Generally, the takeover begins with removal of the control panel and keypad of the legacy system. A GE Concord panel is installed to replace the control panel of the legacy system along with an iHub with GPRS Modem. The legacy system sensors are then connected or wired to the Concord panel, and a GE keypad or touchscreen is installed to replace the control panel of the legacy system. The iHub includes the iControl RF card, which is compatible with the legacy system. The iHub finds and manages the wireless sensors of the legacy system, and learns the sensors into the Concord by emulating the corresponding GE sensors. The iHub effectively acts as a relay for legacy wireless sensors.

Once takeover is complete, the new security system provides a homogeneous system that removes the compromises inherent in taking over or replacing a legacy system. For example, the new system provides a modern touchscreen that may include additional functionality, new services, and supports integration of sensors from various manufacturers. Furthermore, lower support costs can be realized because call centers, installers, etc. are only required to support one architecture. Additionally, there is minimal install cost because only the panel is required to be replaced as a result of the configuration flexibility offered by the iHub.

The system takeover configurations described below include but are not limited to a dedicated wireless configuration, a dedicated wireless configuration that includes a touchscreen, and a fished Ethernet configuration. Each of these configurations is described in detail below.

FIG. 78 is a block diagram of a security system in which the legacy panel is replaced with a GE Concord panel wirelessly coupled to an iHub, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

FIG. 79 is a block diagram of a security system in which the legacy panel is replaced with a GE Concord panel wirelessly coupled to an iHub, and a GE-iControl Touchscreen, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The GE-iControl Touchscreen can be used with either of an 802.11 connection or Ethernet connection with the iHub. Because the takeover involves a GE Concord panel (or Simon XT), the touchscreen is always an option. No extra wiring is required for the touchscreen as it can use the 4-wire set from the replaced keypad of the legacy system. This provides power, battery backup (through Concord), and data link (RS485 Superbus 2000) between Concord and touchscreen. The touchscreen receives its broadband connectivity through the dedicated 802.11 link to the iHub.

FIG. 80 is a block diagram of a security system in which the legacy panel is replaced with a GE Concord panel connected to an iHub via an Ethernet coupling, under an embodiment. All existing wired and RF sensors remain in place. The iHub is located near the Concord panel, and wired to the panel using a 4-wire Superbus 2000 (RS485) interface, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The takeover installation process is similar to the installation process described above, except the control panel of the legacy system is replaced; therefore, only the differences with the installation described above are provided here. The takeover approach of an embodiment uses the existing RS485 control interfaces that GE Security and iControl support with the iHub, touchscreen, and Concord panel. With these interfaces, the iHub is capable of automatically enrolling sensors in the panel. The exception is the leverage of an iControl RF card compatible with legacy systems to 'takeover' existing RF sensors. A description of the takeover installation process follows.

During the installation process, the iHub uses an RF Takeover Card to automatically extract all sensor IDs, zones, and names from the legacy panel. The installer removes connections at the legacy panel from hardwired wired sensors and labels each with the zone. The installer pulls the legacy panel and replaces it with the GE Concord panel. The installer also pulls the existing legacy keypad and replaces it with either a GE keypad or a GE-iControl touchscreen. The installer connects legacy hardwired sensors to appropriate wired zone (from labels) on the Concord. The installer connects the iHub to the local network and connects the iHub RS485 interface to the Concord panel. The iHub automatically 'enrolls' legacy RF sensors into the Concord panel as GE sensors (maps IDs), and pushes or otherwise propagates other information gathered from HW panel (zone, name, group). The installer performs a test of all sensors back to CMS. In operation, the iHub relays legacy sensor data to the Concord panel, emulating equivalent GE sensor behavior and protocols.

The areas of the installation process particular to the legacy takeover include how the iHub extracts sensor info from the legacy panel and how the iHub automatically enrolls legacy RF sensors and populates Concord with wired zone information. Each of these areas is described below.

In having the iHub extract sensor information from the legacy panel, the installer 'enrolls' iHub into the legacy panel as a wireless keypad (use install code and house ID—available from panel). The iHub legacy RF Takeover Card is a compatible legacy RF transceiver. The installer uses the web portal to place iHub into 'Takeover Mode', and the web portal the automatically instructs the iHub to begin extraction. The iHub queries the panel over the RF link (to get all zone information for all sensors, wired and RF). The iHub then stores the legacy sensor information received during the queries on the iConnect server.

The iHub also automatically enrolls legacy RF sensors and populates Concord with wired zone information. In so doing, the installer selects 'Enroll legacy Sensors into Concord' (next step in 'Takeover' process on web portal). The iHub automatically queries the iConnect server, and downloads legacy sensor information previously extracted. The downloaded information includes an ID mapping from legacy ID to 'spoofed' GE ID. This mapping is stored on the server as part of the sensor information (e.g., the iConnect server knows that the sensor is a legacy sensor acting in GE mode). The iHub instructs Concord to go into install mode, and sends appropriate Superbus 2000 commands for sensor learning to the panel. For each sensor, the 'spoofed' GE ID is loaded, and zone, name, and group are set based on information extracted from legacy panel. Upon completion, the iHub notifies the server, and the web portal is updated to reflect next phase of Takeover (e.g., 'Test Sensors').

Sensors are tested in the same manner as described above. When a HW sensor is triggered, the signal is captured by the iHub legacy RF Takeover Card, translated to the equivalent GE RF sensor signal, and pushed to the panel as a sensor event on the SuperBus 2000 wires.

In support of remote programming of the panel, CMS pushes new programming to Concord over a phone line, or to the iConnect CMS/Alarm Server API, which in turn pushes the programming to the iHub. The iHub uses the Concord Superbus 2000 RS485 link to push the programming to the Concord panel.

FIG. 81 is a flow diagram for automatic takeover 2100 of a security system, under an embodiment. Automatic takeover includes establishing 2102 a wireless coupling between a takeover component running under a processor and a first controller of a security system installed at a first location. The security system includes some number of security system components coupled to the first controller. The automatic takeover includes automatically extracting 2104 security data of the security system from the first controller via the takeover component. The automatic takeover includes automatically transferring 2106 the security data to a second controller and controlling loading of the security data into the second controller. The second controller is coupled to the security system components and replaces the first controller.

FIG. 82 is a flow diagram for automatic takeover 2200 of a security system, under an alternative embodiment. Automatic takeover includes automatically forming 2202 a security network at a first location by establishing a wireless coupling between a security system and a gateway. The gateway of an embodiment includes a takeover component. The security system of an embodiment includes security system components. The automatic takeover includes automatically extracting 2204 security data of the security system from a first controller of the security system. The automatic takeover includes automatically transferring 2206 the security data to a second controller. The second controller of an embodiment is coupled to the security system components and replaces the first controller.

Embodiments described herein include a system comprising a gateway located at a premise and forming at least one network on the premise that includes a plurality of premise devices. The system includes a sensor user interface (SUI) coupled to the gateway and presented to a user via a remote device. The SUI comprises at least one display element that includes a floor plan display representing at least one floor of the premise. The floor plan display includes a plurality of system icons that represent location and state of the plurality of premise devices. Control of the plurality of premises devices is accessed via the plurality of system icons. The SUI includes an edit mode for generating the floor plan display to represent the premise and placing the plurality of system icons on the floor plan display.

Embodiments described herein include a system comprising: a gateway located at a premise and forming at least one network on the premise that includes a plurality of premise devices; and a sensor user interface (SUI) coupled to the gateway and presented to a user via a remote device, wherein the SUI comprises at least one display element that includes a floor plan display representing at least one floor of the premise, wherein the floor plan display includes a plurality of system icons that represent location and state of the plurality of premise devices, wherein control of the plurality of premises devices is accessed via the plurality of system icons, wherein the SUI includes an edit mode for generating the floor plan display to represent the premise and placing the plurality of system icons on the floor plan display.

Embodiments described herein include a system comprising a security network comprising a gateway at a premise coupled to a security system that includes security system components located at the premise. The gateway is coupled to a remote network. The system includes a subnetwork coupled to the gateway. The subnetwork comprises a plurality of premise devices located at the premise. The system includes a sensor user interface (SUI) coupled to the gateway and presented to a user via a plurality of remote client devices. The SUI comprises at least one display element that includes a floor plan display that represents at least one floor of the premise. The at least one display element includes a plurality of system icons displayed on the floor plan display and representing location and status of the security system components and the plurality of premise devices. The SUI includes an edit mode for generating the floor plan display to represent the premise and placing the plurality of system icons on the floor plan display.

Embodiments described herein include a system comprising: a security network comprising a gateway at a premise coupled to a security system that includes security system components located at the premise, wherein the gateway is coupled to a remote network; a subnetwork coupled to the gateway, wherein the subnetwork comprises a plurality of premise devices located at the premise; and a sensor user interface (SUI) coupled to the gateway and presented to a user via a plurality of remote client devices, wherein the SUI comprises at least one display element that includes a floor plan display that represents at least one floor of the premise, wherein the at least one display element includes a plurality of system icons displayed on the floor plan display and representing location and status of the security system components and the plurality of premise devices, wherein the SUI includes an edit mode for generating the floor plan display to represent the premise and placing the plurality of system icons on the floor plan display.

The SUI of an embodiment includes a security button that enables control of the security system.

The security button of an embodiment enables arming of the security system.

The security button of an embodiment enables disarming of the security system.

The at least one floor of an embodiment comprises a plurality of floors.

The SUI of an embodiment comprises a plurality of floor icons, wherein each floor icon corresponds to one of the plurality of floors.

The plurality of system icons of an embodiment includes a plurality of sensor icons, wherein each sensor icon represents a location and a state of a security system component corresponding to the sensor icon.

The plurality of system icons of an embodiment includes a plurality of device icons, wherein each device icon represents a location and a state of a premise device corresponding to the device icon.

The system comprises a popup display that is displayed in response to a touch of a system icon of the plurality of system icons.

The popup display of an embodiment includes a name of the security system component corresponding to the sensor icon that was touched and information of the security system component.

The popup display of an embodiment includes a name of the premise device corresponding to the device icon that was touched.

The popup display of an embodiment includes a link to information of the premise device.

The edit mode of an embodiment comprises a plurality of floor plans, wherein each floor plan of the plurality of floor plans defines a perimeter shape of a floor and corresponds to a floor plan icon that is selectable by a user for the floor plan display.

The edit mode of an embodiment comprises at least one of adding walls and deleting walls.

The edit mode of an embodiment comprises adding a wall on the floor plan display, wherein the adding of the wall comprises forming the wall to have a length and placing the wall at a location on the floor plan display.

The edit mode of an embodiment comprises deleting at least a portion of a wall from the floor plan display.

The edit mode of an embodiment comprises placing the plurality of system icons on the floor plan display.

The edit mode of an embodiment comprises a dock region that includes the plurality of system icons.

Each system icon of an embodiment is dragged from the dock region to a tile of the floor plan display representative of a location in the premise of the security system components and the plurality of premise devices.

The edit mode of an embodiment comprises at least one control that controls addition and deletion of floors.

The at least one control of an embodiment comprises an add selector that controls addition of a floor.

The at least one control of an embodiment comprises a delete selector that controls deletion of a floor.

The at least one control of an embodiment comprises an add above selector that controls adding a new floor above an existing floor.

The at least one control of an embodiment comprises an add below selector that controls adding a new floor below an existing floor.

The subnetwork of an embodiment is formed by the gateway and is external to the gateway.

The gateway of an embodiment electronically integrates communications and functions of the plurality of premise devices and the security system components into the security network and controls communications between the security system, the subnetwork and the remote network.

The SUI of an embodiment includes at least one display element for managing and receiving data of the premise devices agnostically across the plurality of remote client devices.

The plurality of remote client devices of an embodiment include at least one of a touchscreen device, a mobile telephone, a cellular telephone, a client device coupled to the gateway via a mobile portal, and a client device coupled to the gateway via a web portal.

Embodiments described herein include a system comprising a touchscreen located at a premise and forming at least one network on the premise that includes a plurality of premise devices. The system includes a sensor user interface (SUI) coupled to the touchscreen and presented to a user via a remote device. The SUI comprises at least one display element that includes a floor plan display representing at least one floor of the premise. The floor plan display includes a plurality of system icons that represent location and state of the plurality of premise devices. Control of the plurality of premises devices is accessed via the plurality of system icons. The SUI includes an edit mode for generating the floor plan display to represent the premise and placing the plurality of system icons on the floor plan display.

Embodiments described herein include a system comprising: a touchscreen located at a premise and forming at least one network on the premise that includes a plurality of premise devices; and a sensor user interface (SUI) coupled to the touchscreen and presented to a user via a remote device, wherein the SUI comprises at least one display element that includes a floor plan display representing at least one floor of the premise, wherein the floor plan display includes a plurality of system icons that represent location and state of the plurality of premise devices, wherein control of the plurality of premises devices is accessed via the plurality of system icons, wherein the SUI includes an edit mode for generating the floor plan display to represent the premise and placing the plurality of system icons on the floor plan display.

Embodiments described herein include a system comprising a security network comprising a touchscreen at a premise coupled to a security system that includes security system components located at the premise. The touchscreen is coupled to a remote network. The system includes a subnetwork coupled to the touchscreen. The subnetwork comprises a plurality of premise devices located at the premise. The system includes a sensor user interface (SUI) coupled to the touchscreen and presented to a user via a plurality of remote client devices. The SUI comprises at least one display element that includes a floor plan display that represents at least one floor of the premise. The at least one display element includes a plurality of system icons displayed on the floor plan display and representing location and status of the security system components and the plurality of premise devices. The SUI includes an edit mode for generating the floor plan display to represent the premise and placing the plurality of system icons on the floor plan display.

Embodiments described herein include a system comprising: a security network comprising a touchscreen at a premise coupled to a security system that includes security system components located at the premise, wherein the touchscreen is coupled to a remote network; a subnetwork coupled to the touchscreen, wherein the subnetwork comprises a plurality of premise devices located at the premise; and a sensor user interface (SUI) coupled to the touchscreen and presented to a user via a plurality of remote client devices, wherein the SUI comprises at least one display element that includes a floor plan display that represents at least one floor of the premise, wherein the at least one display element includes a plurality of system icons displayed on the floor plan display and representing location and status of the security system components and the plurality of premise devices, wherein the SUI includes an edit mode for generating the floor plan display to represent the premise and placing the plurality of system icons on the floor plan display.

Embodiments described herein include a system comprising a gateway located at a premise and forming at least one network on the premise that includes a plurality of premise devices. The system includes a sensor user interface (SUI) coupled to the gateway and presented to a user via a remote device. The SUI includes at least one display element. The at least one display element includes a floor plan display that represents at least one floor of the premise. The floor plan display visually and separately indicates a location and a current state of each premise device of the plurality of premise devices.

Embodiments described herein include a system comprising: a gateway located at a premise and forming at least one network on the premise that includes a plurality of premise devices; and a sensor user interface (SUI) coupled to the gateway and presented to a user via a remote device, wherein the SUI includes at least one display element, wherein the at least one display element includes a floor plan display that represents at least one floor of the premise, wherein the floor plan display visually and separately indicates a location and a current state of each premise device of the plurality of premise devices.

Embodiments described herein include a system comprising a security network comprising a gateway at a premise coupled to a security system that includes security system components located at the premise. The gateway is coupled to a remote network. The system includes a subnetwork coupled to the gateway. The subnetwork comprises a plurality of premise devices located at the premise. The system includes a sensor user interface (SUI) coupled to the gateway and presented to a user via a plurality of remote client devices. The SUI includes at least one display element. The at least one display element includes a floor plan display that represents at least one floor of the premise. The at least one display element includes a plurality of system icons displayed on the floor plan display and representing location and current status of the security system components and the plurality of premise devices.

Embodiments described herein include a system comprising: a security network comprising a gateway at a premise coupled to a security system that includes security system components located at the premise, wherein the gateway is coupled to a remote network; a subnetwork coupled to the gateway, wherein the subnetwork comprises a plurality of premise devices located at the premise; and a sensor user interface (SUI) coupled to the gateway and presented to a user via a plurality of remote client devices, wherein the SUI includes at least one display element, wherein the at least one display element includes a floor plan display that represents at least one floor of the premise, wherein the at least one display element includes a plurality of system icons displayed on the floor plan display and representing location and current status of the security system components and the plurality of premise devices.

Embodiments described herein include a system comprising a gateway at a premise. The gateway forms a security network with a security system that includes security system components located at a premise and forms a subnetwork that includes a plurality of premise devices located at the premise. The system includes a sensor user interface (SUI) coupled to the gateway and presented to a user via a remote device. The SUI includes at least one display element. The at least one display element includes a floor plan display that represents at least one floor of the premise. The floor plan display visually indicates a state of the security system and location and current status of the security system components and the plurality of premise devices.

Embodiments described herein include a system comprising: a gateway at a premise, the gateway forming a security network with a security system that includes security system components located at a premise and forming a subnetwork that includes a plurality of premise devices located at the premise; and a sensor user interface (SUI) coupled to the gateway and presented to a user via a remote device, wherein the SUI includes at least one display element, wherein the at least one display element includes a floor plan display that represents at least one floor of the premise, wherein the floor plan display visually indicates a state of the security system and location and current status of the security system components and the plurality of premise devices.

Embodiments described herein include a system comprising a gateway at a premise. The gateway forms a security network with a security system that includes security system components located at a premise and forms a subnetwork that includes a plurality of premise devices located at the premise. The system includes a sensor user interface (SUI) coupled to the gateway and presented to a user via a remote device. The SUI includes at least one display element. The at least one display element includes a floor plan display that represents at least one floor of the premise. The at least one display element includes a plurality of system icons displayed on the floor plan display. The plurality of system icons includes a plurality of sensor icons that each represents a location and a state of a security system component corresponding to the sensor icon. The plurality of system icons includes a plurality of device icons that each represent a location and a state of a premise device corresponding to the device icon.

Embodiments described herein include a system comprising: a gateway at a premise, the gateway forming a security network with a security system that includes security system components located at a premise and forming a subnetwork that includes a plurality of premise devices located at the premise; and a sensor user interface (SUI) coupled to the gateway and presented to a user via a remote device, wherein the SUI includes at least one display element, wherein the at least one display element includes a floor plan display that represents at least one floor of the premise, wherein the at least one display element includes a plurality of system icons displayed on the floor plan display, wherein the plurality of system icons includes a plurality of sensor icons that each represent a location and a state of a security system component corresponding to the sensor icon, wherein the plurality of system icons includes a plurality of device icons that each represent a location and a state of a premise device corresponding to the device icon.

Embodiments described herein include a system comprising a gateway at a premise. The gateway forms a security network with a security system that includes security system components located at a premise and forms a subnetwork that includes a plurality of premise devices located at the premise. The system includes a sensor user interface (SUI) coupled to the gateway and presented to a user via a remote device. The SUI includes at least one display element. The at least one display element includes at least one of an orb icon and a floor plan display that represents at least one floor of the premise. The at least one display element visually indicates a state of the security system and location and current status of the security system components and the plurality of premise devices.

Embodiments described herein include a system comprising: a gateway at a premise, the gateway forming a security network with a security system that includes security system components located at a premise and forming a subnetwork that includes a plurality of premise devices located at the premise; and a sensor user interface (SUI) coupled to the gateway and presented to a user via a remote device, wherein the SUI includes at least one display element, wherein the at least one display element includes at least one of an orb icon and a floor plan display that represents at least one floor of the premise, wherein the at least one display element visually indicates a state of the security system and location and current status of the security system components and the plurality of premise devices.

Embodiments described herein include method comprising forming at least one network on a premise using a gateway located at the premise. The at least one network includes a plurality of premise devices. The method comprises generating and presenting a sensor user interface (SUI) to a user via a remote device. The SUI is coupled to the gateway. The SUI includes at least one display element. The at least one display element includes a floor plan display that represents at least one floor of the premise. The floor plan display visually and separately indicates a location and a current state of each premise device of the plurality of premise devices.

Embodiments described herein include method comprising: forming at least one network on a premise using a gateway located at the premise, wherein the at least one network includes a plurality of premise devices; and generating and presenting a sensor user interface (SUI) to a user via a remote device, wherein the SUI is coupled to the gateway, wherein the SUI includes at least one display element, wherein the at least one display element includes a floor plan display that represents at least one floor of the premise, wherein the floor plan display visually and separately indicates a location and a current state of each premise device of the plurality of premise devices.

Embodiments described herein include method comprising forming a security network comprising a gateway at a premise coupled to a security system that includes security system components located at the premise. The gateway is coupled to a remote network. The method comprises forming a subnetwork with the gateway. The subnetwork comprises a plurality of premise devices located at the premise. The method comprises generating and presenting a sensor user interface (SUI) to a user via a plurality of remote client devices. The SUI is coupled to the gateway and includes at least one display element. The at least one display element includes a floor plan display that represents at least one floor of the premise. The at least one display element includes a plurality of system icons displayed on the floor plan display and representing location and current status of the security system components and the plurality of premise devices.

Embodiments described herein include method comprising: forming a security network comprising a gateway at a premise coupled to a security system that includes security system components located at the premise, wherein the gateway is coupled to a remote network; forming a subnetwork with the gateway, wherein the subnetwork comprises a plurality of premise devices located at the premise; and generating and presenting a sensor user interface (SUI) to a user via a plurality of remote client devices, wherein the SUI is coupled to the gateway and includes at least one display element, wherein the at least one display element includes a floor plan display that represents at least one floor of the premise, wherein the at least one display element includes a plurality of system icons displayed on the floor plan display and representing location and current status of the security system components and the plurality of premise devices.

Embodiments described herein include method comprising forming a security network between a gateway and a security system that includes security system components located at a premise and forming with the gateway a subnetwork that includes a plurality of premise devices located at the premise. The method comprises generating and presenting a sensor user interface (SUI) to a user via a remote device. The SUI is coupled to the gateway and includes at least one display element. The at least one display element includes a floor plan display that represents at least one floor of the premise. The floor plan display visually indicates a state of the security system and location and current status of the security system components and the plurality of premise devices.

Embodiments described herein include method comprising: forming a security network between a gateway and a security system that includes security system components located at a premise and forming with the gateway a subnetwork that includes a plurality of premise devices located at the premise; and generating and presenting a sensor user interface (SUI) to a user via a remote device, wherein the SUI is coupled to the gateway and includes at least one display element, wherein the at least one display element includes a floor plan display that represents at least one floor of the premise, wherein the floor plan display visually indicates a state of the security system and location and current status of the security system components and the plurality of premise devices.

Embodiments described herein include method comprising forming a security network with a gateway and a security system that includes security system components located at a premise and forming a subnetwork that includes a plurality of premise devices located at the premise. The method comprises generating and presenting a sensor user interface (SUI) to a user via a remote device. The SUI is coupled to the gateway and includes at least one display element. The at least one display element includes a floor plan display that represents at least one floor of the premise. The at least one display element includes a plurality of system icons displayed on the floor plan display. The plurality of system icons includes a plurality of sensor icons that each represents a location and a state of a security system component corresponding to the sensor icon. The plurality of system icons includes a plurality of device icons that each represents a location and a state of a premise device corresponding to the device icon.

Embodiments described herein include method comprising: forming a security network with a gateway and a security system that includes security system components located at a premise and forming a subnetwork that includes a plurality of premise devices located at the premise; and generating and presenting a sensor user interface (SUI) to a user via a remote device, wherein the SUI is coupled to the gateway and includes at least one display element, wherein the at least one display element includes a floor plan display that represents at least one floor of the premise, wherein the at least one display element includes a plurality of system icons displayed on the floor plan display, wherein the plurality of system icons includes a plurality of sensor icons that each represent a location and a state of a security system component corresponding to the sensor icon, wherein the plurality of system icons includes a plurality of device icons that each represent a location and a state of a premise device corresponding to the device icon.

Embodiments described herein include method comprising forming a security network with a gateway and a security system that includes security system components located at a premise and forming a subnetwork that includes a plurality of premise devices located at the premise. The method comprises generating and presenting a sensor user interface (SUI) to a user via a remote device. The SUI is coupled to the gateway. The SUI includes at least one display element. The at least one display element includes at least one of an orb icon and a floor plan display that represents at least one floor of the premise. The at least one display element visually indicates a state of the security system and location and current status of the security system components and the plurality of premise devices.

Embodiments described herein include method comprising: forming a security network with a gateway and a security system that includes security system components located at a premise and forming a subnetwork that includes a plurality of premise devices located at the premise; and generating and presenting a sensor user interface (SUI) to a user via a remote device, wherein the SUI is coupled to the gateway, wherein the SUI includes at least one display element, wherein the at least one display element includes at least one of an orb icon and a floor plan display that represents at least one floor of the premise, wherein the at least one display element visually indicates a state of the security system and location and current status of the security system components and the plurality of premise devices.

The floor plan display of an embodiment comprises a color that visually indicates a state of the security system.

The color of an embodiment is a background color.

The color of an embodiment is a color of a border of the at least one floor displayed on the floor plan display.

Each color of a plurality of colors of an embodiment represents each state of a plurality of states of the security system.

The SUI of an embodiment comprises text presented with floor plan display.

The text of an embodiment comprises a text description of the state of the security system.

The text of an embodiment comprises a plurality of phrases.

The text of an embodiment comprises a first phrase describing an arm state of the security system.

The text of an embodiment comprises a second phrase describing a sensor status of at least one sensor of the security system components.

The SUI of an embodiment includes a security button that enables control of the security system.

The security button of an embodiment enables arming of the security system.

The security button of an embodiment enables disarming of the security system.

The floor plan display of an embodiment comprises a plurality of tiles.

At least one rendered state of the security system components and the plurality of premise devices of an embodiment comprises the plurality of tiles.

The at least one rendered state of an embodiment comprises an alarmed state.

The at least one rendered state of an embodiment comprises an offline state.

The at least one floor of an embodiment comprises a plurality of floors.

The SUI of an embodiment comprises a plurality of floor icons, wherein each floor icon corresponds to one of the plurality of floors.

The plurality of floors of an embodiment corresponds to a number of floors of the premise.

The plurality of floors of an embodiment corresponds to at least one floor of the premise and at least one floor of an outbuilding corresponding to the premise.

The plurality of system icons of an embodiment includes a plurality of sensor icons, wherein each sensor icon represents a location and a state of a security system component corresponding to the sensor icon.

The security system component of an embodiment is a door sensor.

The security system component of an embodiment is a window sensor.

The security system component of an embodiment is a motion sensor.

The security system component of an embodiment is a fire sensor.

The security system component of an embodiment is a smoke sensor.

The security system component of an embodiment is a glass-break sensor.

The security system component of an embodiment is a flood sensor.

The state of an embodiment comprises an alarmed state.

The state of an embodiment comprises a tripped state.

The state of an embodiment comprises a tampered state.

The state of an embodiment comprises a low-battery state.

The state of an embodiment comprises an offline state.

The state of an embodiment comprises an unknown state.

The state of an embodiment comprises an installing state.

The state of an embodiment comprises an open door state.

The state of an embodiment comprises an open window state.

The state of an embodiment comprises a motion sensor active state.

The state of an embodiment comprises a quiet state.

The quiet state of an embodiment comprises an inactive state.

The quiet state of an embodiment comprises a closed state.

The quiet state of an embodiment comprises an untriggered state.

The quiet state of an embodiment comprises an untripped state.

The plurality of system icons of an embodiment includes a plurality of device icons, wherein each device icon represents a location and a state of a premise device corresponding to the device icon.

The premise device of an embodiment is a light.

The premise device of an embodiment is a thermostat.

The premise device of an embodiment is a camera.

The premise device of an embodiment is a lock.

The premise device of an embodiment is an energy device.

The state of an embodiment comprises an installing state.

The state of an embodiment comprises an active state.

The state of an embodiment comprises a quiet state.

The system and method of an embodiment comprise a popup display that is displayed in response to a touch of a system icon of the plurality of system icons.

The popup display of an embodiment includes a name of the security system component corresponding to the sensor icon that was touched.

The popup display of an embodiment includes detailed information of the security system component.

The detailed information of an embodiment comprises text describing a status of the security system component.

The detailed information of an embodiment comprises data of a last event of the security system component.

The popup display of an embodiment includes a name of the premise device corresponding to the device icon that was touched.

The popup display of an embodiment includes a link to information of the premise device.

The link of an embodiment activates presentation of live video of the premise device when the premise device is a camera.

The link of an embodiment activates presentation of a control screen comprising controls for the premise device.

The system and method of an embodiment comprise an edit mode, wherein the SUI presents the edit mode for use in generating the floor plan display and placing the plurality of system icons on the floor plan display.

The edit mode of an embodiment comprises a plurality of floor plans, wherein each floor plan of the plurality of floor plans defines a perimeter shape of a floor and corresponds to a floor plan icon that is selectable by a user for the floor plan display.

The edit mode of an embodiment presents a grid comprising a plurality of tiles on the floor plan display.

The edit mode of an embodiment comprises at least one of adding walls and deleting walls.

The edit mode of an embodiment comprises adding a wall on the floor plan display, wherein the adding of the wall comprises forming the wall to have a length and placing the wall at a location on the floor plan display.

The edit mode of an embodiment comprises deleting at least a portion of a wall from the floor plan display.

The edit mode of an embodiment comprises placing the plurality of system icons on the floor plan display.

The edit mode of an embodiment comprises a dock region that includes the plurality of system icons.

Each system icon of an embodiment is dragged from the dock region to a tile of the floor plan display representative of a location in the premise of the security system components and the plurality of premise devices.

The edit mode of an embodiment differentiates premise exteriors from premise interiors based on a location of a tile.

The edit mode of an embodiment automatically identifies interior tiles as tiles on a first side of a perimeter wall of the floor plan display and exterior tiles as tiles on a second side of the perimeter wall.

The edit mode of an embodiment comprises a fill option that renders tiles on the first side of the perimeter wall as filled and renders tiles on the second side of the perimeter wall as transparent.

The at least one floor of an embodiment comprises a plurality of floors, wherein the edit mode comprises at least one control that controls addition and deletion of floors.

The at least one control of an embodiment comprises an add selector that controls addition of a floor.

The at least one control of an embodiment comprises a delete selector that controls deletion of a floor.

The at least one control of an embodiment comprises an add above selector that controls adding a new floor above an existing floor.

The at least one control of an embodiment comprises an add below selector that controls adding a new floor below an existing floor.

The at least one display element of an embodiment includes an orb icon that visually indicates an arm state of the security system.

The orb icon of an embodiment visually indicates a sensor status of at least one sensor of a plurality of sensors, wherein the security system components comprise the plurality of sensors.

The at least one display element of an embodiment includes orb text presented with the orb icon, wherein the orb text comprises a text description of the arm state, wherein the orb text comprises a first phrase describing the arm state and a second phrase describing a sensor status of at least one sensor of a plurality of sensors, wherein the security system components comprise the plurality of sensors.

The at least one display element of an embodiment includes at least one system warning that is an informational warning of the security system.

The at least one display element of an embodiment includes at least one device warning that is an information warning of at least one of a security system component and a premise device.

The at least one device warning of an embodiment corresponds to at least one of a camera device, a lighting device, and a thermostat device.

The at least one system warning and the at least one device warning of an embodiment is disassociated with at least one sensor of a plurality of sensors, wherein the security system components comprise the plurality of sensors.

A plurality of system warnings of an embodiment comprises the at least one system warning and the at least one device warning, wherein the plurality of system warnings are cumulative.

The at least one display element of an embodiment includes a list of interesting sensors that identifies at least one security system component corresponding to an interesting state.

The at least one display element of an embodiment comprises a plurality of interesting state icons corresponding to a plurality of interesting states, wherein the interesting state comprises at least one of a triggered state, a tampered state, a tripped state, an offline state, an installing state, a low-battery state, and a bypassed state.

The at least one display element of an embodiment includes a list of quiet sensors that identifies at least one security system component corresponding to a quiet state, wherein the quiet state comprises at least one of an inactive state, a closed state, an untriggered state, and an untripped state.

The SUI of an embodiment comprises a summary page, the summary page including an orb icon that visually indicates an arm state of the security system and a security button that enables control of the security system.

The summary page of an embodiment includes orb text presented with the orb icon, wherein the orb text comprises a text description of an arm state of the security system and a sensor status of at least one sensor of a plurality of sensors, wherein the security system components comprise the plurality of sensors.

The security button of an embodiment enables arming and disarming of the security system.

The summary page of an embodiment includes at least one icon representing at least one device warning, wherein the device warning is an information warning of at least one of a premise device.

The summary page of an embodiment comprises at least one icon enabling a transfer of content to and from the remote network, wherein the content includes interactive content in the form of internet widgets.

The summary page of an embodiment comprises at least one icon enabling communication and control of the premise devices coupled to the subnetwork, and access to live video from a camera, wherein the camera is an Internet Protocol (IP) camera.

The SUI of an embodiment comprises a sensor status page, wherein the sensor status page includes a set of display elements of the at least one display element, wherein the set of display elements includes a list of interesting sensors that identifies at least one security system component corresponding to an interesting state.

The set of display elements of an embodiment comprises a plurality of interesting state icons corresponding to a plurality of interesting states.

The set of display elements of an embodiment includes a list of quiet sensors that identifies at least one security system component corresponding to a quiet state.

The sensor status page of an embodiment includes at least one system warning that is an informational warning of the security system.

The subnetwork of an embodiment is formed by the gateway and is external to the gateway.

The gateway of an embodiment electronically integrates communications and functions of the plurality of premise devices and the security system components into the security network and controls communications between the security system, the subnetwork and the remote network.

The SUI of an embodiment includes at least one display element for managing and receiving data of the premise devices agnostically across the plurality of remote client devices.

The plurality of remote client devices of an embodiment include at least one of a touchscreen device, a mobile telephone, a cellular telephone, a client device coupled to the gateway via a mobile portal, and a client device coupled to the gateway via a web portal.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The integrated security system can be a component of a single system, multiple systems, and/or geographically separate systems. The integrated security system can also be a subcomponent or subsystem of a single system, multiple systems, and/or geographically separate systems. The integrated security system can be coupled to one or more other components (not shown) of a host system or a system coupled to the host system.

One or more components of the integrated security system and/or a corresponding system or application to which the integrated security system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the integrated security system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the integrated security system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the integrated security system and corresponding systems and methods include: microcontrollers with memory (such as electronically erasable programmable read only memory (EEPROM)), embedded microprocessors, firmware, software, etc. Furthermore, aspects of the integrated security system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the integrated security system and corresponding systems and methods is not intended to be exhaustive or to limit the systems and methods to the precise forms disclosed. While specific embodiments of, and examples for, the integrated security system and corresponding systems and methods are described herein for illustrative purposes, various equivalent modifications are possible within the scope of the systems and methods, as those skilled in the relevant art will recognize. The teachings of the integrated security system and corresponding systems and methods provided herein can be applied to other systems and methods, not only for the systems and methods described above.

The elements and acts of the various embodiments described above can be combined to provide further embodiments. These and other changes can be made to the integrated security system and corresponding systems and methods in light of the above detailed description.

The invention claimed is:

1. A method comprising:

receiving first data associated with at least one structural component of a premises, wherein the first data comprises an indication of a type of the at least one structural component, an indication of a location of the at least one structural component, and an indication of one or more physical characteristics of the at least one structural component;

receiving second data associated with a premises device located at the premises, wherein the second data comprises an indication of a state of the premises device; and causing output of a user interface that comprises:
a layout portion that, based on the first data, visually indicates the at least one structural component, and
a premises device icon, located relative to the layout portion, that indicates the state of the premises device.

2. The method of claim 1, wherein the layout portion visually indicates the at least one structural component at a location, relative to the layout portion, based on the one or more physical characteristics associated with the at least one structural component.

3. The method of claim 1, wherein the premises device icon is located, relative to the layout portion, based on at least one of: an associated structural component of the at least one structural component, an orientation of an associated structural component of the at least one structural component, or a type of the premises device.

4. The method of claim 1, wherein the premises device comprises at least one of a security sensor, a door sensor, a window sensor, a motion sensor, a fire sensor, a smoke sensor, a glass-break sensor, a flood sensor, a light, a lighting control device, a thermostat, a camera, a lock, or an automation device.

5. The method of claim 1, wherein the layout portion visually indicates the type of the at least one structural component.

6. The method of claim 1, wherein the one or more physical characteristics of the at least one structural component comprises at least one of a length, a width, or a height.

7. The method of claim 1, wherein the type of the at least one structural component comprises at least one of a horizontal wall, a vertical wall, or a space.

8. The method of claim 1, wherein the location of the at least one structural component comprises one or more coordinate values associated with the layout portion.

9. The method of claim 1, wherein the causing output of the user interface is based on the receiving the second data.

10. The method of claim 1, wherein the first data and the second data are received at different times from one another.

11. A method comprising:
receiving data associated with a premises and at least one premises device located at the premises, wherein the data comprises:
an indication of a type of at least one structural component of the premises,
an indication of a location of the at least one structural component,
an indication of one or more physical characteristics of the at least one structural component, and
an indication of a state of a premises device of the at least one premises device; and
causing output of a user interface that comprises:
a layout portion that, based on at least one of the type of the at least one structural component, the location of the at least one structural component, or the one or more physical characteristics of the at least one structural component, visually indicates the at least one structural component, and
a premises device icon, located relative to the layout portion, that indicates the state of the premises device.

12. The method of claim 11, wherein the layout portion visually indicates the at least one structural component at a location, relative to the layout portion, based on the one or more physical characteristics of the at least one structural component.

13. The method of claim 11, wherein the premises device icon is located, relative to the layout portion, based on at least one of: an associated structural component of the at least one structural component, an orientation of an associated structural component of the at least one structural component, or a type of the premises device.

14. The method of claim 11, wherein the layout portion visually indicates the type of the at least one structural component.

15. The method of claim 11, wherein the one or more physical characteristics of the at least one structural component comprises at least one of a length, a width, or a height.

16. The method of claim 11, wherein the type of the at least one structural component comprises at least one of a horizontal wall, a vertical wall, or a space.

17. The method of claim 11, wherein the location of the at least one structural component comprises one or more coordinate values associated with the layout portion.

18. The method of claim 11, wherein the causing output of the user interface is based on the receiving the data associated with the premises and the at least one premises device.

19. A method comprising:
receiving first data comprising an indication of a type of at least one structural component of a premises, an indication of a location of the at least one structural component, and an indication of one or more physical characteristics of the at least one structural component,
receiving second data comprising an indication of a state of a premises device located at the premises; and
causing output of a user interface that comprises:
a layout portion that, based on at least one of the type of the at least one structural component, the location of the at least one structural component, or the one or more physical characteristics of the at least one structural component, visually indicates the at least one structural component, and
a premises device icon, located relative to the layout portion, that indicates the state of the premises device.

20. The method of claim 19, wherein the layout portion visually indicates the at least one structural component at a location, relative to the layout portion, based on the one or more physical characteristics associated with the at least one structural component.

21. The method of claim 19, wherein the premises device icon is located, relative to the layout portion, based on at least one of: an associated structural component of the at least one structural component, an orientation of an associated structural component of the at least one structural component, or a type of the premises device.

22. The method of claim 19, wherein the layout portion visually indicates the type of the at least one structural component.

23. The method of claim 19, wherein the one or more physical characteristics of the at least one structural component comprises at least one of a length, a width, or a height.

24. The method of claim 19, wherein the causing output of the user interface is based on the receiving the second data.

25. The method of claim 19, wherein the first data and the second data are received at different times from one another.

26. A device comprising:

one or more processors; and memory storing instructions that, when executed by the one or more processors, cause the device to:

receive first data associated with at least one structural component of a premises, wherein the first data comprises an indication of a type of the at least one structural component, an indication of a location of the at least one structural component, and an indication of one or more physical characteristics of the at least one structural component;

receive second data associated with a premises device located at the premises, wherein the second data comprises an indication of a state of the premises device; and cause output of a user interface that comprises:

a layout portion that, based on the first data, visually indicates the at least one structural component, and a premises device icon, located relative to the layout portion, that indicates the state of the premises device.

27. The device of claim 26, wherein the layout portion visually indicates the at least one structural component at a location, relative to the layout portion, based on the one or more physical characteristics associated with the at least one structural component.

28. The device of claim 26, wherein the premises device icon is located, relative to the layout portion, based on at least one of: an associated structural component of the at least one structural component, an orientation of an associated structural component of the at least one structural component, or a type of the premises device.

29. The device of claim 26, wherein a premises device comprises at least one of a security sensor, a door sensor, a window sensor, a motion sensor, a fire sensor, a smoke sensor, a glass-break sensor, a flood sensor, a light, a lighting control device, a thermostat, a camera, a lock, or an automation device.

30. The device of claim 26, wherein the layout portion visually indicates the type of the at least one structural component.

31. The device of claim 26, wherein the one or more physical characteristics of the at least one structural component comprises at least one of a length, a width, or a height.

32. The device of claim 26, wherein the type of the at least one structural component comprises at least one of a horizontal wall, a vertical wall, or a space.

33. The device of claim 26, wherein the location of the at least one structural component comprises one or more coordinate values associated with the layout portion.

34. The device of claim 26, wherein the instructions, when executed by the one or more processors, further cause the device to:

cause output of the user interface based on the receiving the second data.

35. The device of claim 26, wherein the first data and the second data are received at different times from one another.

* * * * *